United States Patent
Klasen-Memmer et al.

(10) Patent No.: US 10,072,209 B2
(45) Date of Patent: Sep. 11, 2018

(54) LIQUID-CRYSTALLINE MEDIA

(71) Applicant: MERCK PATENT GMBH, Darmstadt (DE)

(72) Inventors: Melanie Klasen-Memmer, Heuchelheim (DE); Marcus Reuter, Darmstadt (DE); Rocco Fortte, Frankfurt am Main (DE); Detlef Pauluth, Ober-Ramstadt (DE); Matthias Bremer, Darmstadt (DE); Helmut Haensel, Muehltal (DE); Harald Hirschmann, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 13/721,203

(22) Filed: Dec. 20, 2012

(65) Prior Publication Data
US 2013/0183460 A1    Jul. 18, 2013

(30) Foreign Application Priority Data

Dec. 20, 2011   (DE) .................. 10 2011 121 665

(51) Int. Cl.
| | | |
|---|---|---|
| C09K 19/00 | (2006.01) |
| C09K 19/34 | (2006.01) |
| C09K 19/06 | (2006.01) |
| C09K 19/10 | (2006.01) |
| C09K 19/44 | (2006.01) |
| C09K 19/54 | (2006.01) |
| C09K 19/12 | (2006.01) |
| C09K 19/20 | (2006.01) |
| C09K 19/30 | (2006.01) |
| C09K 19/14 | (2006.01) |
| C09K 19/16 | (2006.01) |
| C09K 19/32 | (2006.01) |
| C09K 19/04 | (2006.01) |

(52) U.S. Cl.
CPC ........ C09K 19/3402 (2013.01); C09K 19/062 (2013.01); C09K 19/10 (2013.01); C09K 19/12 (2013.01); C09K 19/14 (2013.01); C09K 19/16 (2013.01); C09K 19/20 (2013.01); C09K 19/3098 (2013.01); C09K 19/322 (2013.01); C09K 19/44 (2013.01); C09K 19/54 (2013.01); C09K 19/32 (2013.01); C09K 2019/0448 (2013.01); C09K 2019/0466 (2013.01); C09K 2019/122 (2013.01); C09K 2019/123 (2013.01); C09K 2019/161 (2013.01); C09K 2019/3027 (2013.01); C09K 2019/3425 (2013.01); Y10T 428/10 (2015.01); Y10T 428/1055 (2015.01)

(58) Field of Classification Search
CPC ........ C09K 19/12; C09K 19/20; C09K 19/32; C09K 19/3402; C09K 19/54; C09K 19/56; C09K 19/44; C09K 19/062; C09K 2019/161; C09K 2019/122; C09K 2019/123; Y10T 428/10
USPC .......... 428/1.1, 1.3; 359/245, 246, 253, 242; 349/168, 182, 186; 252/299.6, 299.61, 252/299.62, 299.65, 299.66; 568/659, 568/660

See application file for complete search history.

(56) References Cited

U.S. PATENT DOCUMENTS

| | | |
|---|---|---|
| 3,814,700 A | 6/1974 | Aviram |
| 4,065,489 A | 12/1977 | Steinstrasser |
| 4,237,026 A | 12/1980 | Eidenschink |
| 4,813,770 A | 3/1989 | Clerc |
| 5,273,680 A | 12/1993 | Gray |
| 6,511,719 B2 | 1/2003 | Farrand |
| 6,781,665 B2 | 8/2004 | Nakanishi |
| 6,818,261 B2 | 11/2004 | Kawabata |
| 6,861,107 B2 | 3/2005 | Klasen-Memmer |
| 6,916,940 B2 | 7/2005 | Kirsch |
| 7,041,345 B2 | 5/2006 | Kirsch |
| 7,060,331 B2 | 6/2006 | Kirsch |
| 7,060,200 B1 | 7/2006 | Ferrand |
| 7,223,450 B2 | 5/2007 | Taugerbeck |
| 7,318,950 B2 | 1/2008 | Kirsch |
| 8,399,073 B2 | 3/2013 | Klasen-Memmer |
| 8,603,358 B2 | 12/2013 | Kuriyama et al. |
| 8,637,125 B2 | 1/2014 | Goto et al. |
| 8,728,590 B2 | 5/2014 | Hattori et al. |
| 8,895,117 B2 | 11/2014 | Jansen et al. |
| 8,940,375 B2 | 1/2015 | Bremer |
| 2002/0030179 A1* | 3/2002 | Miyazawa .............. C07C 25/18 252/299.01 |
| 2004/0011996 A1* | 1/2004 | Klasen-Memmer et al. ............... 252/299.63 |
| 2004/0099842 A1 | 5/2004 | Klasen-Memmer et al. |
| 2006/0172090 A1 | 8/2006 | Syundo |

(Continued)

FOREIGN PATENT DOCUMENTS

| | | |
|---|---|---|
| CN | 101407719 A | 4/2009 |
| CN | 101698802 A | 4/2010 |

(Continued)

OTHER PUBLICATIONS

Combined Search and Examination Report Issued for Application No. GB 1222494.5 dated May 1, 2013.
Kula et al, "Mesomorphic, Dielectric, and Optical Properties of Fluorosubstituted Biphenyls, Terphenyls, and Quaterphenyls", Opto-electronics Review, 2008, 16(4), 379-385.
Examination Report Issued by the Great Britain Intellectual Property Office for Application No. GB 1222494.5 dated Mar. 26, 2013.
Non-Final Office Action dated Mar. 24, 2016 in U.S. Appl. No. 14/674,518.

(Continued)

Primary Examiner — Ruiyun Zhang
(74) Attorney, Agent, or Firm — RatnerPrestia

(57) ABSTRACT

The invention relates to liquid-crystalline media which can be used, in particular, for electro-optical displays having active-matrix addressing based on the ECB effect and for IPS (in-plane switching) displays or FFS (fringe field switching) displays.

19 Claims, No Drawings

(56) References Cited

U.S. PATENT DOCUMENTS

| | | |
|---|---|---|
| 2008/0017836 A1 | 1/2008 | Saito |
| 2008/0308768 A1 | 12/2008 | Klasen-Memmer et al. |
| 2009/0324853 A1* | 12/2009 | Bernatz et al. ............... 428/1.1 |
| 2010/0220252 A1* | 9/2010 | Heckmeier et al. ............ 349/33 |
| 2011/0248216 A1 | 10/2011 | Klasen-Memmer et al. |
| 2012/0305843 A1 | 12/2012 | Klasen-Memmer et al. |
| 2013/0001469 A1 | 1/2013 | Hattori et al. |

FOREIGN PATENT DOCUMENTS

| | | |
|---|---|---|
| CN | 102264867 | 11/2011 |
| DE | 2209127 | 9/1973 |
| DE | 2240864 | 2/1974 |
| DE | 2338281 | 2/1974 |
| DE | 2321632 | 11/1974 |
| DE | 2450088 | 4/1976 |
| DE | 2637430 | 2/1978 |
| DE | 2853728 | 7/1980 |
| DE | 4201712 A1 | 7/1993 |
| DE | 102007057679 A1 | 6/2008 |
| EP | 1427390 | 3/1976 |
| EP | 0240379 | 10/1987 |
| EP | 1 026 143 A1 | 8/2000 |
| EP | 1 245 660 A2 | 10/2002 |
| EP | 1 378 557 A1 | 1/2004 |
| EP | 2 628 779 A | 8/2013 |
| GB | 1376115 | 12/1974 |
| GB | 1418441 | 12/1975 |
| GB | 2314839 | 1/1998 |
| JP | 024723 | 1/1990 |
| JP | 2008502754 | 1/2008 |
| JP | 2011232753 A | 11/2011 |
| TW | 200911965 | 3/2009 |
| WO | 9921816 | 5/1999 |
| WO | WO-0234739 | 5/2002 |
| WO | WO 02/051963 A1 | 7/2002 |
| WO | WO 2006/002952 A | 1/2006 |
| WO | WO 2010/072370 A1 | 7/2010 |
| WO | 2010119779 A1 | 10/2010 |
| WO | WO 2011/098224 A1 | 8/2011 |
| WO | WO-2011 132451 A1 | 10/2011 |
| WO | 2011148928 A1 | 12/2011 |
| WO | 2012144321 A1 | 10/2012 |

OTHER PUBLICATIONS

Notification of Reasons for Refusal for Japanese Application No. 2012-276756, dated Oct. 18, 2016, 1 page.
Taiwan Office Action and Search Report for Taiwan Application No. 105122805, dated Nov. 25, 2016, 6 pages.
Taiwan Office Action and Search Report for Taiwan Application No. 105122807, dated Nov. 25, 2016, 8 pages.
Taiwan Office Action and Search Report for Taiwan Application No. 105122808, dated Nov. 25, 2016, 7 pages.
U.S. Non-Final Office Action for U.S. Appl. No. 14/674,518, dated Oct. 26, 2016, 15 pages.
Notification of Reasons for Refusal for Japanese Application No. 2012-276756, dated Jun. 29, 2017, 4 pages.
Notice of Allowance for U.S. Appl. No. 14/674,518, dated Jan. 25, 2018, 30 pages.
Japanese Office Action for Japanese Application No. 2017-054109, dated May 29, 2018, 6 pages.
Japanese Office Action for Japanese Application No. 2017-054110, dated May 31, 2018, 5 pages.
Japanese Office Action for Japanese Application No. 2017-054111, dated Jun. 1, 2018, 2 pages.
Chinese Office Action for Chinese Application No. 201610980508.3, dated Jun. 19, 2018, 9 pages. 2018.
Chinese Office Action for Chinese Application No. 201610981507.9, dated Jun. 20, 2018, 9 pages. 2018.

* cited by examiner

LIQUID-CRYSTALLINE MEDIA

CROSS-REFERENCE TO RELATED APPLICATIONS

This application claims priority to German Application DE 10 2011 121 665.4, filed Dec. 20, 2011, which is incorporated by reference herein, in its entirety and for all purposes.

FIELD OF THE INVENTION

The invention relates to liquid-crystalline media which comprise at least one compound of the formula I,

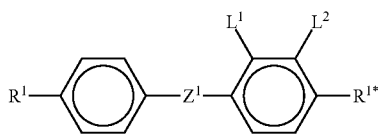

in which
$R^1$ and $R^{1*}$ each, independently of one another, denote an alkyl or alkoxy radical having 1 to 15 C atoms, where, in addition, one or more $CH_2$ groups in these radicals may each be replaced, independently of one another, by —C≡C—, —$CF_2$O—, —CH=CH—,

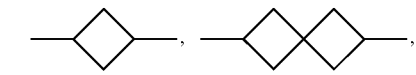

—O—, —CO—O—, —O—CO— in such a way that O atoms are not linked directly to one another, and in which, in addition, one or more H atoms may be replaced by halogen,
$Z^1$ denotes a single bond, —$CH_2CH_2$—, —CH=CH—, —$CH_2$O—, —$OCH_2$—, —$CF_2$O—, —$OCF_2$—, —COO—, —OCO—, —$C_2F_4$—, —CF=CF—, —CH=CHCHO—,
$L^1$ and $L^2$ each, independently of one another, denote F, Cl, $CF_3$, $OCF_3$ or $CHF_2$.

Media of this type can be used, in particular, for electro-optical displays having active-matrix addressing based on the ECB effect and for IPS (in-plane switching) displays or FFS (fringe field switching) displays.

BACKGROUND OF THE INVENTION

The principle of electrically controlled birefringence, the ECB effect or also DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) showed that liquid-crystalline phases must have high values for the ratio of the elastic constants $K_3/K_1$, high values for the optical anisotropy $\Delta n$ and values for the dielectric anisotropy of $\Delta\varepsilon \leq -0.5$ in order to be suitable for use in high-information display elements based on the ECB effect. Electro-optical display elements based on the ECB effect have a homeotropic edge alignment (VA technology=vertically aligned). Dielectrically negative liquid-crystal media can also be used in displays which use the so-called IPS or FFS effect.

Displays which use the ECB effect, as so-called VAN (vertically aligned nematic) displays, for example in the MVA (multi-domain vertical alignment, for example: Yoshide, H. et al., paper 3.1: "MVA LCD for Notebook or Mobile PCs . . . ", SID 2004 International Symposium, Digest of Technical Papers, XXXV, Book I, pp. 6 to 9, and Liu, C. T. et al., paper 15.1: "A 46-inch TFT-LCD HDTV Technology.", SID 2004 International Symposium, Digest of Technical Papers, XXXV, Book II, pp. 750 to 753), PVA (patterned vertical alignment, for example: Kim, Sang Soo, paper 15.4: "Super PVA Sets New State-of-the-Art for LCD-TV", SID 2004 International Symposium, Digest of Technical Papers, XXXV, Book II, pp. 760 to 763), ASV (advanced super view, for example: Shigeta, Mitzuhiro and Fukuoka, Hirofumi, paper 15.2: "Development of High Quality LCDTV", SID 2004 International Symposium, Digest of Technical Papers, XXXV, Book II, pp. 754 to 757) modes, have established themselves as one of the three more recent types of liquid-crystal display that are currently the most important, in particular for television applications, besides IPS (in-plane switching) displays (for example: Yeo, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, seminar M-6: "Recent Advances in LCD Technology", Seminar Lecture Notes, M-6/1 to M-6/26, and Miller, Ian, SID Seminar 2004, seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey shades, is still a problem which has not yet been satisfactorily solved.

Industrial application of this effect in electro-optical display elements requires LC phases, which have to satisfy a multiplicity of requirements. Particularly important here are chemical resistance to moisture, air and physical influences, such as heat, infrared, visible and ultraviolet radiation and direct and alternating electric fields.

Furthermore, industrially usable LC phases are required to have a liquid-crystalline mesophase in a suitable temperature range and low viscosity.

None of the hitherto-disclosed series of compounds having a liquid-crystalline mesophase includes a single compound which meets all these requirements. Mixtures of two to 25, preferably three to 18, compounds are therefore generally prepared in order to obtain substances which can be used as LC phases. However, it has not been possible to prepare optimum phases easily in this way since no liquid-crystal materials having significantly negative dielectric anisotropy and adequate long-term stability were hitherto available.

Matrix liquid-crystal displays (MLC displays) are known. Non-linear elements which can be used for individual switching of the individual pixels are, for example, active elements (i.e. transistors). The term "active matrix" is then used, where a distinction can be made between two types:
1. MOS (metal oxide semiconductor) transistors on a silicon wafer as substrate
2. thin-film transistors (TFTs) on a glass plate as substrate.

In the case of type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred, the electro-optical effect used is usually the TN effect.

A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The term MLC displays here covers any matrix display with integrated non-linear elements, i.e. besides the active matrix, also displays with passive elements, such as varistors or diodes (MIM=metal-insulator-metal).

MLC displays of this type are particularly suitable for TV applications (for example pocket TVs) or for high-information displays in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORI-MACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

There is still a great demand for MLC displays having very high specific resistance at the same time as a large working-temperature range, short response times and a low threshold voltage, with the aid of which various grey shades can be generated.

The disadvantage of the MLC-TN displays frequently used is due to their comparatively low contrast, the relatively high viewing-angle dependence and the difficulty of generating grey shades in these displays.

VA displays have significantly better viewing-angle dependencies and are therefore principally used for televisions and monitors. However, there continues to be a need to improve the response times here. However, properties such as, for example, the low-temperature stability and the reliability must not be impaired at the same time.

SUMMARY OF THE INVENTION

An embodiment of the invention relates to a liquid-crystalline medium which comprises at least one compound of the formula I,

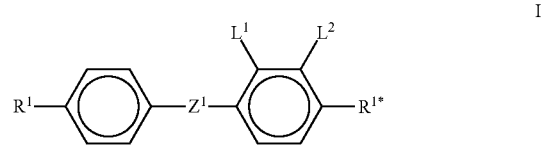

in which
$R^1$ and $R^{1*}$ each, independently of one another, denote an alkyl or alkoxy radical having 1 to 15 C atoms, where, in addition, one or more $CH_2$ groups in these radicals may each be replaced, independently of one another, by —C≡C—, —CF$_2$O—, —CH=CH—,

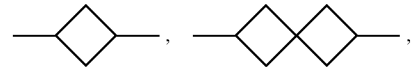

—O—, —CO—O—, —O—CO— in such a way that O atoms are not linked directly to one another, and in which, in addition, one or more H atoms may be replaced by halogen,
$Z^1$ denotes a single bond, —CH$_2$CH$_2$—, —CH=CH—, —CH$_2$O—, —OCH$_2$—, —CF$_2$O—, —OCF$_2$—, —COO—, —OCO—, —C$_2$F$_4$—, —CF=CF—, —CH=CHCHO—,
$L^1$ and $L^2$ each, independently of one another, denote F, Cl, CF$_3$, OCF$_3$ or CHF$_2$.

Media of this type can be used, in particular, for electro-optical displays having active-matrix addressing based on the ECB effect and for IPS (in-plane switching) displays or FFS (fringe field switching) displays.

DETAILED DESCRIPTION OF THE INVENTION

The invention is based on the object of providing liquid-crystal mixtures, in particular for monitor and TV applications, based on the ECB effect or on the IPS or FFS effect, which do not have the disadvantages indicated above, or only do so to a reduced extent. In particular, it must be ensured for monitors and televisions that they also work at extremely high and extremely low temperatures and at the same time have short response times and at the same time have an improved reliability behaviour, in particular exhibit no or significantly reduced image sticking after long operating times.

Surprisingly, it is possible to improve the rotational viscosity values and thus the response times if one or more, preferably two, polar compounds of the general formula I are used in liquid-crystal mixtures, in particular in LC mixtures having negative dielectric anisotropy, preferably for VA displays. With the aid of the compounds of the formula I, it is possible to prepare liquid-crystal mixtures, preferably VA, PS-VA, PSA, IPS and FFS mixtures which have short response times, at the same time good phase properties and good low-temperature behaviour.

An embodiment of the invention thus relates to a liquid-crystalline medium which comprises at least one compound of the formula I,

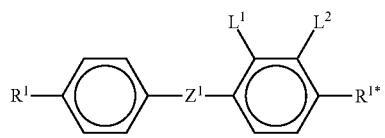

I in which

R¹ and R¹* each, independently of one another, denote an alkyl or alkoxy radical having 1 to 15 C atoms, where, in addition, one or more CH$_2$ groups in these radicals may each be replaced, independently of one another, by —C≡C—, —CF$_2$O—, —CH=CH—,

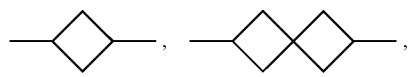

—O—, —CO—O—, —O—CO— in such a way that O atoms are not linked directly to one another, and in which, in addition, one or more H atoms may be replaced by halogen, Z¹ denotes a single bond, —CH$_2$CH$_2$—, —CH=CH—, —CH$_2$O—, —OCH$_2$—, —CF$_2$O—, —OCF$_2$—, —COO—, —OCO—, —C$_2$F$_4$—, —CF=CF—, —CH=CHCHO—, L¹ and L² each, independently of one another, denote F, Cl, CF$_3$, OCF$_3$ or CHF$_2$.

The mixtures according to the invention preferably exhibit very broad nematic phase ranges with clearing points ≥70° C., preferably ≥75° C., in particular ≥80° C., very favourable values of the capacitive threshold, relatively high values of the holding ratio and at the same time very good low-temperature stabilities at −20° C. and −30° C., as well as very low rotational viscosity values and short response times. The mixtures according to the invention are furthermore distinguished by the fact that, in addition to the improvement in the rotational viscosity γ$_1$, relatively high values of the elastic constants K$_{33}$ for improving the response times can be observed. The compounds of the formula I are suitable, in particular, for the preparation of negative Δε mixtures which are intended to have a Δn>0.1.

Some preferred embodiments of the mixtures according to the invention are indicated below.

In the compounds of the formula I, R¹ preferably denotes straight-chain alkyl, in particular CH$_3$, C$_2$H$_5$, n-C$_3$H$_7$, n-C$_4$H$_9$, nC$_5$H$_{11}$ and n-C$_6$H$_{13}$.

In the compounds of the formula I, R¹* preferably denotes straight-chain alkoxy, in particular OC$_2$H$_5$, OC$_3$H$_7$, OC$_4$H$_9$, OC$_5$H$_{11}$, OC$_6$H$_{13}$, furthermore alkenyloxy, in particular OCH$_2$CH=CH$_2$, OCH$_2$CH=CHCH$_3$, OCH$_2$CH=CHC$_2$H$_5$, furthermore alkyl, in particular n-C$_3$H$_7$, n-C$_4$H$_9$, n-C$_5$H$_{11}$, n-C$_6$H$_{13}$.

Preferred compounds of the formula I are the compounds of the formulae I-1 to I-145,

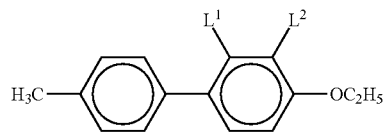

I-1

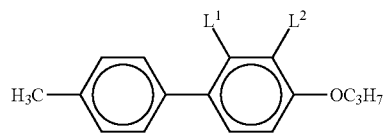

I-2

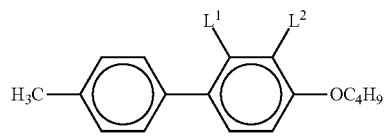

I-3

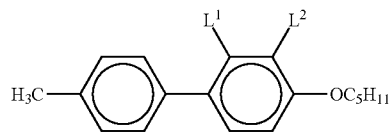

I-4

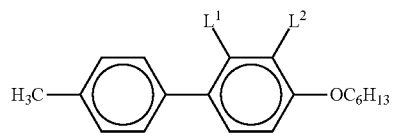

I-5

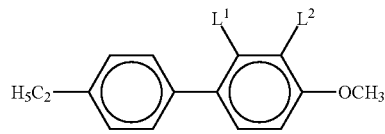

I-6

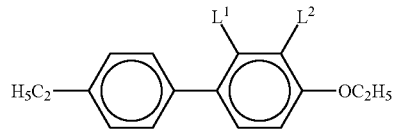

I-7

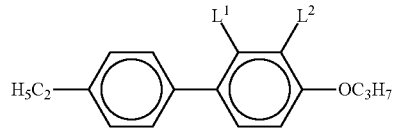

I-8

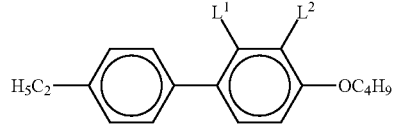

I-9

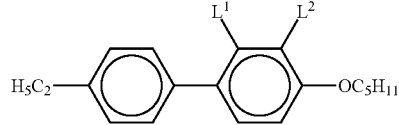

I-10

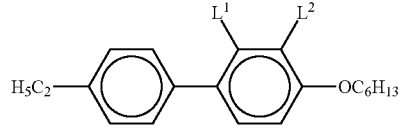

I-11

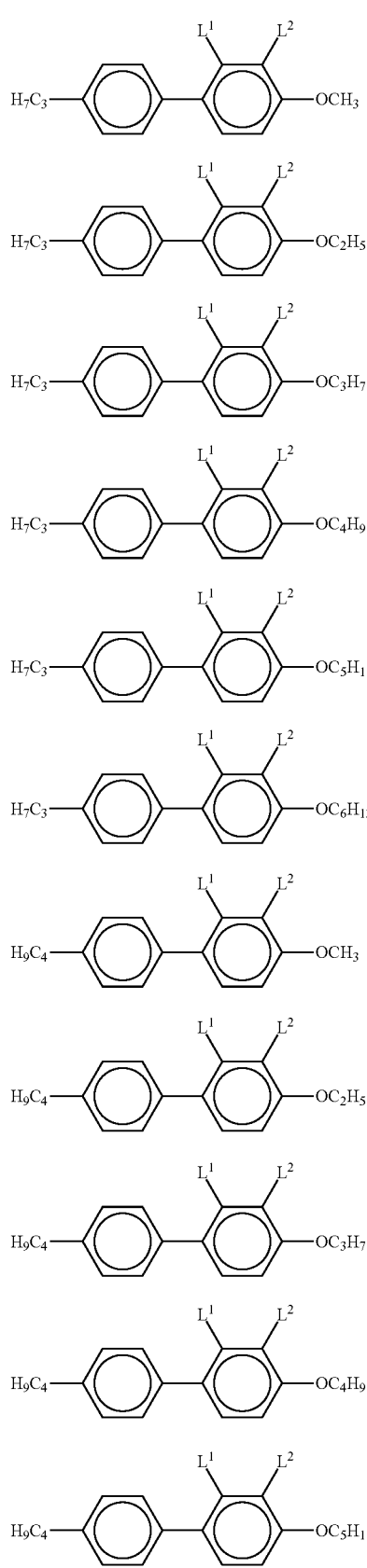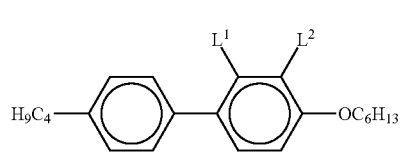

| | |
|---|---|
| I-33 | H₃C—⌬—CH₂O—⌬(L¹,L²)—OC₅H₁₁ |
| I-34 | H₃C—⌬—CH₂O—⌬(L¹,L²)—OC₆H₁₃ |
| I-35 | H₅C₂—⌬—CH₂O—⌬(L¹,L²)—OCH₃ |
| I-36 | H₅C₂—⌬—CH₂O—⌬(L¹,L²)—OC₂H₅ |
| I-37 | H₅C₂—⌬—CH₂O—⌬(L¹,L²)—OC₃H₇ |
| I-38 | H₅C₂—⌬—CH₂O—⌬(L¹,L²)—OC₄H₉ |
| I-39 | H₅C₂—⌬—CH₂O—⌬(L¹,L²)—OC₅H₁₁ |
| I-40 | H₅C₂—⌬—CH₂O—⌬(L¹,L²)—OC₆H₁₃ |
| I-41 | H₇C₃—⌬—CH₂O—⌬(L¹,L²)—OCH₃ |
| I-42 | H₇C₃—⌬—CH₂O—⌬(L¹,L²)—OC₂H₅ |
| I-43 | H₇C₃—⌬—CH₂O—⌬(L¹,L²)—OC₃H₇ |
| I-44 | H₇C₃—⌬—CH₂O—⌬(L¹,L²)—OC₄H₉ |
| I-45 | H₇C₃—⌬—CH₂O—⌬(L¹,L²)—OC₅H₁₁ |
| I-46 | H₇C₃—⌬—CH₂O—⌬(L¹,L²)—OC₆H₁₃ |
| I-47 | H₉C₄—⌬—CH₂O—⌬(L¹,L²)—OCH₃ |
| I-48 | H₉C₄—⌬—CH₂O—⌬(L¹,L²)—OC₂H₅ |
| I-49 | H₉C₄—⌬—CH₂O—⌬(L¹,L²)—OC₃H₇ |
| I-50 | H₉C₄—⌬—CH₂O—⌬(L¹,L²)—OC₄H₉ |
| I-51 | H₉C₄—⌬—CH₂O—⌬(L¹,L²)—OC₅H₁₁ |
| I-52 | H₉C₄—⌬—CH₂O—⌬(L¹,L²)—OC₆H₁₃ |
| I-53 | H₁₁C₅—⌬—CH₂O—⌬(L¹,L²)—OCH₃ |
| I-54 | H₁₁C₅—⌬—CH₂O—⌬(L¹,L²)—OC₂H₅ |

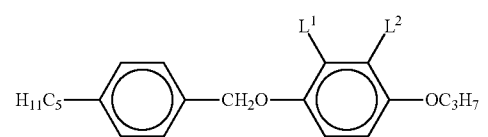 I-55
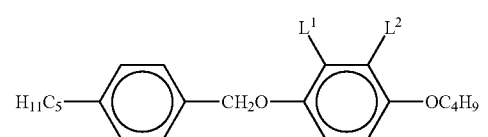 I-56
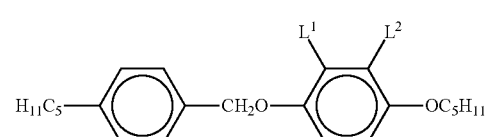 I-57
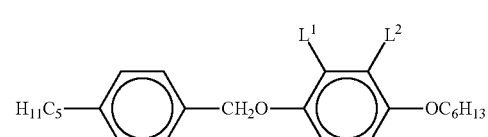 I-58
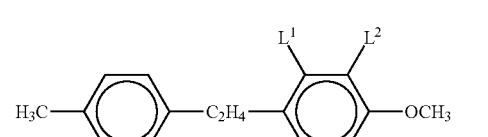 I-59
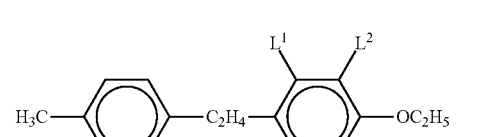 I-60
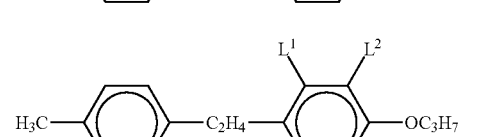 I-61
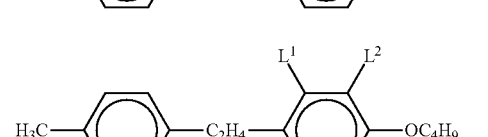 I-62
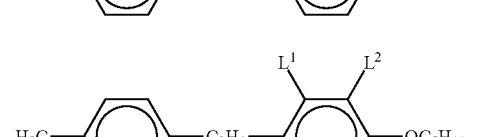 I-62
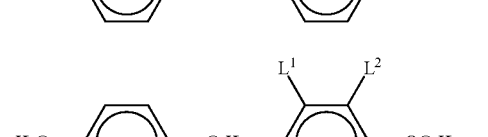 I-63
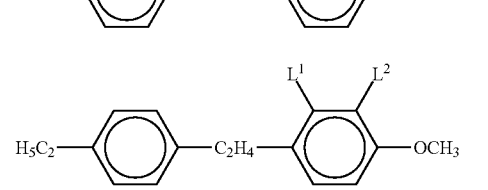 I-64
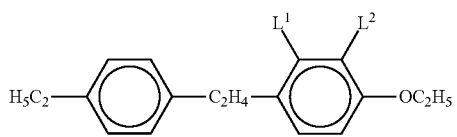 I-65
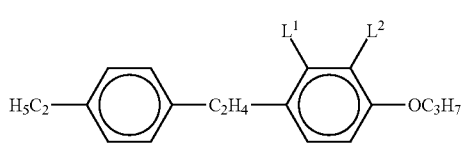 I-66
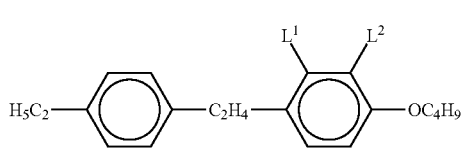 I-67
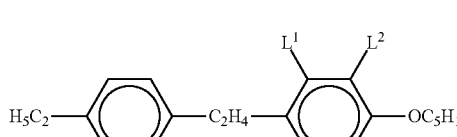 I-68
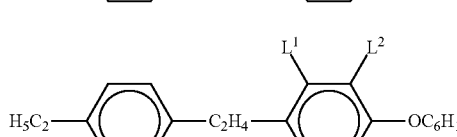 I-69
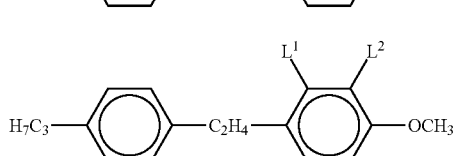 I-70
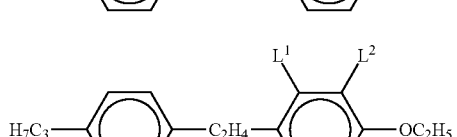 I-71
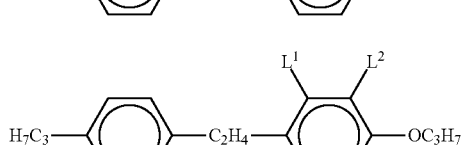 I-72
 I-73
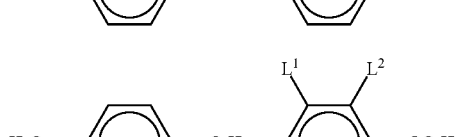 I-74
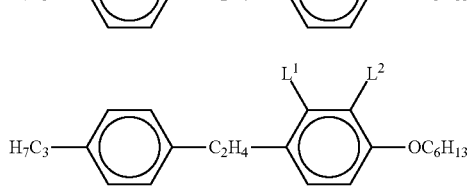 I-75

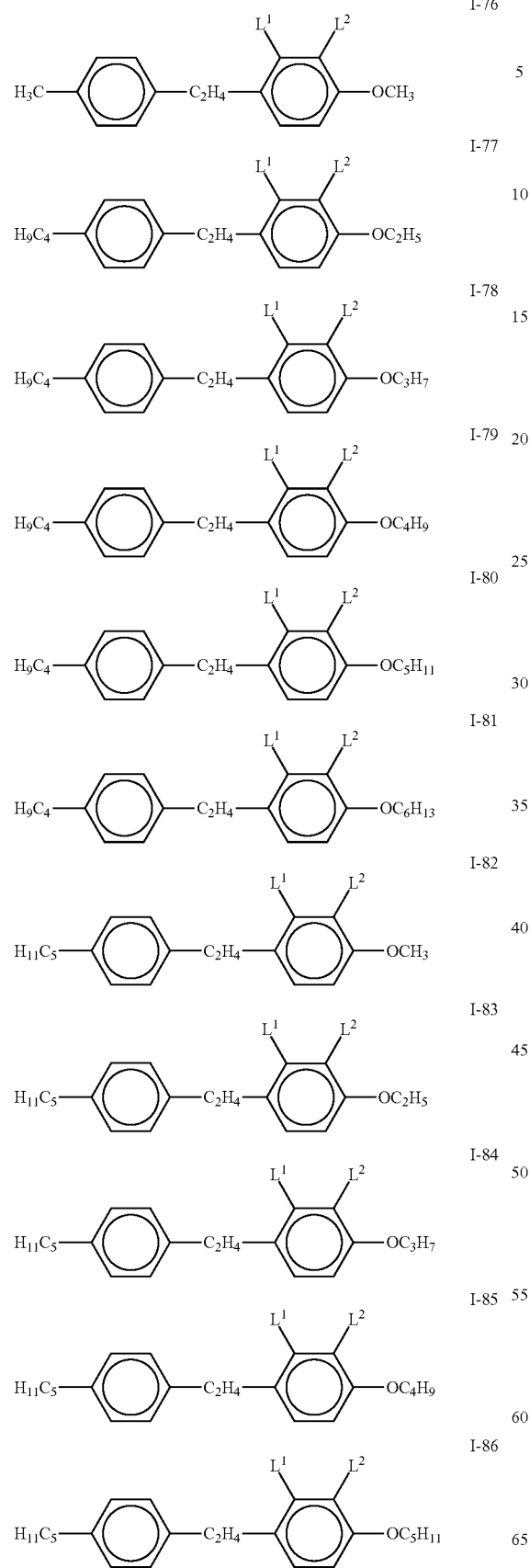
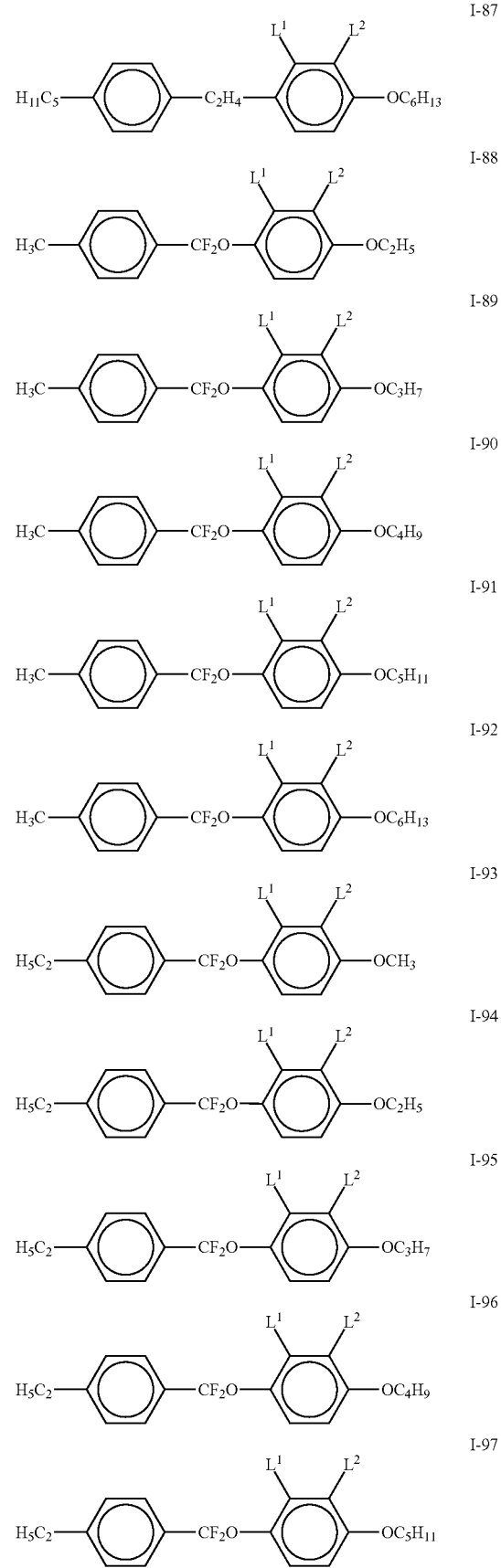

I-98 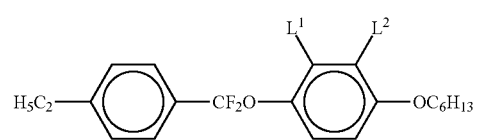
I-99 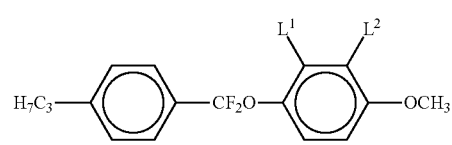
I-100 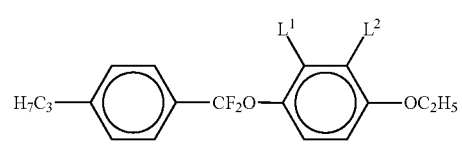
I-101 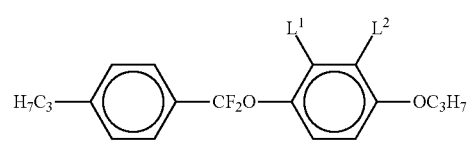
I-102 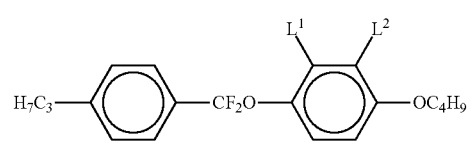
I-103 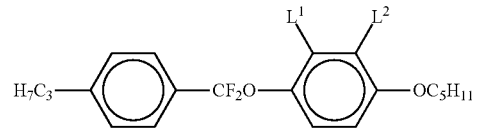
I-104 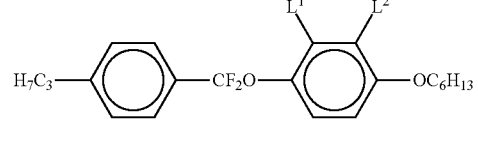
I-105 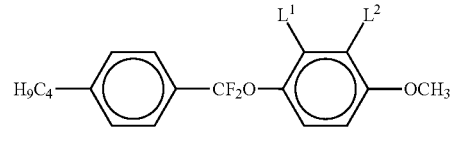
I-106 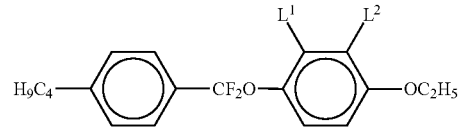
I-107 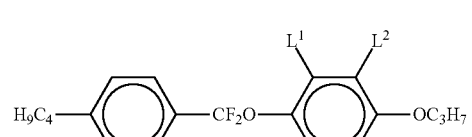
I-108 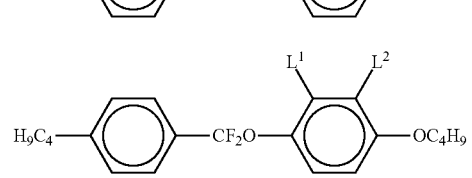
I-109 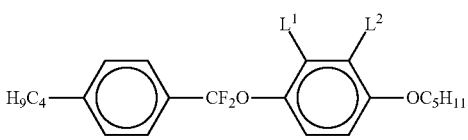
I-110 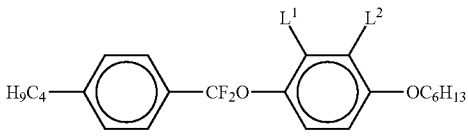
I-111 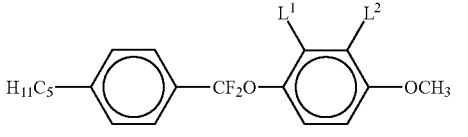
I-112 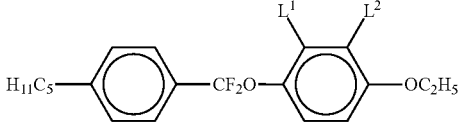
I-113 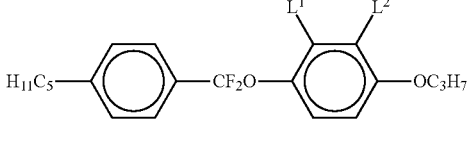
I-114 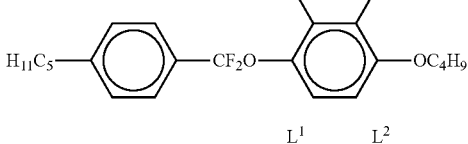
I-115 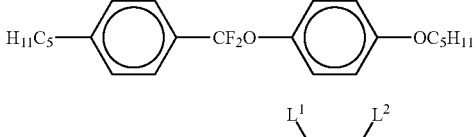
I-116 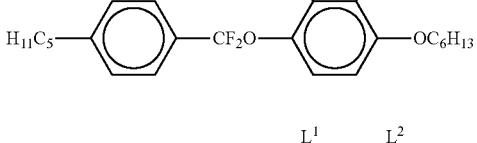
I-117 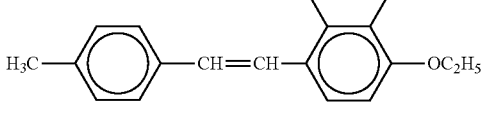
I-118 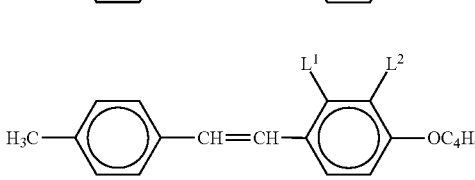
I-119 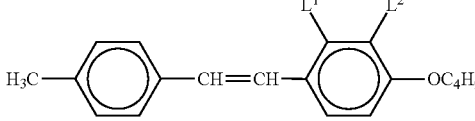

-continued
I-120
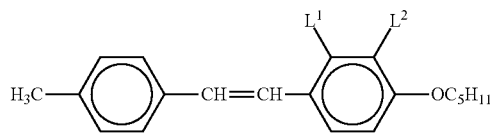
I-121
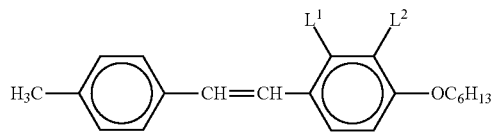
I-122
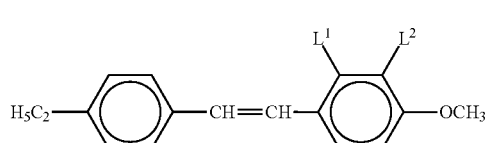
I-123
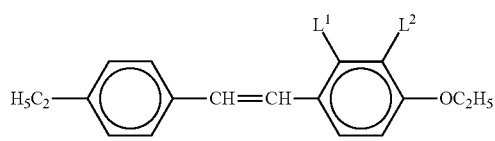
I-124
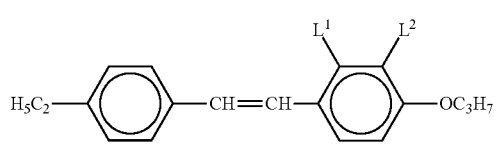
I-125
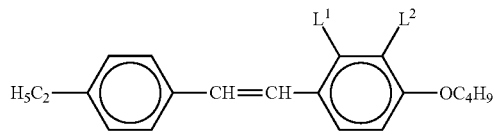
I-126
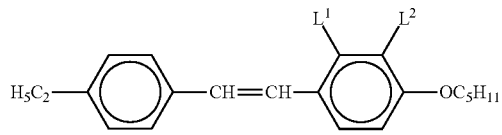
I-127
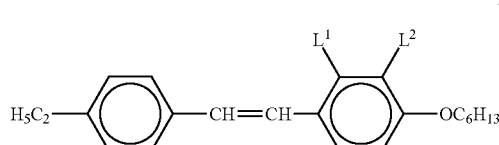
I-128
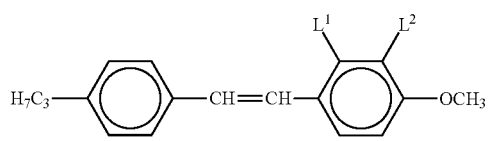
I-129
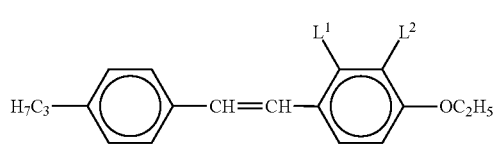
-continued
I-130
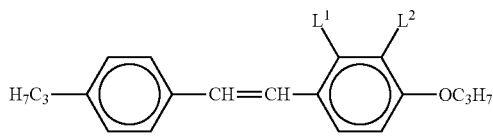
I-131
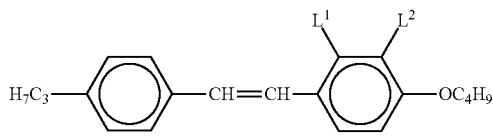
I-132
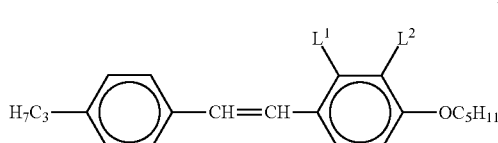
I-133
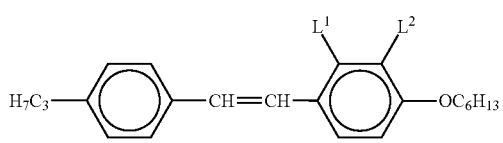
I-134
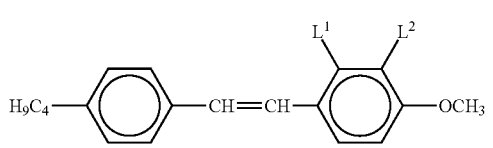
I-135
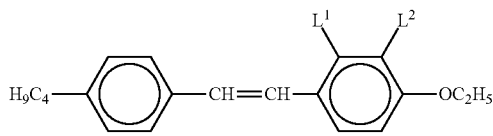
I-136
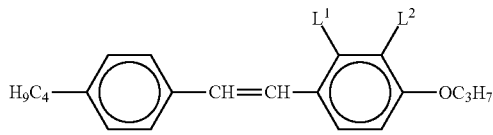
I-137
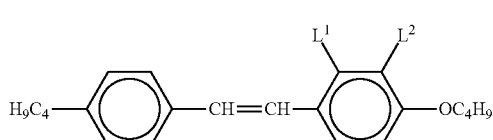
I-138
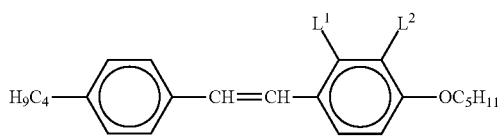
I-139
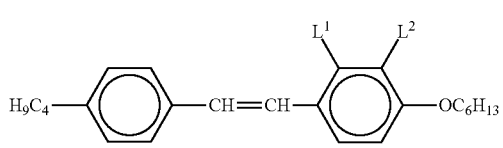

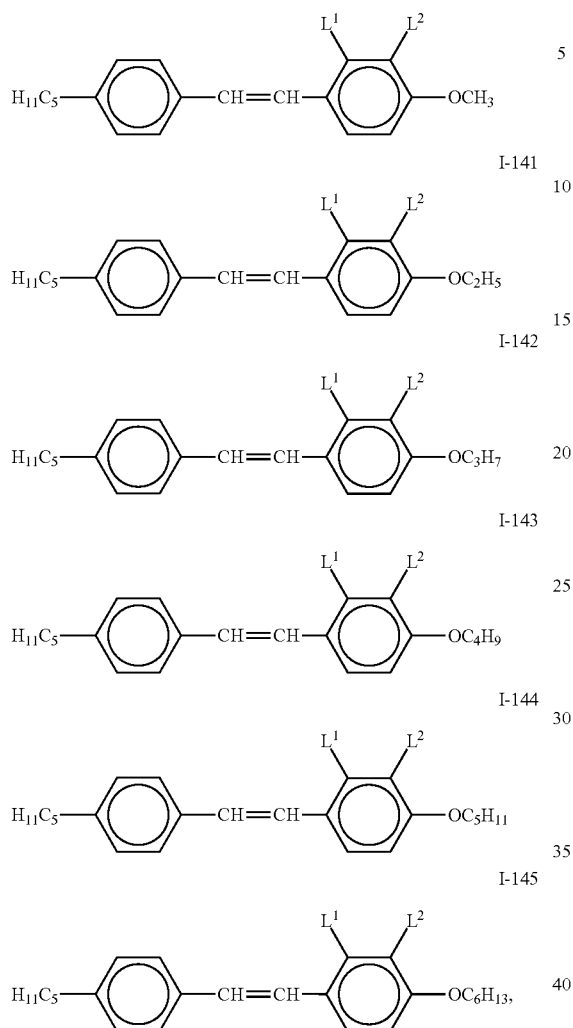

in which

L¹ and L² each, independently of one another, denote F or Cl. In the compounds of the formula I and in sub-formulae I-1 to I-145, preferably L¹=L²=F. Z¹ preferably denotes a single bond.

Particular preference is given to the compounds of the formulae I-1, I-3, I-7, I-13, I-15, I-19, I-25 and I-26.

The mixture according to the invention very particularly preferably comprises at least two compounds of the formula I-A:

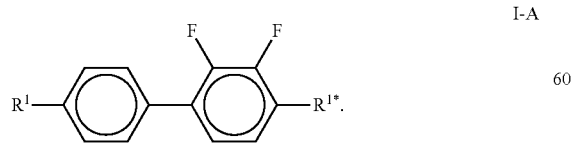

The mixtures according to the invention very particularly preferably comprise at least two compounds from the following group:

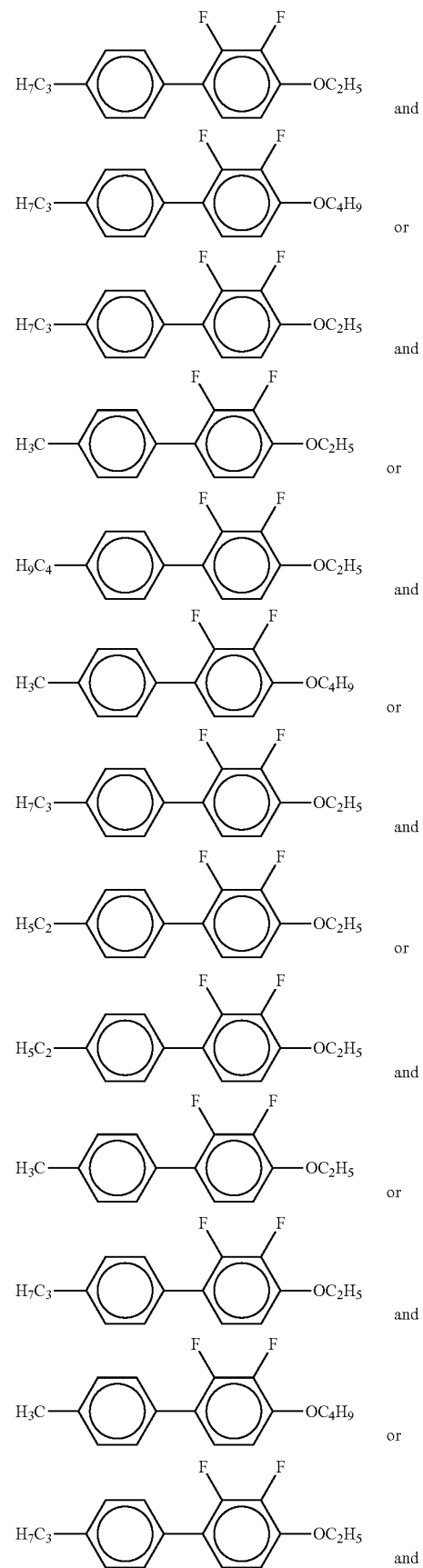

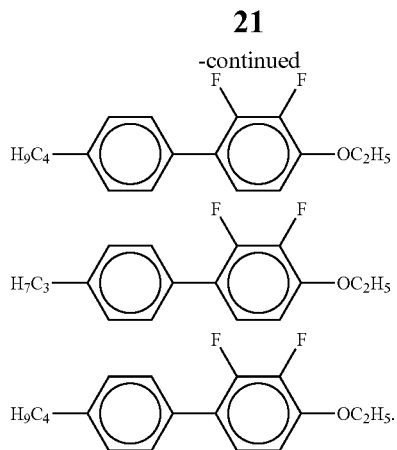

Preference is furthermore given to mixtures which comprise at least three compounds of the formula I. The mixtures according to the invention preferably comprise the following three compounds:

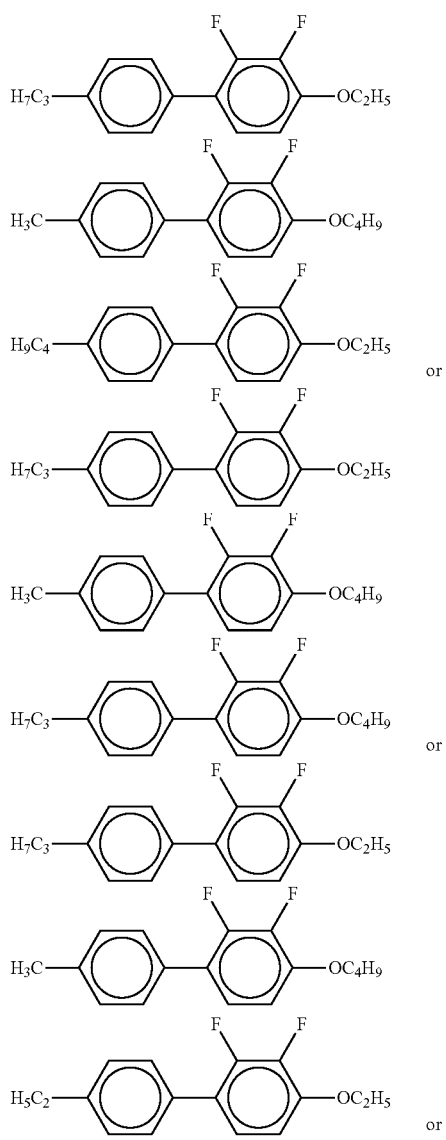

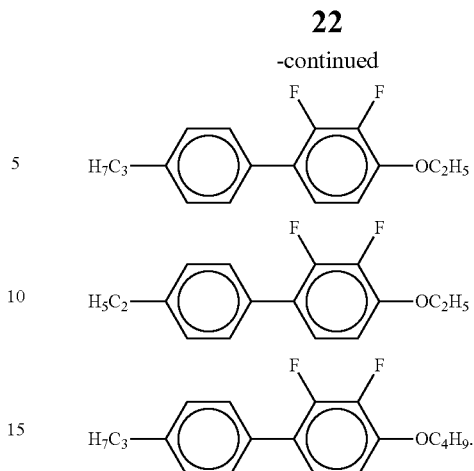

The compounds of the formula I are, for example, from U.S. Pat. No. 5,273,680 and can be prepared by known processes.

The media according to the invention preferably comprise two, three, four or more, preferably two or three, compounds of the formula I.

The compounds of the formula I are preferably employed in the liquid-crystalline medium in amounts of 5-65% by weight, preferably 10-45% by weight, based on the mixture as a whole. Particular preference is given to liquid-crystalline media which comprise 25-45% by weight of one or more, preferably two or three, compounds of the formula I.

Preferred embodiments of the liquid-crystalline medium according to the invention are indicated below:

a) Liquid-crystalline medium which additionally comprises one or more compounds selected from the group of the compounds of the formulae IIA, IIB and IIC,

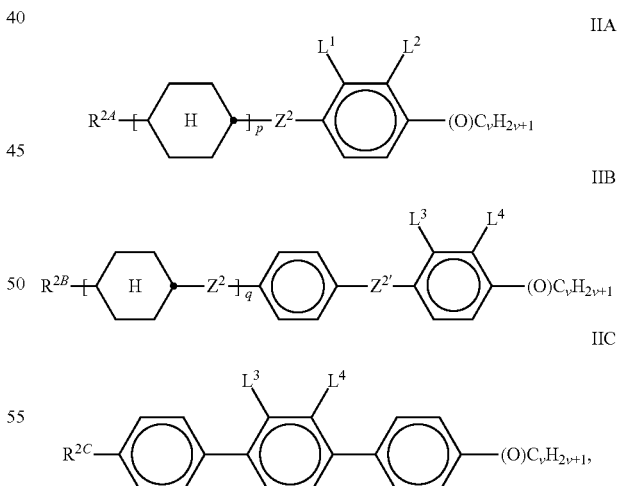

in which $R^{2A}$, $R^{2B}$ and $R^{2C}$ each, independently of one another, denote H, an alkyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

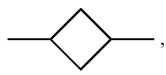,

—C≡C—, —CF$_2$O—, —OCF$_2$—, —OC—O— or —O—CO— in such a way that O atoms are not linked directly to one another, L$^{1-4}$ each, independently of one another, denote F, Cl, CF$_3$ or CHF$_2$, Z$^2$ and Z$^{2'}$ each, independently of one another, denote a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF—, —CH=CHCH$_2$O—, denotes 1 or 2,
q denotes 1 or 2, and
v denotes 1 to 6.

In the compounds of the formulae IIA and IIB, Z$^2$ may have identical or different meanings. In the compounds of the formula IIB, Z$^2$ and Z$^{2'}$ may have identical or different meanings.

In the compounds of the formulae IIA, IIB and IIC, R$^{2A}$, R$^{2B}$ and R$^{2C}$ each preferably denote alkyl having 1-6 C atoms, in particular CH$_3$, C$_2$H$_5$, n-C$_3$H$_7$, n-C$_4$H$_9$, n-C$_5$H$_{11}$.

In the compounds of the formulae IIA and IIB, L$^1$, L$^2$, L$^3$ and L$^4$ preferably denote L$^1$=L$^2$=F and L$^3$=L$^4$=F, furthermore L$^1$=F and L$^2$=Cl, L$^1$=C$^1$ and L$^2$=F, L$^3$=F and L$^4$=Cl, L$^3$=C$^1$ and L$^4$=F. Z$^2$ and Z$^{2'}$ in the formulae IIA and IIB preferably each, independently of one another, denote a single bond, furthermore a —C$_2$H$_4$— bridge. If in the formula IIB Z$^2$=—C$_2$H$_4$—, Z$^{2'}$ is preferably a single bond or, if Z$^{2'}$=—C$_2$H$_4$—, Z$^2$ is preferably a single bond. In the compounds of the formulae IIA and IIB, (O)C$_v$H$_{2v+1}$ preferably denotes OC$_v$H$_{2v+1}$, furthermore C$_v$H$_{2v+1}$. In the compounds of the formula IIC, (O)C$_v$H$_{2v+1}$ preferably denotes C$_v$H$_{2v+1}$. In the compounds of the formula IIC, L$^3$ and L$^4$ preferably each denote F.

Preferred compounds of the formulae IIA, IIB and IIC are indicated below:

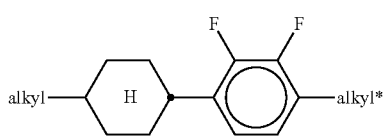 IIA-1

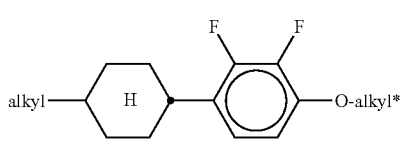 IIA-2

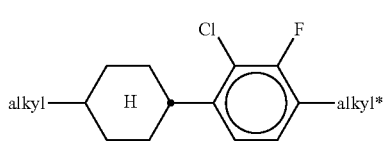 IIA-3

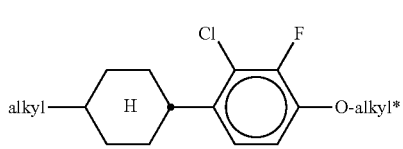 IIA-4

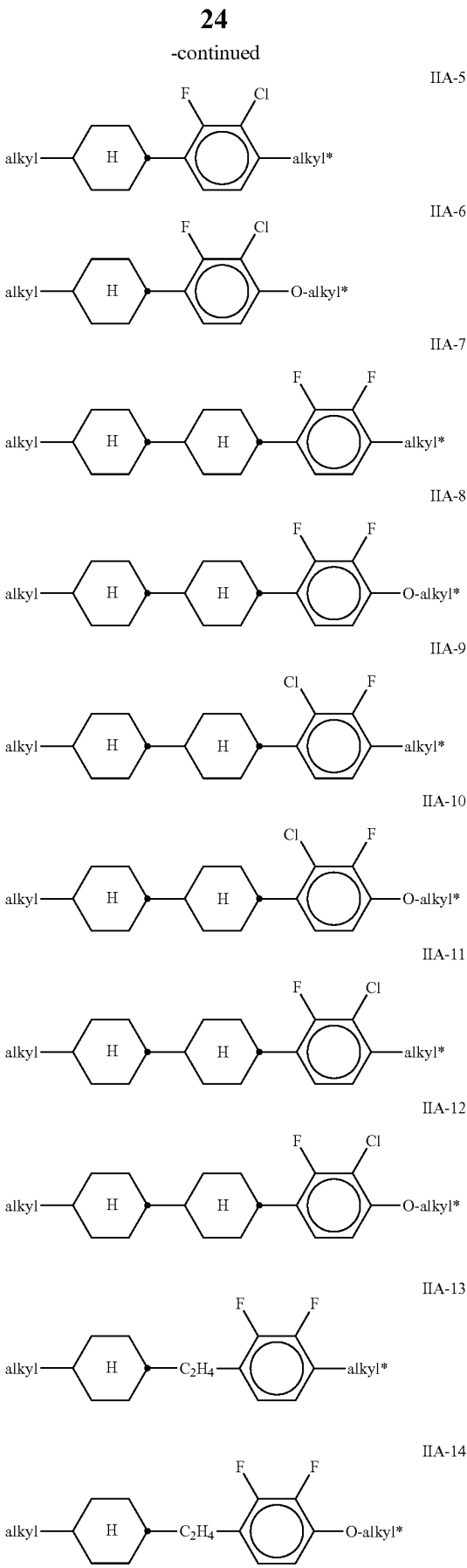

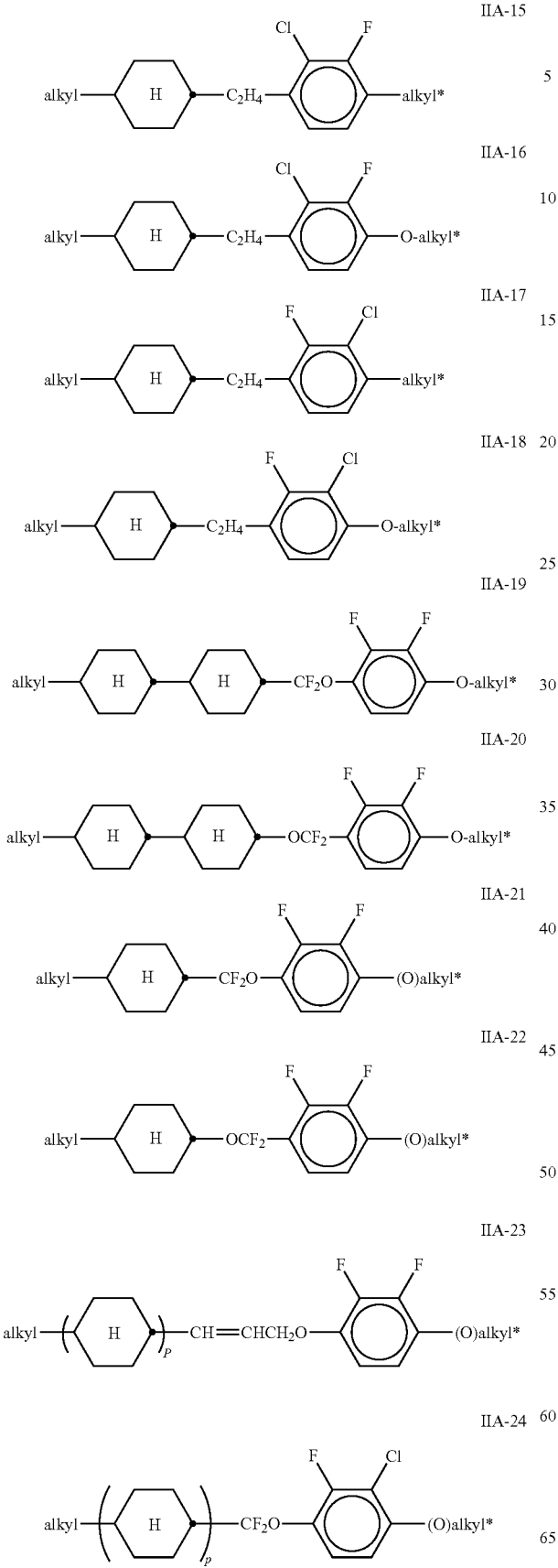
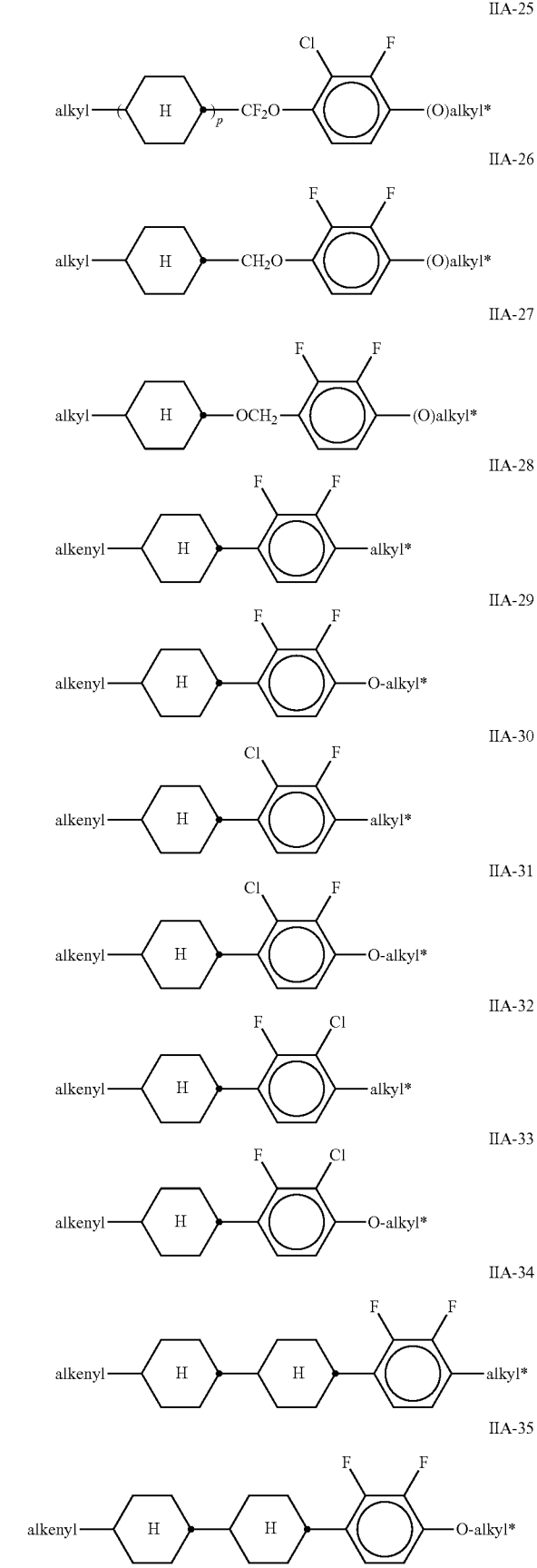

IIA-36
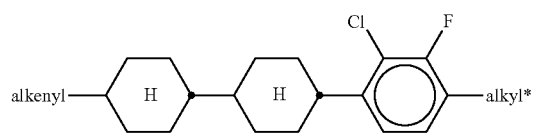
IIA-37
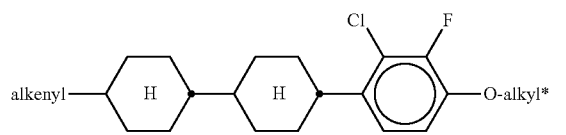
IIA-38
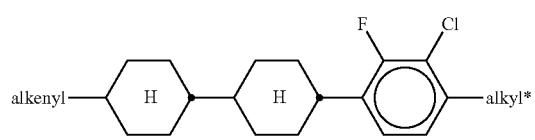
IIA-39
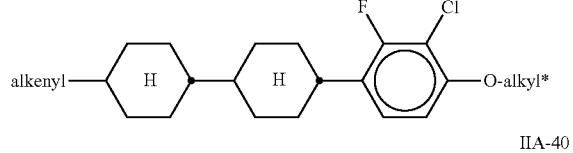
IIA-40
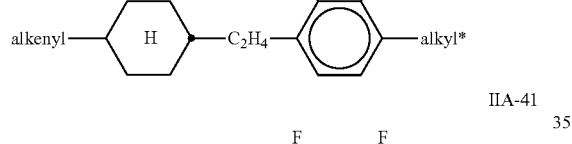
IIA-41
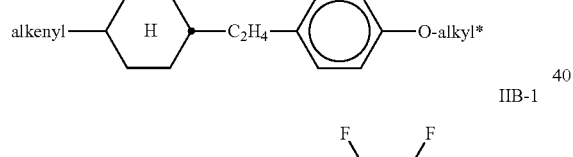
IIB-1
IIB-2
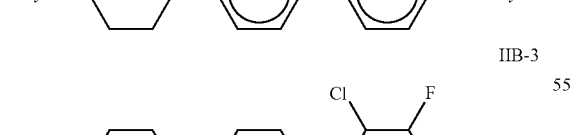
IIB-3
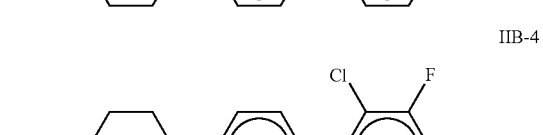
IIB-4
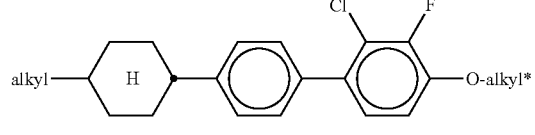
IIB-5
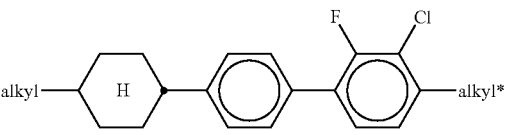
IIB-6
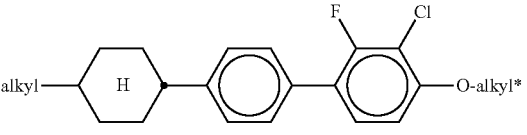
IIB-7
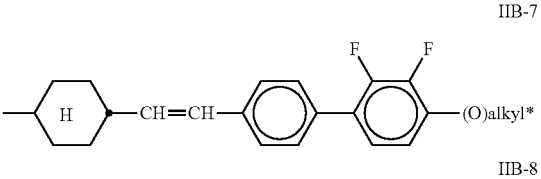
IIB-8
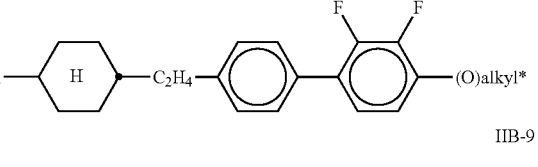
IIB-9
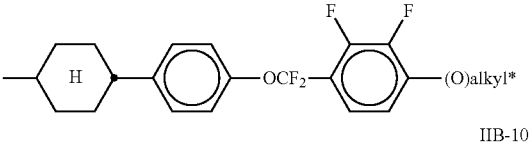
IIB-10
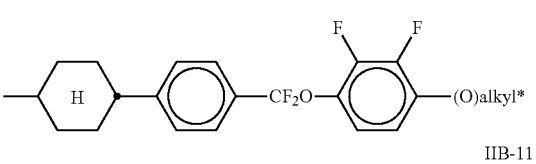
IIB-11
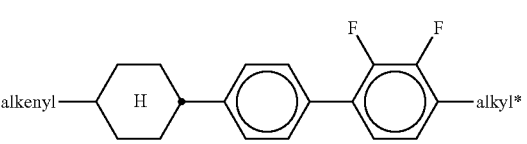
IIB-12
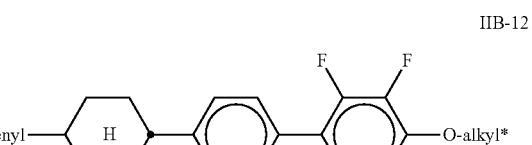
IIC-1
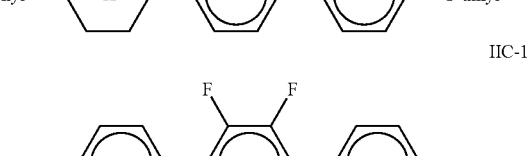
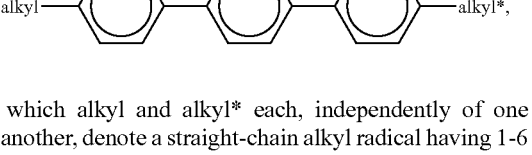
in which alkyl and alkyl* each, independently of one another, denote a straight-chain alkyl radical having 1-6 C atoms.
Particularly preferred mixtures according to the invention comprise one or more compounds of the formulae IIA-2, IIA-8, IIA-14, IIA-29, IIA-35, IIB-2, IIB-12 and IIC-1.

The proportion of compounds of the formulae IIA and/or IIB in the mixture as a whole is preferably at least 20% by weight.

Particularly preferred media according to the invention comprise at least one compound of the formula IIC-1,

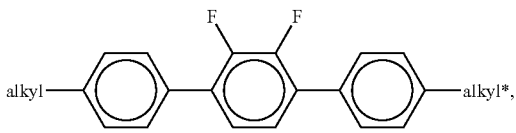

in which alkyl and alkyl* have the meanings indicated above, preferably in amounts of >3% by weight, in particular >5% by weight and particularly preferably 5-25% by weight.

b) Liquid-crystalline medium which additionally comprises one or more compounds of the formula III,

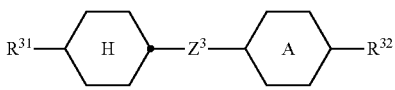

III in which
$R^{31}$ and $R^{32}$ each, independently of one another, denote a straight-chain alkyl, alkoxyalkyl or alkoxy radical having up to 12 C atoms, and

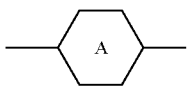

denotes

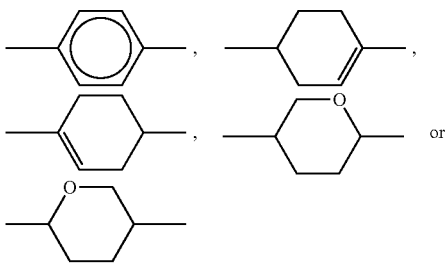

$Z^3$ denotes a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —C$_4$H$_8$—, —CF=CF—.

Preferred compounds of the formula III are indicated below:

IIIa

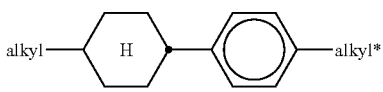

IIIb

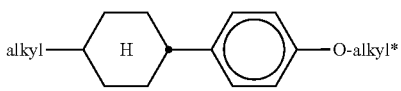

-continued

IIIc

IIId

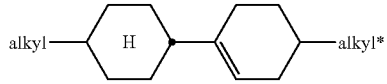

in which
alkyl and
alkyl* each, independently of one another, denote a straight-chain alkyl radical having 1-6 C atoms.

The medium according to the invention preferably comprises at least one compound of the formula IIIa and/or formula IIIb.

The proportion of compounds of the formula III in the mixture as a whole is preferably at least 5% by weight.

c) Liquid-crystalline medium additionally comprising a compound of the formula

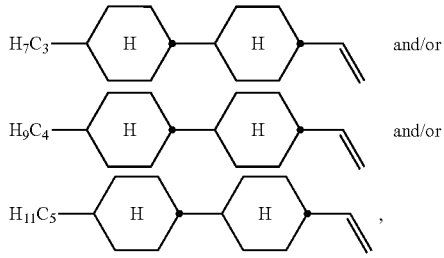

preferably in total amounts of 5% by weight, in particular 10% by weight.

Preference is furthermore given to mixtures according to the invention comprising the compound

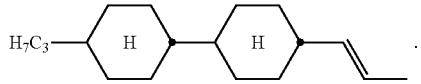

d) Liquid-crystalline medium which additionally comprises one or more tetracyclic compounds of the formulae

V-1

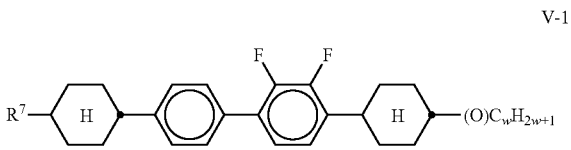

V-2

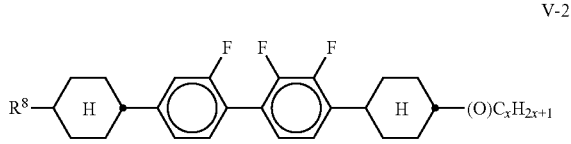

V-3

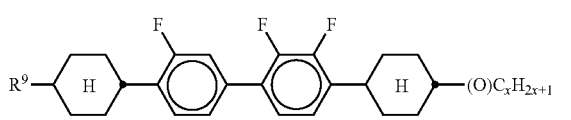

V-4
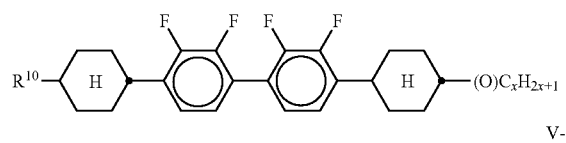

V-5
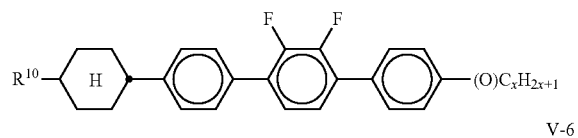

V-6
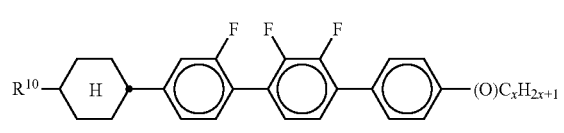

V-7
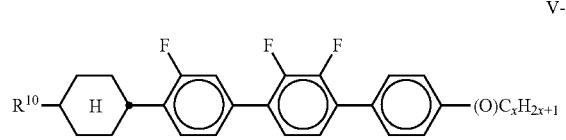

V-8
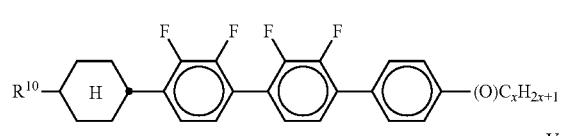

V-9
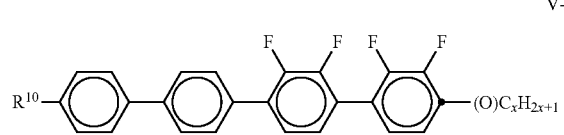

in which
R$^{7-10}$ each, independently of one another, have one of the meanings indicated for R$^{2A}$ in Claim 10, and
w and x each, independently of one another, denote 1 to 6.

Particular preference is given to mixtures comprising at least one compound of the formula V-9.

e) Liquid-crystalline medium which additionally comprises one or more compounds of the formulae Y-1 to Y-6, Y-1
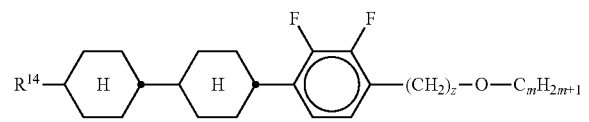

Y-2
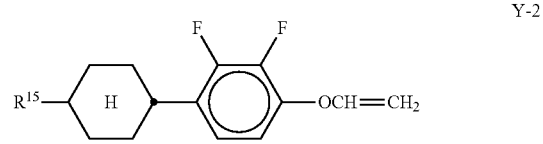

Y-3
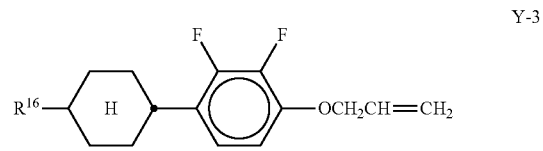

Y-4
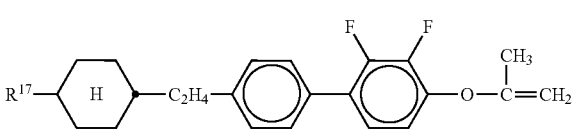

Y-5
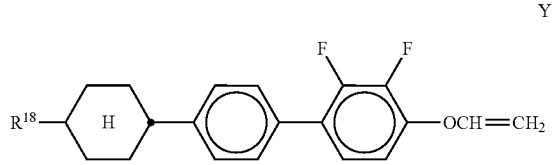

Y-6
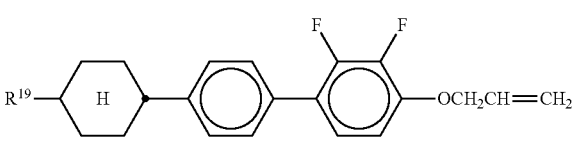

in which R$^{14}$-R$^{19}$ each, independently of one another, denote an alkyl or alkoxy radical having 1-6 C atoms; z and m each, independently of one another, denote 1-6; x denotes 0, 1, 2 or 3.

The medium according to the invention particularly preferably comprises one or more compounds of the formulae Y-1 to Y-6, preferably in amounts of ≥5% by weight.

f) Liquid-crystalline medium additionally comprising one or more fluorinated terphenyls of the formulae T-1 to T-21, T-1
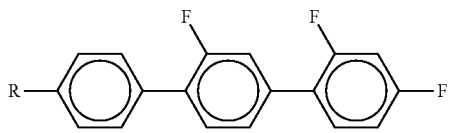

T-2
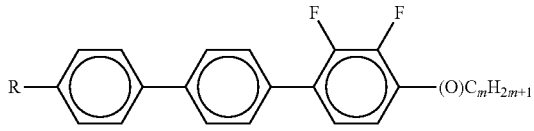

T-3
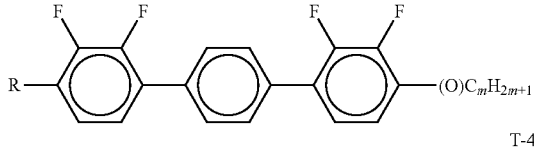

T-4
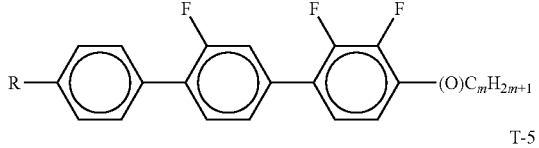

T-5
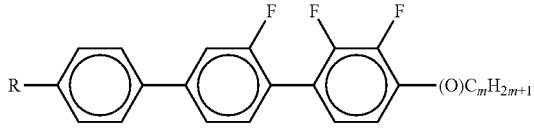

-continued

T-6
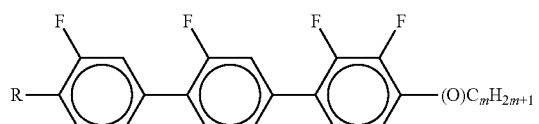

T-7
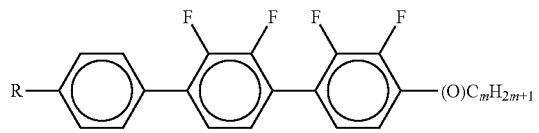

T-8
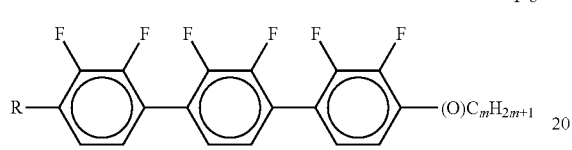

T-9
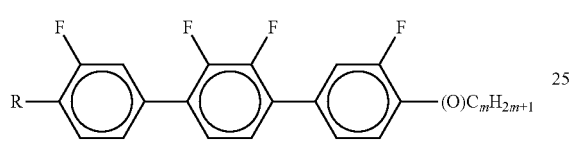

T-10
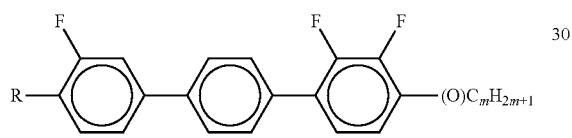

T-11
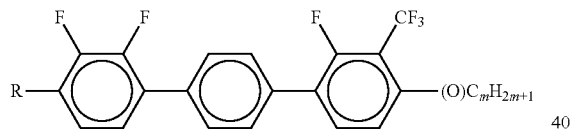

T-12
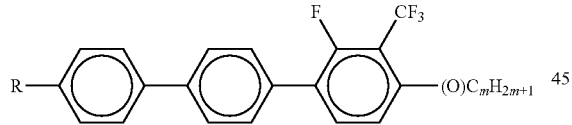

T-13
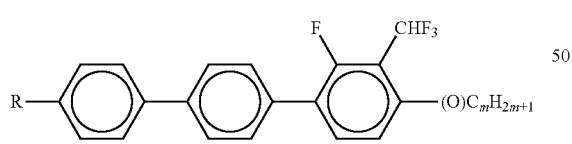

T-14
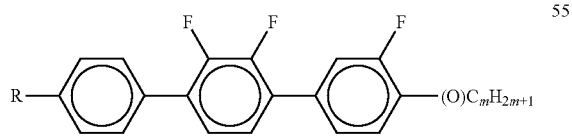

T-15
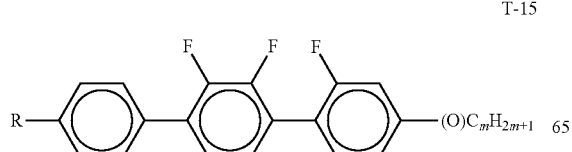

-continued

T-16
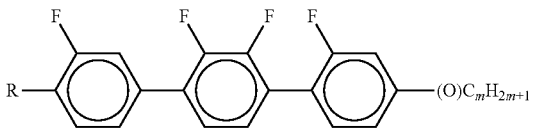

T-17
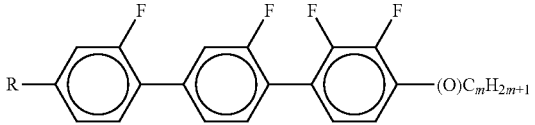

T-18
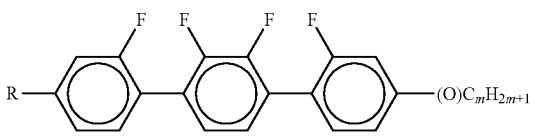

T-19
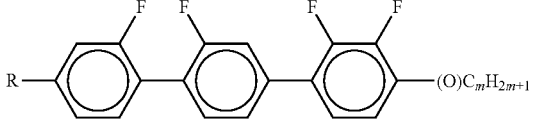

T-20
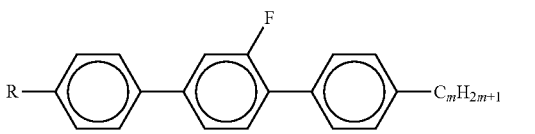

T-21
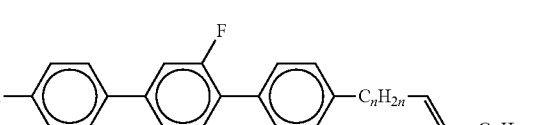

in which

R denotes a straight-chain alkyl or alkoxy radical having 1-7 C atoms, and m=0, 1, 2, 3, 4, 5 or 6 and n denotes 0, 1, 2, 3 or 4.

R preferably denotes methyl, ethyl, propyl, butyl, pentyl, hexyl, methoxy, ethoxy, propoxy, butoxy, pentoxy.

The medium according to the invention preferably comprises the terphenyls of the formulae T-1 to T-21 in amounts of 2-30% by weight, in particular 5-20% by weight.

Particular preference is given to compounds of the formulae T-1, T-2, T-20 and T-21. In these compounds, R preferably denotes alkyl, furthermore alkoxy, each having 1-5 C atoms. In the compounds of the formula T-20, R preferably denotes alkyl or alkenyl, in particular alkyl. In the compound of the formula T-21, R preferably denotes alkyl.

The terphenyls are preferably employed in the mixtures according to the invention if the Δn value of the mixture is to be ≥0.1. Preferred mixtures comprise 2-20% by weight of one or more terphenyl compounds selected from the group of the compounds T-1 to T-21.

g) Liquid-crystalline medium additionally comprising one or more biphenyls of the formulae B-1 to B-3,

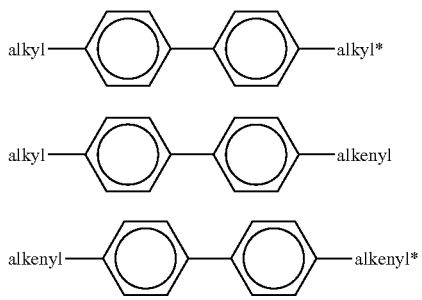

B-1

B-2

B-3 in which alkyl and alkyl* each, independently of one another, denote a straight-chain alkyl radical having 1-6 C atoms, preferably having 3-5 C atoms, and alkenyl and alkenyl* each, independently of one another, denote a straight-chain alkenyl radical having 2-6 C atoms.

The proportion of the biphenyls of the formulae B-1 to B-3 in the mixture as a whole is preferably at least 3% by weight, in particular ≥5% by weight.

Of the compounds of the formulae B-1 to B-3, the compounds of the formula B-2 are particularly preferred.

Particularly preferred biphenyls are

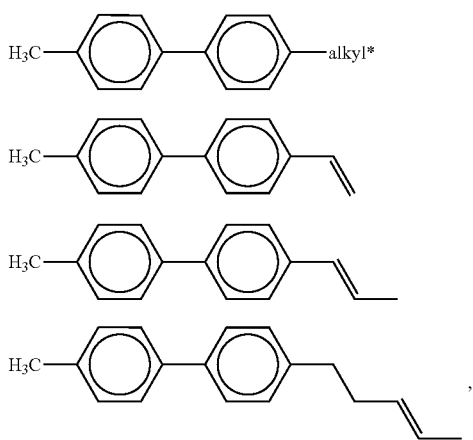

B-1a

B-2a

B-2b

B-2c in which alkyl* denotes an alkyl radical having 1-6 C atoms. The medium according to the invention particularly preferably comprises one or more compounds of the formulae B-1a and/or B-2c.

h) Liquid-crystalline medium comprising at least one compound of the formulae Z-1 to Z-7,

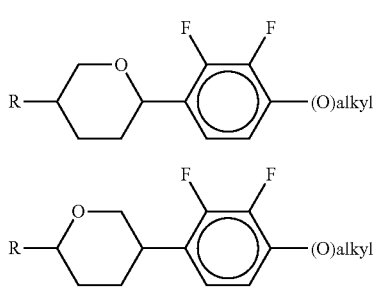

Z-1

Z-2

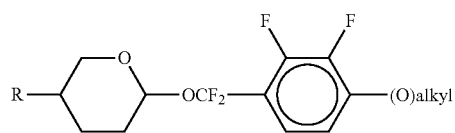

Z-3

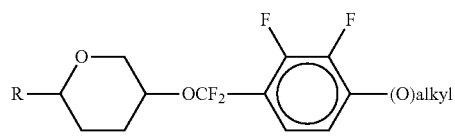

Z-4

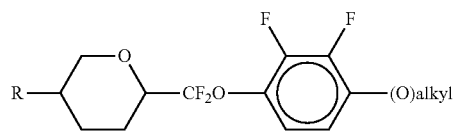

Z-5

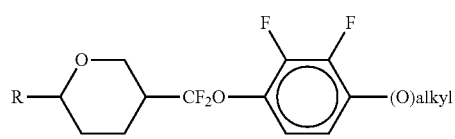

Z-6

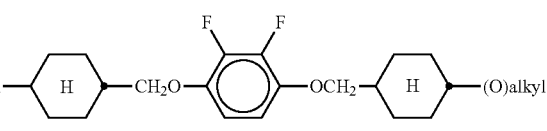

Z-7 in which R and alkyl have the meanings indicated above.

i) Liquid-crystalline medium comprising at least one compound of the formulae O-1 to O-17,

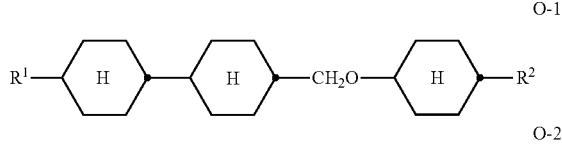

O-1

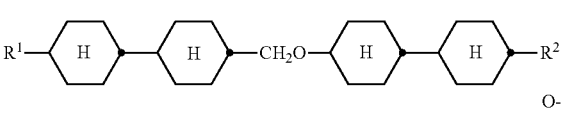

O-2

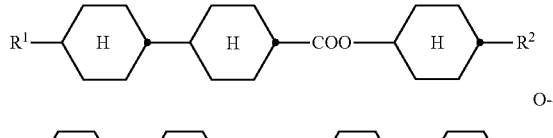

O-3

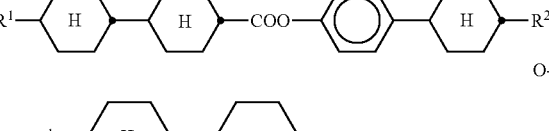

O-4

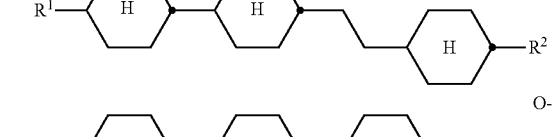

O-5

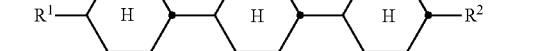

O-6

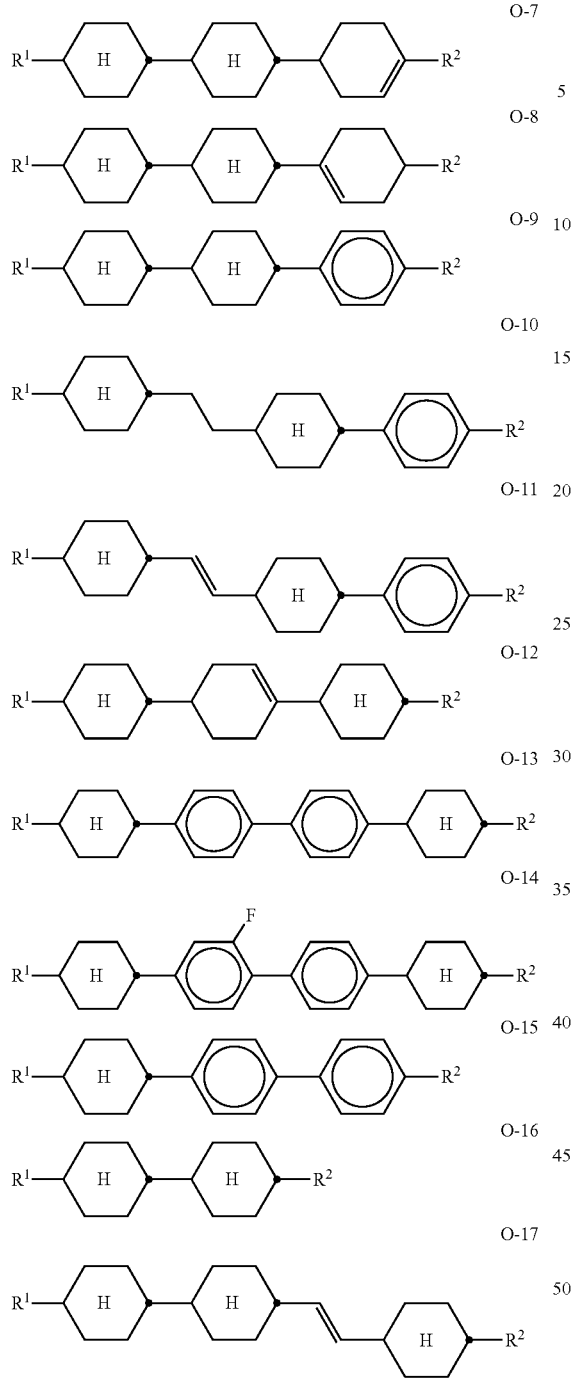

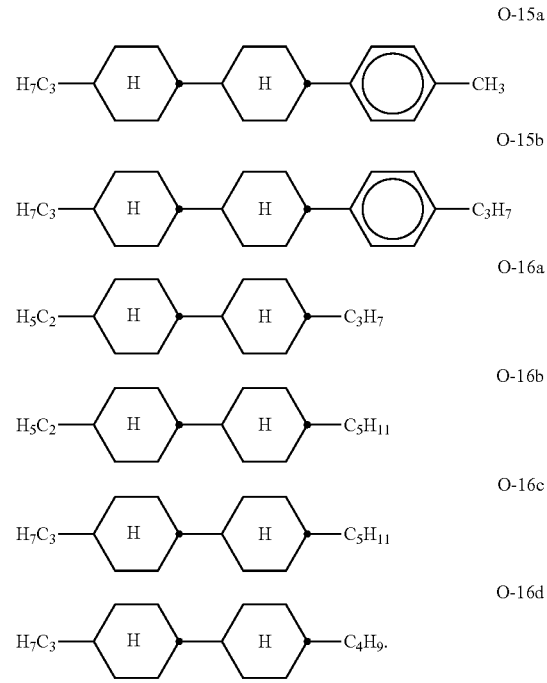

in which $R^1$ and $R^2$ have the meanings indicated for $R^{2A}$. $R^1$ and $R^2$ preferably each, independently of one another, denote straight-chain alkyl.

Preferred media comprise one or more compounds of the formulae O-1, O-3, O-4, O-5, O-9, O-13, O-14, O-15, O-16 and/or O-17.

Mixtures according to the invention very particularly preferably comprise one or more compound(s) of the formula O-9, O-15, O-16 and/or O-17, in particular in amounts of 5-30%.

Preferred compounds of the formulae O-15 and O-16 are indicated below:

The medium according to the invention particularly preferably comprises the tricyclic compounds of the formula O-15a and/or of the formula O-15b in combination with one or more bicyclic compounds of the formulae O-16a to O-16d. The total proportion of the compounds of the formulae O-15a and/or O-15b in combination with one or more compounds selected from the bicyclic compounds of the formulae O-16a to O-16d is 5-40%, very particularly preferably 15-35%.

Very particularly preferred mixtures comprise compounds O-15a and O-16a:

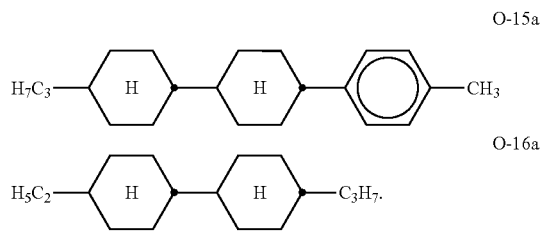

Compounds O-15a and O-16a are preferably present in the mixture in a concentration of 15-35%, particularly preferably 15-25% and especially preferably 18-22%, based on the mixture as a whole.

Very particularly preferred mixtures comprise compounds O-15b and O-16a:

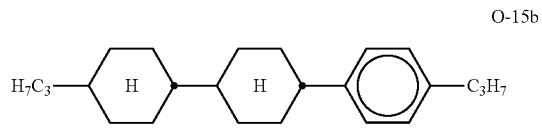

O-16a

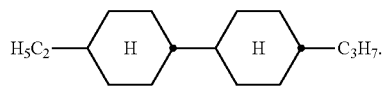

Compounds O-15b and O-16a are preferably present in the mixture in a concentration of 15-35%, particularly preferably 15-25% and especially preferably 18-22%, based on the mixture as a whole.

Very particularly preferred mixtures comprise the following three compounds:

O-15a

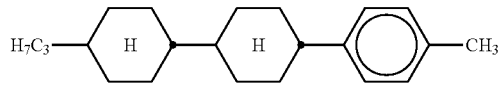

O-15b

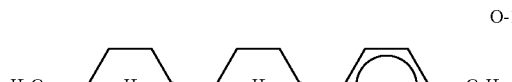

O-16a

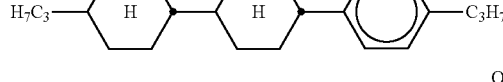

Compounds O-15a, O-15b and O-16a are preferably present in the mixture in a concentration of 15-35%, particularly preferably 15-25% and especially preferably 18-22%, based on the mixture as a whole.

j) Preferred liquid-crystalline media according to the invention comprise one or more substances which contain a tetrahydronaphthyl or naphthyl unit, such as, for example, the compounds of the formulae N-1 to N-5,

N-1

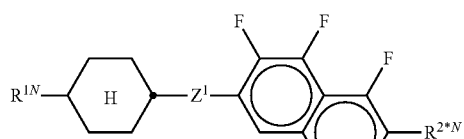

N-2

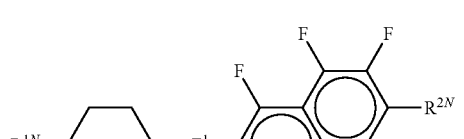

N-3

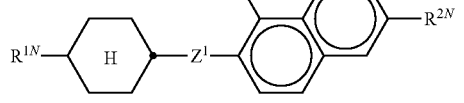

N-4

N-5

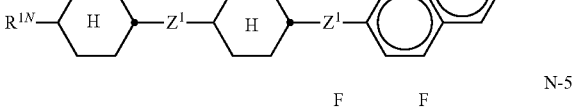

in which $R^{1N}$ and $R^{2N}$ each, independently of one another, have the meanings indicated for $R^{2A}$, preferably denote straight-chain alkyl, straight-chain alkoxy or straight-chain alkenyl, and $Z^1$ and $Z^2$ each, independently of one another, denote —$C_2H_4$—, —CH=CH—, —$(CH_2)_4$—, —$(CH_2)_3O$—, —$O(CH_2)_3$—, —CH=CHCH$_2$CH$_2$—, —CH$_2$CH$_2$CH=CH—, —CH$_2$O—, —OCH$_2$—, —COO—, —OCO—, —$C_2F_4$—, —CF=CF—, —CF=CH—, —CH=CF—, —CF$_2$O—, —OCF$_2$—, —CH$_2$— or a single bond.

k) Preferred mixtures comprise one or more compounds selected from the group of the difluorodibenzochroman compounds of the formula BC, chromans of the formula CR, fluorinated phenanthrenes of the formulae PH-1 and PH-2, fluorinated dibenzofurans of the formula BF,

BC

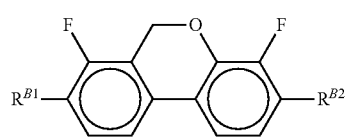

CR

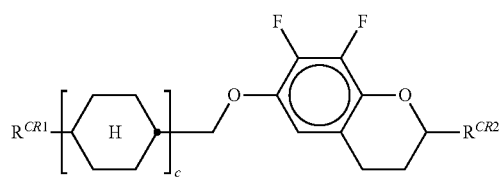

PH-1

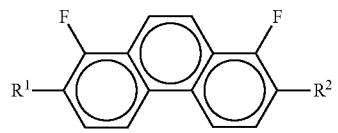

PH-2

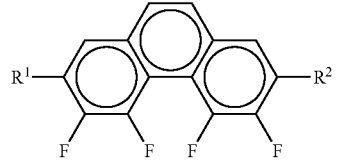

-continued

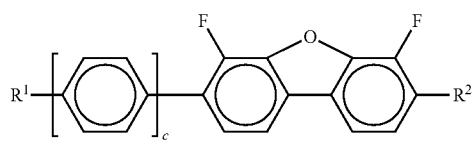
BF in which $R^{B1}$, $R^{B2}$, $R^{CR1}$, $R^{CR2}$, $R^1$, $R^2$ each, independently of one another, have the meaning of $R^{2A}$. c is 0, 1 or 2.

The mixtures according to the invention preferably comprise the compounds of the formulae BC, CR, PH-1, PH-2 and/or BF in amounts of 3 to 20% by weight, in particular in amounts of 3 to 15% by weight.

Particularly preferred compounds of the formulae BC and CR are the compounds BC-1 to BC-7 and CR-1 to CR-5,

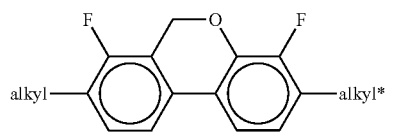
BC-1

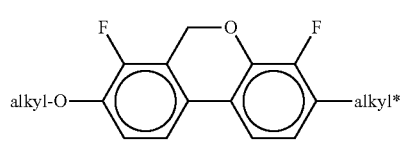
BC-2

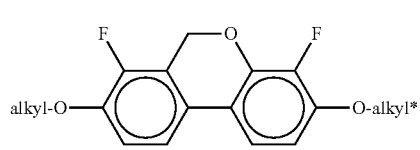
BC-3

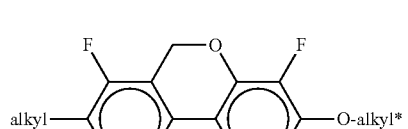
BC-4

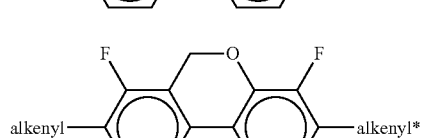
BC-5

BC-6

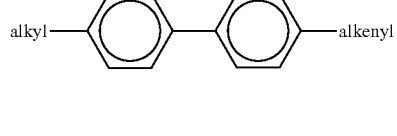

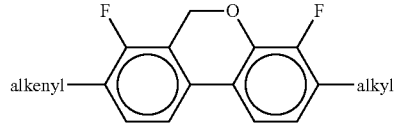
BC-7

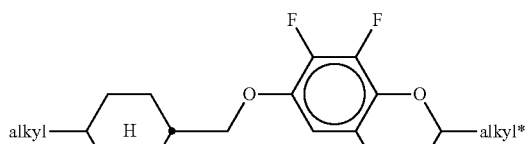
CR-1

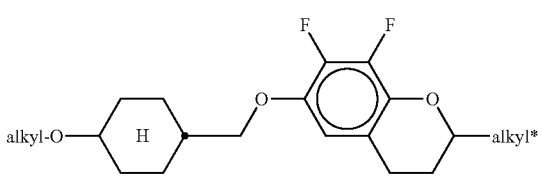
CR-2

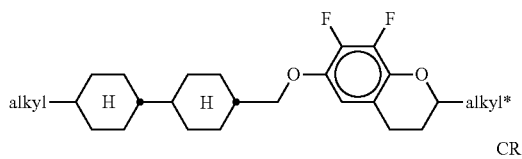
CR-3

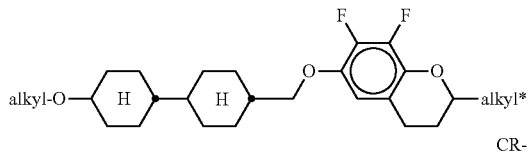
CR-4

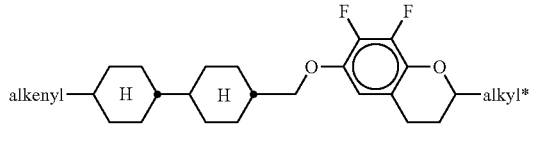
CR-5 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms.

Very particular preference is given to mixtures comprising one, two or three compounds of the formula BC-2.

l) Preferred mixtures comprise one or more indane compounds of the formula In,

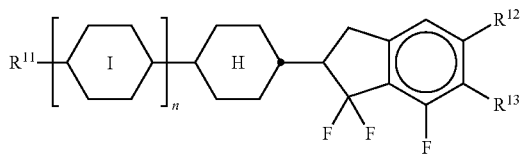
In in which $R^{11}$, $R^{12}$, $R^{13}$ each, independently of one another, denote a straight-chain alkyl, alkoxy, alkoxyalkyl or alkenyl radical having 1-6 C atoms, $R^{12}$ and $R^{13}$ additionally denote halogen, preferably F,

denotes
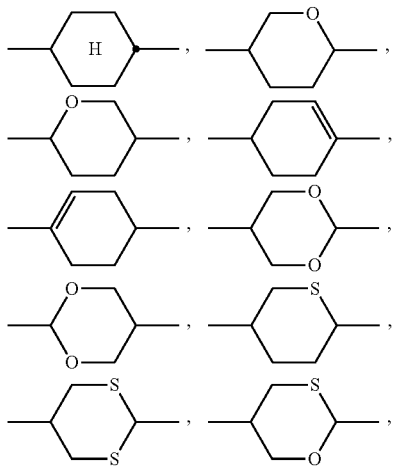
i denotes 0, 1 or 2.
Preferred compounds of the formula In are the compounds of the formulae In-1 to In-16 indicated below:
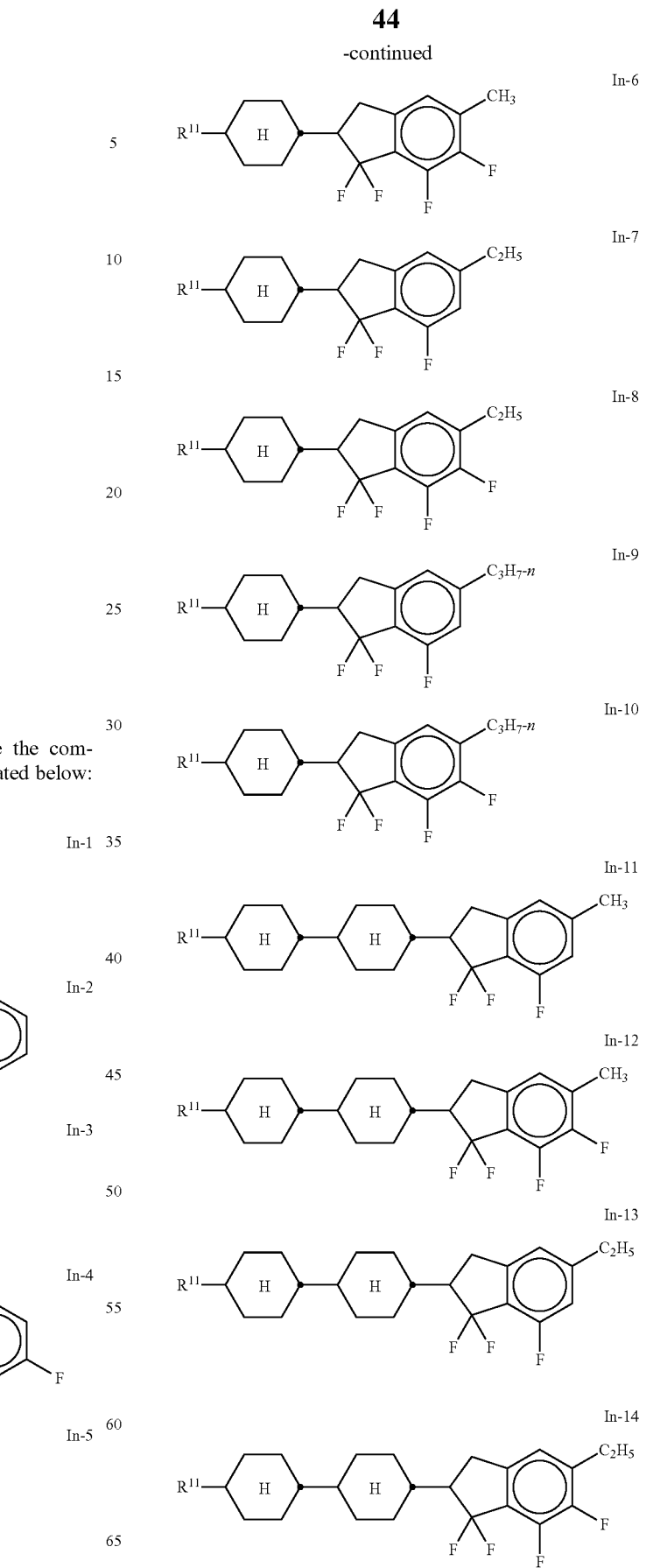

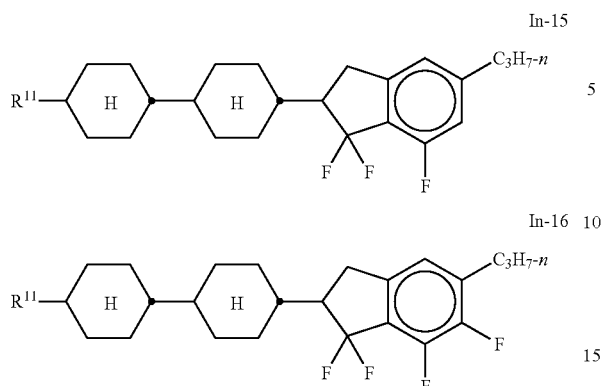

Particular preference is given to the compounds of the formulae In-1, In-2, In-3 and In-4.

The compounds of the formula In and the sub-formulae In-1 to In-16 are preferably employed in the mixtures according to the invention in concentrations ≥5% by weight, in particular 5-30% by weight and very particularly preferably 5-25% by weight.

m) Preferred mixtures additionally comprise one or more compounds of the formulae L-1 to L-11,

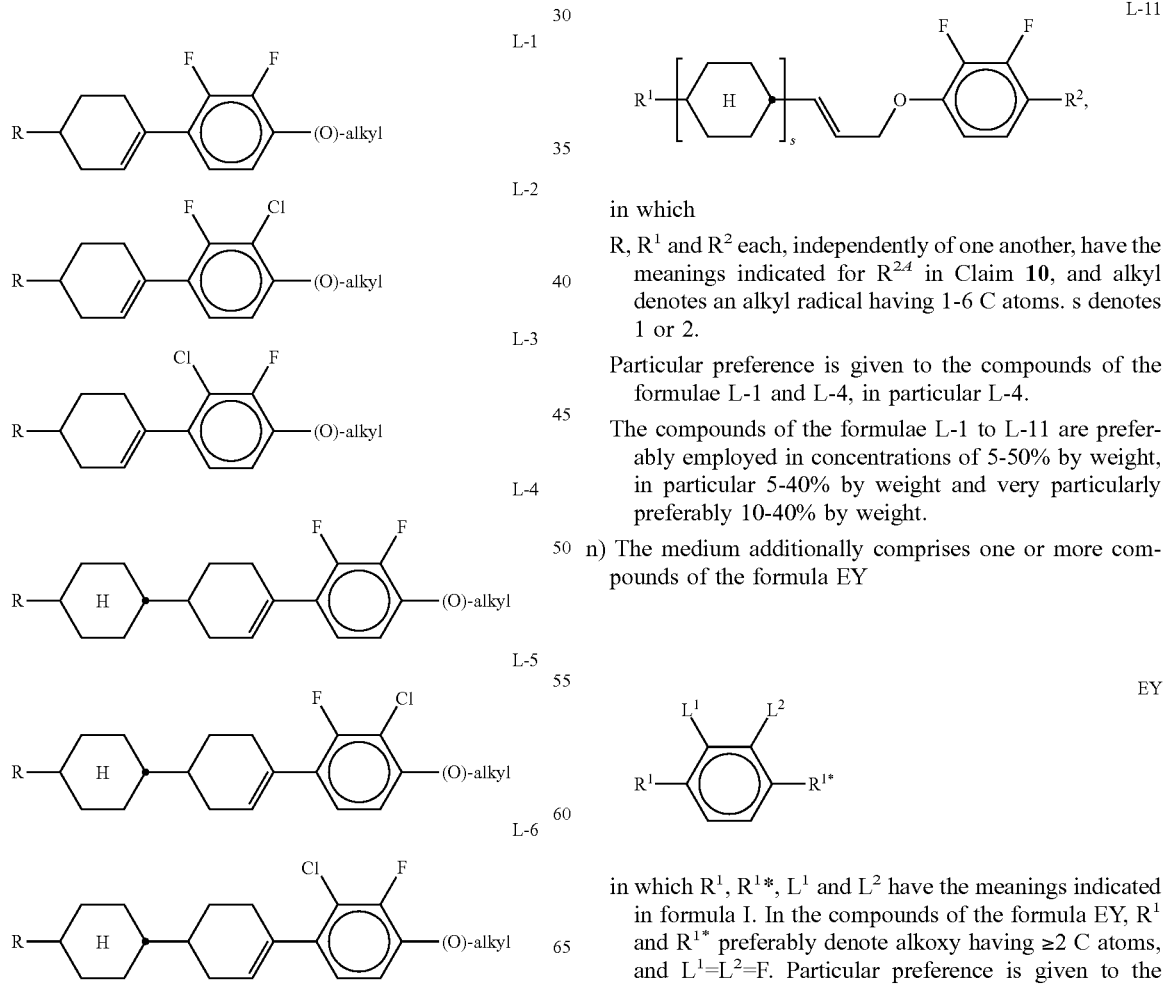

in which

R, $R^1$ and $R^2$ each, independently of one another, have the meanings indicated for $R^{2A}$ in Claim 10, and alkyl denotes an alkyl radical having 1-6 C atoms. s denotes 1 or 2.

Particular preference is given to the compounds of the formulae L-1 and L-4, in particular L-4.

The compounds of the formulae L-1 to L-11 are preferably employed in concentrations of 5-50% by weight, in particular 5-40% by weight and very particularly preferably 10-40% by weight.

n) The medium additionally comprises one or more compounds of the formula EY

in which $R^1$, $R^{1*}$, $L^1$ and $L^2$ have the meanings indicated in formula I. In the compounds of the formula EY, $R^1$ and $R^{1*}$ preferably denote alkoxy having ≥2 C atoms, and $L^1=L^2=F$. Particular preference is given to the compounds of the formulae

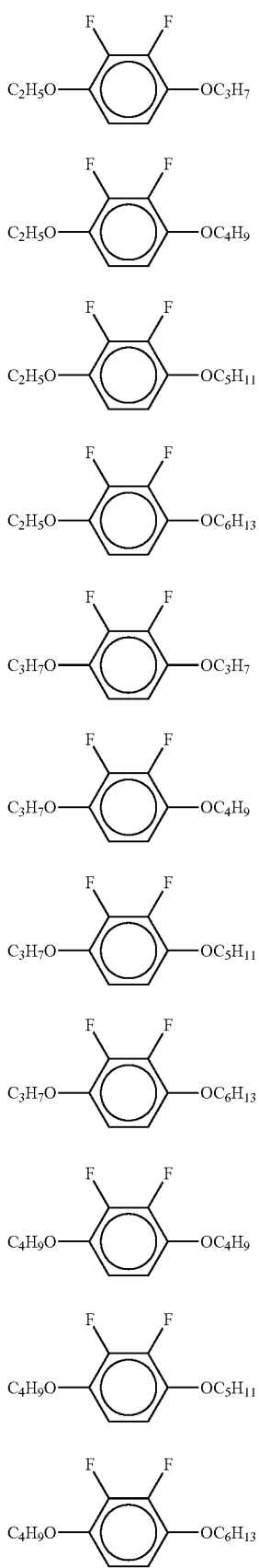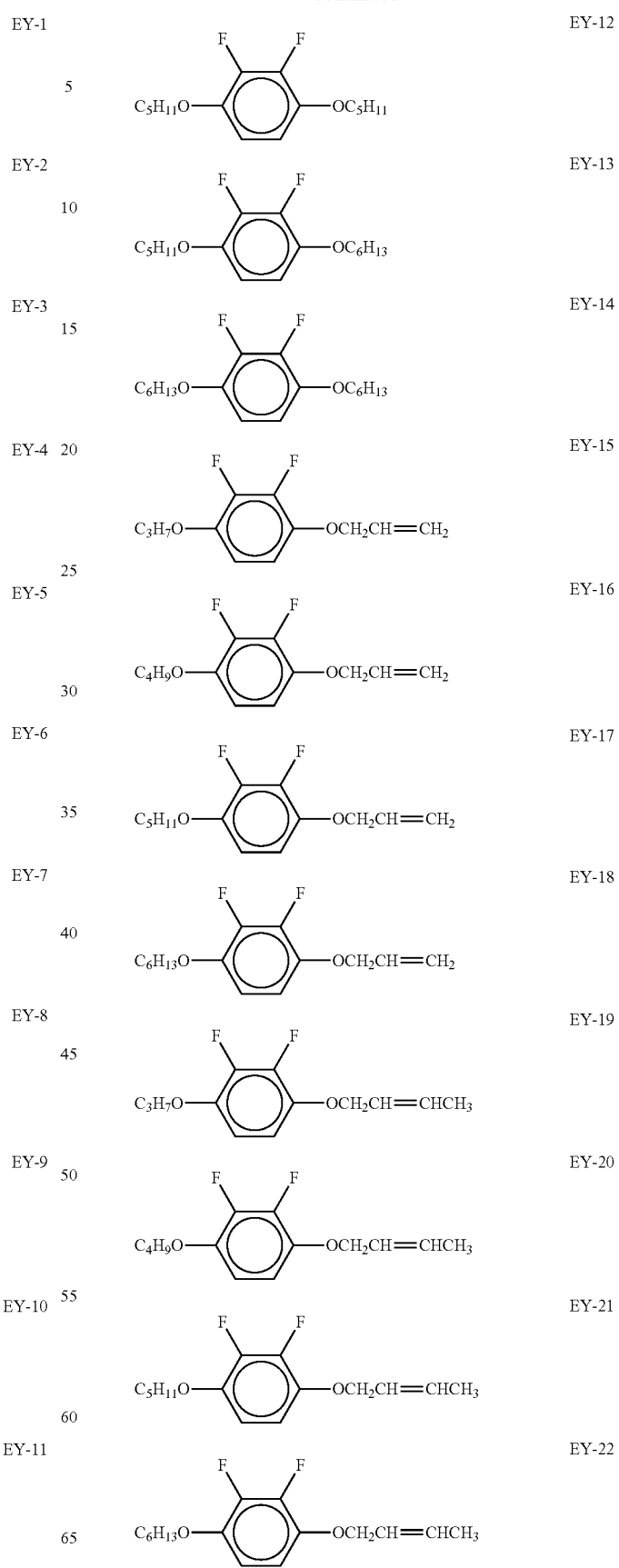

-continued

EY-23

$C_3H_7O$—⬡(F,F)—$OCH_2CH=CHC_2H_5$

EY-24

$C_4H_9O$—⬡(F,F)—$OCH_2CH=CHC_2H_5$

EY-25

$C_5H_{11}O$—⬡(F,F)—$OCH_2CH=CHC_2H_5$

EY-26

$C_6H_{13}O$—⬡(F,F)—$OCH_2CH=CHC_2H_5$.

The compound(s) of the formula EY are preferably employed in amounts of 3-15% by weight, based on the mixture as a whole.

The mixtures according to the invention preferably comprise one or more compounds of the formula P4

P4

$R^1$—⬡—⬡—⬡(F)—⬡(F,F,F)—F in which $R^1$ has the meaning indicated for formula I in Claim 1.

The compound of the formula P4 is preferably present in the mixture according to the invention in concentrations of 0-5% by weight, in particular in concentrations of 0-2% by weight.

Particularly preferred mixture concepts are indicated below: (The acronyms used are explained in Table A. n and m here each, independently of one another, denote 1-6).

The mixtures according to the invention preferably comprise
one or more compounds of the formula I in which $L^1=L^2=F$ and $R^1$=alkyl and $R^{1*}$=alkoxy;
CPY-n-Om, in particular CPY-2-O2, CPY-3-O2 and/or CPY-5-O2, preferably in concentrations >5%, in particular 10-30%, based on the mixture as a whole,
and/or
CY-n-Om, preferably CY-3-O2, CY-3-O4, CY-5-O2 and/or CY-5-O4, preferably in concentrations >5%, in particular 15-50%, based on the mixture as a whole,
and/or
CCY-n-Om, preferably CCY-2-O2, CCY-3-O1, CCY-3-O2, CCY-3-O3, CCY-4-O2 and/or CCY-5-O2, preferably in concentrations >5%, in particular 10-30%, based on the mixture as a whole,
and/or
CLY-n-Om, preferably CLY-2-O4, CLY-3-O2 and/or CLY-3-O3, preferably in concentrations >5%, in particular 10-30%, based on the mixture as a whole,
and/or
CK-n-F, preferably CK-3-F, CK-4-F and/or CK-5-F, preferably >5%, in particular 5-25%, based on the mixture as a whole.

Preference is furthermore given to mixtures according to the invention which comprise the following mixture concepts:
(n and m each, independently of one another, denote 1-6.)
CPY-n-Om and CY-n-Om, preferably in concentrations of 10-80% based on the mixture as a whole,
and/or
CPY-n-Om and CK-n-F, preferably in concentrations of 10-70% based on the mixture as a whole,
and/or
CPY-n-Om and CLY-n-Om, preferably in concentrations of 10-80% based on the mixture as a whole,
and/or
Y-nO-Om, preferably in concentrations of 8-16%, based on the mixture as a whole.

The invention furthermore relates to an electro-optical display having active-matrix addressing based on the ECB, VA, PS-VA, IPS, PS-IPS, FFS or PS-FFS effect, characterised in that it contains, as dielectric, a liquid-crystalline medium according to one or more of Claims 1 to 16.

The liquid-crystalline medium according to the invention preferably has a nematic phase from ≤−20° C. to ≥70° C., particularly preferably from ≤−30° C. to ≥80° C., very particularly preferably from ≤−40° C. to ≥90° C.

The expression "have a nematic phase" here means on the one hand that no smectic phase and no crystallisation are observed at low temperatures at the corresponding temperature and on the other hand that clearing still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of −20° C. in a corresponding test cell is 1000 h or more, the medium is referred to as stable at this temperature. At temperatures of −30° C. and −40° C., the corresponding times are 500 h and 250 h respectively. At high temperatures, the clearing point is measured by conventional methods in capillaries.

The liquid-crystal mixture preferably has a nematic phase range of at least 60 K and a flow viscosity $v_{20}$ of at most 30 $mm^2 \cdot s^{-1}$ at 20° C.

The values of the birefringence Δn in the liquid-crystal mixture are generally between 0.07 and 0.16, preferably between 0.08 and 0.12.

The liquid-crystal mixture according to the invention has a Δε of −0.5 to −8.0, in particular −2.5 to −6.0, where Δε denotes the dielectric anisotropy. The rotational viscosity $\gamma_1$ at 20° C. is preferably 165 mPa·s, in particular 140 mPa·s.

The liquid-crystal media according to the invention have relatively low values for the threshold voltage ($V_0$). They are preferably in the range from 1.7 V to 3.0 V, particularly preferably ≤2.5 V and very particularly preferably ≤2.3 V.

For the present invention, the term "threshold voltage" relates to the capacitive threshold ($V_0$), also known as the Freedericks threshold, unless explicitly indicated otherwise.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a higher addressing voltage or threshold voltage and vice versa.

For the present invention, the term "dielectrically positive compounds" denotes compounds having a $\Delta\epsilon>1.5$, the term "dielectrically neutral compounds" denotes those having $-1.5\leq\Delta\epsilon\leq1.5$ and the term "dielectrically negative compounds" denotes those having $\Delta\epsilon<-1.5$. The dielectric anisotropy of the compounds is determined here by dissolving 10% of the compounds in a liquid-crystalline host and determining the capacitance of the resultant mixture in at least one test cell in each case having a layer thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

All temperature values indicated for the present invention are in ° C.

The mixtures according to the invention are suitable for all VA-TFT applications, such as, for example, VAN, MVA, (S)-PVA, ASV, PSA (polymer sustained VA) and PS-VA (polymer stabilized VA). They are furthermore suitable for IPS (in-plane switching) and FFS (fringe field switching) applications having negative $\Delta\epsilon$.

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of $\leq-0.5$. Besides one or more compounds of the formula I, it preferably comprises the compounds of the formulae IIA, IIB and/or IIC, furthermore compounds of the formula III.

The proportion of component A is preferably between 45 and 100%, in particular between 60 and 100%.

For component A, one (or more) individual compound(s) which has (have) a value of $\Delta\epsilon\leq-0.8$ is (are) preferably selected. This value must be more negative, the smaller the proportion A in the mixture as a whole.

Component B has pronounced nematogeneity and a flow viscosity of not greater than 30 mm$^2\cdot$s$^{-1}$, preferably not greater than 25 mm$^2\cdot$s$^{-1}$, at 20° C.

Particularly preferred individual compounds in component B are extremely low-viscosity nematic liquid crystals having a flow viscosity of not greater than 18 mm$^2\cdot$s$^{-1}$, preferably not greater than 12 mm$^2\cdot$s$^{-1}$, at 20° C.

Component B is monotropically or enantiotropically nematic, has no smectic phases and is able to prevent the occurrence of smectic phases down to very low temperatures in liquid-crystal mixtures. For example, if various materials of high nematogeneity are added to a smectic liquid-crystal mixture, the nematogeneity of these materials can be compared through the degree of suppression of smectic phases that is achieved.

The mixture may optionally also comprise a component C, comprising compounds having a dielectric anisotropy of $\Delta\epsilon\geq1.5$. These so-called positive compounds are generally present in a mixture of negative dielectric anisotropy in amounts of $\leq20\%$ by weight, based on the mixture as a whole.

A multiplicity of suitable materials is known to the person skilled in the art from the literature. Particular preference is given to compounds of the formula III.

In addition, these liquid-crystal phases may also comprise more than 18 components, preferably 18 to 25 components.

Besides one or more compounds of the formula I, the phases preferably comprise 4 to 15, in particular 5 to 12, and particularly preferably <10, compounds of the formulae IIA, IIB and/or IIC and optionally III.

Besides compounds of the formula I and the compounds of the formulae IIA, IIB and/or IIC and optionally III, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acid esters.

The most important compounds which are suitable as constituents of liquid-crystal phases of this type can be characterised by the formula IV $$R^{20}\text{-L-G-E-}R^{21} \quad\quad\quad \text{IV}$$

in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline,

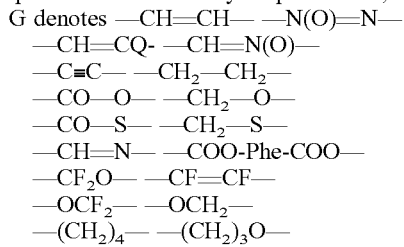

or a C—C single bond, Q denotes halogen, preferably chlorine, or —CN, and R$^{20}$ and R$^{21}$ each denote alkyl, alkenyl, alkoxy, alkoxyalkyl or alkoxycarbonyloxy having up to 18, preferably up to 8, carbon atoms, or one of these radicals alternatively denotes CN, NC, NO$_2$, NCS, CF$_3$, SF$_5$, OCF$_3$, F, Cl or Br.

In most of these compounds, R$^{20}$ and R$^{21}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, IPS or FFS mixture according to the invention may also comprise compounds in which, for example, H, N, O, Cl and F have been replaced by the corresponding isotopes.

Polymerisable compounds, so-called reactive mesogens (RMs), for example as disclosed in U.S. Pat. No. 6,861,107, may furthermore be added to the mixtures according to the invention in concentrations of preferably 0.12-5% by weight, particularly preferably 0.2-2% by weight, based on the mixture. These mixtures may optionally also comprise an initiator, as described, for example, in U.S. Pat. No. 6,781,665. The initiator, for example Irganox-1076 from BASF, is preferably added to the mixture comprising polymerisable compounds in amounts of 0-1%. Mixtures of this type can be used for so-called polymer-stabilised VA modes (PS-VA) or PSA (polymer sustained VA), in which polymerisation of the reactive mesogens is intended to take place in the liquid-crystalline mixture. The prerequisite for this is that the liquid-crystal mixture does not itself comprise any polymerisable components.

In a preferred embodiment of the invention, the polymerisable compounds are selected from the compounds of the formula M $$R^a\text{-}A^1\text{-}(Z^1\text{-}A^2)_m\text{-}R^b \qquad M$$

in which the individual radicals have the following meanings:

$R^a$ and $R^b$ each, independently of one another, denote P, P-Sp-, H, halogen, $SF_5$, $NO_2$, a carbon group or hydrocarbon group, where at least one of the radicals $R^a$ and $R^b$ denotes or contains a group P or P-Sp-, P on each occurrence, identically or differently, denotes a polymerisable group, Sp on each occurrence, identically or differently, denotes a spacer group or a single bond, $A^1$ and $A^2$ each, independently of one another, denote an aromatic, heteroaromatic, alicyclic or heterocyclic group, preferably having 4 to 25 ring atoms, which may also contain fused rings, and which may also be mono- or polysubstituted by L, L denotes P-Sp-, H, OH, $CH_2OH$, halogen, $SF_5$, $NO_2$, a carbon group or hydrocarbon group, $Z^1$ on each occurrence, identically or differently, denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH═CH—, —CF═CF—, —C≡C—, —CH═CH—COO—, —OCO—CH═CH—, $CR^0R^{00}$ or a single bond, $R^0$ and $R^{00}$ each, independently of one another, denote H or alkyl having 1 to 12 C atoms, m denotes 0, 1, 2, 3 or 4, n1 denotes 1, 2, 3 or 4.

Particularly preferred compounds of the formula M are those in which $R^a$ and $R^b$ each, independently of one another, denote P, P-Sp-, H, F, Cl, Br, I, —CN, —NO$_2$, —NCO, —NCS, —OCN, —SCN, $SF_5$ or straight-chain or branched alkyl having 1 to 25 C atoms, in which, in addition, one or more non-adjacent CH$_2$ groups may each be replaced, independently of one another, by —C(R$^0$)═C(R$^{00}$)—, —C≡C—, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp-, where at least one of the radicals $R^a$ and $R^b$ denotes or contains a group P or P-Sp-, $A^1$ and $A^2$ each, independently of one another, denote 1,4-phenylene, naphthalene-1,4-diyl, naphthalene-2,6-diyl, phenanthrene-2,7-diyl, anthracene-2,7-diyl, fluorene-2,7-diyl, 2-oxo-2H-chromene-3,6-diyl, 2-oxo-2H-chromene-3,7-diyl, 4-oxo-4H-chromene-2,6-diyl, 4-oxo-4H-chromene-3,6-diyl, 4-oxo-4H-chromene-3,7-diyl (trivial name coumarine or flavone), where, in addition, one or more CH groups in these groups may be replaced by N, cyclohexane-1,4-diyl, in which, in addition, one or more non-adjacent CH$_2$ groups may be replaced by O and/or S, 1,4-cyclohexenylene, bicycle[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L, L denotes P, P-Sp-, OH, CH$_2$OH, F, Cl, Br, I, —CN, —NO$_2$, —NCO, —NCS, —OCN, —SCN, —C(═O)N(R$^x$)$_2$, —C(═O)Y$^1$, —C(═O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, P denotes a polymerisable group, $Y^1$ denotes halogen, $R^x$ denotes P, P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

Further preferred compounds of the formula M are those selected from one or more of the following sub-groups:

m is 2 or 3, m is 2, $R^a$ and $R^b$ denote identical or different groups P-Sp-, $R^a$ and $R^b$ denote identical or different groups P-Sp- in which one or more groups Sp denote a single bond, m is 2 or 3, and $R^a$ and $R^b$ denote identical groups P-Sp-, one of the radicals $R^a$ and $R^b$ denotes P-Sp- and the other denotes an unpolymerisable group, preferably straight-chain or branched alkyl having 1 to 25 C atoms, in which, in addition, one or more non-adjacent CH$_2$ groups may each be replaced, independently of one another, by —C(R$^{00}$)═C(R$^{000}$)—, —C≡C—, —N(R$^{00}$)—, —O—, —S—, —CO—, —CO—O—, —O—CO— or —O—CO—O— in such a way that O and/or S atoms are not linked directly to one another, and in which, in addition, one or more H atoms may be replaced by F, Cl, Br, I or CN, one or more groups Sp denote a single bond, one or more groups Sp denote —(CH$_2$)$_{p1}$—, —(CH$_2$)$_{p1}$—O—, —(CH$_2$)$_{p1}$—OCO— or —(CH$_2$)$_{p1}$—OCOO—, in which p1 denotes an integer from 1 to 12, and r1 denotes an integer from 1 to 8, L does not denote and/or contain a polymerisable group, $A^1$ and $A^2$ denote, independently of one another, 1,4-phenylene or naphthalene-2,6-diyl, in which, in addition, one or more CH groups in these groups may be replaced by N and which may, in addition, be mono- or polyfluorinated, $Z^1$ is selected from the group consisting of —O—, —CO—O—, —OCO—, —OCH$_2$—, —CH$_2$O—, —CF$_2$O—, —OCF$_2$—, —CH$_2$CH$_2$—, —CH═CH—, —CF═CF—, —CH═CF—, —CF═CH—, —C≡C— and a single bond, L is an unpolymerisable group, preferably selected from the group consisting of F, Cl, —CN, straight-chain and branched alkyl having 1 to 25 C atoms, in which, in addition, one or more non-adjacent CH$_2$ groups may each be replaced, independently of one another, by —C(R$^{00}$)═C(R$^{000}$)—, —C≡C—, —N(R$^{00}$)—, —O—, —S—, —CO—, —CO—, —CO—O—, —O—CO— or —O—CO—O— in such a way that O and/or S atoms are not linked directly to one another, and in which, in addition, one or more H atoms may be replaced by F, Cl, Br, I or CN.

Suitable and preferred co-monomers for the production of LC mixtures according to the invention for the use in PS-VA, PS-IPS and PS-FFS applications are selected, for example from the following formulae:

M1
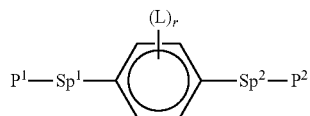

M2
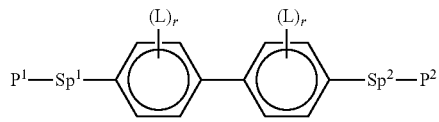

M3
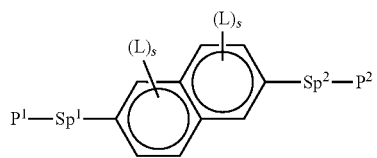

M4
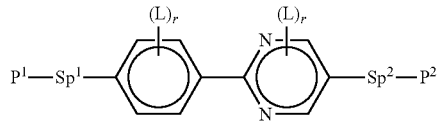

M5
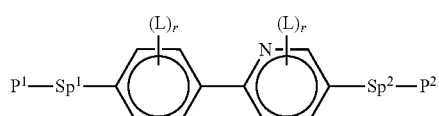

M6
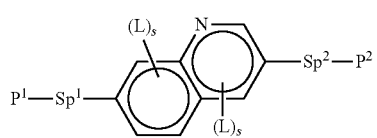

M7
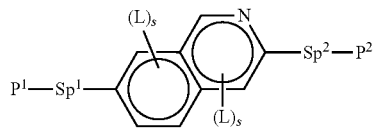

M8
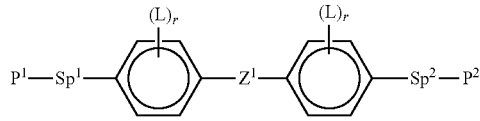

M9
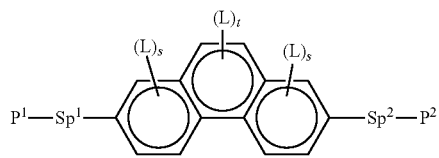

M10
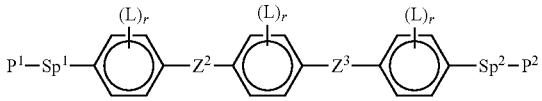

M11
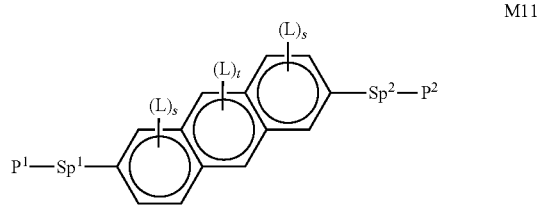

M12
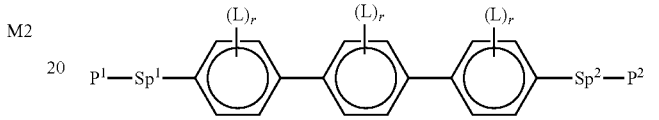

M13

M14
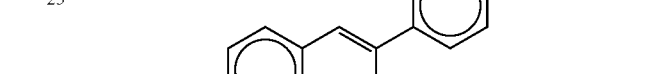

M15
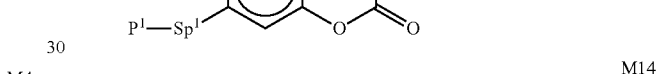

M16
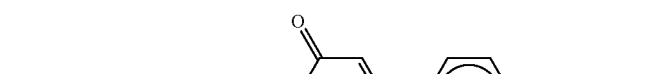

M17
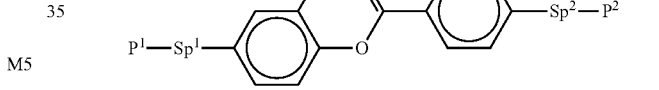

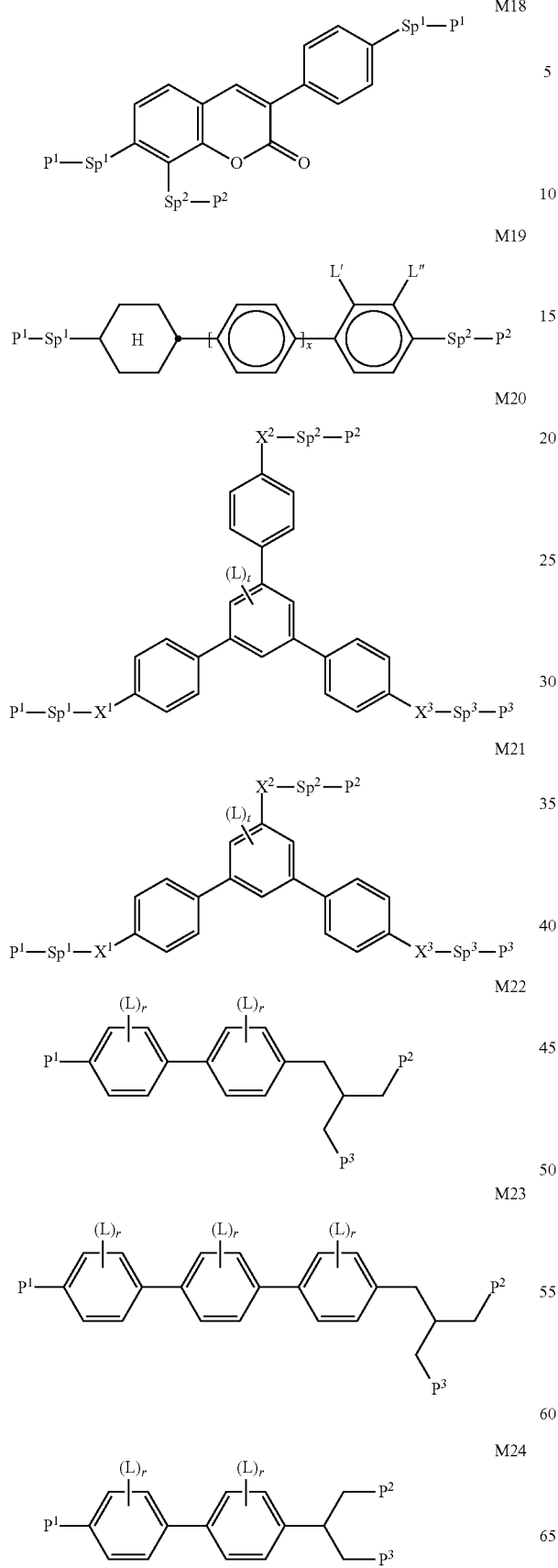

-continued

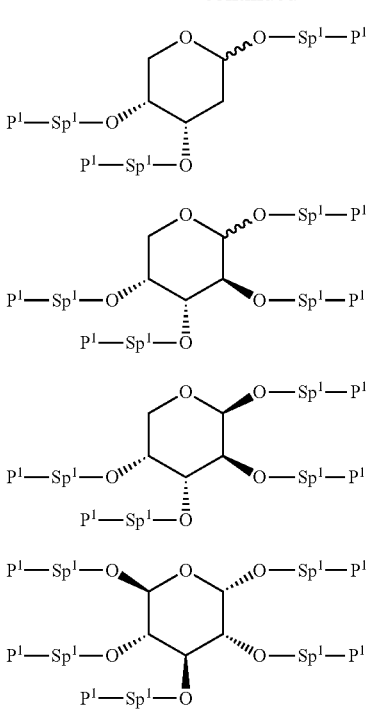

in which the individual radicals have the following meanings:

$P^1$, $P^2$ and $P^3$ each, identically or differently, denotes a polymerisable group, preferably having one of the meanings indicated above and below for P, particularly preferably an acrylate, methacrylate, fluoroacrylate, oxetane, vinyloxy or epoxy group, $Sp^1$, $Sp^2$ and $Sp^3$ each, independently of one another, denote a single bond or a spacer group, preferably having one of the meanings indicated above and below for $Sp^a$, and particularly preferably —$(CH_2)_{p1}$—, —$(CH_2)_{p1}$—O—, —$(CH_2)_{p1}$—CO—O— or —$(CH_2)_{p1}$—O—CO—O—, in which p1 is an integer from 1 to 12, and where in the last-mentioned groups the linking to the adjacent ring takes place via the O atom, where one or more of the radicals $P^1$-$Sp^1$-, $P^2$-$Sp^2$- and $P^3$-$Sp^3$- may also denote $R^{aa}$, with the proviso that at least one of the radicals $P^1$-$Sp^1$-, $P^2$-$Sp^2$- and $P^3$-$Sp^3$- present does not denote $R^{aa}$, $R^{aa}$ denotes H, F, Cl, CN or straight-chain or branched alkyl having 1 to 25 C atoms, in which, in addition, one or more non-adjacent $CH_2$ groups may each be replaced, independently of one another, by $C(R^0)$=$C(R^{00})$—, —C≡C—, —$N(R^0)$—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated, alkyl, alkoxy, alkenyl, alkynyl, alkylcarbonyl, alkoxycarbonyl or alkylcarbonyloxy having 1 to 12 C atoms (where the alkenyl and alkynyl radicals have at least two and the branched radicals at least three C atoms), $R^0$, $R^{00}$ each, independently of one another and on each occurrence identically or differently, denote H or alkyl having 1 to 12 C atoms, $R^y$ and $R^z$ each, independently of one another, denote H, F, $CH_3$ or $CF_3$, $X^1$, $X^2$ and $X^3$ each, independently of one another, denote —CO—O—, —O—CO— or a single bond, $Z^1$ denotes —O—, —CO—, —$C(R^yR^z)$— or —$CF_2CF_2$—, $Z^2$ and $Z^3$ each, independently of one another, denote —CO—O—, —O—CO—, —$CH_2O$—, —$OCH_2$—, —$CF_2O$—, —$OCF_2$— or —$(CH_2)_n$—, where n is 2, 3 or 4, L on each occurrence, identically or differently, denotes F, Cl, CN, SON, $SF_5$ or straight-chain or branched, optionally mono- or polyfluorinated, alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L" each, independently of one another, denote H, F or Cl, r denotes 0, 1, 2, 3 or 4, s denotes 0, 1, 2 or 3, t denotes 0, 1 or 2, x denotes 0 or 1.

In a preferred embodiment, in the compounds of the formula M1 to M34

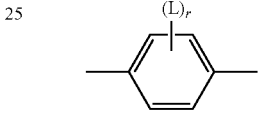

denotes

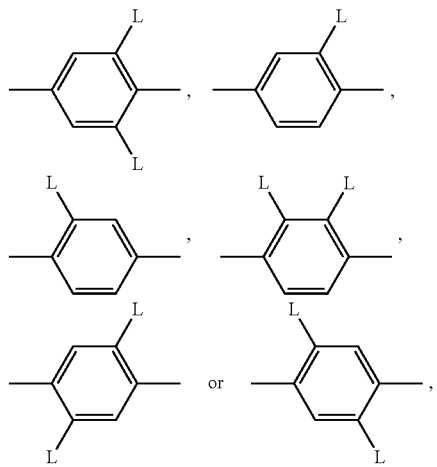

in which L on each occurrence, identically or differently, has one of the meanings indicated and in particular denotes F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ oder P-Sp-, preferably F, Cl, CN, $CH_3$, $C_2H_5$, $OCH_3$, $COCH_3$, $OCF_3$ or P-Sp-, most preferably F, Cl, $CH_3$, $OCH_3$, $COCH_3$ or $OCF_3$, in particular F or $CH_3$.

In a further preferred embodiment of the invention, the polymerisable compounds are chiral or optically active compounds selected from formula II* (chiral RMs):

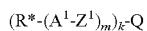  II* in which $A^1$, $Z^1$ and m have on each occurrence, identically or differently, one of the meanings indicated in formula M, R* has on each occurrence, identically or differently, one of the meanings indicated for $R^a$ in formula M, where R* can be chiral or achiral, Q denotes a k-valent chiral group, which is optionally mono- or polysubstituted by L, as defined in formula M, k is 1, 2, 3, 4, 5 or 6, where the compounds contain at least one radical R* or L which denotes or contains a group P or P-Sp- as defined above.

Particularly preferred compounds of the formula II* contain a monovalent group Q of the formula III*

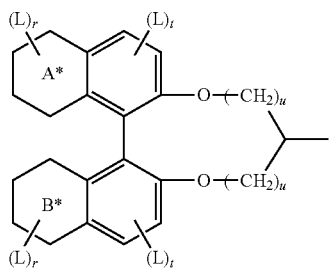

in which L and r have on each occurrence, identically or differently, the meanings indicated above, A* and B* each, independently of one another, denote fused benzene, cyclohexane or cyclohexene, t on each occurrence, identically or differently, denotes 0, 1 or 2, and u on each occurrence, identically or differently, denotes 0, 1 or 2.

Particular preference is given to groups of the formula III* in which u denotes 1.

Further preferred compounds of the formula II* contain a monovalent group Q or one or more groups R* of the formula IV*

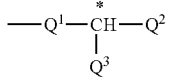

in which $Q^1$ denotes alkylene or alkyleneoxy having 1 to 9 C atoms or a single bond, $Q^2$ denotes optionally fluorinated alkyl or alkoxy having 1 to 10 C atoms, in which, in addition, one or two non-adjacent CH$_2$ groups may be replaced by —O—, —S—, —CH=CH—, —CO—, —OCO—, —COO—, —O—COO—, —S—CO—, —CO—S— or —C≡C— in such a way that O and/or S atoms are not linked directly to one another, $Q^3$ denotes F, Cl, CN or alkyl or alkoxy as defined for $Q^2$, but different from $Q^2$.

Preferred groups of the formula IV* are, for example, 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chloropropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy.

Further preferred compounds of the formula II* contain a divalent group Q of the formula V*

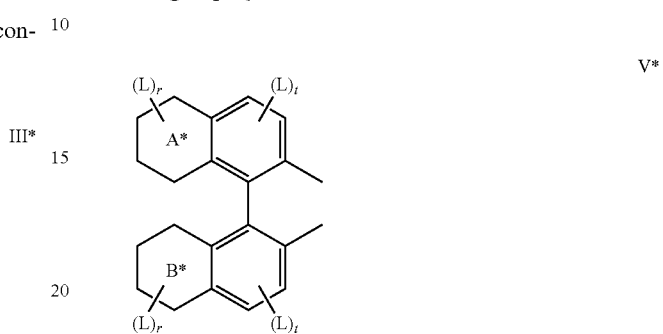

in which L, r, t, A* and B* have the meanings indicated above.

Further preferred compounds of the formula II* contain a divalent group Q selected from the following formulae:

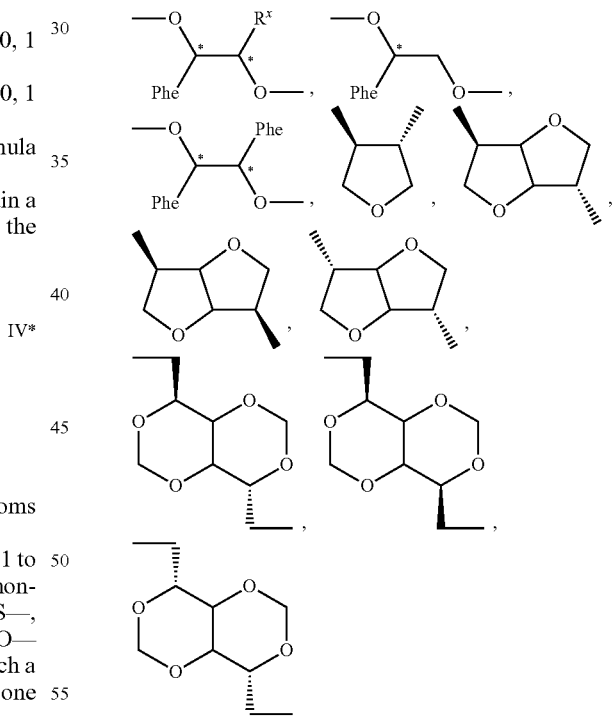

in which Phe denotes phenyl, which is optionally mono- or polysubstituted by L, and $R^x$ denotes F or optionally fluorinated alkyl having 1 to 4 C atoms.

Suitable chiral RMs are described, for example, in GB 2 314 839 A, U.S. Pat. No. 6,511,719, U.S. Pat. No. 7,223,450, WO 02/34739 A1, U.S. Pat. No. 7,041,345, U.S. Pat. No. 7,060,331 or U.S. Pat. No. 7,318,950. Suitable RMs containing binaphthyl groups are described, for example, in U.S. Pat. No. 6,818,261, U.S. Pat. No. 6,916,940, U.S. Pat. No. 7,318,950 and U.S. Pat. No. 7,223,450.

The chiral structural elements shown above and below and polymerisable and polymerised compounds containing such chiral structural elements can be employed in optically active form, i.e. as pure enantiomers or as any desired mixture of the two enantiomers, or alternatively as a racemate. The use of racemates is preferred. The use of racemates has some advantages over the use of pure enantiomers, such as, for example, significantly lower synthesis complexity and lower material costs.

The compounds of the formula II* are preferably present in the LC medium in the form of the racemate.

Particularly preferred compounds of the formula II* are selected from the following sub-formulae:

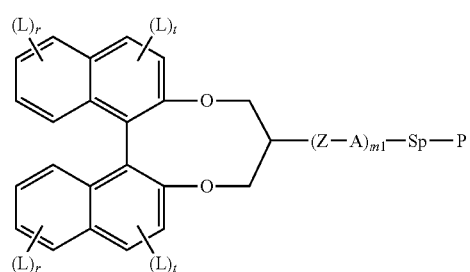

II*1

II*2

II*3

II*4

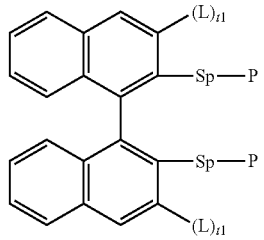

II*5

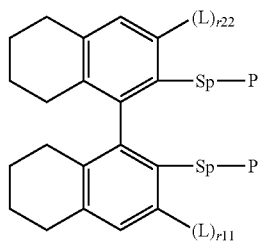

II*6

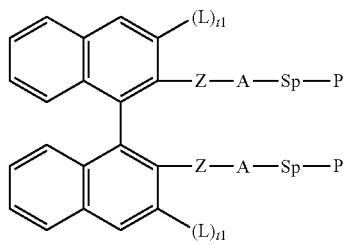

II*7

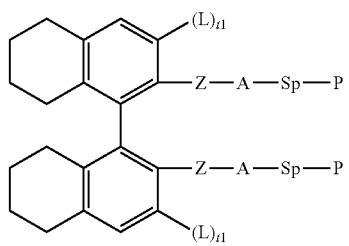

II*8

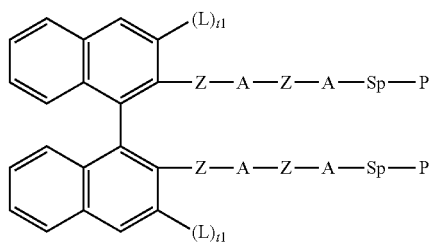

II*9

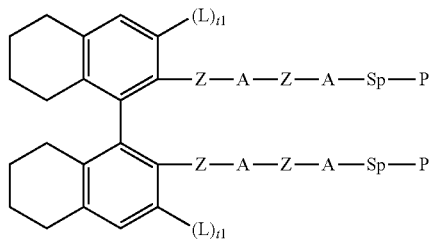

II*10

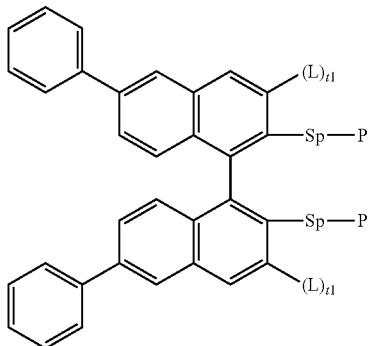

II*11 in which L, P, Sp, m, r and t have the meanings indicated above, Z and A have on each occurrence, identically or differently, one of the meanings indicated for $Z^1$ and $A^1$ respectively, and t1 on each occurrence, identically or differently, denotes 0 or 1.

The term "carbon group" denotes a mono- or polyvalent organic group containing at least one carbon atom, where this either contains no further atoms (such as, for example, —C≡C—) or optionally contains one or more further atoms, such as, for example, N, O, S, P, Si, Se, As, Te or Ge (for example carbonyl, etc.). The term "hydrocarbon group" denotes a carbon group which additionally contains one or more H atoms and optionally one or more heteroatoms, such as, for example, N, O, S, P, Si, Se, As, Te or Ge.

"Halogen" denotes F, Cl, Br or I.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms.

Preferred carbon and hydrocarbon groups are optionally substituted alkyl, alkenyl, alkynyl, alkoxy, alkylcarbonyl, alkoxycarbonyl, alkylcarbonyloxy and alkoxycarbonyloxy having 1 to 40, preferably 1 to 25, particularly preferably 1 to 18, C atoms, optionally substituted aryl or aryloxy having 6 to 40, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25, C atoms.

Further preferred carbon and hydrocarbon groups are $C_1$-$C_{40}$ alkyl, $C_2$-$C_{40}$ alkenyl, $C_2$-$C_{40}$ alkynyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkynyl, $C_3$-$C_{22}$ allyl, $C_4$-$C_{22}$ alkyldienyl, $C_6$-$C_{12}$ aryl, $C_6$-$C_{20}$ arylalkyl and $C_2$-$C_{20}$ heteroaryl.

Further preferred carbon and hydrocarbon groups are straight-chain, branched or cyclic alkyl radicals having 1 to 40, preferably 1 to 25, C atoms, which are unsubstituted or mono- or polysubstituted by F, Cl, Br, I or CN and in which one or more non-adjacent $CH_2$ groups may each be replaced, independently of one another,
by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O— and in which one or more H atoms may be replaced by fluorine, an optionally substituted aryl or aryloxy group having 6 to 40 C atoms, or an optionally substituted heteroaryl or heteroaryloxy group having 2 to 40 C atoms.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 2 to 25 C atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, 1,1':3',1''-terphenyl-2'-yl, naphthyl, anthracene, binaphthyl, phenanthrene, pyrene, dihydropyrene, chrysene, perylene, tetracene, pentacene, benzpyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 3 to 25 C atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" above and below, are, for example, F, Cl, Br, I, —CN, —NO$_2$, —NCO, —NCS, —OCN, —SCN, —C(=O)N($R^x$)$_2$, —C(=O)$Y^1$, —C(=O)$R^x$, —N($R^x$)$_2$, in which $R^x$ has the meaning indicated above, and $Y^1$ denotes halogen, optionally substituted silyl or aryl having 6 to 40, preferably 6 to 20, C atoms, and straight-chain or branched alkyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, $R^0$, —$OR^0$, —CO—$R^0$, —CO—O—$R^0$, —O—CO—$R^0$ or —O—CO—O—$R^0$, in which $R^0$ has the meaning indicated above.

Particularly preferred substituents L are, for example, F, Cl, CN, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$, furthermore phenyl.

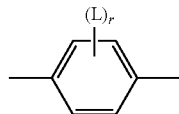

is preferably

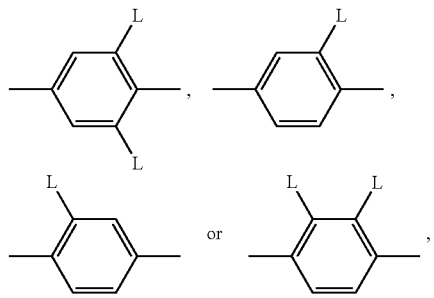

in which L has one of the meanings indicated above.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups P are selected from $CH_2=CW^1$—COO—, $CH_2=CW^1$—CO—,

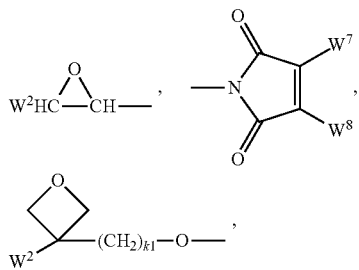

$CH_2=CW^2$—(O)$_{k3}$—, $CW^1$=CH—CO—(O)$_{k3}$—, $CW^1$=CH—CO—NH—, $CH_2=CW^1$—CO—NH—, $CH_3$—CH=CH—O—, $(CH_2=CH)_2$CH—OCO—, $(CH_2=CH-CH_2)_2$CH—OCO—, $(CH_2=CH)_2$CH—O—, $(CH_2=CH-CH_2)_2$N—, $(CH_2=CH-CH_2)_2$N—CO—, HO—$CW^2W^3$—, HS—$CW^2W^3$—, $HW^2$N—, HO—$CW^2W^3$—NH—, $CH_2=CW^1$—CO—NH—, $CH_2=CH$—(COO)$_{k1}$-Phe-(O)$_{k2}$—, $CH_2=CH$—(CO)$_{k1}$-Phe-(O)$_{k2}$—, Phe-CH=CH—, HOOC—, OCN— and $W^4W^5W^6$Si—, in which $W^1$ denotes H, F, Cl, CN, CF$_3$, phenyl or alkyl having 1 to 5 C atoms, in particular H, F, C$_1$ or CH$_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are different from P-Sp-, $k_1$, $k_2$ and $k_3$ each, independently of one another, denote 0 or 1, $k_3$ preferably denotes 1.

Particularly preferred groups P are $CH_2=CW^1-COO-$, in particular $CH_2=CH-COO-$, $CH_2=C(CH_3)-COO-$ and $CH_2=CF-COO-$, furthermore $CH_2=CH-O-$, $(CH_2=CH)_2CH-OCO-$, $(CH_2=CH)_2CH-O-$,

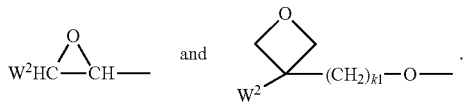

Very particularly preferred groups P are vinyloxy, acrylate, methacrylate, fluoroacrylate, chloroacrylate, oxetane and epoxide, in particular acrylate and methacrylate.

Preferred spacer groups Sp are selected from the formula Sp'-X', so that the radical P-Sp- corresponds to the formula P-Sp'-X'—, where Sp' denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —NR$^0$—, —SiR$^{00}$R$^{000}$—, —CO—, —COO—, —OCO—, —OCO—O—, —S—CO—, —CO—S—, —NR$^{00}$—CO—O—, —O—CO—NR$^{00}$—, —NR$^{00}$—CO—NR$^{00}$—, —CH=CH— or —C≡C— in such a way that O and/or S atoms are not linked directly to one another, X' denotes —O—, —S—, —CO—, —COO—, —OCO—, —O—COO—, —CO—NR$^{00}$—, —NR$^{00}$—CO—, —NR$^{00}$—CO—NR$^{00}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—COO—, —OCO—CH=CH— or a single bond, $R^{00}$ and $R^{000}$ each, independently of one another, denote H or alkyl having 1 to 12 C atoms, and $Y^2$ and $Y^3$ each, independently of one another, denote H, F, Cl or CN.

X' is preferably —O—, —S—, —CO—, —COO—, —OCO—, —O—COO—, —CO—NR$^0$—, —NR$^0$—CO—, —NR$^0$—CO—NR$^0$— or a single bond.

Typical spacer groups Sp' are, for example, —$(CH_2)_{p1}$—, —$(CH_2CH_2O)_{q1}$—$CH_2CH_2$—, —$CH_2CH_2$—S—$CH_2CH_2$—, —$CH_2CH_2$—NH—$CH_2CH_2$— or —$(SiR^{00}R^{000}$—O$)_{p1}$—, in which p1 is an integer from 1 to 12, q1 is an integer from 1 to 3, and $R^{00}$ and $R^{000}$ have the meanings indicated above.

Particularly preferred groups —X'-Sp'— are —$(CH_2)_{p1}$—, —O—$(CH_2)_{p1}$—, —OCO—$(CH_2)_{p1}$—, —OCOO—$(CH_2)_{p1}$—.

Particularly preferred groups Sp' are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

In a further preferred embodiment of the invention, P-Sp- denotes a radical containing two or more polymerisable groups (multifunctional polymerisable radicals). Suitable radicals of this type and polymerisable compounds containing them and the preparation thereof are described, for example, in U.S. Pat. No. 7,060,200 B1 or US 2006/0172090 A1. Particular preference is given to multifunctional polymerisable radicals P-Sp- selected from the following formulae:

| | |
|---|---|
| —X-alkyl-CHP$^1$—CH$_2$—CH$_2$P$^2$ | M*a |
| —X-alkyl-C(CH$_2$P$^1$)(CH$_2$P$^2$)—CH$_2$P$^3$ | M*b |
| —X-alkyl-CHP$^1$CHP$^2$—CH$_2$P$^3$ | M*c |
| —X-alkyl-C(CH$_2$P$^1$)(CH$_2$P$^2$)—C$_{aa}$H$_{2aa+1}$ | M*d |
| —X-alkyl-CHP$^1$—CH$_2$P$^2$ | M*e |
| —X-alkyl-CHP$^1$P$^2$ | M*f |
| —X-alkyl-CP$^1$P$^2$—C$_{aa}$H$_{2aa+1}$ | M*g |
| —X-alkyl-C(C(CH$_2$P$^1$)(CH$_2$P$^2$)—CH$_2$OCH$_2$—C(CH$_2$P$^3$)(CH$_2$P$^4$)CH$_2$P$^5$ | M*h |
| —X-alkyl-CH((CH$_2$)$_{aa}$P$^1$)((CH$_2$)$_{bb}$P$^2$) | M*i |
| —X-alkyl-CHP$^1$CHP$^2$—C$_{aa}$H$_{2aa+1}$ | M*k |
| —X'-alkyl-C(CH$_3$)(CH$_2$P$^1$)(CH$_2$P$^2$) | M*m | in which alkyl denotes a single bond or straight-chain or branched alkylene having 1 to 12 C atoms, in which one or more non-adjacent CH$_2$ groups may each be replaced, independently of one another, by —C(R$^{00}$)=C(R$^{000}$)—, —C≡C—, —N(R$^{00}$)—, —O—, —S—, —CO—, —CO—O—, —O—CO—, —O—CO—O— in such a way that O and/or S atoms are not linked directly to one another and in which, in addition, one or more H atoms may be replaced by F, Cl or CN, where R$^{00}$ and R$^{000}$ have the meanings indicated above, aa and bb each, independently of one another, denote 0, 1, 2, 3, 4, 5 or 6, X has one of the meanings indicated for X', and P$^{1-5}$ each, independently of one another, have one of the meanings indicated for P.

The polymerisable compounds and RMs can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart. Further synthetic methods are given in the documents cited above and below. In the simplest case, the synthesis of such RMs is carried out, for example, by esterification or etherification of 2,6-dihydroxynaphthalene or 4,4'-dihydroxybiphenyl using corresponding acids, acid derivatives or halogenated compounds containing a group P, such as, for example, (meth)acryloyl chloride or (meth)acrylic acid, in the presence of a dehydrating reagent, such as, for example, DCC (dicyclohexylcarbodiimide).

The LC mixtures and LC media according to the invention are in principle suitable for any type of PS or PSA display, in particular those based on LC media having negative dielectric anisotropy, particularly preferably for PSA-VA, PSA-IPS or PS-FFS displays. However, the person skilled in the art will also be able, without inventive step, to employ suitable LC mixtures and LC media according to the invention in other displays of the PS or PSA type which differ from the above-mentioned displays, for example, through their basic structure or through the nature, arrangement or structure of the individual components used, such as, for example, the substrates, alignment layers, electrodes, addressing elements, backlighting, polarisers, coloured filters, compensation films optionally present, etc.

Very particularly suitable polymerisable compounds are listed in Table D.

If the liquid-crystalline media according to the invention comprise at least one polymerisable compound, it is present in the medium in amounts of 0.1 to 10% by weight, preferably 0.2 to 4.0% by weight, particularly preferably 0.2 to 2.0% by weight.

The mixtures according to the invention may furthermore comprise conventional additives, such as, for example, stabilisers, antioxidants, UV absorbers, nanoparticles, microparticles, etc. Suitable and preferred additives for the LC mixtures according to the invention are given in Table C.

The structure of the liquid-crystal displays according to the invention corresponds to the usual geometry, as described, for example, in EP-A 0 240 379.

The following examples are intended to explain the invention without limiting it. Above and below, percent data denote percent by weight; all temperatures are indicated in degrees Celsius.

Throughout the patent application, 1,4-cyclohexylene rings and 1,4-phenylene rings are depicted as follows:

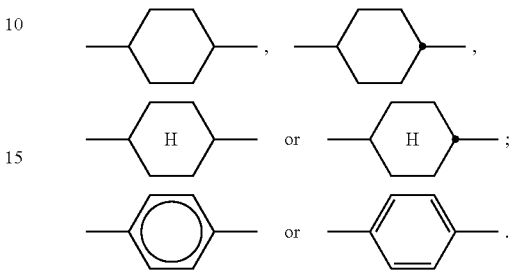

Besides the compounds of the formulae IIA and/or IIB and/or IIC, one or more compounds of the formula I, the mixtures according to the invention preferably comprise one or more of the compounds from Table A indicated below.

TABLE A

The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)

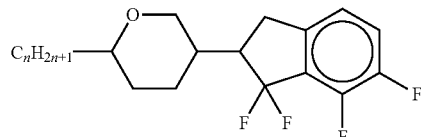

Alk-n-F

BCH-nm

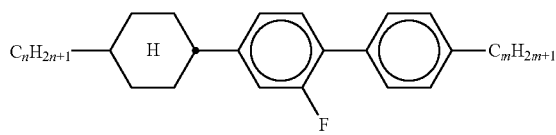

BCH-nmF

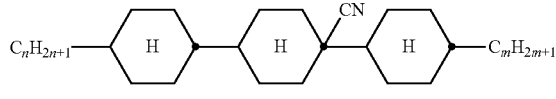

BCN-nm

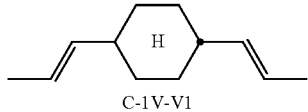

C-1V-V1

TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
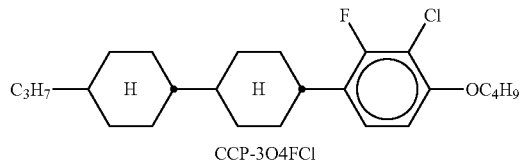
CCP-3O4FCl
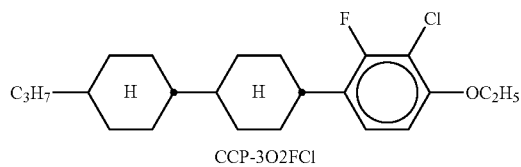
CCP-3O2FCl
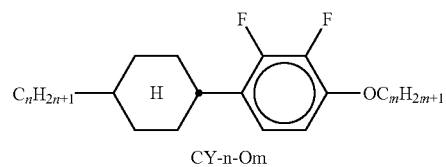
CY-n-Om
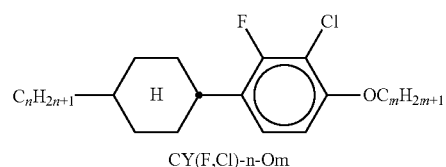
CY(F,Cl)-n-Om
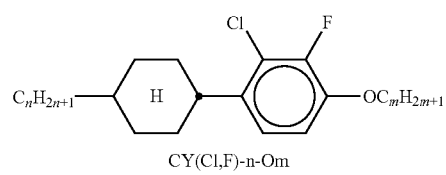
CY(Cl,F)-n-Om
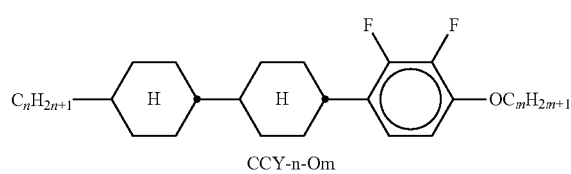
CCY-n-Om
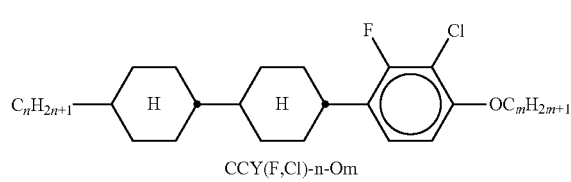
CCY(F,Cl)-n-Om
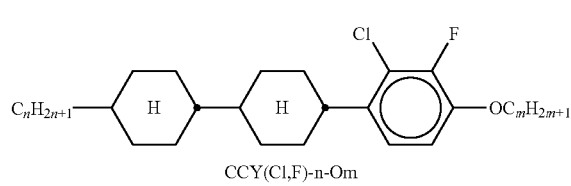
CCY(Cl,F)-n-Om TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
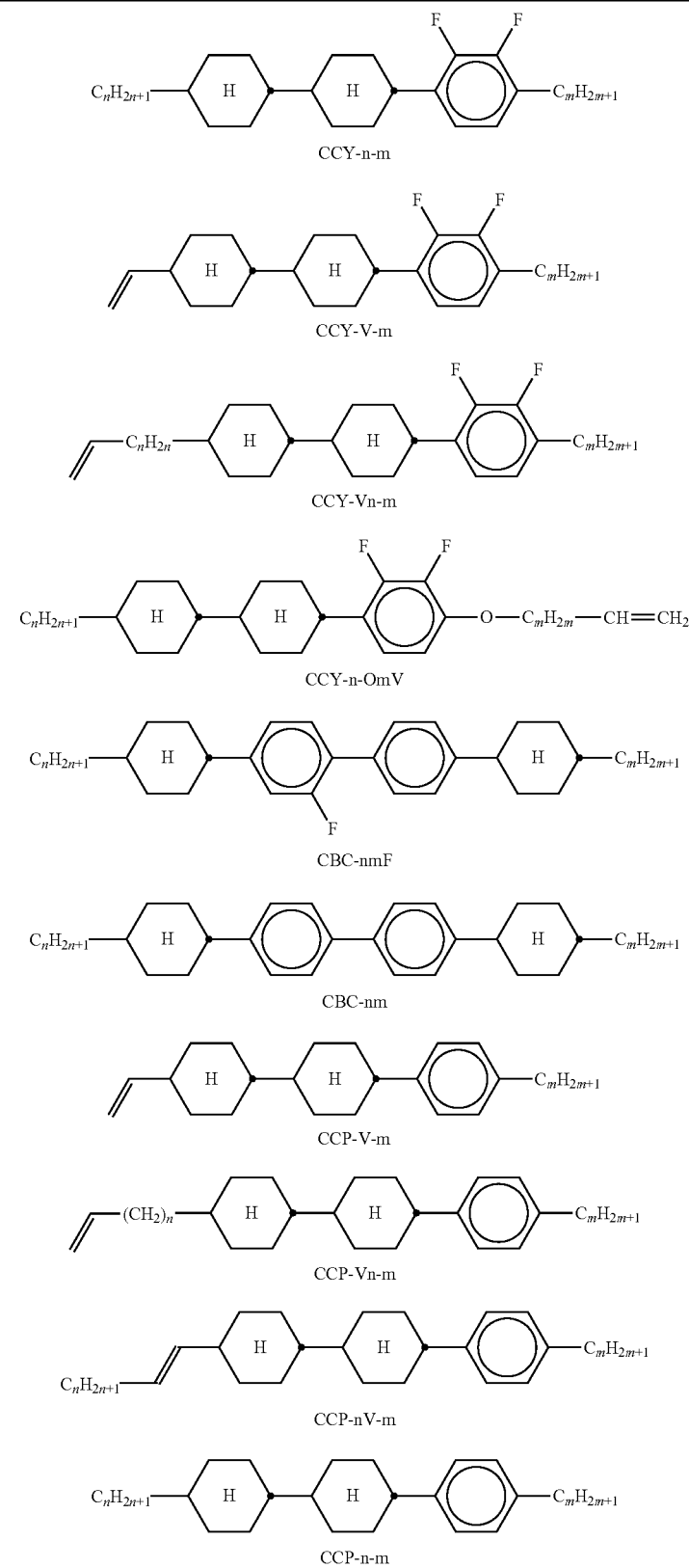

TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
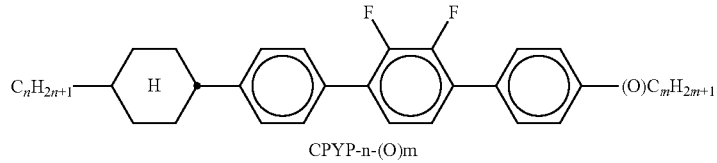
CPYP-n-(O)m
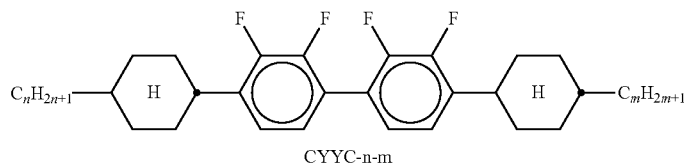
CYYC-n-m
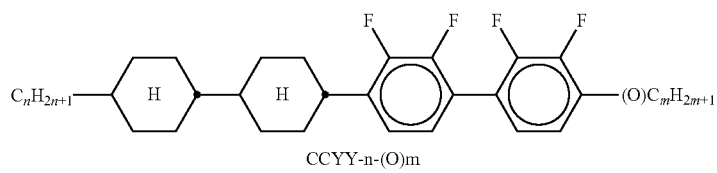
CCYY-n-(O)m
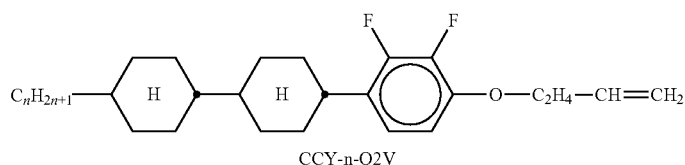
CCY-n-O2V
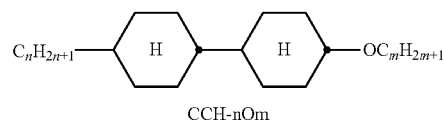
CCH-nOm
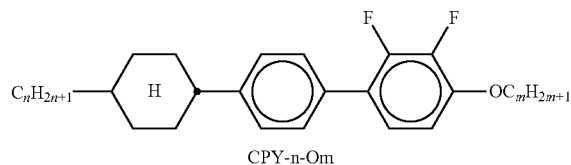
CPY-n-Om
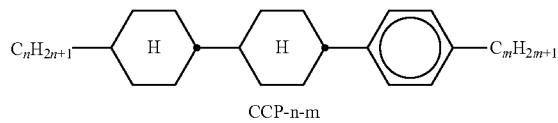
CCP-n-m
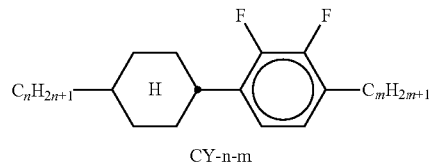
CY-n-m
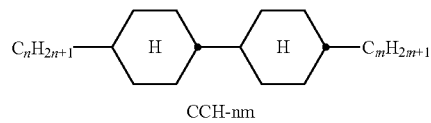
CCH-nm TABLE A-continued
The following abbreviations are used:
(n, m, m', z: each, independently of one another, 1, 2, 3, 4, 5 or 6;
(O)C$_m$H$_{2m+1}$ means OC$_m$H$_{2m+1}$ or C$_m$H$_{2m+1}$)
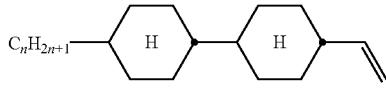
CC-n-V
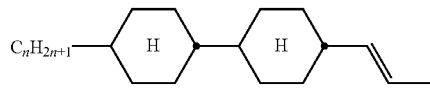
CC-n-V1
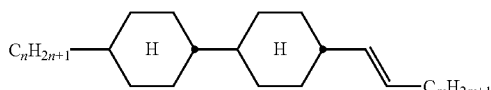
CC-n-Vm
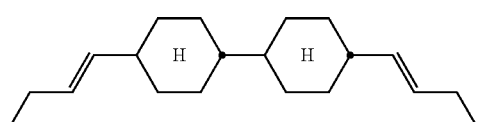
CC-2V-V2
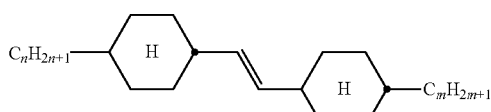
CVC-n-m
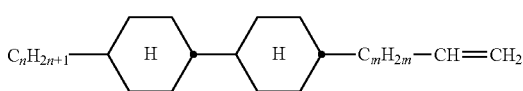
CC-n-mV
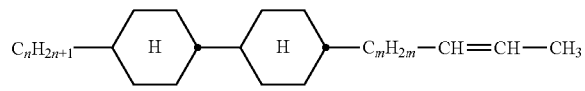
CC-n-mV1
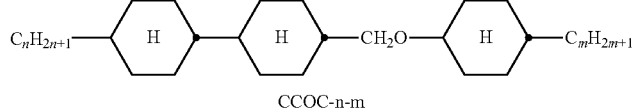
CCOC-n-m
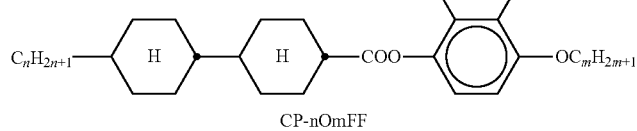
CP-nOmFF
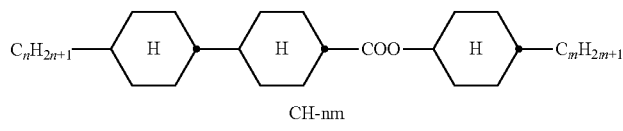
CH-nm TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
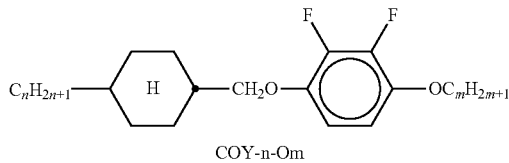
COY-n-Om
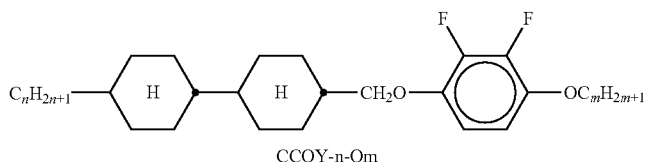
CCOY-n-Om
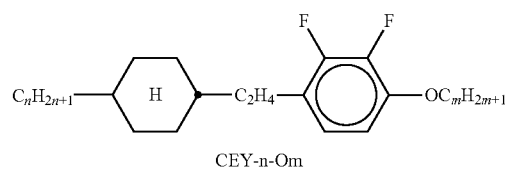
CEY-n-Om
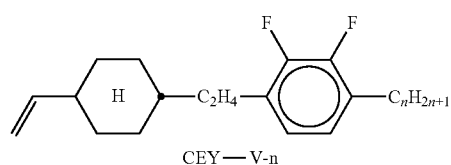
CEY—V-n
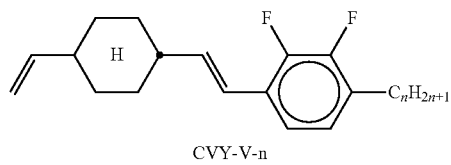
CVY-V-n
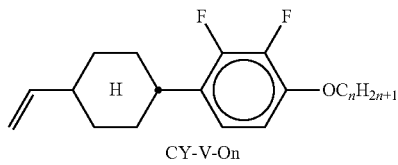
CY-V-On
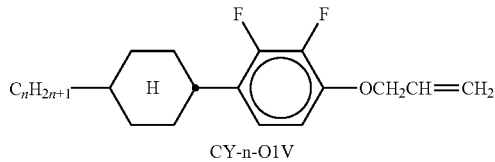
CY-n-O1V
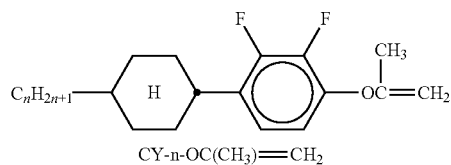
CY-n-OC(CH$_3$)=CH$_2$
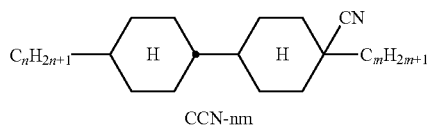
CCN-nm TABLE A-continued
The following abbreviations are used:
(n, m, m', z: each, independently of one another, 1, 2, 3, 4, 5 or 6;
(O)$C_mH_{2m+1}$ means $OC_mH_{2m+1}$ or $C_mH_{2m+1}$)
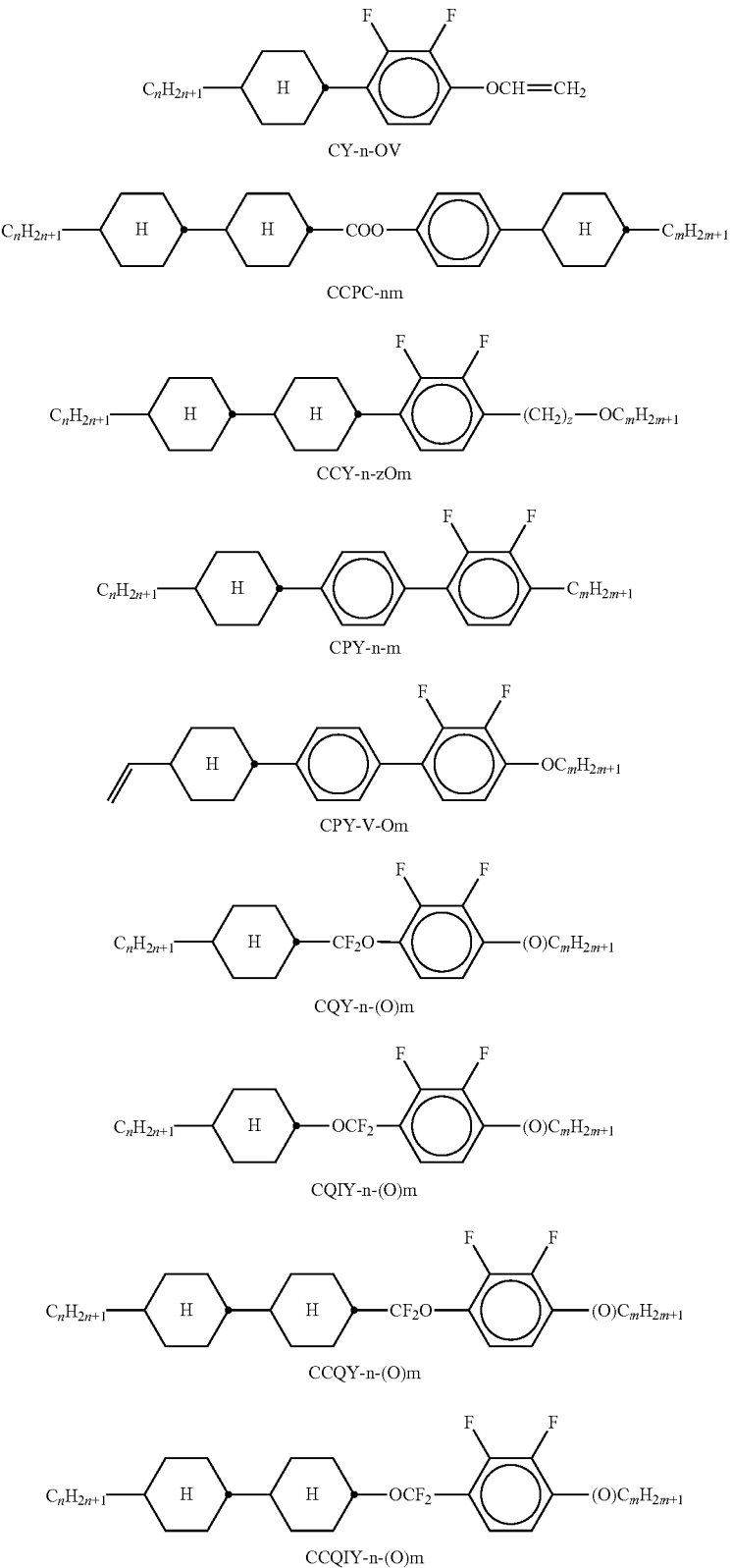

TABLE A-continued
The following abbreviations are used:
(n, m, m', z: each, independently of one another, 1, 2, 3, 4, 5 or 6;
(O)$C_mH_{2m+1}$ means $OC_mH_{2m+1}$ or $C_mH_{2m+1}$)
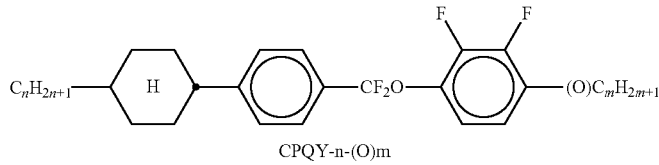
CPQY-n-(O)m
CPQIY-n-(O)m
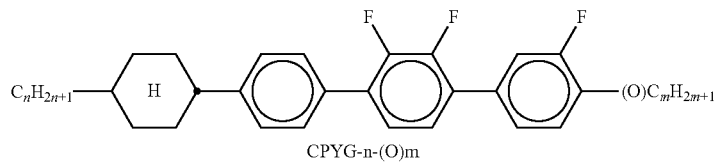
CPYG-n-(O)m
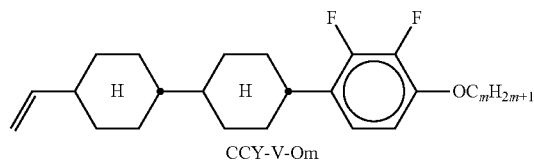
CCY-V-Om
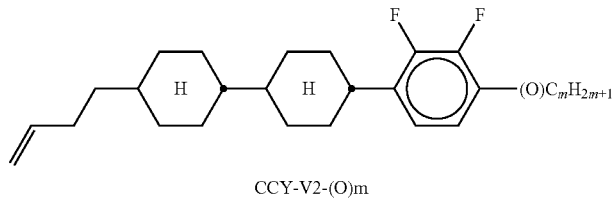
CCY-V2-(O)m
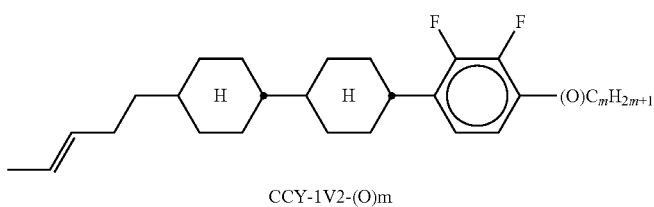
CCY-1V2-(O)m
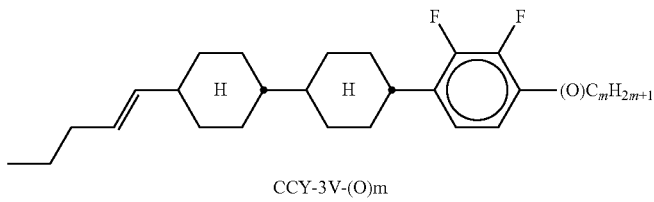
CCY-3V-(O)m
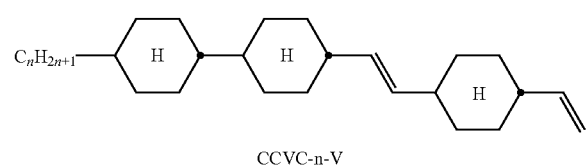
CCVC-n-V TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
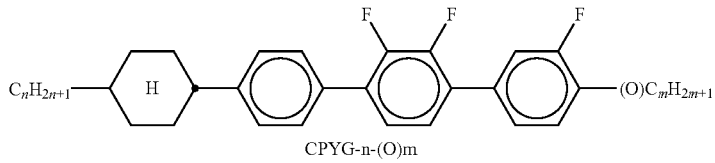
CPYG-n-(O)m
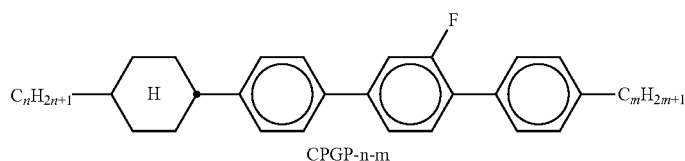
CPGP-n-m
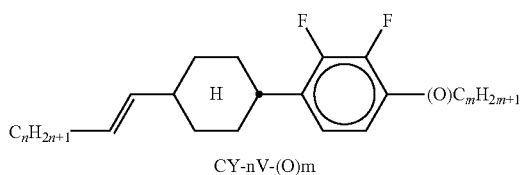
CY-nV-(O)m
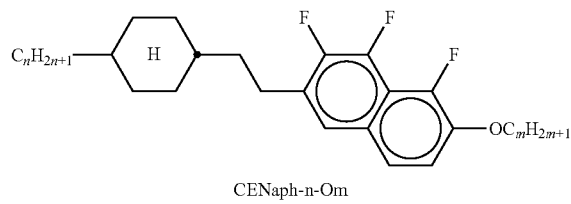
CENaph-n-Om
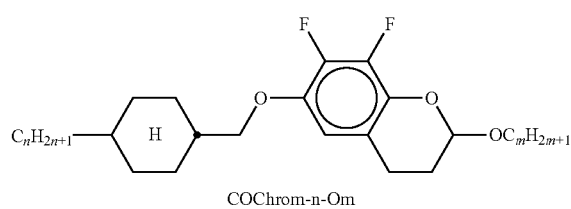
COChrom-n-Om
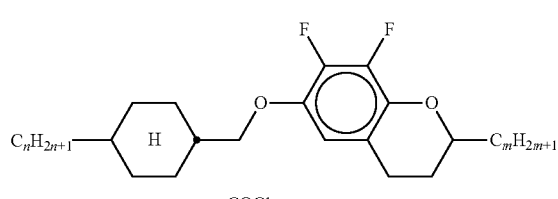
COChrom-n-m
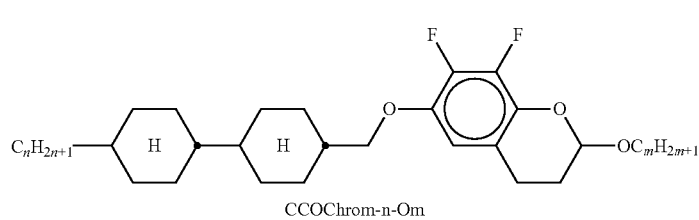
CCOChrom-n-Om
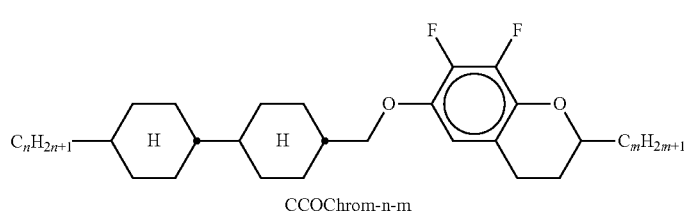
CCOChrom-n-m TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
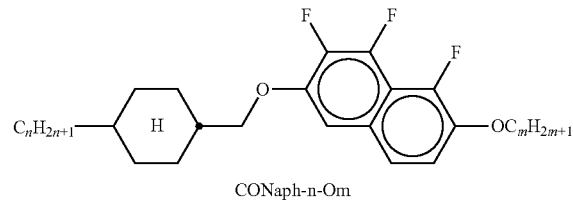
CONaph-n-Om
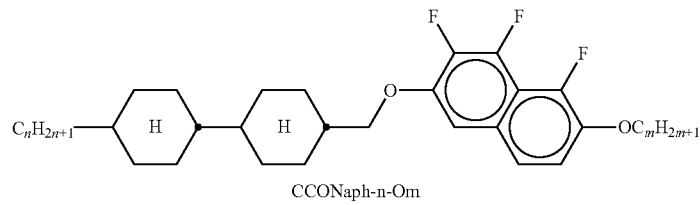
CCONaph-n-Om
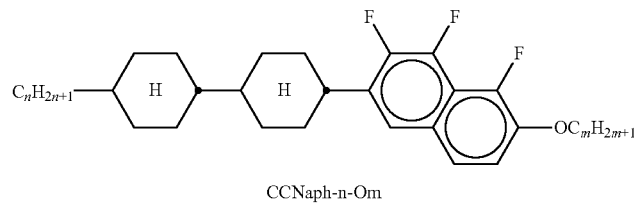
CCNaph-n-Om
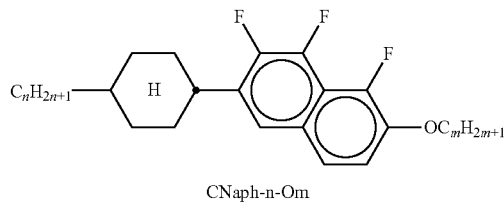
CNaph-n-Om
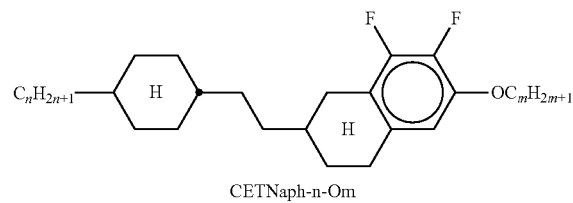
CETNaph-n-Om
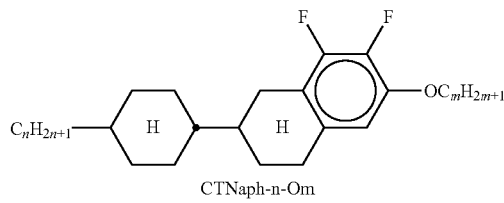
CTNaph-n-Om
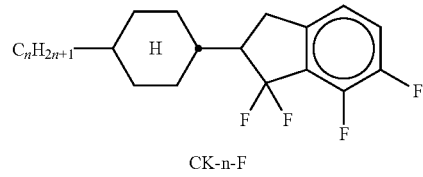
CK-n-F TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
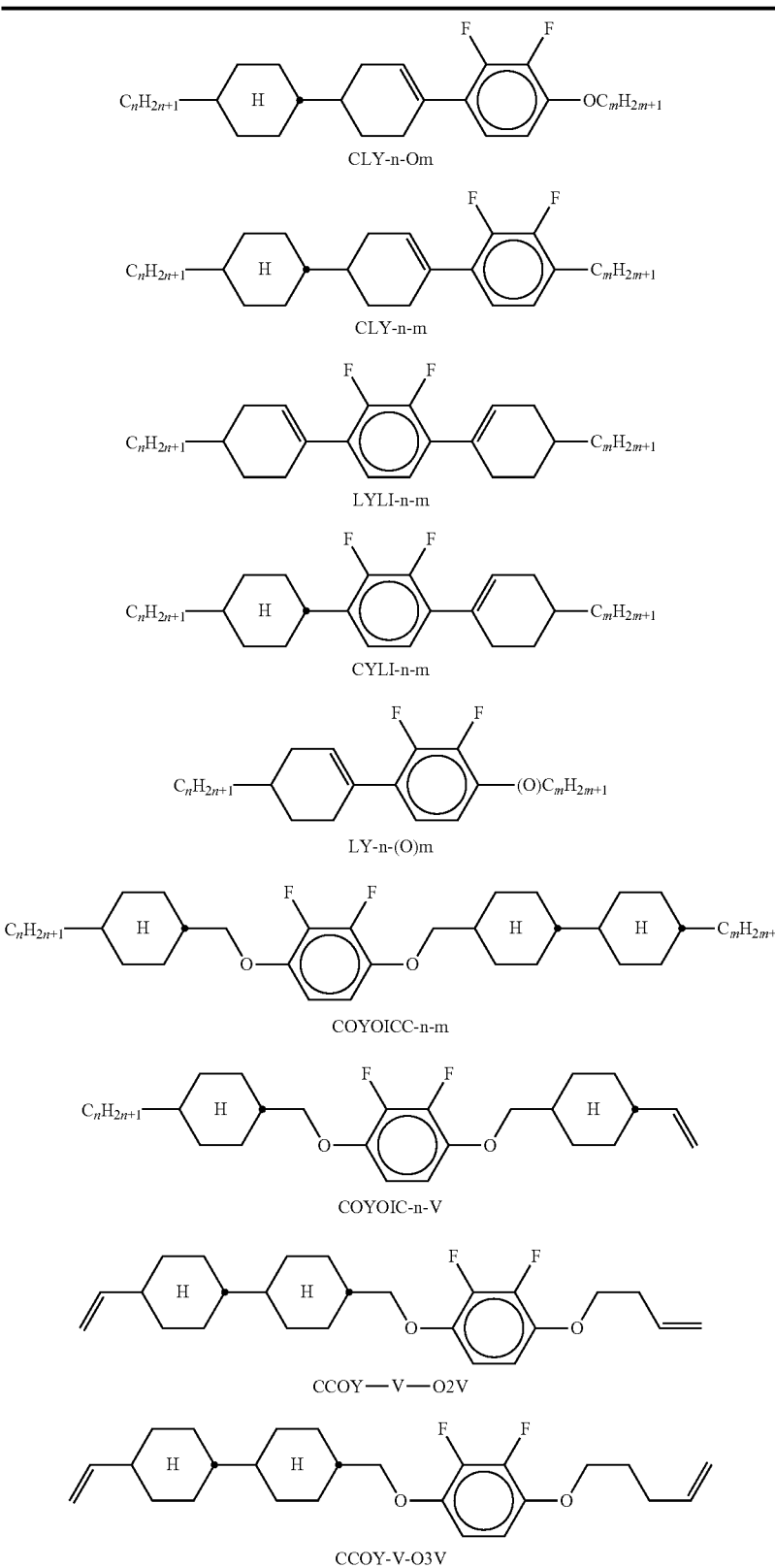

TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
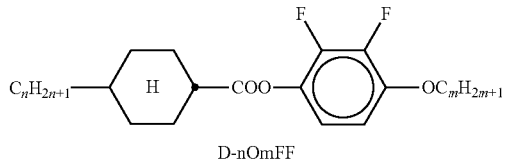
D-nOmFF
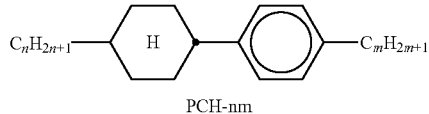
PCH-nm
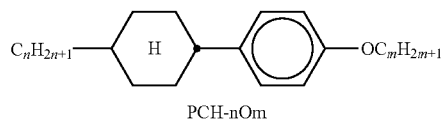
PCH-nOm
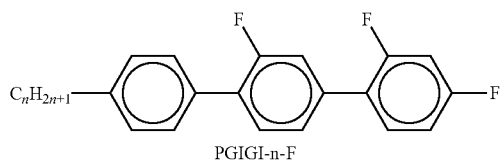
PGIGI-n-F
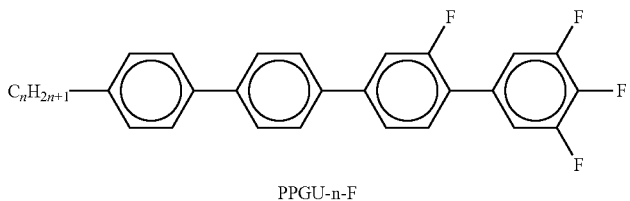
PPGU-n-F
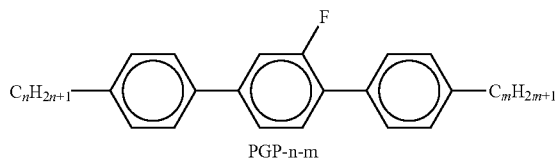
PGP-n-m
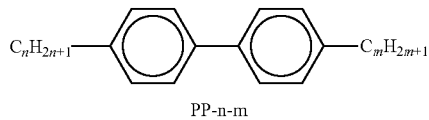
PP-n-m
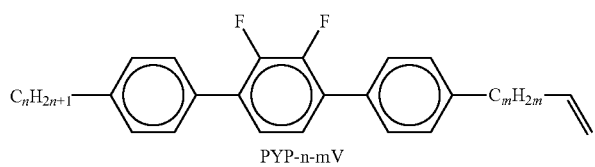
PYP-n-mV
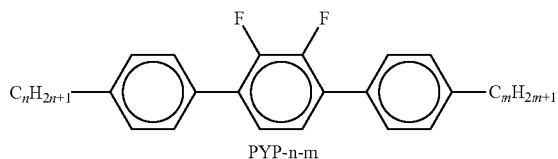
PYP-n-m TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
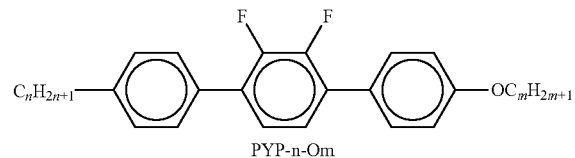
PYP-n-Om
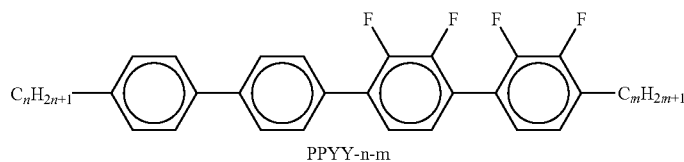
PPYY-n-m
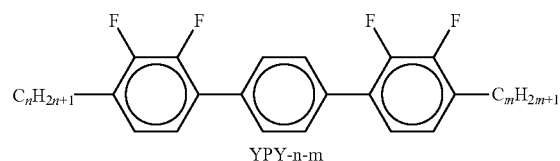
YPY-n-m
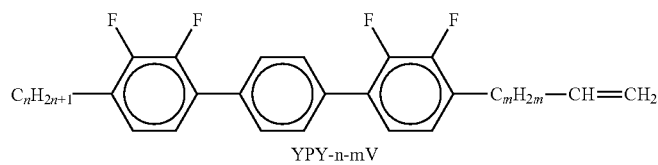
YPY-n-mV
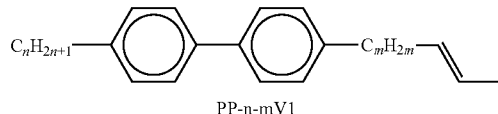
PP-n-mV1
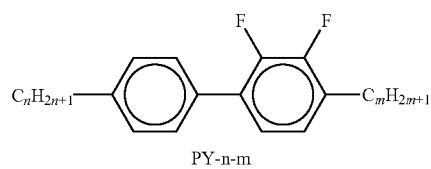
PY-n-m
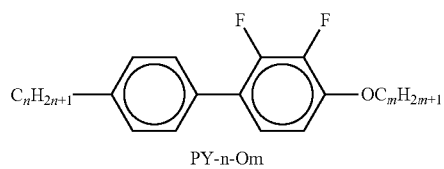
PY-n-Om
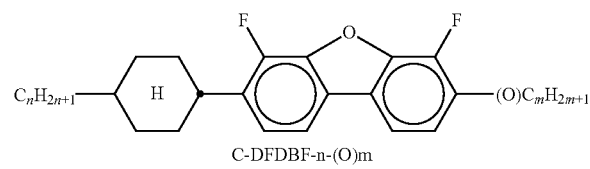
C-DFDBF-n-(O)m
DFDBC-n(O)-(O)m

TABLE A-continued

The following abbreviations are used:
(n, m, m', z: each, independently of one another, 1, 2, 3, 4, 5 or 6;
(O)C$_m$H$_{2m+1}$ means OC$_m$H$_{2m+1}$ or C$_m$H$_{2m+1}$)

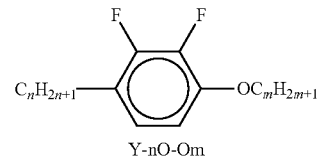

Y-nO-Om

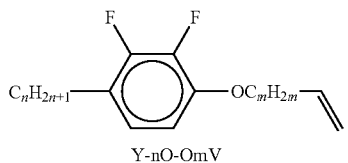

Y-nO-OmV

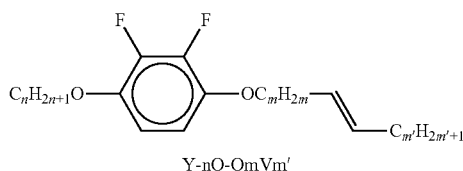

Y-nO-OmVm'

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

By means of suitable additives, the liquid-crystal phases according to the invention can be modified in such a way that they can be employed in any type of, for example, ECB, VAN, IPS, GH or ASM-VA LCD display that has been disclosed to date.

The dielectrics may also comprise further additives known to the person skilled in the art and described in the literature, such as, for example, UV absorbers, antioxidants, nanoparticles and free-radical scavengers. For example, 0-15% of pleochroic dyes, stabilisers or chiral dopants may be added. Suitable stabilisers for the mixtures according to the invention are, in particular, those listed in Table B.

For example, 0-15% of pleochroic dyes may be added, furthermore conductive salts, preferably ethyldimethyldodecylammonium 4-hexoxybenzoate, tetrabutylammonium tetraphenylboranate or complex salts of crown ethers (cf., for example, Haller et al., Mol. Cryst. Liq. Cryst., Volume 24, pages 249-258 (1973)), may be added in order to improve the conductivity or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

Table B shows possible dopants which can be added to the mixtures according to the invention. If the mixtures comprise a dopant, it is employed in amounts of 0.01-4% by weight, preferably 0.1-1.0% by weight.

TABLE B

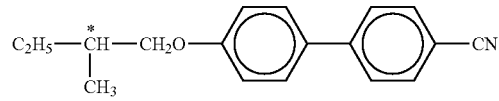

C 15

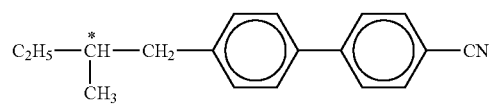

CB 15

TABLE B-continued
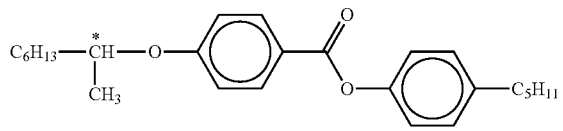
CM 21
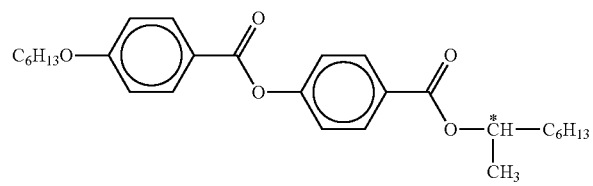
R/S-811
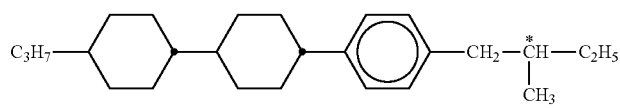
CM 44
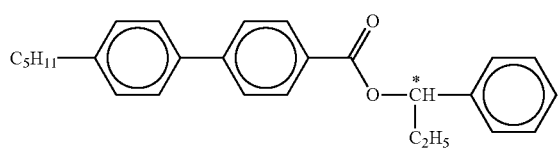
CM 45
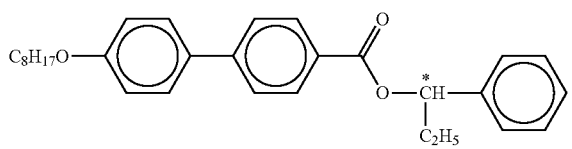
CM 47
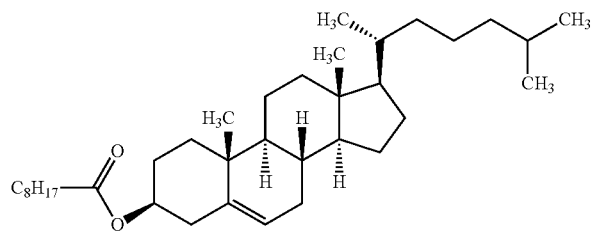
CN
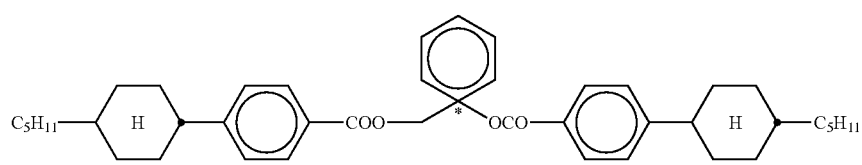
R/S-1011

TABLE B-continued

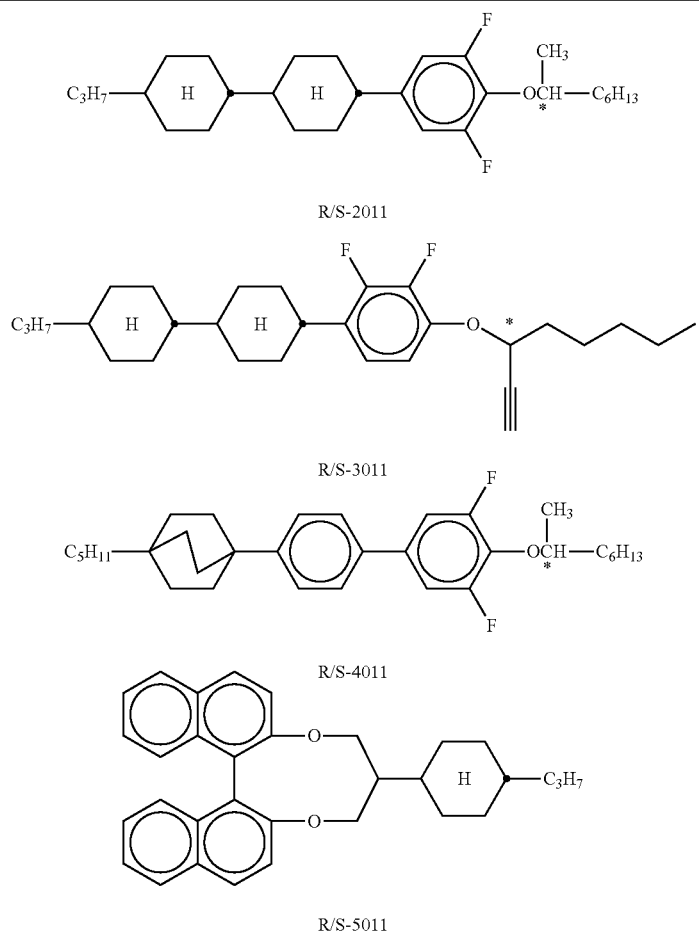

Stabilisers which can be added, for example, to the mixtures according to the invention in amounts of up to 10% by weight, based on the total amount of the mixture, preferably 0.01 to 6% by weight, in particular 0.1 to 3% by weight, are shown below in Table C. Preferred stabilisers are, in particular, BHT derivatives, for example 2,6-di-tert-butyl-4-alkylphenols, and Tinuvin 770.

TABLE C (n = 1-12)

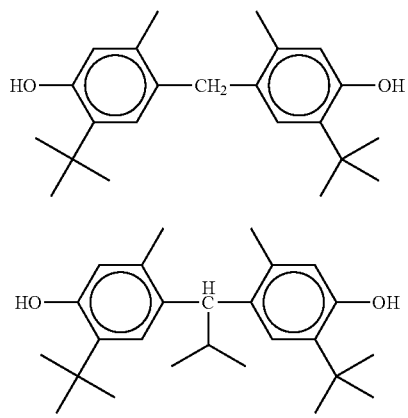

TABLE C-continued
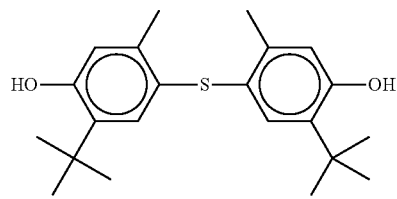
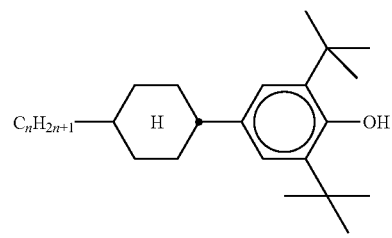
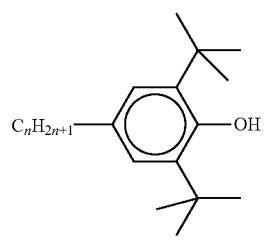
n = 1, 2, 3, 4, 5, 6 or 7
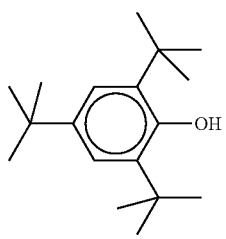
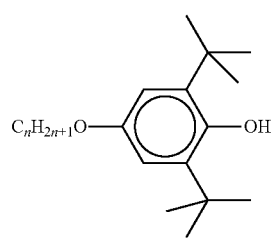
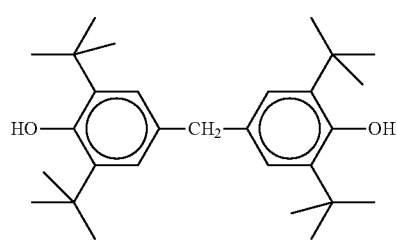

TABLE C-continued
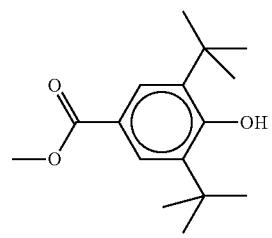
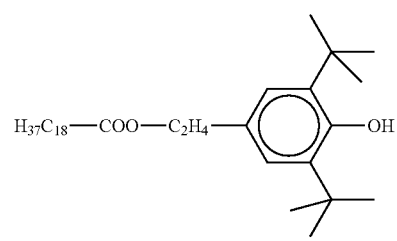
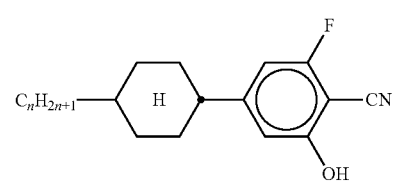
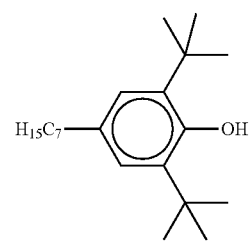
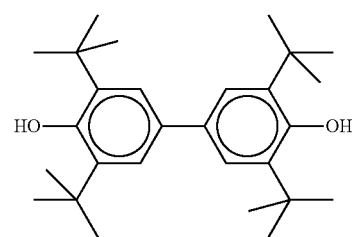

TABLE C-continued
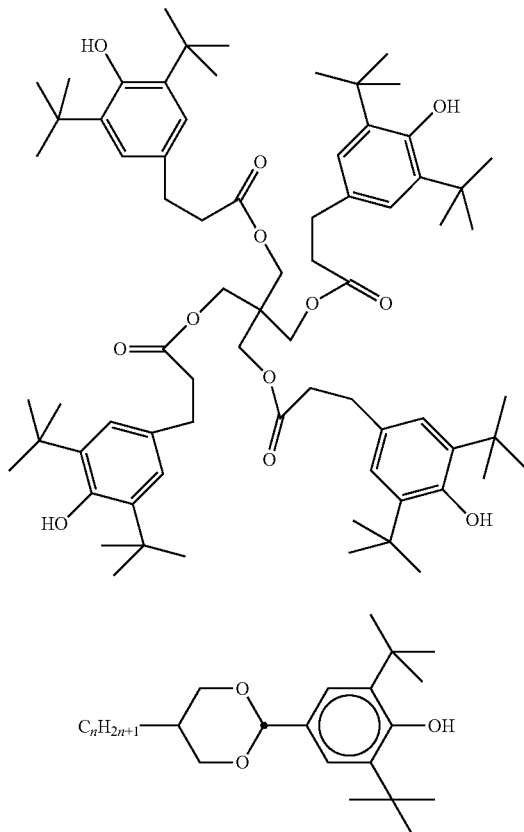
n = 1, 2, 3, 4, 5, 6 or 7
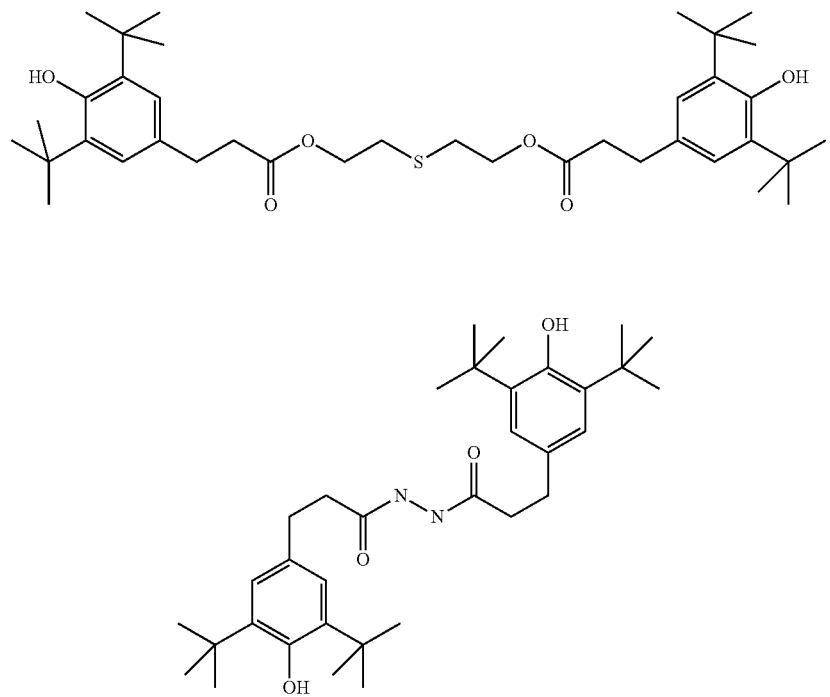

TABLE C-continued
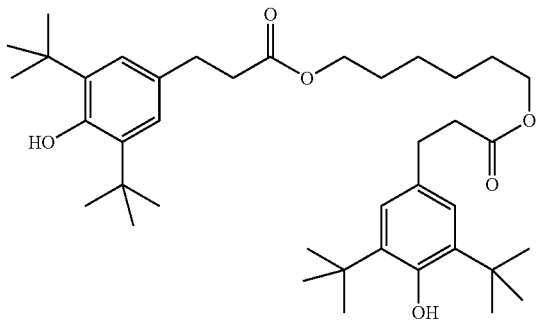 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
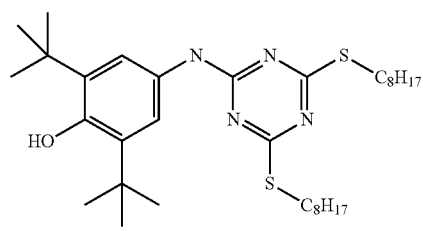
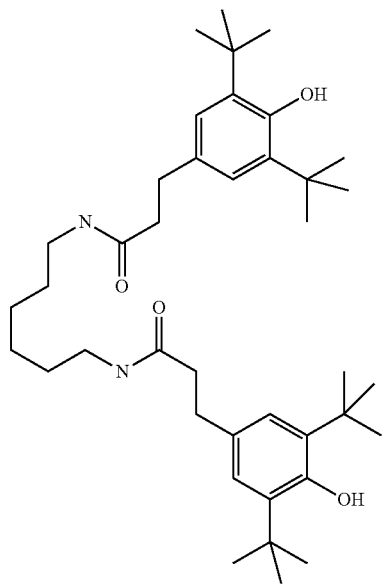 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
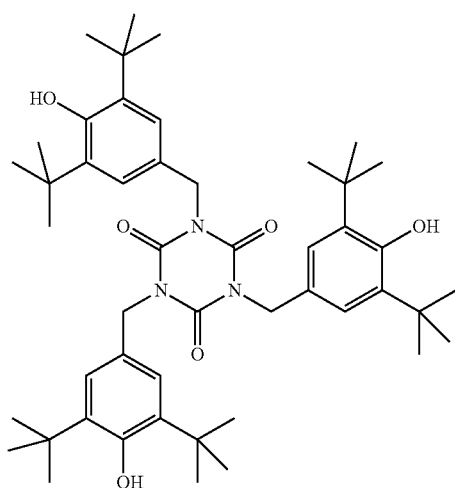 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE C-continued
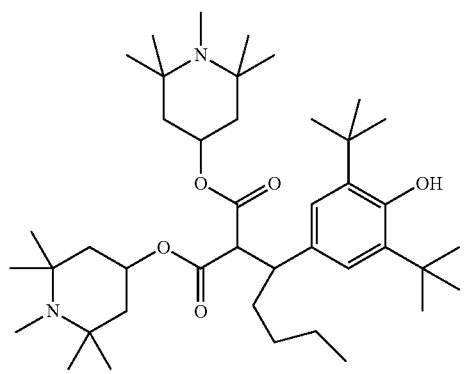 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
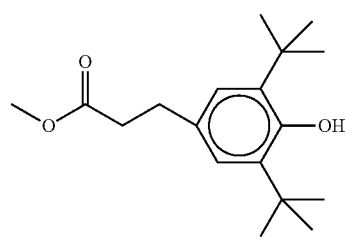
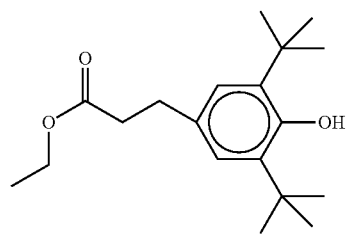
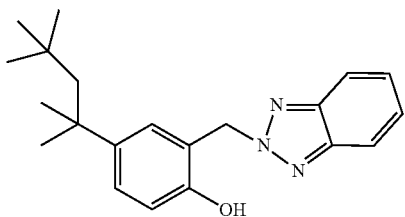 [SMILES: CC(C)(C)CC(C)(C)c1ccc(O)c(Cn2nc3ccccc3n2)c1]
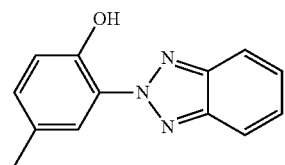 [SMILES: Cc1ccc(O)c(-n2nc3ccccc3n2)c1]
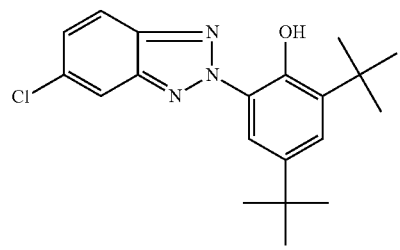 [SMILES: CC(C)(C)c1cc(-n2nc3ccc(Cl)cc3n2)c(O)c(C(C)(C)C)c1]

TABLE C-continued
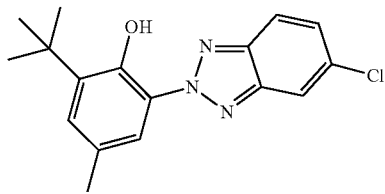 [SMILES: Cc1cc(-n2nc3ccc(Cl)cc3n2)c(O)c(C(C)(C)C)c1]
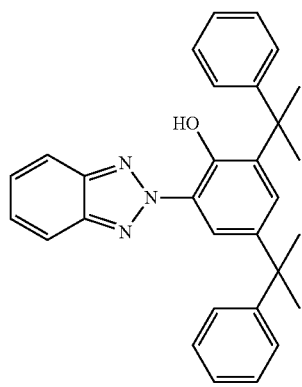 [SMILES: CC(C)(c1ccccc1)c1cc(-n2nc3ccccc3n2)c(O)c(C(C)(C)c2ccccc2)c1]
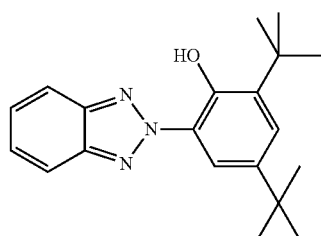
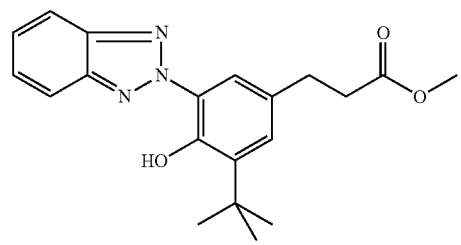 [SMILES: COC(=O)CCc1cc(-n2nc3ccccc3n2)c(O)c(C(C)(C)C)c1]
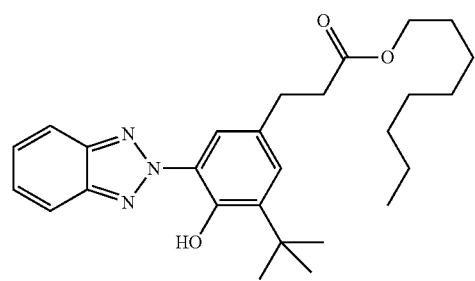 [SMILES: CCCCCCCCOC(=O)CCc1cc(-n2nc3ccccc3n2)c(O)c(C(C)(C)C)c1]

TABLE C-continued
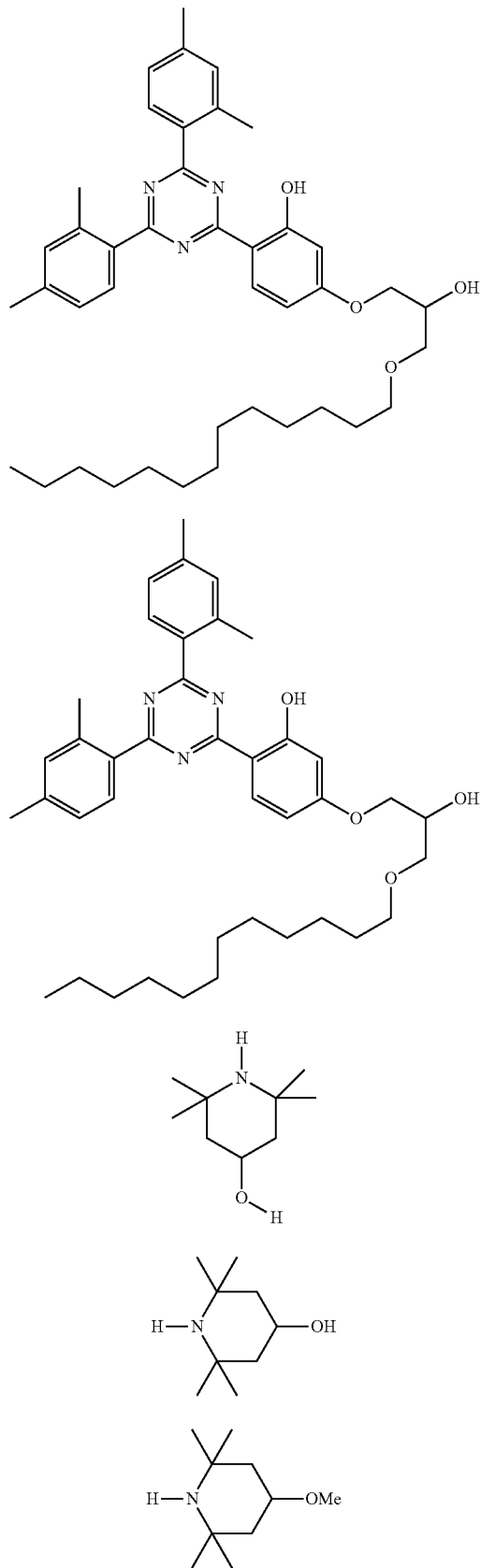

TABLE C-continued
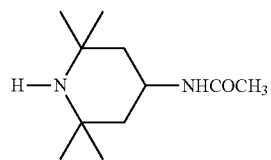
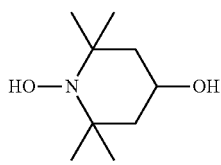
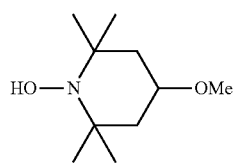
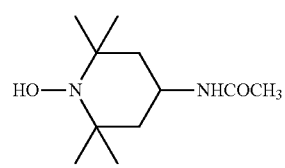
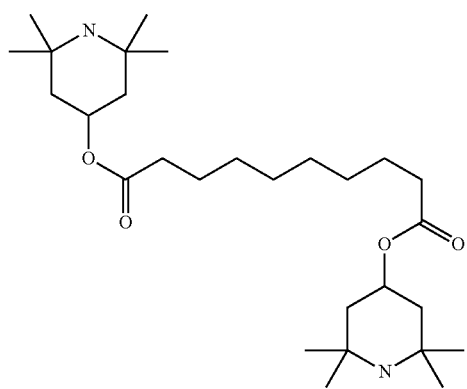
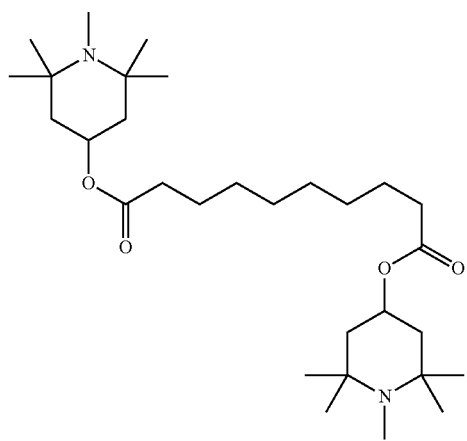

TABLE C-continued

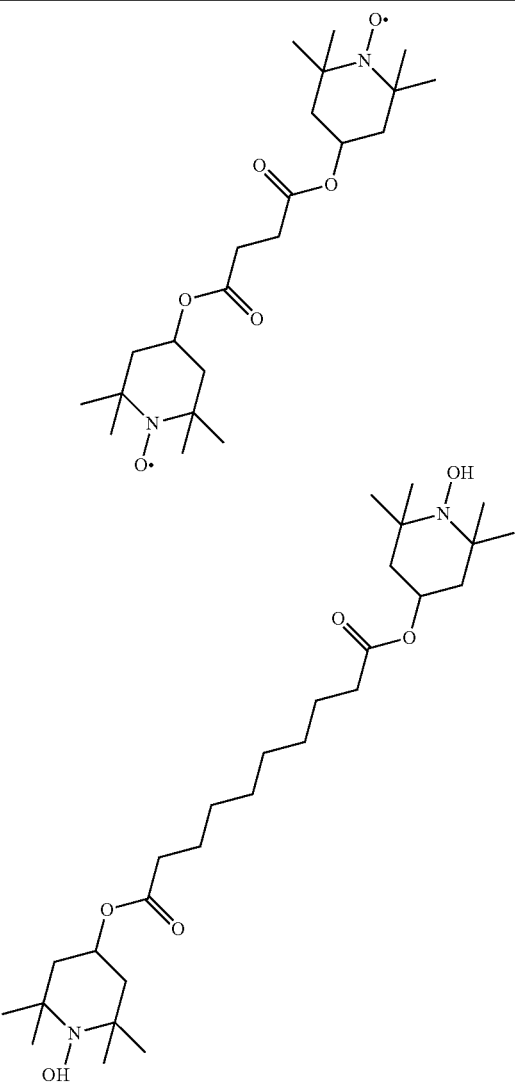

Suitable polymerisable compounds (reactive mesogens) for use in the mixtures according to the invention, preferably in PSA, PS-VA, PS-IPS and PS-FFS applications, are shown in Table D below:

Table D shows illustrative compounds which can preferably be used as polymerisable compounds (reactive mesogenic compounds) in the LC media, preferably for PS-VA, PSA, PS-IPS or PS-FFS applications in accordance with the present invention.

TABLE D

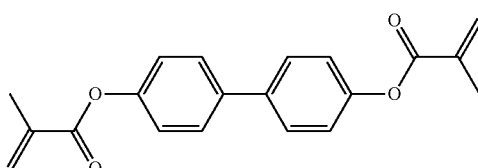

RM-1

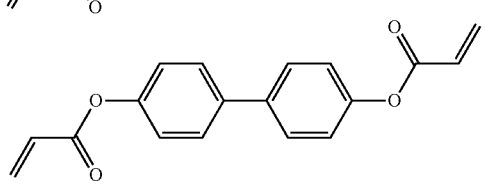

RM-2

TABLE D-continued
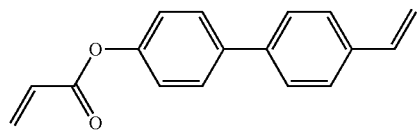 [SMILES: C=CC(=O)Oc1ccc(-c2ccc(C=C)cc2)cc1] RM-3
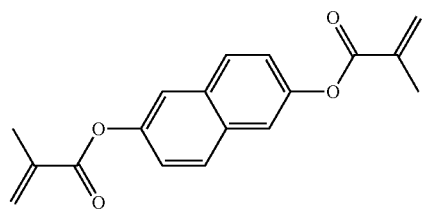 [SMILES: C=C(C)C(=O)Oc1ccc2cc(OC(=O)C(=C)C)ccc2c1] RM-4
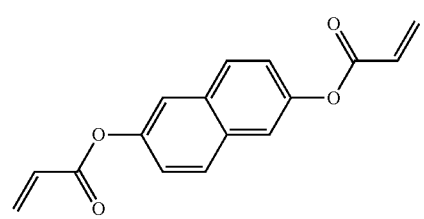 [SMILES: C=CC(=O)Oc1ccc2cc(OC(=O)C=C)ccc2c1] RM-5
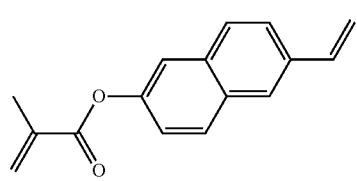 [SMILES: C=Cc1ccc2cc(OC(=O)C(=C)C)ccc2c1] RM-6
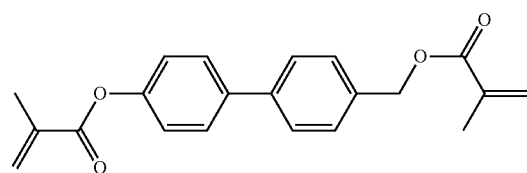 [SMILES: C=C(C)C(=O)OCc1ccc(-c2ccc(OC(=O)C(=C)C)cc2)cc1] RM-7
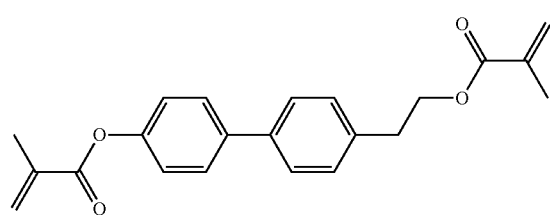 [SMILES: C=C(C)C(=O)OCCc1ccc(-c2ccc(OC(=O)C(=C)C)cc2)cc1] RM-8
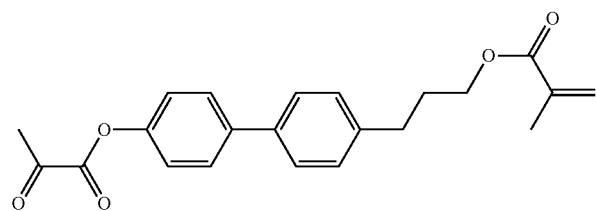 [SMILES: C=C(C)C(=O)OCCCc1ccc(-c2ccc(OC(=O)C(C)=O)cc2)cc1] RM-9
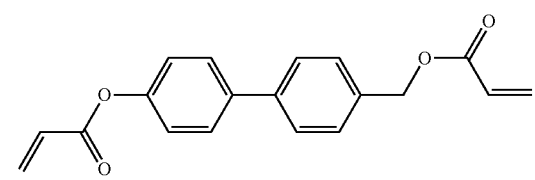 [SMILES: C=CC(=O)OCc1ccc(-c2ccc(OC(=O)C=C)cc2)cc1] RM-10

TABLE D-continued
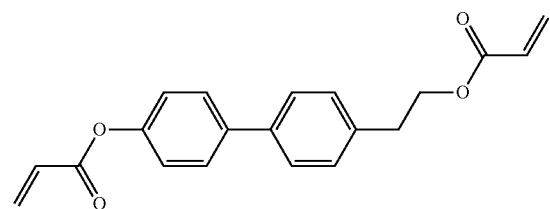 [SMILES: C=CC(=O)OCCc1ccc(-c2ccc(OC(=O)C=C)cc2)cc1]
RM-11
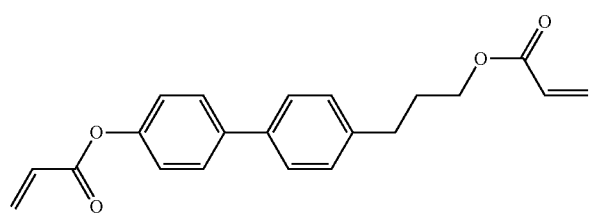 [SMILES: C=CC(=O)OCCCc1ccc(-c2ccc(OC(=O)C=C)cc2)cc1]
RM-12
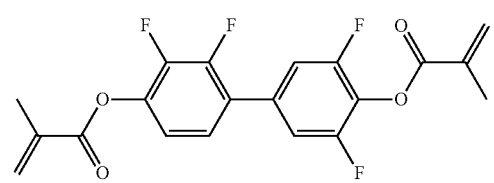 [SMILES: C=C(C)C(=O)Oc1ccc(-c2cc(F)c(OC(=O)C(=C)C)c(F)c2)c(F)c1F]
RM-13
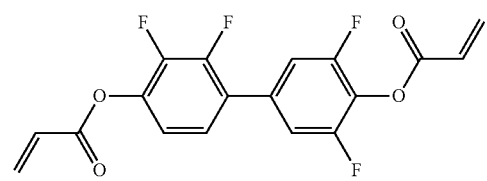 [SMILES: C=CC(=O)Oc1ccc(-c2cc(F)c(OC(=O)C=C)c(F)c2)c(F)c1F]
RM-14
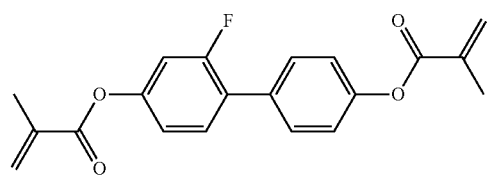
RM-15
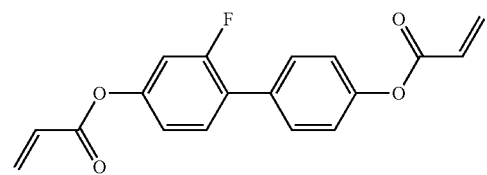
RM-16
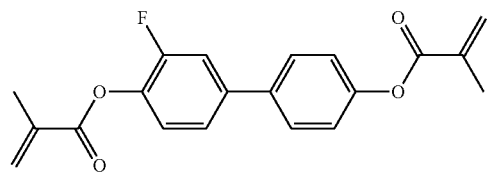
RM-17
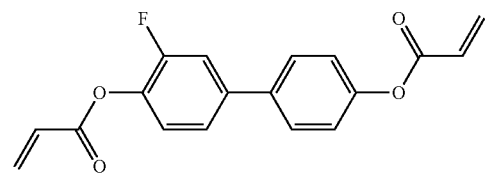 [SMILES: C=CC(=O)Oc1ccc(-c2ccc(OC(=O)C=C)c(F)c2)cc1]
RM-18

TABLE D-continued
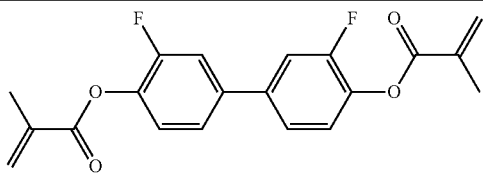 RM-19
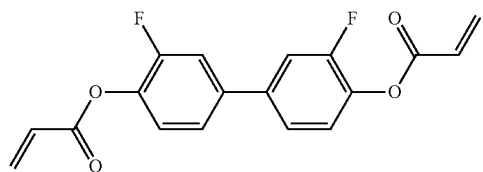 [SMILES: C=CC(=O)Oc1ccc(-c2ccc(OC(=O)C=C)c(F)c2)cc1F] RM-20
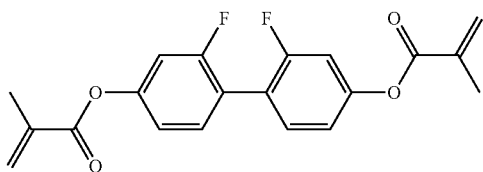 [SMILES: C=C(C)C(=O)Oc1ccc(-c2ccc(OC(=O)C(=C)C)cc2F)c(F)c1] RM-21
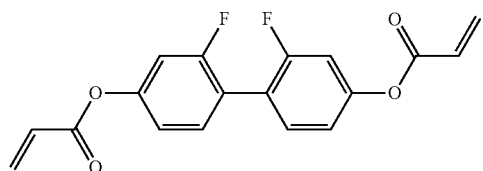 RM-22
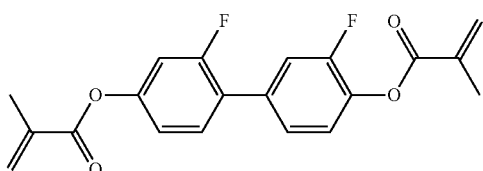 RM-23
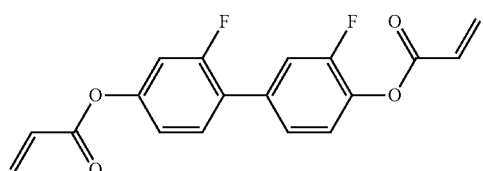 RM-24
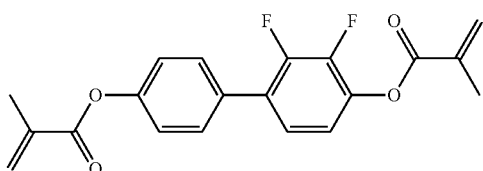 RM-25
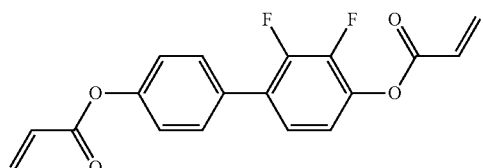 RM-26
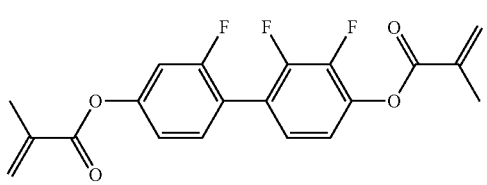 [SMILES: C=C(C)C(=O)Oc1ccc(-c2ccc(OC(=O)C(=C)C)c(F)c2F)c(F)c1] RM-27

TABLE D-continued
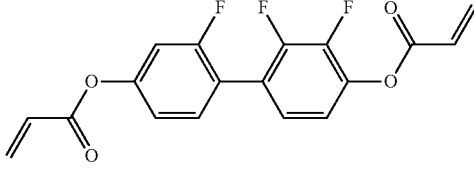 RM-28
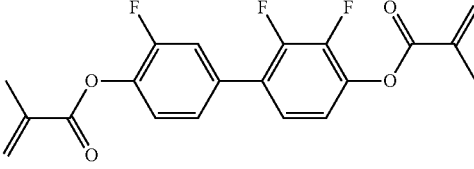 RM-29
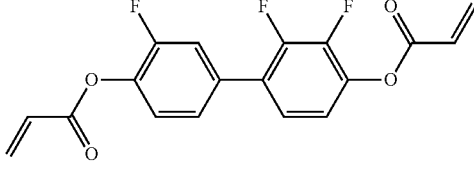 [SMILES: C=CC(=O)Oc1ccc(-c2ccc(OC(=O)C=C)c(F)c2F)cc1F] RM-30
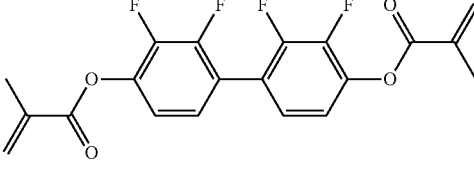 RM-31
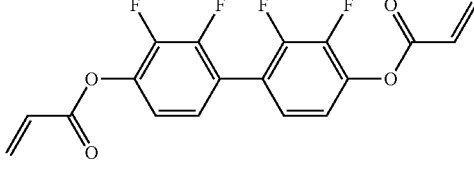 RM-32
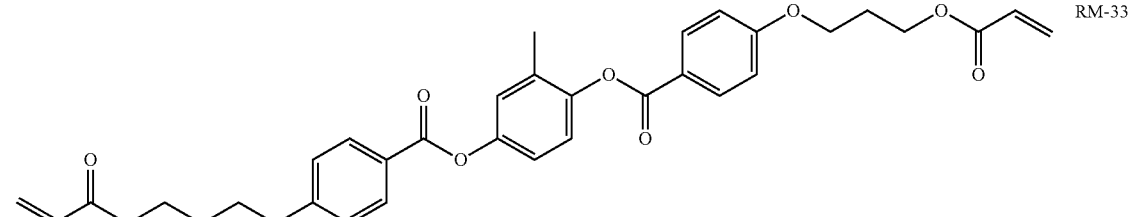 RM-33
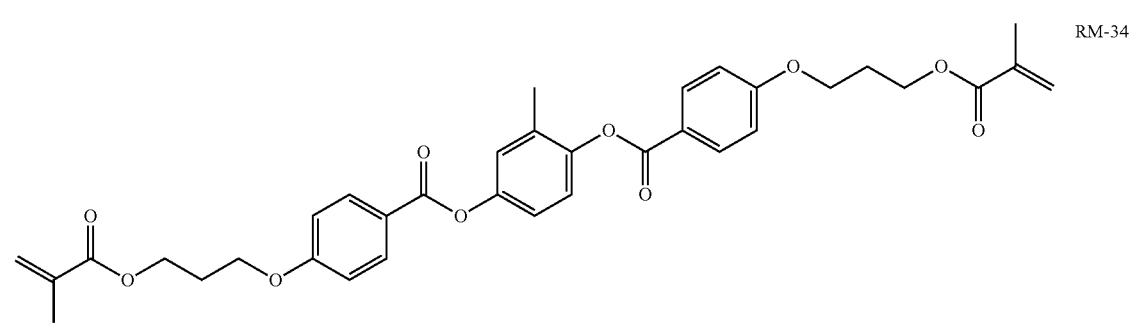 RM-34
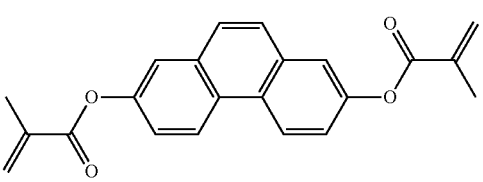 [SMILES: C=C(C)C(=O)Oc1ccc2c(ccc3cc(OC(=O)C(=C)C)ccc32)c1] RM-35

TABLE D-continued
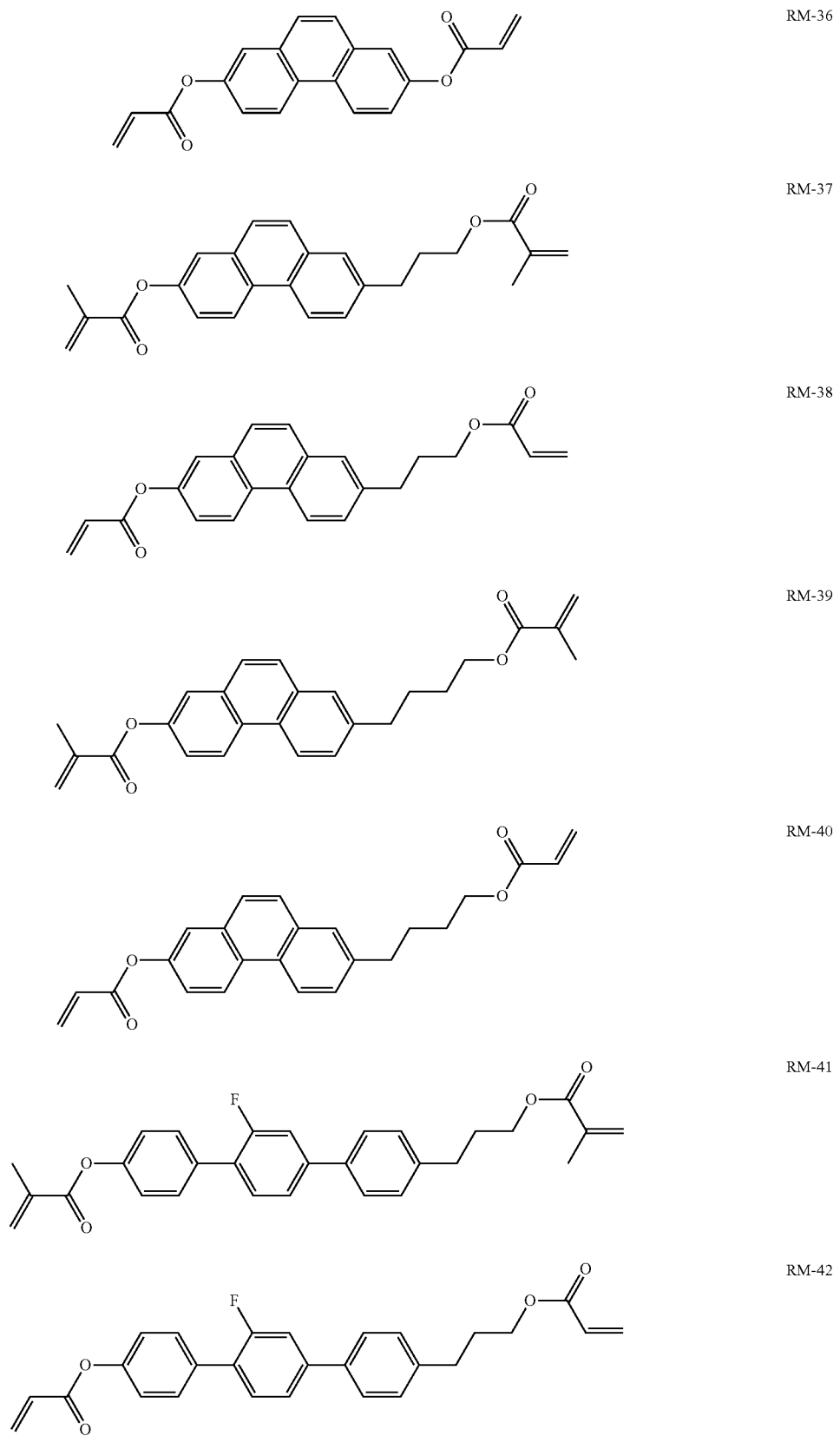
RM-36
RM-37
RM-38
RM-39
RM-40
RM-41
RM-42

TABLE D-continued
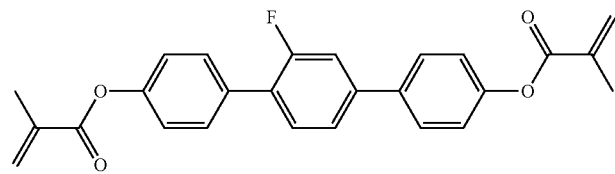 [SMILES: C=C(C)C(=O)Oc1ccc(-c2ccc(-c3ccc(OC(=O)C(=C)C)cc3)c(F)c2)cc1] RM-43
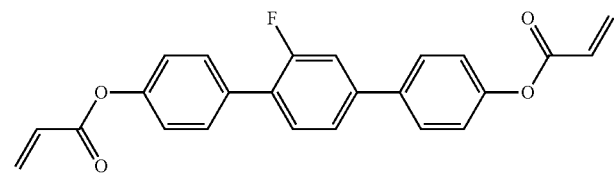 [SMILES: C=CC(=O)Oc1ccc(-c2ccc(-c3ccc(OC(=O)C=C)cc3)c(F)c2)cc1] RM-44
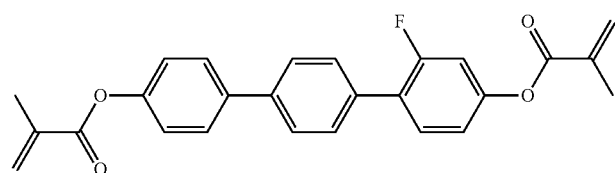 RM-45
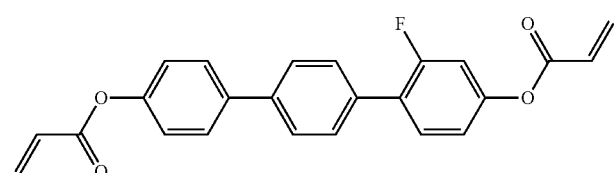 RM-46
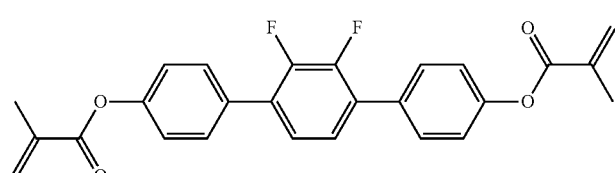 RM-47
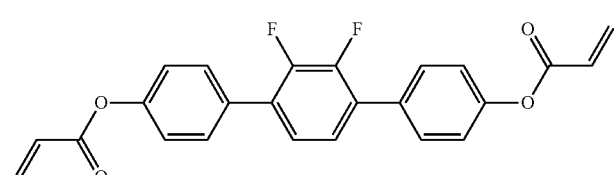 RM-48
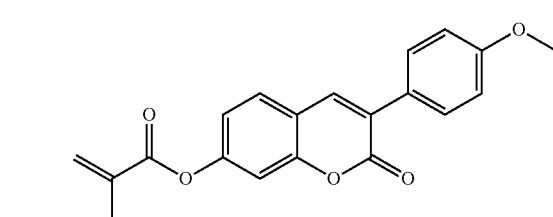 RM-49
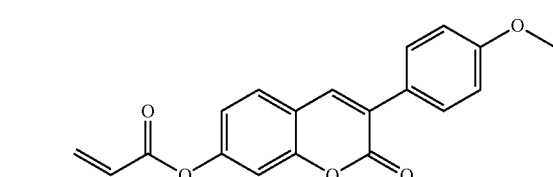 RM-50

TABLE D-continued
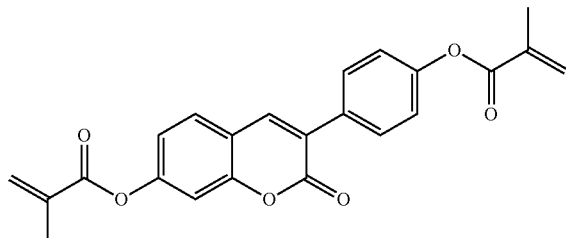 RM-51
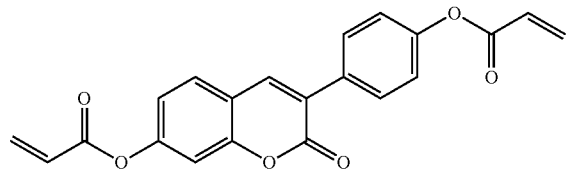 [SMILES: C=CC(=O)Oc1ccc(-c2cc3ccc(OC(=O)C=C)cc3oc2=O)cc1] RM-52
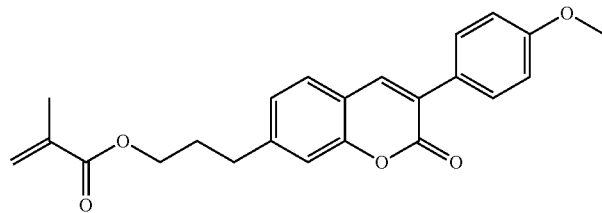 [SMILES: C=C(C)C(=O)OCCCc1ccc2cc(-c3ccc(OC)cc3)c(=O)oc2c1] RM-53
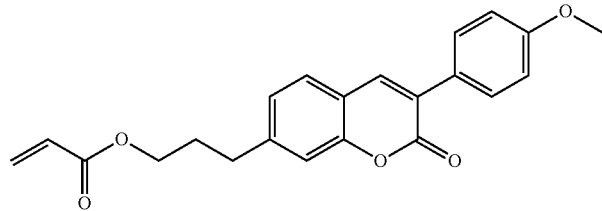 [SMILES: C=CC(=O)OCCCc1ccc2cc(-c3ccc(OC)cc3)c(=O)oc2c1] RM-54
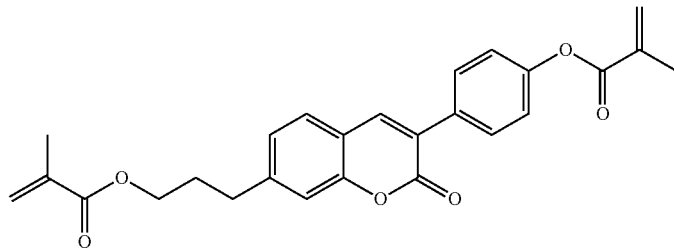 [SMILES: C=C(C)C(=O)OCCCc1ccc2cc(-c3ccc(OC(=O)C(=C)C)cc3)c(=O)oc2c1] RM-55
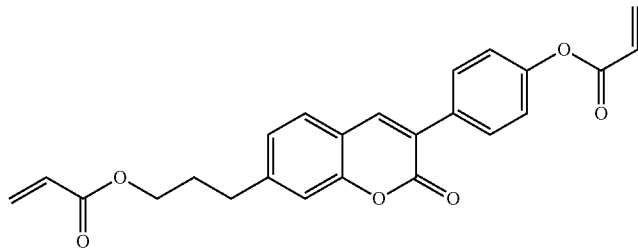 [SMILES: C=CC(=O)OCCCc1ccc2cc(-c3ccc(OC(=O)C=C)cc3)c(=O)oc2c1] RM-56
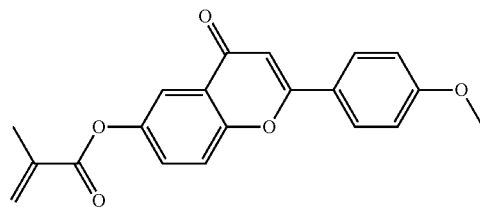 RM-57

TABLE D-continued
RM-58
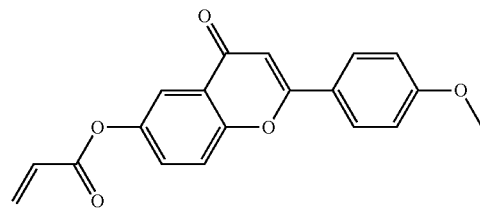 [SMILES: C=C(C)C(=O)Oc1ccc2oc(-c3ccc(OC)cc3)cc(=O)c2c1]
RM-59
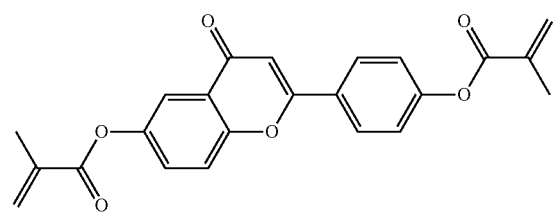 [SMILES: C=C(C)C(=O)Oc1ccc(-c2cc(=O)c3cc(OC(=O)C(=C)C)ccc3o2)cc1]
RM-60
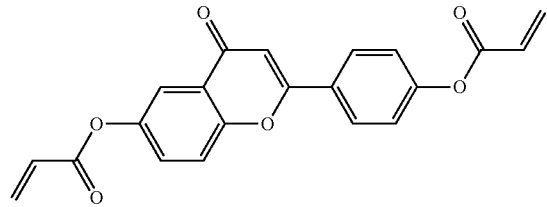 [SMILES: C=CC(=O)Oc1ccc(-c2cc(=O)c3cc(OC(=O)C=C)ccc3o2)cc1]
RM-61
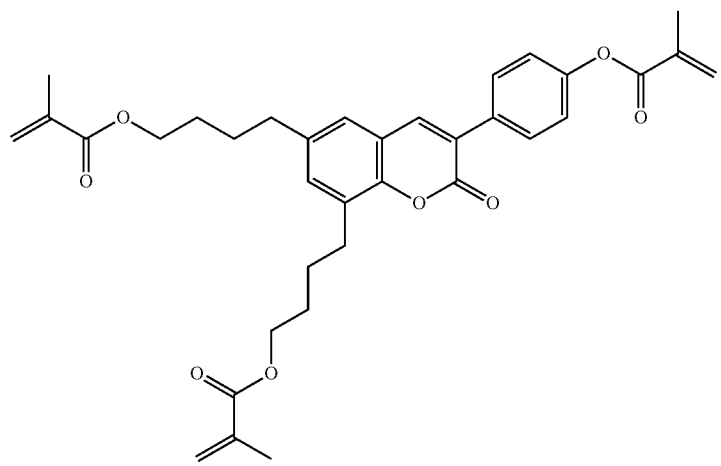 [SMILES: C=C(C)C(=O)OCCCCc1cc(CCCCOC(=O)C(=C)C)c2oc(=O)c(-c3ccc(OC(=O)C(=C)C)cc3)cc2c1]
RM-62
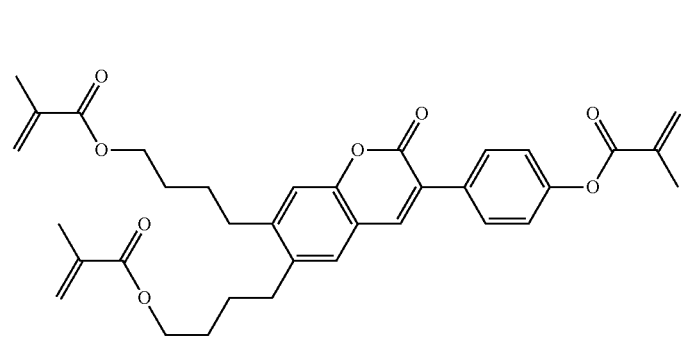 [SMILES: C=C(C)C(=O)OCCCCc1cc2cc(-c3ccc(OC(=O)C(=C)C)cc3)c(=O)oc2cc1CCCCOC(=O)C(=C)C]

TABLE D-continued
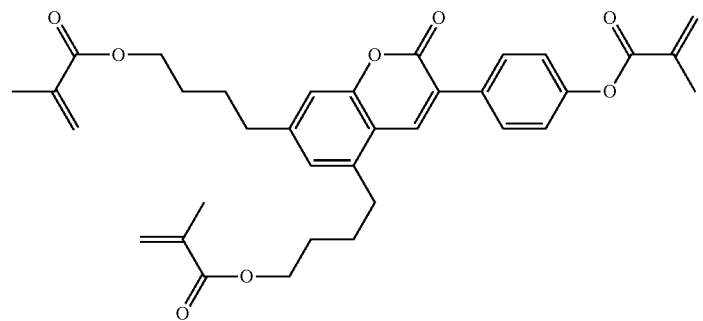 [SMILES: C=C(C)C(=O)OCCCCc1cc(CCCCOC(=O)C(=C)C)c2cc(-c3ccc(OC(=O)C(=C)C)cc3)c(=O)oc2c1]
RM-63
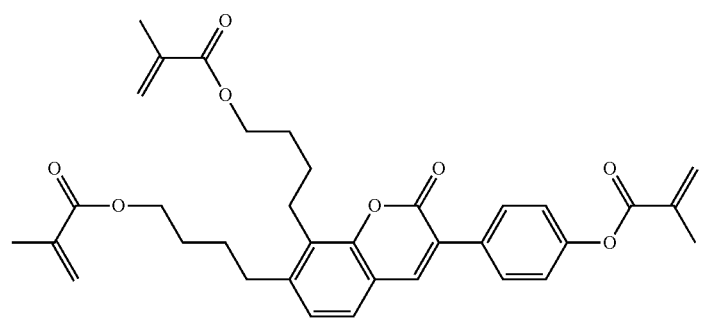 [SMILES: C=C(C)C(=O)OCCCCc1ccc2cc(-c3ccc(OC(=O)C(=C)C)cc3)c(=O)oc2c1CCCCOC(=O)C(=C)C]
RM-64
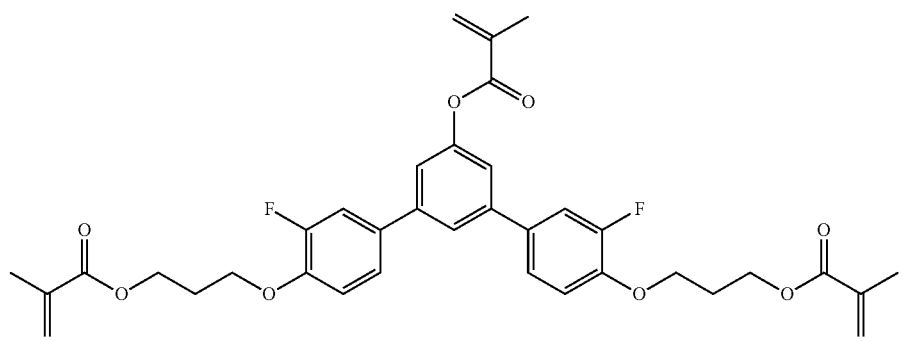 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-65
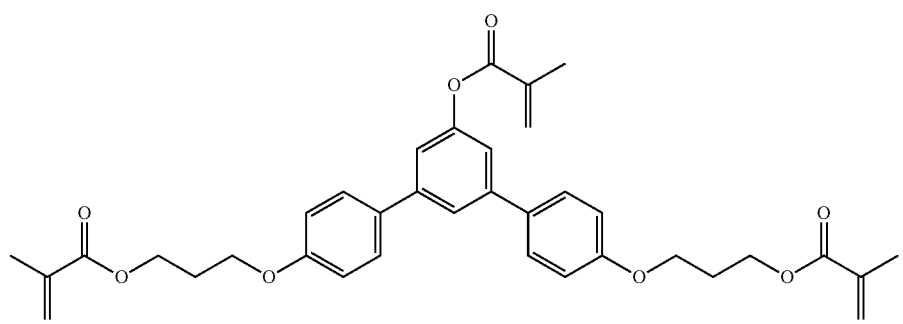 [SMILES: C=C(C)C(=O)OCCCOc1ccc(-c2cc(OC(=O)C(=C)C)cc(-c3ccc(OCCCOC(=O)C(=C)C)cc3)c2)cc1]
RM-66
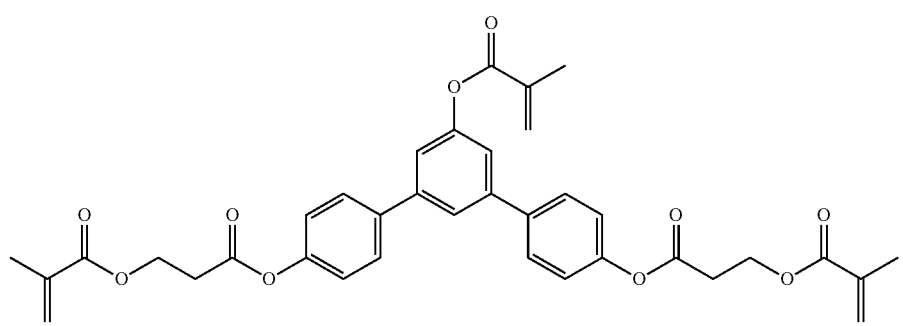 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-67

TABLE D-continued
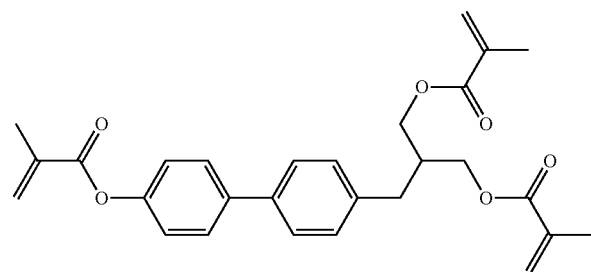 [SMILES: C=C(C)C(=O)OCC(COC(=O)C(=C)C)Cc1ccc(-c2ccc(OC(=O)C(=C)C)cc2)cc1]
RM-68
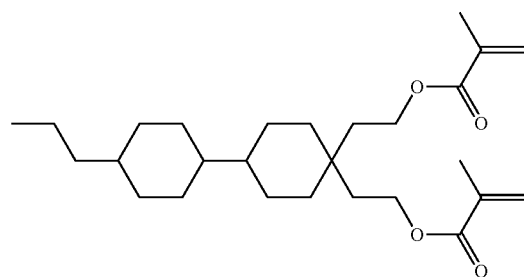 [SMILES: C=C(C)C(=O)OCCC1(CCOC(=O)C(=C)C)CCC(C2CCC(CCC)CC2)CC1]
RM-69
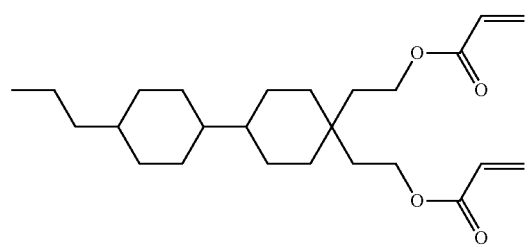 [SMILES: C=CC(=O)OCCC1(CCOC(=O)C=C)CCC(C2CCC(CCC)CC2)CC1]
RM-70
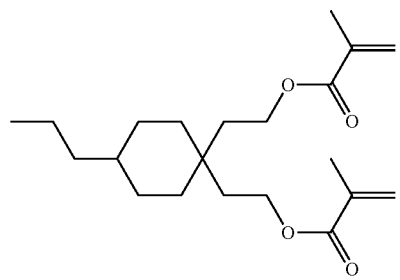 [SMILES: C=C(C)C(=O)OCCC1(CCOC(=O)C(=C)C)CCC(CCC)CC1]
RM-71
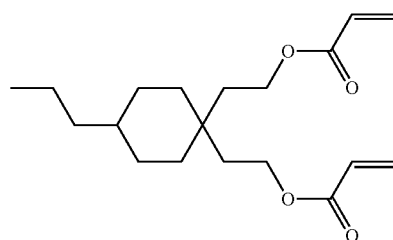 [SMILES: C=CC(=O)OCCC1(CCOC(=O)C=C)CCC(CCC)CC1]
RM-72
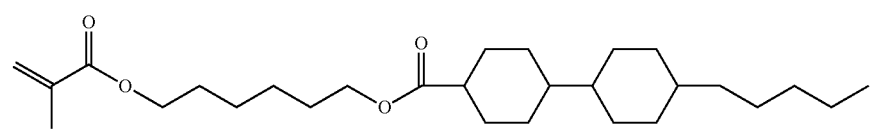 [SMILES: C=C(C)C(=O)OCCCCCCOC(=O)C1CCC(C2CCC(CCCCC)CC2)CC1]
RM-73
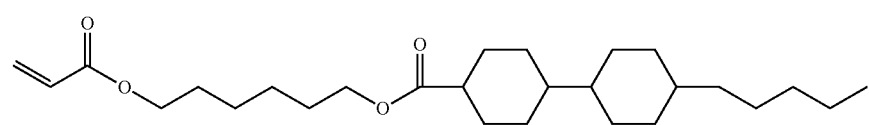 [SMILES: C=CC(=O)OCCCCCCOC(=O)C1CCC(C2CCC(CCCCC)CC2)CC1]
RM-74

TABLE D-continued
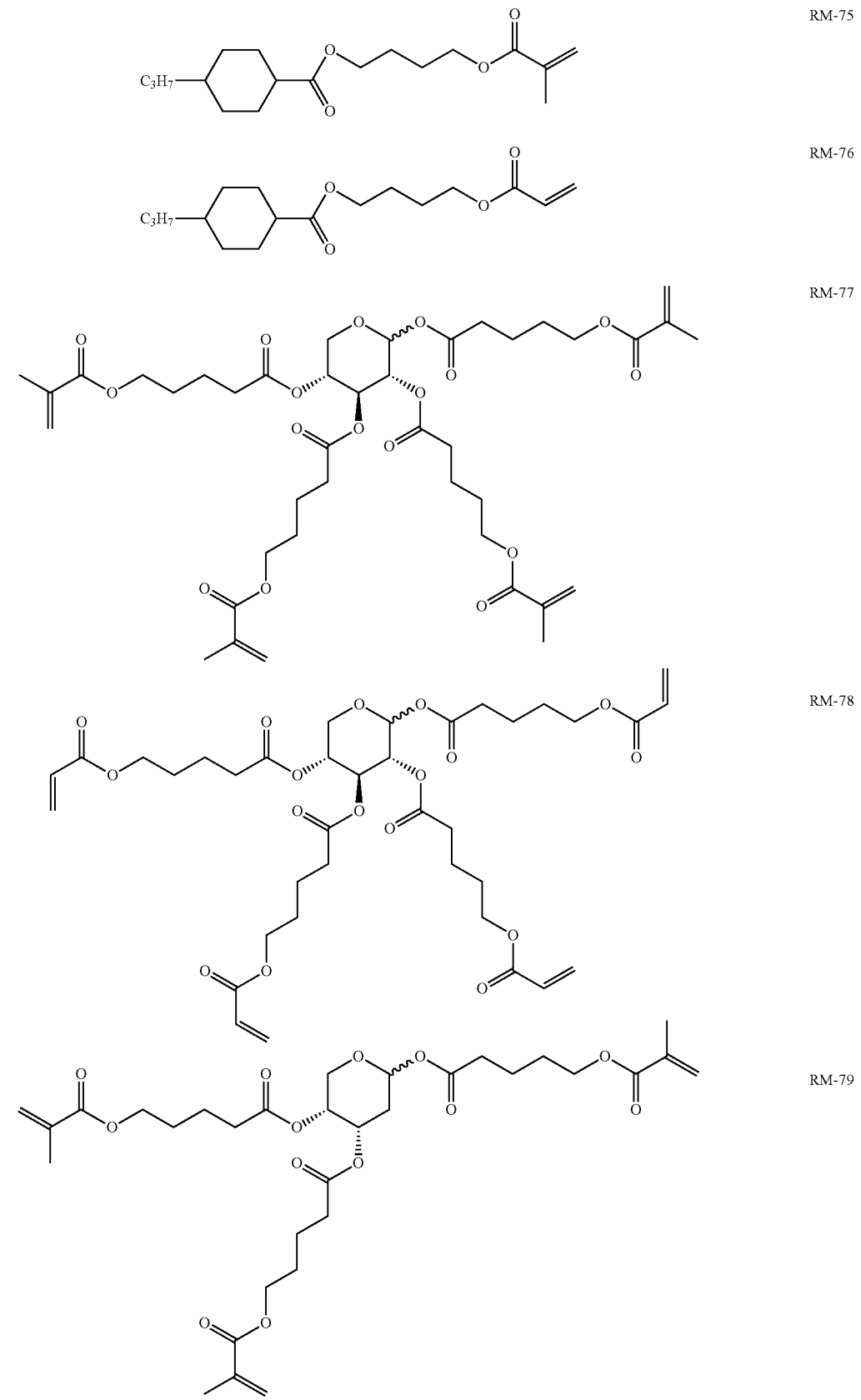
RM-75
RM-76
RM-77
RM-78
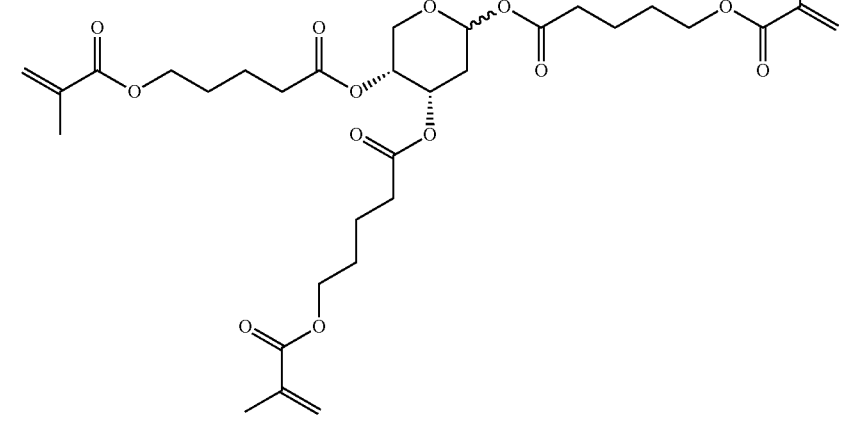 [SMILES: C=CC(=O)OCCCCC(=O)OC1C[C@H](OC(=O)CCCCOC(=O)C=C)[C@H](OC(=O)CCCCOC(=O)C=C)CO1]
RM-79

TABLE D-continued

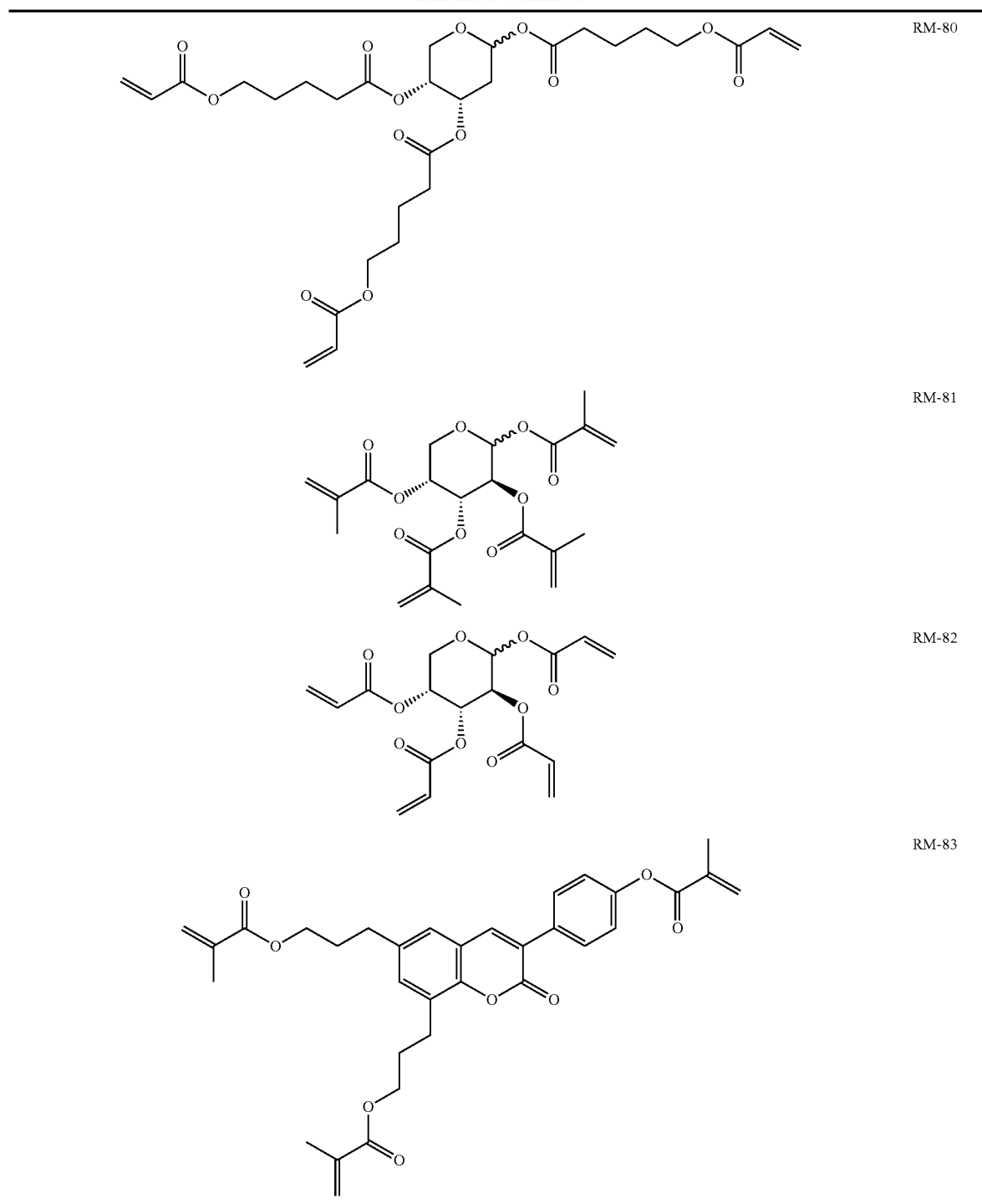

In case that the LC medium according to the invention contains one or more mesogenic compounds, the mesogenic compound is preferably selected from the compounds given in Table D.

WORKING EXAMPLES

The following examples are intended to explain the invention without limiting it. In the examples, m.p. denotes the melting point and C denotes the clearing point of a liquid-crystalline substance in degrees Celsius; boiling temperatures are denoted by m.p. Furthermore: C denotes crystalline solid state, S denotes smectic phase (the index denotes the phase type), N denotes nematic state, Ch denotes cholesteric phase, I denotes isotropic phase, $T_g$ denotes glass-transition temperature. The number between two symbols indicates the conversion temperature in degrees Celsius an. The host mixture used for determination of the optical anisotropy Δn of the compounds of the formula I is the commercial mixture ZLI-4792 (Merck KGaA). The dielectric anisotropy Δε is determined using commercial mixture ZLI-2857. The physical data of the compound to be investigated are obtained from the change in the dielectric constants of the host mixture after addition of the compound to be investigated and extrapolation to 100% of the compound employed. In general, 10% of the compound to be investigated are dissolved in the host mixture, depending on the solubility.

Unless indicated otherwise, parts or percent data denote parts by weight or percent by weight.

Above and below, $V_o$ denotes threshold voltage, capacitive [V] at 20° C.

Δn denotes the optical anisotropy measured at 20° C. and 589 nm

Δε denotes the dielectric anisotropy at 20° C. and 1 kHz cp., T(N,I) denotes clearing point [° C.]

$K_1$ denotes elastic constant, "splay" deformation at 20° C. [pN]

$K_3$ denotes elastic constant, "bend" deformation at 20° C. [pN]

$γ_1$ denotes rotational viscosity measured at 20° C. [mPa·s], determined by the rotation method in a magnetic field LTS denotes low-temperature stability (nematic phase), determined in test cells.

The display used for measurement of the threshold voltage has two plane-parallel outer plates at a separation of 20 μm and electrode layers with overlying alignment layers of SE-1211 (Nissan Chemicals) on the insides of the outer plates, which effect a homeotropic alignment of the liquid crystals.

All concentrations in this application relate to the corresponding mixture or mixture component, unless explicitly indicated otherwise. All physical properties are determined as described in "Merck Liquid Crystals, Physical Properties of Liquid Crystals", status November 1997, Merck KGaA, Germany, and apply for a temperature of 20° C., unless explicitly indicated otherwise.

The display used for measurement of the capacitive threshold voltage consists of two plane-parallel glass outer plates at a separation of 20 μm, each of which has on the inside an electrode layer and an unrubbed polyimide alignment layer on top, which effect a homeotropic edge alignment of the liquid-crystal molecules.

The display or test cell used for measurement of the tilt angles consists of two plane-parallel glass outer plates at a separation of 4 μm, each of which has on the inside an electrode layer and a polyimide alignment layer on top, where the two polyimide layers are rubbed antiparallel to one another and effect a homeotropic edge alignment of the liquid-crystal molecules.

The polymerisable compounds are polymerised in the display or test cell by irradiation with UVA light (for example at 365 nm) of defined intensity for a prespecified time, with a voltage simultaneously being applied to the display (usually 10 V to 30 V alternating current, 1 kHz). In the examples, unless indicated otherwise, a metal halide lamp and an intensity of 100 mW/cm² is used for polymerisation. The intensity is measured using a standard UVA meter (Hoenle UV-meter high end with UVA sensor).

MIXTURE EXAMPLES

Example M1

| | | | |
|---|---|---|---|
| PY-3-O2 | 8.00% | Clearing point [° C.]: | 74.5 |
| PY-3-O4 | 9.00% | Δn [589 nm, 20° C.]: | 0.1172 |
| CCY-3-O3 | 8.00% | Δε [1 kHz, 20° C.]: | -3.1 |
| CCY-4-O2 | 6.50% | $ε_∥$ [1 kHz, 20° C.]: | 3.5 |
| CPY-2-O2 | 10.00% | $K_3$ [pN, 20° C.]: | 12.9 |
| CPY-3-O2 | 10.00% | $K_3/K_1$ [20° C.]: | 0.94 |
| CCH-34 | 10.00% | $γ_1$ [mPa·s, 20° C.]: | 116 |
| CCH-23 | 22.00% | $V_0$ [20° C., V]: | 2.14 |
| PYP-2-3 | 8.00% | | |
| PYP-2-4 | 4.00% | | |
| PCH-301 | 4.50% | | |

Example M2

| | | | |
|---|---|---|---|
| PY-3-O2 | 7.00% | Clearing point [° C.]: | 74.5 |
| PY-3-O4 | 7.00% | Δn [589 nm, 20° C.]: | 0.1169 |
| CY-3-O2 | 2.50% | Δε [1 kHz, 20° C.]: | -3.1 |
| CCY-3-O3 | 8.00% | $ε_∥$ [1 kHz, 20° C.]: | 3.5 |
| CCY-4-O2 | 6.00% | $K_3$ [pN, 20° C.]: | 12.8 |
| CPY-2-O2 | 10.00% | $K_3/K_1$ [20° C.]: | 0.96 |
| CPY-3-O2 | 10.00% | $γ_1$ [mPa·s, 20° C.]: | 116 |
| CCH-34 | 10.00% | $V_0$ [20° C., V]: | 2.14 |
| CCH-23 | 21.00% | | |
| PYP-2-3 | 8.00% | | |
| PYP-2-4 | 5.00% | | |
| PCH-301 | 5.50% | | |

Example M3

| | | | |
|---|---|---|---|
| PY-3-O2 | 10.00% | Clearing point [° C.]: | 69.0 |
| PY-3-O4 | 10.00% | Δn [589 nm, 20° C.]: | 0.1199 |
| CCY-3-O3 | 4.00% | Δε [1 kHz, 20° C.]: | -3.0 |
| CCY-3-O2 | 10.00% | $ε_∥$ [1 kHz, 20° C.]: | 3.5 |
| CPY-2-O2 | 7.00% | $K_3$ [pN, 20° C.]: | 13.5 |
| CPY-3-O2 | 10.00% | $K_3/K_1$ [20° C.]: | 0.94 |
| CCH-34 | 11.00% | $γ_1$ [mPa·s, 20° C.]: | 104 |
| CCH-23 | 20.00% | $V_0$ [20° C., V]: | 2.23 |
| PYP-2-3 | 7.00% | | |
| PYP-2-4 | 1.50% | | |
| CCP-3-1 | 2.50% | | |
| PP-1-3 | 7.00% | | |

Example M4

| | | | |
|---|---|---|---|
| BCH-32 | 6.50% | Clearing point [° C.]: | 74.5 |
| CCP-3-1 | 6.00% | Δn [589 nm, 20° C.]: | 0.1021 |
| CCH-23 | 20.00% | Δε [1 kHz, 20° C.]: | -3.1 |
| CCH-34 | 3.00% | $ε_∥$ [1 kHz, 20° C.]: | 3.6 |
| CCH-35 | 3.00% | $K_3$ [pN, 20° C.]: | 14.5 |
| CCY-3-O2 | 10.00% | $K_3/K_1$ [20° C.]: | 0.99 |
| CCY-3-O1 | 5.50% | $γ_1$ [mPa·s, 20° C.]: | 97 |
| CPY-2-O2 | 6.00% | $V_0$ [20° C., V]: | 2.30 |
| CPY-3-O2 | 10.00% | | |
| Y-4O-O4 | 8.00% | | |
| PY-3-O2 | 9.00% | | |
| PY-3-O4 | 2.50% | | |
| PYP-2-3 | 1.50% | | |
| CC-3-V1 | 9.00% | | |

Example M5

| | | | |
|---|---|---|---|
| CY-3-O2 | 10.00% | Clearing point [° C.]: | 77.5 |
| PY-3-O2 | 6.00% | Δn [589 nm, 20° C.]: | 0.0957 |
| PY-1-O2 | 6.00% | Δε [1 kHz, 20° C.]: | -3.0 |

-continued

| | | | |
|---|---|---|---|
| CLY-2-O4 | 5.00% | $\varepsilon_\parallel$ [1 kHz, 20° C.]: | 3.4 |
| CLY-3-O2 | 4.00% | $K_3$ [pN, 20° C.]: | 15.0 |
| CLY-3-O3 | 4.00% | $K_3/K_1$ [20° C.]: | 1.01 |
| CCY-4-O2 | 8.00% | $\gamma_1$ [mPa · s, 20° C.]: | 106 |
| CPY-3-O2 | 8.00% | $V_0$ [20° C., V]: | 2.37 |
| CCH-34 | 6.00% | | |
| CCH-23 | 22.00% | | |
| CCP-3-3 | 6.00% | | |
| CCP-3-1 | 8.50% | | |
| PCH-301 | 6.50% | | |

Example M6

| | | | |
|---|---|---|---|
| CY-3-O2 | 3.00% | Clearing point [° C.]: | 74.0 |
| PY-3-O2 | 7.00% | $\Delta n$ [589 nm, 20° C.]: | 0.1040 |
| PY-1-O2 | 7.00% | $\Delta\varepsilon$ [1 kHz, 20° C.]: | −2.9 |
| CPY-2-O2 | 7.00% | $\varepsilon_\parallel$ [1 kHz, 20° C.]: | 3.5 |
| CPY-3-O2 | 8.00% | $K_3$ [pN, 20° C.]: | 13.5 |
| CCH-34 | 10.00% | $K_3/K_1$ [20° C.]: | 0.99 |
| CCH-23 | 20.00% | $\gamma_1$ [mPa · s, 20° C.]: | 105 |
| CCP-3-3 | 4.00% | $V_0$ [20° C., V]: | 2.26 |
| BCH-32 | 3.50% | | |
| PCH-301 | 11.50% | | |
| CLY-2-O4 | 7.00% | | |
| CLY-3-O2 | 5.00% | | |
| CLY-3-O3 | 7.00% | | |

Example M7

| | | | |
|---|---|---|---|
| CY-3-O2 | 7.00% | Clearing point [° C.]: | 75.0 |
| PY-3-O2 | 8.00% | $\Delta n$ [589 nm, 20° C.]: | 0.1075 |
| PY-3-O4 | 8.00% | $\Delta\varepsilon$ [1 kHz, 20° C.]: | −3.0 |
| CCY-3-O2 | 4.00% | $\varepsilon_\parallel$ [1 kHz, 20° C.]: | 3.5 |
| CLY-3-O2 | 8.00% | $K_3$ [pN, 20° C.]: | 15.1 |
| CPY-2-O2 | 8.00% | $K_3/K_1$ [20° C.]: | 1.09 |
| CPY-3-O2 | 9.00% | $\gamma_1$ [mPa · s, 20° C.]: | 87 |
| PYP-2-3 | 3.00% | $V_0$ [20° C., V]: | 2.37 |
| CC-3-V | 36.50% | | |
| CCP-3-1 | 8.50% | | |

Example M8

| | | | |
|---|---|---|---|
| CLY-3-O2 | 11.50% | Clearing point [° C.]: | 74.0 |
| CPY-2-O2 | 8.00% | $\Delta n$ [589 nm, 20° C.]: | 0.1150 |
| CPY-3-O2 | 14.00% | $\Delta\varepsilon$ [1 kHz, 20° C.]: | −2.9 |
| CC-3-V | 43.00% | $\varepsilon_\parallel$ [1 kHz, 20° C.]: | 3.5 |
| PY-3-O2 | 10.00% | $K_3$ [pN, 20° C.]: | 14.7 |
| PY-3-O4 | 7.00% | $K_3/K_1$ [20° C.]: | 1.06 |
| PYP-2-3 | 5.00% | $\gamma_1$ [mPa · s, 20° C.]: | 82 |
| PGP-2-4 | 1.50% | $V_0$ [20° C., V]: | 2.39 |

Example M9

| | | | |
|---|---|---|---|
| PY-4-O2 | 8.00% | Clearing point [° C.]: | 74.0 |
| PY-1-O4 | 8.00% | $\Delta n$ [589 nm, 20° C.]: | 0.0958 |
| CCY-3-O1 | 7.00% | $\Delta\varepsilon$ [1 kHz, 20° C.]: | −2.2 |
| CCY-3-O2 | 8.00% | $\varepsilon_\parallel$ [1 kHz, 20° C.]: | 3.2 |
| CPY-3-O2 | 10.00% | $K_3$ [pN, 20° C.]: | 14.5 |
| CCH-23 | 20.00% | $K_3/K_1$ [20° C.]: | 1.01 |
| CCH-34 | 5.00% | $\gamma_1$ [mPa · s, 20° C.]: | 90 |
| CCH-35 | 5.00% | $V_0$ [20° C., V]: | 2.73 |
| PCH-302 | 10.50% | | |
| CCH-301 | 6.00% | | |
| CCP-3-1 | 7.50% | | |
| BCH-32 | 5.00% | | |

Example M10

| | | | |
|---|---|---|---|
| BCH-32 | 3.00% | Clearing point [° C.]: | 75.0 |
| CCH-23 | 21.00% | $\Delta n$ [589 nm, 20° C.]: | 0.0952 |
| CCH-34 | 6.00% | $\Delta\varepsilon$ [1 kHz, 20° C.]: | −2.3 |
| CCP-3-1 | 12.00% | $\varepsilon_\parallel$ [1 kHz, 20° C.]: | 3.4 |
| CCP-3-3 | 6.00% | $K_3$ [pN, 20° C.]: | 14.8 |
| CCY-3-O1 | 5.50% | $K_3/K_1$ [20° C.]: | 1.02 |
| CCY-3-O2 | 9.00% | $\gamma_1$ [mPa · s, 20° C.]: | 93 |
| CPY-3-O2 | 9.50% | $V_0$ [20° C., V]: | 2.67 |
| PYP-2-3 | 3.00% | | |
| PCH-302 | 10.00% | | |
| PY-4-O2 | 3.50% | | |
| PY-1-O4 | 3.50% | | |
| Y-4O-O4 | 8.00% | | |

Example M11

| | | | |
|---|---|---|---|
| PY-4-O2 | 7.00% | Clearing point [° C.]: | 75.5 |
| PY-1-O4 | 8.00% | $\Delta n$ [589 nm, 20° C.]: | 0.1074 |
| CCY-3-O1 | 7.00% | $\Delta\varepsilon$ [1 kHz, 20° C.]: | −2.2 |
| CCY-3-O2 | 9.00% | $\varepsilon_\parallel$ [1 kHz, 20° C.]: | 3.2 |
| CPY-3-O2 | 8.50% | $K_3$ [pN, 20° C.]: | 14.6 |
| PYP-2-3 | 3.50% | $K_3/K_1$ [20° C.]: | 1.00% |
| CCH-23 | 20.00% | $\gamma_1$ [mPa · s, 20° C.]: | 98 |
| CCH-34 | 5.00% | $V_0$ [20° C., V]: | 2.74 |
| CCH-35 | 5.00% | | |
| PCH-302 | 15.00% | | |
| BCH-32 | 12.00% | | |

Example M12

| | | | |
|---|---|---|---|
| Y-4O-O4 | 7.00% | Clearing point [° C.]: | 74.5 |
| PY-4-O2 | 3.50% | $\Delta n$ [589 nm, 20° C.]: | 0.1069 |
| PY-1-O4 | 3.50% | $\Delta\varepsilon$ [1 kHz, 20° C.]: | −2.0 |
| CCY-3-O2 | 8.50% | $\varepsilon_\parallel$ [1 kHz, 20° C.]: | 3.3 |
| CPY-3-O2 | 10.00% | $K_3$ [pN, 20° C.]: | 14.2 |
| PYP-2-3 | 9.50% | $K_3/K_1$ [20° C.]: | 0.97 |
| CCH-23 | 19.00% | $\gamma_1$ [mPa · s, 20° C.]: | 88 |
| CCH-34 | 6.00% | $V_0$ [20° C., V]: | 2.80 |
| CCH-35 | 6.00% | | |
| PCH-302 | 8.50% | | |
| BCH-32 | 8.50% | | |
| CCP-3-1 | 10.00% | | |

Example M13

| | | | |
|---|---|---|---|
| PY-3-O2 | 12.00% | Clearing point [° C.]: | 74.0 |
| PY-2-O2 | 11.00% | $\Delta n$ [589 nm, 20° C.]: | 0.1079 |
| CCY-3-O1 | 6.00% | $\Delta\varepsilon$ [1 kHz, 20° C.]: | −3.1 |
| CCY-3-O2 | 8.50% | $\varepsilon_\parallel$ [1 kHz, 20° C.]: | 3.7 |
| CPY-2-O2 | 7.00% | $K_3$ [pN, 20° C.]: | 15.0 |
| CPY-3-O2 | 10.00% | $K_3/K_1$ [20° C.]: | 1.11 |
| CC-3-V | 36.50% | $\gamma_1$ [mPa · s, 20° C.]: | 85 |

-continued

| | | | |
|---|---|---|---|
| CCP-3-1 | 8.50% | $V_0$ [20° C., V]: | 2.34 |
| PPGU-3-F | 0.50% | | |

Example M14

| | | | |
|---|---|---|---|
| CY-3-O2 | 3.50% | Clearing point [° C.]: | 75.0 |
| PY-3-O2 | 9.00% | $\Delta n$ [589 nm, 20° C.]: | 0.1025 |
| PY-2-O2 | 6.00% | $\Delta\varepsilon$ [1 kHz, 20° C.]: | −3.1 |
| CCY-3-O2 | 9.00% | $\varepsilon_\parallel$ [1 kHz, 20° C.]: | 3.5 |
| CCY-3-O1 | 6.00% | $K_3$ [pN, 20° C.]: | 14.2 |
| CCY-4-O2 | 2.00% | $K_3/K_1$ [20° C.]: | 1.04 |
| CPY-2-O2 | 8.00% | $\gamma_1$ [mPa·s, 20° C.]: | 103 |
| CPY-3-O2 | 10.00% | $V_0$ [20° C., V]: | 2.27 |
| CCH-34 | 10.00% | | |
| CCH-23 | 21.00% | | |
| BCH-32 | 3.00% | | |
| CCP-3-1 | 4.00% | | |
| PCH-301 | 8.50% | | |

Example M15

| | | | |
|---|---|---|---|
| PY-3-O2 | 10.00% | Clearing point [° C.]: | 75.0 |
| PY-2-O2 | 9.00% | $\Delta n$ [589 nm, 20° C.]: | 0.1035 |
| CCY-3-O2 | 9.00% | $\Delta\varepsilon$ [1 kHz, 20° C.]: | −3.1 |
| CCY-3-O1 | 6.00% | $\varepsilon_\parallel$ [1 kHz, 20° C.]: | 3.5 |
| CCY-4-O2 | 3.00% | $K_3$ [pN, 20° C.]: | 14.4 |
| CPY-2-O2 | 7.00% | $K_3/K_1$ [20° C.]: | 1.04 |
| CPY-3-O2 | 10.00% | $\gamma_1$ [mPa·s, 20° C.]: | 103 |
| CCH-34 | 10.00% | $V_0$ [20° C., V]: | 2.26 |
| CCH-23 | 20.00% | | |
| CCP-3-1 | 7.00% | | |
| PCH-301 | 9.00% | | |

Example M16

| | | | |
|---|---|---|---|
| CY-3-O2 | 8.00% | Clearing point [° C.]: | 79.5 |
| PY-2-O2 | 8.00% | $\Delta n$ [589 nm, 20° C.]: | 0.0948 |
| PY-1-O2 | 6.50% | $\Delta\varepsilon$ [1 kHz, 20° C.]: | −3.0 |
| CCY-3-O2 | 5.00% | $\varepsilon_\parallel$ [1 kHz, 20° C.]: | 3.4 |
| CCY-3-O3 | 8.00% | $K_3$ [pN, 20° C.]: | 15.1 |
| CCY-4-O2 | 8.00% | $K_3/K_1$ [20° C.]: | 1.05 |
| CPY-3-O2 | 8.00% | $\gamma_1$ [mPa·s, 20° C.]: | 110 |
| CCH-34 | 6.00% | $V_0$ [20° C., V]: | 2.38 |
| CCH-23 | 22.00% | | |
| CCP-3-3 | 7.50% | | |
| CCP-3-1 | 8.50% | | |
| PCH-301 | 4.50% | | |

Example M17

| | | | |
|---|---|---|---|
| PY-4-O2 | 8.00% | Clearing point [° C.]: | 74.0 |
| PY-1-O4 | 8.00% | $\Delta n$ [589 nm, 20° C.]: | 0.0958 |
| CCY-3-O1 | 7.00% | $\Delta\varepsilon$ [1 kHz, 20° C.]: | −2.2 |
| CCY-3-O2 | 8.00% | $\varepsilon_\parallel$ [1 kHz, 20° C.]: | 3.2 |
| CPY-3-O2 | 10.00% | $K_3$ [pN, 20° C.]: | 14.5 |
| CCH-23 | 20.00% | $K_3/K_1$ [20° C.]: | 1.01 |
| CCH-34 | 5.00% | $\gamma_1$ [mPa·s, 20° C.]: | 90 |
| CCH-35 | 5.00% | $V_0$ [20° C., V]: | 2.73 |
| PCH-302 | 10.50% | | |
| CCH-301 | 6.00% | | |

-continued

| | | | |
|---|---|---|---|
| CCP-3-1 | 7.50% | | |
| BCH-32 | 5.00% | | |

Example M18

| | | | |
|---|---|---|---|
| PY-3-O2 | 11.00% | Clearing point [° C.]: | 74.0 |
| PY-1-O4 | 6.50% | $\Delta n$ [589 nm, 20° C.]: | 0.1093 |
| CY-3-O2 | 5.00% | $\Delta\varepsilon$ [1 kHz, 20° C.]: | −3.0 |
| CCY-3-O1 | 6.00% | $\varepsilon_\parallel$ [1 kHz, 20° C.]: | 3.7 |
| CCY-3-O2 | 8.00% | $K_3$ [pN, 20° C.]: | 14.6 |
| CPY-2-O2 | 8.50% | $K_3/K_1$ [20° C.]: | 1.11 |
| CPY-3-O2 | 10.00% | $\gamma_1$ [mPa·s, 20° C.]: | 87 |
| CC-3-V | 37.50% | $V_0$ [20° C., V]: | 2.32 |
| BCH-32 | 7.00% | | |
| PPGU-3-F | 0.50% | | |

Example M19

| | | | |
|---|---|---|---|
| CY-3-O2 | 4.00% | Clearing point [° C.]: | 75.0 |
| PY-3-O2 | 9.00% | $\Delta n$ [589 nm, 20° C.]: | 0.1022 |
| PY-4-O2 | 6.00% | $\Delta\varepsilon$ [1 kHz, 20° C.]: | −3.1 |
| CCY-3-O2 | 9.00% | $\varepsilon_\parallel$ [1 kHz, 20° C.]: | 3.5 |
| CCY-3-O1 | 6.00% | $K_3$ [pN, 20° C.]: | 14.1 |
| CCY-4-O2 | 2.00% | $K_3/K_1$ [20° C.]: | 1.03 |
| CPY-2-O2 | 8.00% | $\gamma_1$ [mPa·s, 20° C.]: | 104 |
| CPY-3-O2 | 10.00% | $V_0$ [20° C., V]: | 2.26 |
| CCH-34 | 10.00% | | |
| CCH-23 | 21.00% | | |
| BCH-32 | 3.50% | | |
| CCP-3-1 | 3.00% | | |
| PCH-301 | 8.50% | | |

Example M20

| | | | |
|---|---|---|---|
| PY-3-O2 | 12.00% | Clearing point [° C.]: | 74.0 |
| PY-4-O2 | 11.00% | $\Delta n$ [589 nm, 20° C.]: | 0.1075 |
| CCY-3-O1 | 6.00% | $\Delta\varepsilon$ [1 kHz, 20° C.]: | −3.0 |
| CCY-3-O2 | 8.00% | $\varepsilon_\parallel$ [1 kHz, 20° C.]: | 3.7 |
| CPY-2-O2 | 8.00% | $K_3$ [pN, 20° C.]: | 14.7 |
| CPY-3-O2 | 10.00% | $K_3/K_1$ [20° C.]: | 1.09 |
| CC-3-V | 37.00% | $\gamma_1$ [mPa·s, 20° C.]: | 87 |
| CCP-3-1 | 7.50% | $V_0$ [20° C., V]: | 2.35 |
| PPGU-3-F | 0.50% | | |

Example M21

| | | | |
|---|---|---|---|
| PY-3-O2 | 6.50% | Clearing point [° C.]: | 75.0 |
| PY-1-O4 | 6.00% | $\Delta n$ [589 nm, 20° C.]: | 0.1039 |
| PY-4-O2 | 6.00% | $\Delta\varepsilon$ [1 kHz, 20° C.]: | −3.0 |
| CCY-3-O2 | 9.00% | $\varepsilon_\parallel$ [1 kHz, 20° C.]: | 3.5 |
| CCY-3-O1 | 5.00% | $K_3$ [pN, 20° C.]: | 14.1 |
| CCY-4-O2 | 3.50% | $K_3/K_1$ [20° C.]: | 1.01 |
| CPY-2-O2 | 7.00% | $\gamma_1$ [mPa·s, 20° C.]: | 105 |
| CPY-3-O2 | 10.00% | $V_0$ [20° C., V]: | 2.29 |
| CCH-34 | 10.00% | | |
| CCH-23 | 20.00% | | |
| BCH-32 | 3.50% | | |
| CCP-3-1 | 3.50% | | |
| PCH-301 | 10.00% | | |

Example M22

| | | | |
|---|---|---|---|
| PY-3-O2 | 12.00% | Clearing point [° C.]: | 74.0 |
| PY-1-O4 | 6.00% | $\Delta n$ [589 nm, 20° C.]: | 0.1080 |
| PY-4-O2 | 5.00% | $\Delta \varepsilon$ [1 kHz, 20° C.]: | −3.0 |
| CCY-3-O1 | 5.50% | $\varepsilon_{\parallel}$ [1 kHz, 20° C.]: | 3.7 |
| CCY-3-O2 | 9.00% | $K_3$ [pN, 20° C.]: | 14.9 |
| CPY-2-O2 | 7.00% | $K_3/K_1$ [20° C.]: | 1.10 |
| CPY-3-O2 | 10.00% | $\gamma_1$ [mPa · s, 20° C.]: | 86 |
| CC-3-V | 37.50% | $V_0$ [20° C., V]: | 2.36 |
| CCP-3-1 | 6.00% | | |
| BCH-32 | 1.50% | | |
| PPGU-3-F | 0.50% | | |

Example M23

| | | | |
|---|---|---|---|
| CY-3-O2 | 2.00% | Clearing point [° C.]: | 74.5 |
| PY-3-O2 | 7.00% | $\Delta n$ [589 nm, 20° C.]: | 0.1030 |
| PY-1-O4 | 5.50% | $\Delta \varepsilon$ [1 kHz, 20° C.]: | −3.0 |
| PY-4-O2 | 4.00% | $\varepsilon_{\parallel}$ [1 kHz, 20° C.]: | 3.5 |
| CCY-3-O2 | 9.00% | $K_3$ [pN, 20° C.]: | 14.2 |
| CCY-3-O1 | 6.00% | $K_3/K_1$ [20° C.]: | 1.04 |
| CCY-4-O2 | 2.00% | $\gamma_1$ [mPa · s, 20° C.]: | 105 |
| CPY-2-O2 | 8.00% | $V_0$ [20° C., V]: | 2.28 |
| CPY-3-O2 | 10.00% | | |
| CCH-34 | 10.00% | | |
| CCH-23 | 20.00% | | |
| BCH-32 | 3.00% | | |
| CCP-3-1 | 3.50% | | |
| PCH-301 | 10.00% | | |

Example M24

| | | | |
|---|---|---|---|
| CY-3-O2 | 4.00% | Clearing point [° C.]: | 73.5 |
| PY-3-O2 | 7.00% | $\Delta n$ [589 nm, 20° C.]: | 0.1034 |
| PY-1-O4 | 5.50% | $\Delta \varepsilon$ [1 kHz, 20° C.]: | −3.1 |
| PY-4-O2 | 4.00% | $\varepsilon_{\parallel}$ [1 kHz, 20° C.]: | 3.5 |
| CCY-3-O2 | 10.00% | $K_3$ [pN, 20° C.]: | 14.5 |
| CCY-3-O1 | 6.00% | $K_3/K_1$ [20° C.]: | 1.01 |
| CCY-4-O2 | 6.00% | $\gamma_1$ [mPa · s, 20° C.]: | 105 |
| CPY-2-O2 | 3.00% | $V_0$ [20° C., V]: | 2.28 |
| CPY-3-O2 | 10.00% | | |
| CCH-34 | 10.00% | | |
| CCH-23 | 20.00% | | |
| CCP-3-1 | 6.00% | | |
| PCH-301 | 2.50% | | |
| PP-1-3 | 6.00% | | |

Example M25

| | | | |
|---|---|---|---|
| PY-3-O2 | 6.00% | Clearing point [° C.]: | 73.0 |
| PY-4-O2 | 8.00% | $\Delta n$ [589 nm, 20° C.]: | 0.1175 |
| PY-1-O4 | 6.50% | $\Delta \varepsilon$ [1 kHz, 20° C.]: | −3.5 |
| CCY-3-O3 | 5.00% | $\varepsilon_{\parallel}$ [1 kHz, 20° C.]: | 3.6 |
| CCY-3-O2 | 12.00% | $K_3$ [pN, 20° C.]: | 13.9 |
| CPY-2-O2 | 8.00% | $K_3/K_1$ [20° C.]: | 0.96 |
| CPY-3-O2 | 12.00% | $\gamma_1$ [mPa · s, 20° C.]: | 116 |
| CCH-34 | 10.00% | $V_0$ [20° C., V]: | 2.12 |
| CCH-23 | 21.00% | | |
| PYP-2-3 | 4.00% | | |
| PYP-2-4 | 2.00% | | |
| CCP-3-1 | 1.00% | | |
| PP-1-3 | 4.50% | | |

Example M26

| | | | |
|---|---|---|---|
| PY-3-O2 | 10.00% | Clearing point [° C.]: | 75.0 |
| PY-1-O4 | 5.00% | $\Delta n$ [589 nm, 20° C.]: | 0.1101 |
| PY-3-O4 | 2.00% | $\Delta \varepsilon$ [1 kHz, 20° C.]: | −3.0 |
| CCY-3-O2 | 10.00% | $\varepsilon_{\parallel}$ [1 kHz, 20° C.]: | 3.5 |
| CCY-4-O2 | 4.50% | $K_3$ [pN, 20° C.]: | 13.9 |
| CCY-3-O1 | 6.00% | $K_3/K_1$ [20° C.]: | 1.08 |
| CPY-2-O2 | 3.00% | $\gamma_1$ [mPa · s, 20° C.]: | 108 |
| CPY-3-O2 | 10.00% | $V_0$ [20° C., V]: | 2.27 |
| CCH-34 | 10.00% | | |
| CCH-23 | 21.00% | | |
| PYP-2-3 | 7.00% | | |
| BCH-32 | 2.50% | | |
| PCH-301 | 9.00% | | |

Example M27

| | | | |
|---|---|---|---|
| CY-3-O2 | 2.50% | Clearing point [° C.]: | 75.0 |
| PY-3-O2 | 6.00% | $\Delta n$ [589 nm, 20° C.]: | 0.1025 |
| PY-1-O4 | 5.00% | $\Delta \varepsilon$ [1 kHz, 20° C.]: | −3.1 |
| PY-2-O2 | 5.00% | $\varepsilon_{\parallel}$ [1 kHz, 20° C.]: | 3.5 |
| CCY-3-O2 | 9.00% | $K_3$ [pN, 20° C.]: | 14.3 |
| CCY-3-O1 | 5.00% | $K_3/K_1$ [20° C.]: | 1.05 |
| CCY-4-O2 | 3.00% | $\gamma_1$ [mPa · s, 20° C.]: | 104 |
| CPY-2-O2 | 8.00% | $V_0$ [20° C., V]: | 2.27 |
| CPY-3-O2 | 10.00% | | |
| CCH-34 | 10.00% | | |
| CCH-23 | 20.00% | | |
| BCH-32 | 3.00% | | |
| CCP-3-1 | 4.00% | | |
| PCH-301 | 9.50% | | |

Example M28

| | | | |
|---|---|---|---|
| PY-3-O2 | 10.00% | Clearing point [° C.]: | 73.5 |
| PY-1-O4 | 7.00% | $\Delta n$ [589 nm, 20° C.]: | 0.1104 |
| PY-3-O4 | 6.00% | $\Delta \varepsilon$ [1 kHz, 20° C.]: | −3.0 |
| CCY-3-O2 | 9.00% | $\varepsilon_{\parallel}$ [1 kHz, 20° C.]: | 3.5 |
| CCY-3-O1 | 6.00% | $K_3$ [pN, 20° C.]: | 14.0 |
| CPY-2-O2 | 5.50% | $K_3/K_1$ [20° C.]: | 0.99 |
| CPY-3-O2 | 10.00% | $\gamma_1$ [mPa · s, 20° C.]: | 105 |
| CCH-34 | 10.00% | $\gamma V_0$ [20° C., V]: | 2.27 |
| CCH-23 | 20.00% | | |
| CCP-3-1 | 2.00% | | |
| BCH-32 | 8.50% | | |
| PCH-301 | 6.00% | | |

Example M29

| | | | |
|---|---|---|---|
| PY-3-O2 | 7.00% | Clearing point [° C.]: | 73.5 |
| PY-1-O4 | 6.00% | $\Delta n$ [589 nm, 20° C.]: | 0.1105 |
| PY-2-O2 | 5.00% | $\Delta \varepsilon$ [1 kHz, 20° C.]: | −3.0 |
| PY-3-O4 | 5.00% | $\varepsilon_{\parallel}$ [1 kHz, 20° C.]: | 3.5 |
| CCY-3-O2 | 9.00% | $K_3$ [pN, 20° C.]: | 13.9 |
| CCY-3-O1 | 6.00% | $K_3/K_1$ [20° C.]: | 1.00% |
| CPY-2-O2 | 5.50% | $\gamma_1$ [mPa · s, 20° C.]: | 103 |
| CPY-3-O2 | 10.00% | $V_0$ [20° C., V]: | 2.25 |
| CCH-34 | 10.00% | | |
| CCH-23 | 20.00% | | |
| CCP-3-1 | 2.50% | | |
| BCH-32 | 8.50% | | |
| PCH-301 | 5.50% | | |

Example M30

| | | | |
|---|---|---|---|
| PY-3-O2 | 12.00% | Clearing point [° C.]: | 74.0 |
| PY-1-O4 | 6.00% | $\Delta n$ [589 nm, 20° C.]: | 0.1077 |
| PY-2-O2 | 5.00% | $\Delta \varepsilon$ [1 kHz, 20° C.]: | −3.0 |
| CCY-3-O1 | 5.50% | $\varepsilon_{\parallel}$ [1 kHz, 20° C.]: | 3.7 |
| CCY-3-O2 | 9.00% | $K_3$ [pN, 20° C.]: | 15.1 |
| CPY-2-O2 | 7.00% | $K_3/K_1$ [20° C.]: | 1.11 |
| CPY-3-O2 | 10.00% | $\gamma_1$ [mPa · s, 20° C.]: | 86 |
| CC-3-V | 37.00% | $V_0$ [20° C., V]: | 2.36 |
| CCP-3-1 | 8.00% | | |
| PPGU-3-F | 0.50% | | |

Example M31

| | | | |
|---|---|---|---|
| PY-3-O2 | 12.00% | Clearing point [° C.]: | 74.0 |
| PY-1-O4 | 6.00% | $\Delta n$ [589 nm, 20° C.]: | 0.1080 |
| PY-4-O2 | 5.00% | $\Delta \varepsilon$ [1 kHz, 20° C.]: | −3.0 |
| CCY-3-O1 | 5.50% | $\varepsilon_{\parallel}$ [1 kHz, 20° C.]: | 3.7 |
| CCY-3-O2 | 9.00% | $K_3$ [pN, 20° C.]: | 14.9 |
| CPY-2-O2 | 7.00% | $K_3/K_1$ [20° C.]: | 1.10 |
| CPY-3-O2 | 10.00% | $\gamma_1$ [mPa · s, 20° C.]: | 86 |
| CC-3-V | 37.50% | $V_0$ [20° C., V]: | 2.36 |
| CCP-3-1 | 6.00% | | |
| BCH-32 | 1.50% | | |
| PPGU-3-F | 0.50% | | |

Example M32

| | | | |
|---|---|---|---|
| PY-3-O2 | 10.00% | Clearing point [° C.]: | 75.0 |
| PY-2-O2 | 5.00% | $\Delta n$ [589 nm, 20° C.]: | 0.1098 |
| PY-3-O4 | 2.50% | $\Delta \varepsilon$ [1 kHz, 20° C.]: | −3.1 |
| CCY-3-O2 | 9.00% | $\varepsilon_{\parallel}$ [1 kHz, 20° C.]: | 3.5 |
| CCY-4-O2 | 5.00% | $K_3$ [pN, 20° C.]: | 14.0 |
| CCY-3-O1 | 5.50% | $K_3/K_1$ [20° C.]: | 1.02 |
| CPY-2-O2 | 4.00% | $\gamma_1$ [mPa · s, 20° C.]: | 107 |
| CPY-3-O2 | 10.00% | $V_0$ [20° C., V]: | 2.25 |
| CCH-34 | 10.00% | | |
| CCH-23 | 20.00% | | |
| PYP-2-3 | 6.50% | | |
| CCP-3-1 | 2.00% | | |
| BCH-32 | 1.50% | | |
| PCH-301 | 9.00% | | |

Example M33

| | | | |
|---|---|---|---|
| PY-3-O2 | 10.00% | Clearing point [° C.]: | 75.0 |
| PY-2-O2 | 5.00% | $\Delta n$ [589 nm, 20° C.]: | 0.1098 |
| PY-3-O4 | 2.50% | $\Delta \varepsilon$ [1 kHz, 20° C.]: | −3.1 |
| CCY-3-O2 | 9.00% | $\varepsilon_{\parallel}$ [1 kHz, 20° C.]: | 3.5 |
| CCY-4-O2 | 5.00% | $K_3$ [pN, 20° C.]: | 14.0 |
| CCY-3-O1 | 5.50% | $K_3/K_1$ [20° C.]: | 1.02 |
| CPY-2-O2 | 4.00% | $\gamma_1$ [mPa · s, 20° C.]: | 107 |
| CPY-3-O2 | 10.00% | $V_0$ [20° C., V]: | 2.25 |
| CCH-34 | 10.00% | | |
| CCH-23 | 20.00% | | |
| PYP-2-3 | 6.50% | | |
| CCP-3-1 | 2.00% | | |
| BCH-32 | 1.50% | | |
| PCH-301 | 9.00% | | |

Example M34

| | | | |
|---|---|---|---|
| PY-3-O2 | 10.00% | Clearing point [° C.]: | 75.0 |
| PY-1-O4 | 5.00% | $\Delta n$ [589 nm, 20° C.]: | 0.1101 |
| PY-3-O4 | 2.00% | $\Delta \varepsilon$ [1 kHz, 20° C.]: | −3.0 |
| CCY-3-O2 | 10.00% | $\varepsilon_{\parallel}$ [1 kHz, 20° C.]: | 3.5 |
| CCY-4-O2 | 4.50% | $K_3$ [pN, 20° C.]: | 13.9 |
| CCY-3-O1 | 6.00% | $K_3/K_1$ [20° C.]: | 1.08 |
| CPY-2-O2 | 3.00% | $\gamma_1$ [mPa · s, 20° C.]: | 108 |
| CPY-3-O2 | 10.00% | $V_0$ [20° C., V]: | 2.27 |
| CCH-34 | 10.00% | | |
| CCH-23 | 21.00% | | |
| PYP-2-3 | 7.00% | | |
| BCH-32 | 2.50% | | |
| PCH-301 | 9.00% | | |

Example M35

| | | | |
|---|---|---|---|
| CY-3-O2 | 2.50% | Clearing point [° C.]: | 75.0 |
| PY-3-O2 | 6.00% | $\Delta n$ [589 nm, 20° C.]: | 0.1025 |
| PY-1-O4 | 5.00% | $\Delta \varepsilon$ [1 kHz, 20° C.]: | −3.1 |
| PY-2-O2 | 5.00% | $\varepsilon_{\parallel}$ [1 kHz, 20° C.]: | 3.5 |
| CCY-3-O2 | 9.00% | $K_3$ [pN, 20° C.]: | 14.3 |
| CCY-3-O1 | 5.00% | $K_3/K_1$ [20° C.]: | 1.05 |
| CCY-4-O2 | 3.00% | $\gamma_1$ [mPa · s, 20° C.]: | 104 |
| CPY-2-O2 | 8.00% | $V_0$ [20° C., V]: | 2.27 |
| CPY-3-O2 | 10.00% | | |
| CCH-34 | 10.00% | | |
| CCH-23 | 20.00% | | |
| BCH-32 | 3.00% | | |
| CCP-3-1 | 4.00% | | |
| PCH-301 | 9.50% | | |

Example M36

| | | | |
|---|---|---|---|
| PY-4-O2 | 5.00% | Clearing point [° C.]: | 75.0 |
| PY-1-O4 | 4.00% | $\Delta n$ [589 nm, 20° C.]: | 0.1072 |
| PY-3-O2 | 8.00% | $\Delta \varepsilon$ [1 kHz, 20° C.]: | −1.9 |
| CPY-2-O2 | 10.00% | $\varepsilon_{\parallel}$ [1 kHz, 20° C.]: | 3.2 |
| CPY-3-O2 | 10.00% | $K_3$ [pN, 20° C.]: | 13.6 |
| BCH-32 | 12.00% | $K_3/K_1$ [20° C.]: | 0.93 |
| CCP-3-1 | 7.00% | $\gamma_1$ [mPa · s, 20° C.]: | 86 |
| CCH-23 | 15.00% | $V_0$ [20° C., V]: | 2.84 |
| CCH-34 | 7.00% | | |
| CCH-35 | 10.00% | | |
| CCH-301 | 6.00% | | |
| PCH-301 | 6.00% | | |

Example M37

| | | | |
|---|---|---|---|
| CCY-3-O2 | 7.50% | Clearing point [° C.]: | 75.0 |
| CCY-3-O1 | 8.00% | $\Delta n$ [589 nm, 20° C.]: | 0.0902 |
| CCY-3-O3 | 5.00% | $\Delta \varepsilon$ [1 kHz, 20° C.]: | −3.9 |
| CCY-4-O2 | 8.50% | $\varepsilon_{\parallel}$ [1 kHz, 20° C.]: | 3.7 |
| CPY-2-O2 | 5.00% | $K_3$ [pN, 20° C.]: | 15.0 |
| CPY-3-O2 | 6.00% | $K_3/K_1$ [20° C.]: | 1.18 |
| CY-3-O2 | 18.00% | $\gamma_1$ [mPa · s, 20° C.]: | 99 |
| PY-3-O2 | 6.00% | $V_0$ [20° C., V]: | 2.08 |
| CC-3-V | 35.50% | | |

Example M38

For the preparation of a PS-FFS mixture or PS-IPS mixture, 0.25% of the polymerisable compound of the formula

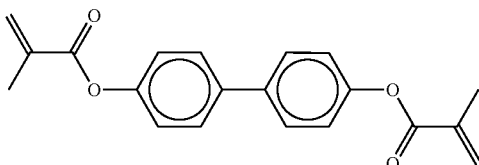

are added to 99.75% of the mixture according to Example M37.

Example M39

For the preparation of a PS-FFS mixture or PS-IPS mixture, 0.25% of the polymerisable compound of the formula

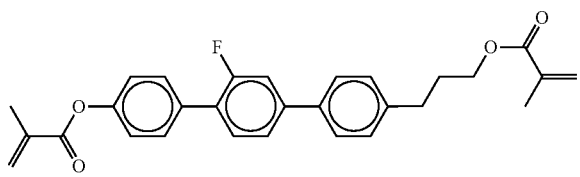

are added to 99.75% of the mixture according to Example M37.

Example M40

For the preparation of a PS-FFS mixture or PS-IPS mixture, 0.4% of the polymerisable compound of the formula

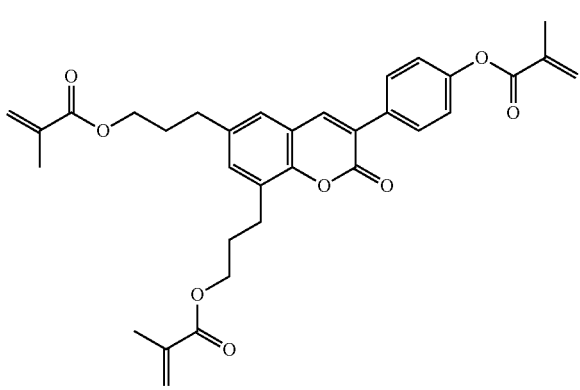 [SMILES: C=C(C)C(=O)OCCCc1cc(CCCOC(=O)C(=C)C)c2oc(=O)c(-c3ccc(OC(=O)C(=C)C)cc3)cc2c1]

are added to 99.6% of the mixture according to Example M37, causing the voltage holding ratio of mixture M37 to be significantly increased (VHR>90% after UV exposure).

Example M41

| | | | |
|---|---|---|---|
| PY-3-O2 | 10.00% | Clearing point [° C.]: | 73.5 |
| PY-1-O4 | 7.00% | Δn [589 nm, 20° C.]: | 0.1105 |
| PY-3-O4 | 6.00% | Δε [1 kHz, 20° C.]: | −3.0 |
| CCY-3-O2 | 9.00% | $\varepsilon_{\parallel}$ [1 kHz, 20° C.]: | 3.5 |
| CCY-3-O1 | 5.00% | $K_3$ [pN, 20° C.]: | 13.8 |
| CPY-2-O2 | 6.50% | $K_3/K_1$ [20° C.]: | 0.97 |
| CPY-3-O2 | 10.00% | $\gamma_1$ [mPa · s, 20° C.]: | 105 |
| CCH-34 | 10.00% | $V_0$ [20° C., V]: | 2.26 |
| CCH-23 | 21.00% | | |
| CCP-3-1 | 2.00% | | |
| BCH-32 | 8.50% | | |
| PCH-301 | 5.00% | | |

Example M42

| | | | |
|---|---|---|---|
| PY-4-O2 | 10.00% | Clearing point [° C.]: | 70.5 |
| PY-1-O4 | 8.00% | Δn [589 nm, 20° C.]: | 0.1158 |
| CCY-3-O2 | 10.00% | Δε [1 kHz, 20° C.]: | −3.0 |
| CPY-3-O2 | 12.00% | $\gamma_1$ [mPa · s, 20° C.]: | 105 |
| CLY-3-O2 | 8.00% | | |
| PYP-2-3 | 5.00% | | |
| PYP-2-4 | 5.00% | | |
| CCH-35 | 6.00% | | |
| CCH-23 | 21.00% | | |
| PCH-301 | 8.00% | | |
| PP-1-2V1 | 7.00% | | |

Example M43

| | | | |
|---|---|---|---|
| PY-3-O2 | 6.50% | Clearing point [° C.]: | 73.0 |
| PY-1-O4 | 6.00% | Δn [589 nm, 20° C.]: | 0.1018 |
| PY-4-O2 | 6.00% | Δε [1 kHz, 20° C.]: | −2.9 |
| CCP-304FCl | 6.00% | $\gamma_1$ [mPa · s, 20° C.]: | 111 |
| CCP-302FCl | 5.00% | | |
| CCY-4-O2 | 6.50% | | |
| CPY-2-O2 | 7.00% | | |
| CPY-3-O2 | 10.00% | | |
| CCH-34 | 10.00% | | |
| CCH-23 | 20.00% | | |
| BCH-32 | 3.50% | | |
| CCP-3-1 | 3.50% | | |
| PCH-301 | 10.00% | | |

Example M44

For the preparation of a PS-VA mixture, 0.2% of the polymerisable compound of the formula

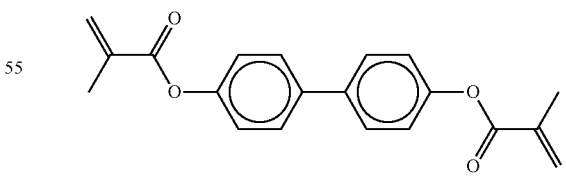

are added to 99.8% of the mixture according to Example M6.

The PS-VA mixture is introduced into a cell having homeotropic alignment. After application of a voltage of 24 V, the cell is irradiated with UV light with a power of 100 mW/cm².

Example M45

For the preparation of a PS-VA mixture, 0.2% of the polymerisable compound of the formula

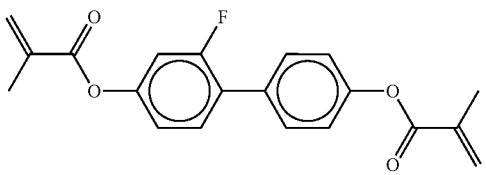

are added to 99.8% of the mixture according to Example M6.

The PS-VA mixture is introduced into a cell having homeotropic alignment. After application of a voltage of 24 V, the cell is irradiated with UV light with a power of 100 mW/cm².

Example M46

For the preparation of a PS-VA mixture, 0.2% of the polymerisable compound of the formula

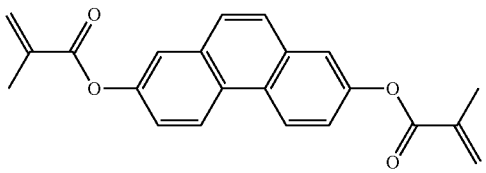 [SMILES: C=C(C)C(=O)Oc1ccc2c(ccc3cc(OC(=O)C(=C)C)ccc32)c1]

are added to 99.8% of the mixture according to Example M6.

The PS-VA mixture is introduced into a cell having homeotropic alignment. After application of a voltage of 24 V, the cell is irradiated with UV light with a power of 100 mW/cm².

Example M47

| | | | |
|---|---|---|---|
| CC-3-V | 28.50% | Clearing point [° C.]: | 75.1 |
| CC-3-V1 | 5.00% | Δn [589 nm, 20° C.]: | 0.1090 |
| CCH-34 | 6.50% | Δε [1 kHz, 20° C.]: | −3.0 |
| CCY-3-O3 | 9.50% | ε$_{\parallel}$ [1 kHz, 20° C.]: | 3.6 |
| CCY-4-O2 | 10.00% | K$_1$ [pN, 20° C.]: | 13.5 |
| CPY-2-O2 | 7.50% | K$_3$/K$_1$ [20° C.]: | 1.02 |
| CPY-3-O2 | 6.50% | V$_0$ [20° C., V]: | 2.26 |
| PY-1-O4 | 5.00% | | |
| PY-3-O2 | 14.50% | | |
| PYP-2-4 | 6.50% | | |
| PPGU-3-F | 0.50% | | |

Example M48

For the preparation of a PS-VA mixture, 0.45% of the polymerisable compound of the formula

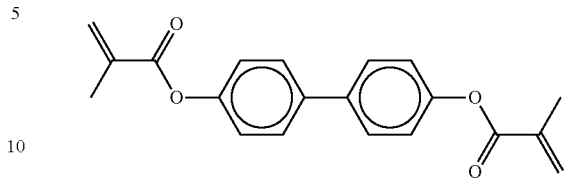

are added to 99.55% of the mixture according to Example M45.

The PS-VA mixture is introduced into a cell having homeotropic alignment. After application of a voltage of 24 V, the cell is irradiated with UV light with a power of 100 mW/cm².

Example M49

| | | | |
|---|---|---|---|
| CCY-3-O1 | 5.00% | Clearing point [° C.]: | 79.8 |
| CCY-3-O2 | 8.00% | Δn [589 nm, 20° C.]: | 0.1406 |
| CCY-3-O3 | 8.00% | Δε [1 kHz, 20° C.]: | −7.0 |
| CCY-4-O2 | 8.00% | K$_1$ [pN, 25° C.]: | 13.0 |
| CCY-5-O2 | 2.00% | K$_3$ [pN, 25° C.]: | 15.3 |
| CPY-2-O2 | 10.00% | V$_0$ [25° C., V]: | 1.56 |
| CPY-3-O2 | 10.00% | | |
| CY-3-O2 | 8.00% | | |
| CY-3-O4 | 5.00% | | |
| PY-1-O4 | 12.00% | | |
| PY-3-O2 | 6.00% | | |
| PY-4-O2 | 12.00% | | |
| PYP-2-3 | 6.00% | | |

Example M50

| | | | |
|---|---|---|---|
| CC-4-V | 4.00% | Clearing point [° C.]: | 80.2 |
| CCY-3-O1 | 5.50% | Δn [589 nm, 20° C.]: | 0.1401 |
| CCY-3-O2 | 8.00% | Δε [1 kHz, 20° C.]: | −6.5 |
| CCY-3-O3 | 8.00% | K$_1$ [pN, 25° C.]: | 13.4 |
| CCY-4-O2 | 8.00% | K$_3$ [pN, 25° C.]: | 14.5 |
| CPY-2-O2 | 10.00% | V$_0$ [25° C., V]: | 1.59 |
| CPY-3-O2 | 10.00% | | |
| CY-3-O2 | 4.00% | | |
| CY-3-O4 | 5.00% | | |
| PY-1-O4 | 12.00% | | |
| PY-3-O2 | 6.00% | | |
| PY-4-O2 | 12.00% | | |
| PYP-2-3 | 7.50% | | |

Example M51

| | | | |
|---|---|---|---|
| CC-4-V | 3.50% | Clearing point [° C.]: | 74.8 |
| CCY-3-O1 | 5.00% | Δn [589 nm, 20° C.]: | 0.1392 |
| CCY-3-O2 | 8.00% | Δε [1 kHz, 20° C.]: | −6.5 |
| CCY-4-O2 | 8.00% | K$_1$ [pN, 25° C.]: | 12.6 |
| CCY-5-O2 | 5.00% | K$_3$ [pN, 25° C.]: | 14.6 |
| CPY-2-O2 | 10.00% | V$_0$ [25° C., V]: | 1.58 |
| CPY-3-O2 | 10.00% | | |
| CY-3-O2 | 8.00% | | |
| CY-3-O4 | 5.00% | | |
| PY-1-O4 | 12.00% | | |
| PY-3-O2 | 6.00% | | |
| PY-4-O2 | 12.00% | | |
| PYP-2-3 | 7.50% | | |

Example M52

| | | | |
|---|---|---|---|
| CCH-23 | 20.00% | Clearing point [° C.]: | 76.0 |
| CCH-34 | 6.00% | Δn [589 nm, 20° C.]: | 0.0987 |
| CCH-35 | 3.00% | Δε [1 kHz, 20° C.]: | −3.1 |
| CCH-301 | 6.00% | $\gamma_1$ [mPa · s, 20° C.]: | 107 |
| PCH-301 | 6.00% | $K_1$ [pN, 20° C.]: | 13.9 |
| CCP-3-1 | 6.50% | $K_3$ [pN, 20° C.]: | 14.3 |
| CCY-3-O1 | 5.00% | $V_0$ [20° C., V]: | 2.26 |
| CCY-3-O2 | 5.00% | | |
| CCY-4-O2 | 3.50% | | |
| COY-3-O2 | 5.00% | | |
| PY-3-O2 | 8.00% | | |
| PY-4-O2 | 4.00% | | |
| CPY-2-O2 | 10.00% | | |
| CPY-3-O2 | 12.00% | | |

Example M53

| | | | |
|---|---|---|---|
| CCH-23 | 20.00% | Clearing point [° C.]: | 76.0 |
| CCH-34 | 6.00% | Δn [589 nm, 20° C.]: | 0.0988 |
| CCH-35 | 3.00% | Δε [1 kHz, 20° C.]: | −3.2 |
| CCH-301 | 6.00% | $\gamma_1$ [mPa · s, 20° C.]: | 108 |
| PCH-301 | 6.00% | $K_1$ [pN, 20° C.]: | 13.9 |
| CCP-3-1 | 5.50% | $K_3$ [pN, 20° C.]: | 14.2 |
| CCY-3-O1 | 4.50% | $V_0$ [20° C., V]: | 2.24 |
| CCY-3-O2 | 5.00% | | |
| CCY-4-O2 | 3.00% | | |
| CCOY-2-O2 | 4.00% | | |
| COY-3-O2 | 3.00% | | |
| PY-3-O2 | 8.00% | | |
| PY-4-O2 | 4.00% | | |
| CPY-2-O2 | 10.00% | | |
| CPY-3-O2 | 11.00% | | |
| PP-1-3 | 1.00% | | |

Example M54

| | | | |
|---|---|---|---|
| CC-3-V | 28.00% | Clearing point [° C.]: | 74.0 |
| CY-3-O2 | 10.00% | Δn [589 nm, 20° C.]: | 0.1082 |
| CCY-3-O1 | 5.50% | Δε [1 kHz, 20° C.]: | −3.5 |
| CCY-3-O2 | 11.00% | $\gamma_1$ [mPa · s, 20° C.]: | 101 |
| CCY-4-O2 | 5.00% | $K_1$ [pN, 20° C.]: | 13.9 |
| CPY-3-O2 | 11.00% | $K_3$ [pN, 20° C.]: | 16.1 |
| PY-3-O2 | 11.50% | $V_0$ [20° C., V]: | 2.27 |
| PY-1-O4 | 3.00% | | |
| PYP-2-3 | 5.00% | | |
| PP-1-2V1 | 2.00% | | |
| CC-3-2V1 | 8.00% | | |

Example M55

| | | | |
|---|---|---|---|
| CC-3-V | 32.50% | Clearing point [° C.]: | 75.1 |
| CC-3-V1 | 9.50% | Δn [589 nm, 20° C.]: | 0.1092 |
| CCY-3-O1 | 9.50% | Δε [1 kHz, 20° C.]: | −3.2 |
| CCY-3-O2 | 4.50% | $\gamma_1$ [mPa · s, 20° C.]: | 91 |
| CLY-3-O2 | 10.00% | $K_1$ [pN, 20° C.]: | 13.9 |
| CPY-3-O2 | 8.00% | $K_3$ [pN, 20° C.]: | 16.4 |
| PY-1-O4 | 4.00% | $V_0$ [20° C., V]: | 2.39 |
| PY-3-O2 | 17.00% | | |
| PYP-2-3 | 5.00% | | |

Example M56 a)-e)

For the preparation of a PS-VA mixture, 0.45% of the polymerisable compound of the formula a), b), c), d) or e)

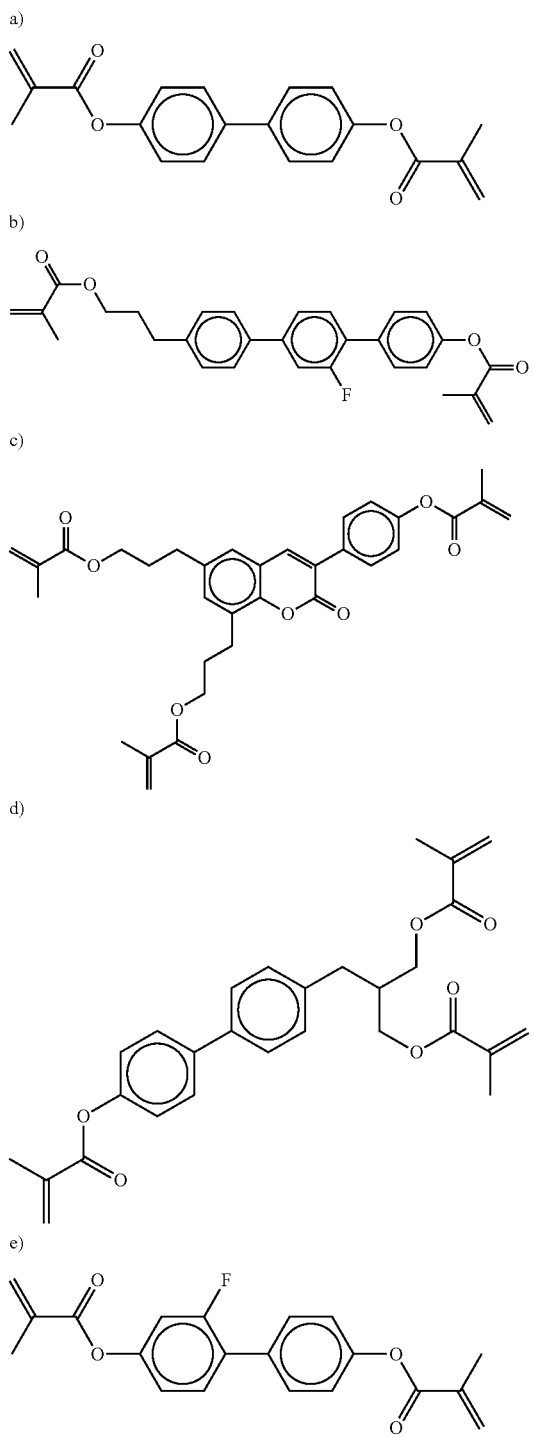

are added to 99.55% of the mixture according to Example M55.

Example M57

| | | | |
|---|---|---|---|
| BCH-32 | 3.00% | Clearing point [° C.]: | 70.5 |
| CC-3-V | 28.00% | Δn [589 nm, 20° C.]: | 0.1064 |
| CC-3-V1 | 10.00% | Δε [1 kHz, 20° C.]: | −2.9 |

-continued

| | | | | |
|---|---|---|---|---|
| CCY-3-O1 | 6.00% | γ₁ [mPa·s, 20° C.]: | 86 | |
| CCY-3-O2 | 11.50% | $K_1$ [pN, 20° C.]: | 13.9 | |
| CPY-3-O2 | 12.00% | $K_3$ [pN, 20° C.]: | 16.4 | |
| CY-3-O2 | 10.50% | $V_0$ [20° C., V]: | 2.53 | |
| PP-1-2V1 | 7.00% | | | |
| PY-3-O2 | 12.00% | | | |

Example M58

0.02% of the compound of the formula

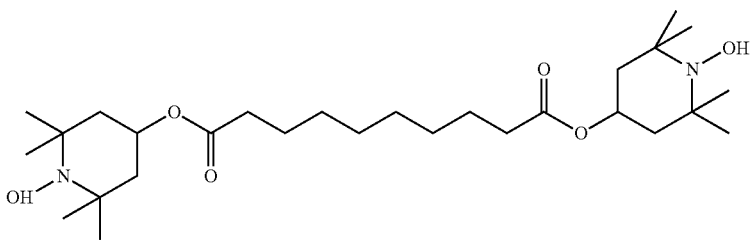 [SMILES: CC1(C)CC(OC(=O)CCCCCCCCC(=O)OC2CC(C)(C)N(O)C(C)(C)C2)CC(C)(C)N1O]

are added to the VA mixture according to Example M57 for stabilization.

Example M59

| | | | |
|---|---|---|---|
| CC-3-V | 29.00% | Clearing point [° C.]: | 80.5 |
| CY-3-O2 | 13.00% | Δn [589 nm, 20° C.]: | 0.1072 |
| CY-5-O2 | 2.00% | Δε [1 kHz, 20° C.]: | −4.4 |
| CCY-3-O2 | 9.00% | γ₁ [mPa·s, 20° C.]: | 131 |
| CCY-4-O2 | 9.00% | $K_1$ [pN, 20° C.]: | 14.3 |
| CCY-5-O2 | 3.00% | $K_3$ [pN, 20° C.]: | 15.9 |
| CPY-2-O2 | 9.50% | $V_0$ [20° C., V]: | 2.00 |
| CPY-3-O2 | 9.50% | | |
| PYP-2-3 | 2.50% | | |
| PY-3-O2 | 10.00% | | |
| CCY-3-O1 | 3.50% | | |

Example M60

0.025% of the compound of the formula

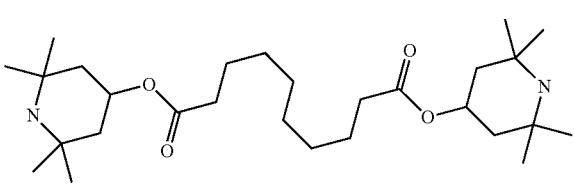

are added to the FFS mixture according to Example M59 for stabilization.

Example M61

| | | | |
|---|---|---|---|
| CC-3-V | 23.50% | Clearing point [° C.]: | 77.8 |
| CCP-V-1 | 15.00% | Δn [589 nm, 20° C.]: | 0.1089 |
| CCY-3-O2 | 3.00% | Δε [1 kHz, 20° C.]: | −2.9 |
| CCY-4-O2 | 13.50% | γ₁ [mPa·s, 20° C.]: | 108 |
| CPY-2-O2 | 2.00% | $K_1$ [pN, 20° C.]: | 12.3 |
| CY-3-O2 | 9.00% | $K_3$ [pN, 20° C.]: | 14.2 |
| CY-5-O2 | 15.00% | $V_0$ [20° C., V]: | 2.33 |
| PY-3-O2 | 2.00% | | |
| PYP-2-3 | 4.00% | | |
| PYP-2-4 | 13.00% | | |

Example M62

| | | | |
|---|---|---|---|
| BCH-32 | 1.50% | Clearing point [° C.]: | 74.4 |
| CC-3-V | 30.00% | Δn [589 nm, 20° C.]: | 0.1051 |
| CC-3-V1 | 9.00% | Δε [1 kHz, 20° C.]: | −3.5 |
| CCY-3-O1 | 7.00% | γ₁ [mPa·s, 20° C.]: | 94 |
| CCY-3-O2 | 11.00% | $K_1$ [pN, 20° C.]: | 13.4 |
| CPY-2-O2 | 11.00% | $K_3$ [pN, 20° C.]: | 14.9 |
| CPY-3-O2 | 11.00% | $V_0$ [20° C., V]: | 2.18 |
| PY-3-O2 | 15.00% | | |
| Y-4O-O4 | 4.50% | | |

Example M63

0.01% of the compound of the formula

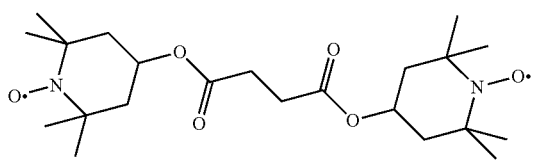

are added to the VA mixture according to Example M62 for stabilization.

Example M64

| | | | |
|---|---|---|---|
| BCH-32 | 4.50% | Clearing point [° C.]: | 74.2 |
| CC-3-V | 21.00% | Δn [589 nm, 20° C.]: | 0.1028 |
| CC-3-V1 | 10.50% | Δε [1 kHz, 20° C.]: | −3.4 |
| CCH-23 | 6.00% | γ₁ [mPa·s, 20° C.]: | 96 |
| CCY-3-O1 | 6.00% | $K_1$ [pN, 20° C.]: | 14.0 |
| CCY-3-O2 | 12.50% | $K_3$ [pN, 20° C.]: | 16.0 |
| CPY-2-O2 | 5.00% | $V_0$ [20° C., V]: | 2.29 |
| CPY-3-O2 | 9.00% | | |
| CY-3-O2 | 10.50% | | |
| PY-3-O2 | 15.00% | | |

Example M65

For the preparation of a PS-VA mixture, 0.01% Irganox-1076 of BASF and 0.3% of the polymerisable compound of the formula

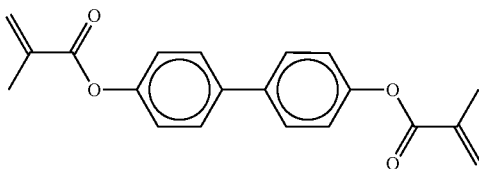

are added to the VA mixture according to Example M64.

Example M66

| | | | |
|---|---|---|---|
| CC-3-V | 36.00% | Clearing point [° C.]: | 77.8 |
| CCP-V-1 | 5.50% | Δn [589 nm, 20° C.]: | 0.1046 |
| CCY-3-O2 | 12.50% | Δε [1 kHz, 20° C.]: | -3.4 |
| CPY-2-O2 | 11.00% | γ₁ [mPa · s, 20° C.]: | 94 |
| CPY-3-O2 | 11.00% | K₁ [pN, 20° C.]: | 13.3 |
| CY-5-O2 | 9.50% | K₃ [pN, 20° C.]: | 15.2 |
| PY-3-O2 | 14.50% | V₀ [20° C., V]: | 2.25 |

Example M67

0.01% of the compound of the formula

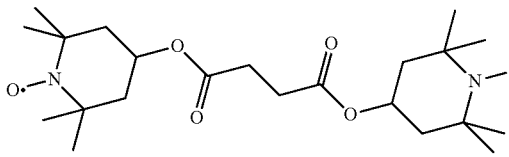

are added to the VA mixture according to Example M66 for stabilization.

Example M68

| | | | |
|---|---|---|---|
| BCH-32 | 1.50% | Clearing point [° C.]: | 74.4 |
| CC-3-V | 30.00% | Δn [589 nm, 20° C.]: | 0.1051 |
| CC-3-V1 | 9.00% | Δε [1 kHz, 20° C.]: | -3.5 |
| CCY-3-O1 | 7.00% | γ₁ [mPa · s, 20° C.]: | 94 |
| CCY-3-O2 | 11.00% | K₁ [pN, 20° C.]: | 13.4 |
| CPY-2-O2 | 11.00% | K₃ [pN, 20° C.]: | 14.9 |
| CPY-3-O2 | 11.00% | V₀ [20° C., V]: | 2.18 |
| PY-3-O2 | 15.00% | | |
| Y-4O-O4 | 4.50% | | |

Example M69

0.01% of the compound of the formula

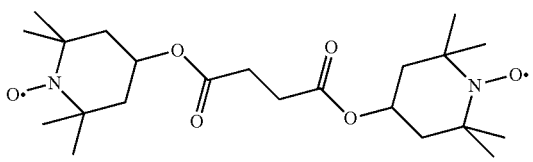

are added to the VA mixture according to Example M68 for stabilization.

Example M70

| | | | |
|---|---|---|---|
| BCH-32 | 4.00% | Clearing point [° C.]: | 74.8 |
| CC-3-V1 | 8.00% | Δn [589 nm, 20° C.]: | 0.1057 |
| CCH-23 | 13.00% | Δε [1 kHz, 20° C.]: | -3.5 |
| CCH-34 | 7.00% | γ₁ [mPa · s, 20° C.]: | 115 |
| CCH-35 | 7.00% | K₁ [pN, 20° C.]: | 14.8 |
| CCY-3-O2 | 13.00% | K₃ [pN, 20° C.]: | 15.8 |
| CPY-2-O2 | 7.00% | V₀ [20° C., V]: | 2.23 |
| CPY-3-O2 | 12.00% | | |
| CY-3-O2 | 12.00% | | |
| PCH-301 | 2.00 | | |
| PY-3-O2 | 15.00 | | |

Example M71

For the preparation of a PS-VA mixture, 0.4% of the polymerisable compound of the formula

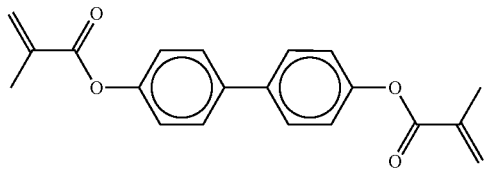

are added to the VA mixture according to Example M70.

Example M72

For the preparation of a PS-VA mixture, 0.35% of the polymerisable compound of the formula

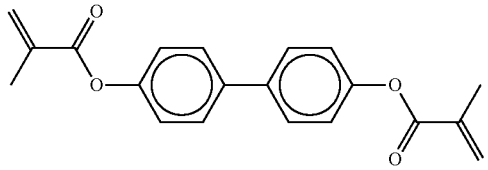

are added to the VA mixture according to Example M70.

Example M73

| | | | |
|---|---|---|---|
| CC-3-V | 28.00% | Clearing point [° C.]: | 77.2 |
| CC-3-V1 | 4.00% | Δn [589 nm, 20° C.]: | 0.1053 |
| CCH-34 | 7.00% | Δε [1 kHz, 20° C.]: | -3.4 |
| CCY-3-1 | 2.00% | γ₁ [mPa · s, 20° C.]: | 105 |
| CCY-3-O3 | 12.00% | K₁ [pN, 20° C.]: | 14.0 |
| CCY-4-O2 | 5.00% | K₃ [pN, 20° C.]: | 14.2 |
| CPY-2-O2 | 12.00% | V₀ [20° C., V]: | 2.17 |
| CPY-3-O2 | 10.00% | | |
| PY-3-O2 | 10.00% | | |
| PY-4-O2 | 10.00% | | |

Example M74

| | | | |
|---|---|---|---|
| BCH-32 | 6.00% | Clearing point [° C.]: | 76.6 |
| CCH-23 | 16.00% | Δn [589 nm, 20° C.]: | 0.0935 |
| CCH-301 | 3.00% | Δε [1 kHz, 20° C.]: | -2.6 |
| CCH-34 | 6.00% | $\gamma_1$ [mPa · s, 20° C.]: | 107 |
| CCH-35 | 6.00% | $K_1$ [pN, 20° C.]: | 14.8 |
| CCP-3-1 | 12.00% | $K_3$ [pN, 20° C.]: | 15.4 |
| CY-3-O2 | 15.00% | $V_0$ [20° C., V]: | 2.59 |
| CCY-3-O1 | 5.00% | | |
| CCY-3-O2 | 8.00% | | |
| CPY-3-O2 | 8.50% | | |
| PCH-302 | 5.00% | | |
| PY-1-O4 | 3.50% | | |
| PY-4-O2 | 6.00% | | |

Example M75

| | | | |
|---|---|---|---|
| BCH-32 | 8.00% | Clearing point [° C.]: | 75.5 |
| CCH-23 | 15.00% | Δn [589 nm, 20° C.]: | 0.0940 |
| CCH-301 | 9.00% | Δε [1 kHz, 20° C.]: | -2.3 |
| CCH-34 | 5.00% | $\gamma_1$ [mPa · s, 20° C.]: | 95 |
| CCH-35 | 5.00% | $K_1$ [pN, 20° C.]: | 14.4 |
| CCP-3-1 | 8.00% | $K_3$ [pN, 20° C.]: | 14.1 |
| CCP-3-3 | 3.50% | $V_0$ [20° C., V]: | 2.61 |
| CCY-3-O1 | 5.00% | | |
| CCY-3-O2 | 8.00% | | |
| CPY-2-O2 | 6.00% | | |
| CPY-3-O2 | 8.00% | | |
| PCH-302 | 6.00% | | |
| PY-1-O4 | 2.50% | | |
| PY-4-O2 | 4.00% | | |
| Y-4O-O4 | 7.00% | | |

Example M76

| | | | |
|---|---|---|---|
| BCH-32 | 8.00% | Clearing point [° C.]: | 76.4 |
| CCH-23 | 15.00% | Δn [589 nm, 20° C.]: | 0.0951 |
| CCH-301 | 5.50% | Δε [1 kHz, 20° C.]: | -2.4 |
| CCH-34 | 5.00% | $\gamma_1$ [mPa · s, 20° C.]: | 96 |
| CCH-35 | 5.00% | $K_1$ [pN, 20° C.]: | 15.1 |
| CCP-3-1 | 12.00% | $K_3$ [pN, 20° C.]: | 15.0 |
| CCY-3-O1 | 4.00% | $V_0$ [20° C., V]: | 2.61 |
| CCY-3-O2 | 6.00% | | |
| CPY-3-O2 | 8.00% | | |
| CLY-3-O2 | 8.00% | | |
| PCH-302 | 8.00% | | |
| PY-1-O4 | 3.50% | | |
| PY-4-O2 | 4.00% | | |
| Y-4O-O4 | 8.00% | | |

Example M77

0.01% of the compound of the formula

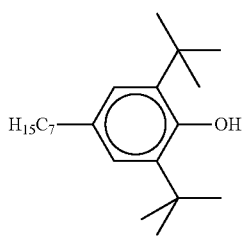

are added to the VA mixture according to Example M71 for stabilization.

What is claimed is:

1. A liquid-crystalline medium having a nematic phase comprising:
at least two compounds of the formula I,

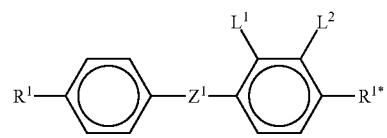

in which $R^1$ and $R^{1*}$ each, independently of one another, denote an alkyl or alkoxy radical having 1 to 15 C atoms, where, in addition, one or more $CH_2$ groups in these radicals may each be replaced, independently of one another, by —C≡C—, —CF$_2$O-, —CH=CH—,

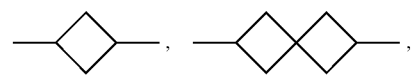

—O—, —CO—O—, —O—CO— in such a way that O atoms are not linked directly to one another, and in which, in addition, one or more H atoms may be replaced by halogen,
$Z^1$ denotes a single bond, —CH$_2$CH$_2$-, —CH=CH—, —CH$_2$O—, —OCH$_2$—, -CF$_2$O—, —OCF$_2$-, —COO—, —OCO—, —C$_2$F$_4$-, -CF=CF—, or —CH=CHCHO—,
$L^1$ and $L^2$ each, independently of one another, denote F, Cl, CF$_3$, OCF$_3$, or CHF$_2$;
a compound of the formula,

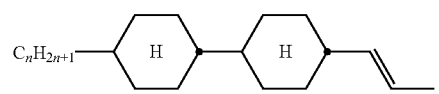

in which n=3; and
at least one compound of the formula O-16,

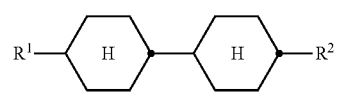

in which $R^1$ and $R^2$ each, Independently of one another, denote H, an alkyl radical having up to 15 C atoms which is unsubstituted, monosubstituted by CN or CF$_3$, or at least monosubstituted by halogen, and wherein, in addition, one or more CH$_2$ groups in the alkyl radical may be replaced by —O—, —S—,

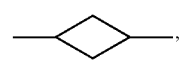

—C≡C—, —CF₂O—, —OCF₂-, —OC—O—, or —O—CO— in such a way that O atoms are not linked directly to one another.

2. A liquid-crystalline medium according to claim 1, wherein the proportion of the compounds in the medium as a whole is 5-65% by weight.

3. A liquid-crystalline medium according to claim 1 further comprising one or more compounds of the formula III,

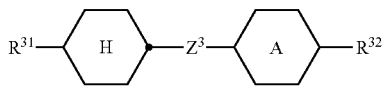

in which
R³¹ and R³² each, independently of one another, denote a straight-chain alkyl, alkoxyalkyl or alkoxy radical having up to 12 C atoms, and

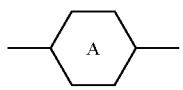

denotes

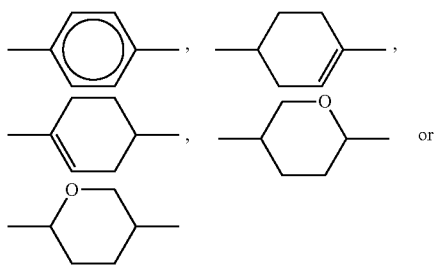

Z³ denotes a single bond, —CH₂CH₂-, —CH=CH—, —CF₂O—, —OCF₂-, —OCH₂O-, —OCH₂—, —COO—, —OCO—, —C₂F₄-, -C₄H₈-, -CF=CF—.

4. A liquid-crystalline medium according to claim 1 further comprising one or more compounds of the formula L-1 to L-11,

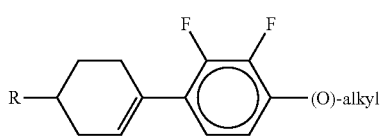

L-1

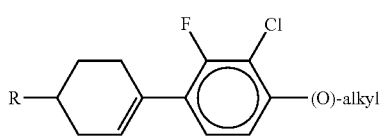

L-2

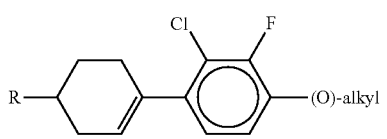

L-3

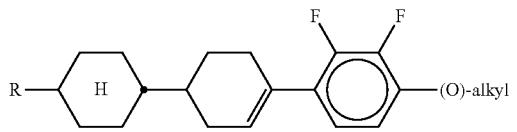

L-4

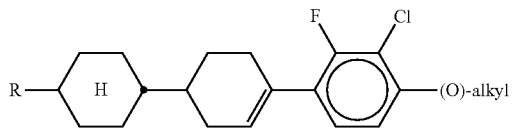

L-5

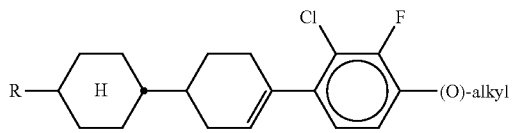

L-6

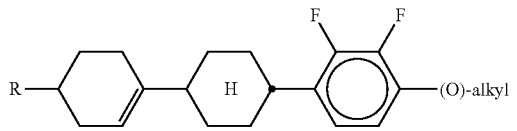

L-7

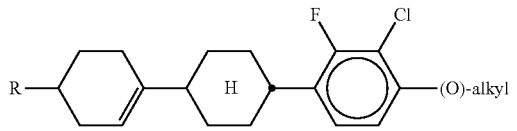

L-8

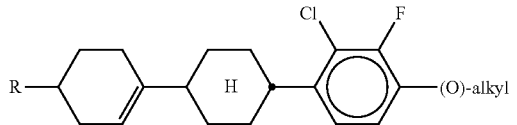

L-9

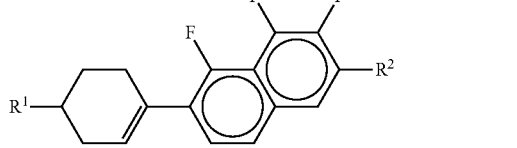

L-10

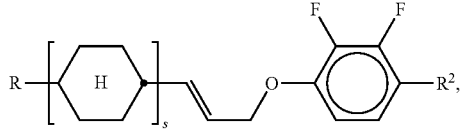

L-11 in which
R, R¹ and R² each, independently of one another, denote H, an alkyl radical having up to 15 carbon atoms, which is unsubstituted, mono-substituted by CN or CF₃ or at least mono-substituted by halogen, and one or more CH₂ groups in these radicals may be replaced —O—,—S—,

—C—, —CF$_2$O—, —OCF$_2$—, —OC—O— or —O—CO— in such a way that oxygen atoms are not linked directly to on another, and alkyl denotes an alkyl radical having 1-6 C atoms, and
s denotes 1 or 2.
5. A liquid-crystalline medium according to claim 1 further comprising one or more terphenyls of the formulae T-1 to T-21,
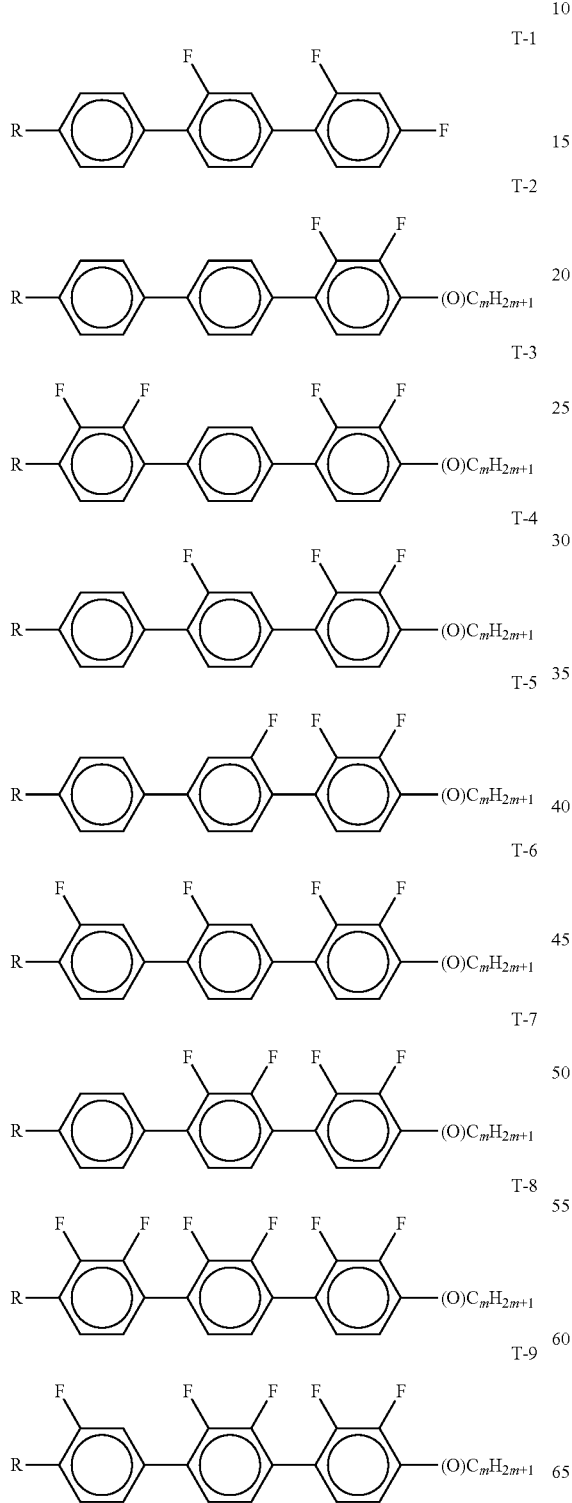
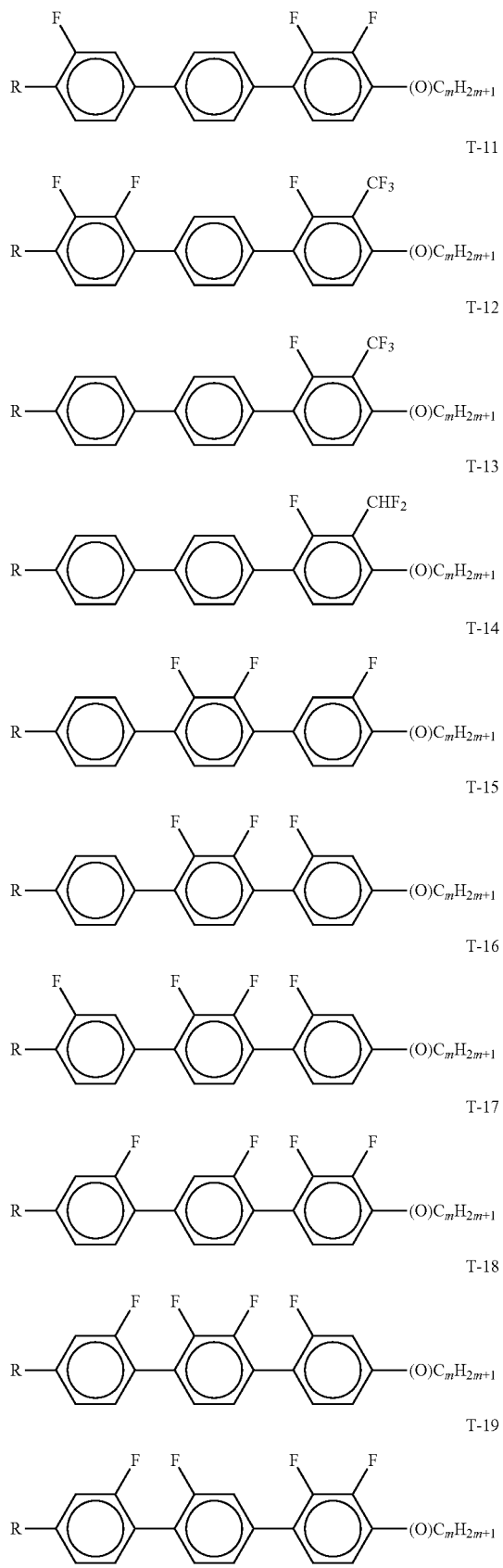

T-20

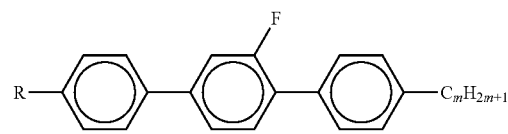

T-21

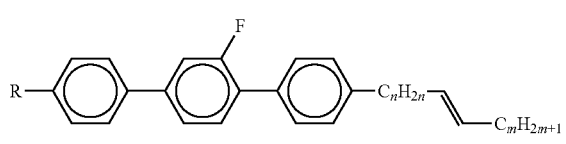

in which

R denotes a straight-chain alkyl or alkoxy radical having 1-7 C atoms, and m denotes 1-6.

6. A liquid-crystalline medium according to claim 1 further comprising one or more compounds of the formulae O-1 to O-17,

O-1

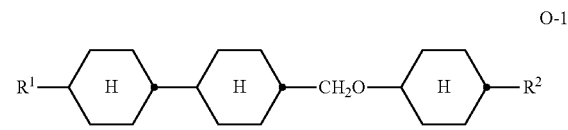

O-2

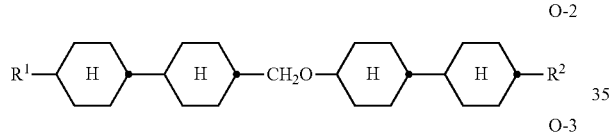

O-3

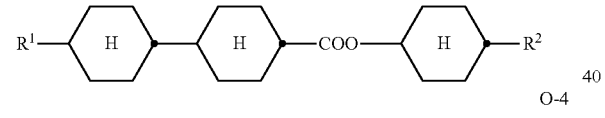

O-4

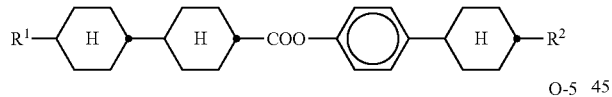

O-5

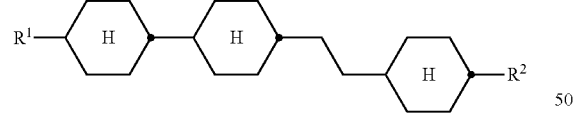

O-6

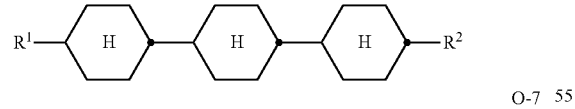

O-7

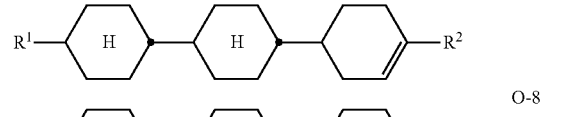

O-8

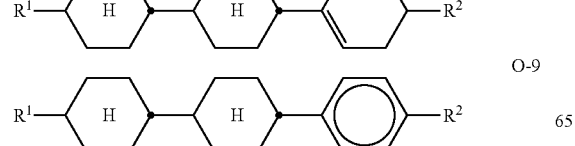

O-9

O-10

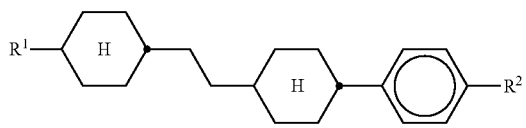

O-11

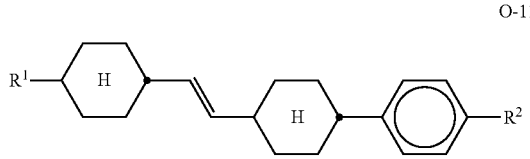

O-12

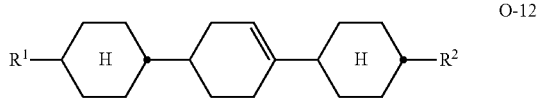

O-13

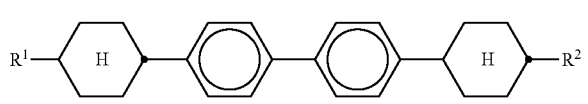

O-14

O-15

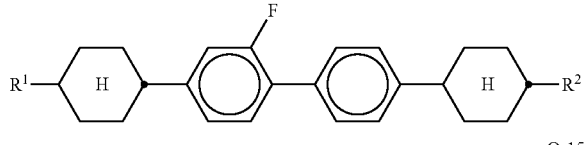

O-16

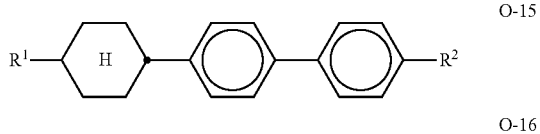

O-17

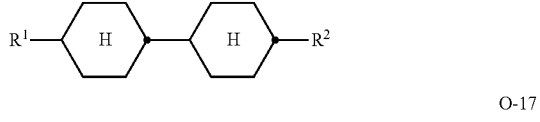

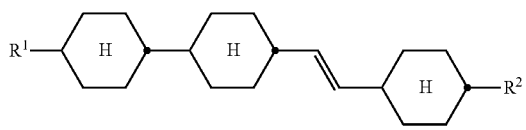

in which

R$^1$ and R$^2$ each, independently of one another, denote H, an alkyl radical having up to 15 C atoms which is unsubstituted, monosubstituted by CN or CF$_3$ or at least monosubstituted by halogen, where, in addition, one or more CH$_2$ groups in these radicals may be replaced by —O—, —S—,

—≡C—, —CF$_2$O—, —OCF$_2$—, —OC—O— or —O—CO— in such a way that O atoms are not linked directly to one another.

7. A liquid-crystalline medium according to claim 1 further comprising one or more indane compounds of the formula In,

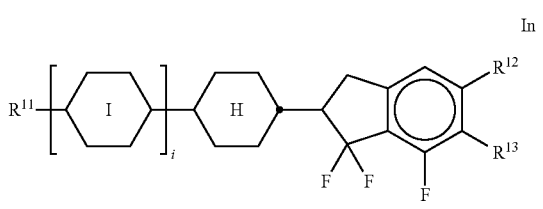

in which

R$^{11}$, R$^{12}$, R$^{13}$ denote a straight-chain alkyl, alkoxy, alkoxyalkyl or alkenyl radical having 1-5 C atoms, R$^{12}$ and R$^{13}$ additionally also denote halogen,

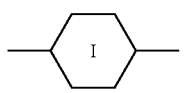

denotes

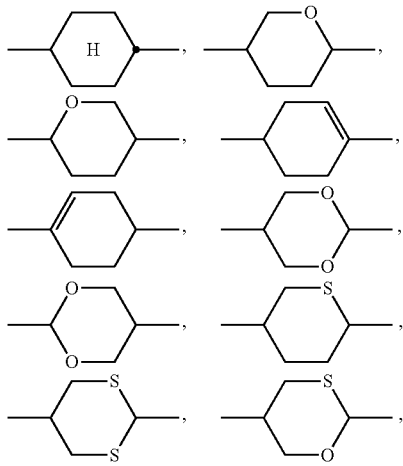

denotes 0, 1 or 2.

8. A liquid-crystalline medium according to claim 1 further comprising one or more indane compounds of the formula P4

P4

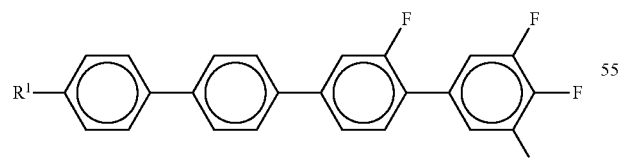

in which

R$^{1}$ denotes an alkyl or alkoxy radical having 1 to 15 C atoms, where, in addition, one or more CH$_2$ groups in these radicals may each be replaced independently of one another, by —C≡C—, —CF$_2$O—, —CH=CH—,

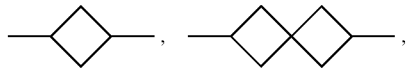

—CO—O—, —O—CO— in such a way that O atoms are not linked directly to one another, and in which, in addition, one or more H atoms may be replaced by halogen.

9. A process for the preparation of a liquid-crystalline medium according to claim 1, wherein at least one compound of the formula I is mixed with at least one further liquid-crystalline compound, and one or more additives are optionally added.

10. A process according to claim 9, wherein the additive is selected from the group consisting of stabilisers, antioxidants, UV absorbers, nanoparticles, microparticles, polymerisable compounds, dopants and free-radical initiators.

11. An electro-optical display comprising the liquid-crystalline medium according to claim 1.

12. An electro-optical display having active-matrix addressing, wherein the electro-optical display contains, as dielectric, a liquid-crystalline medium according to claim 1.

13. The electro-optical display according to claim 12, wherein the electro-optical display is a VA, PSA, PS-VA, PALC, FFS, PS-FFS, IPS or PS-IPS display.

14. The liquid-crystalline medium according to claim 1 further comprising one or more compounds selected from the compounds of formulae BC, CR, PH-1, PH-2 and BF,

BC

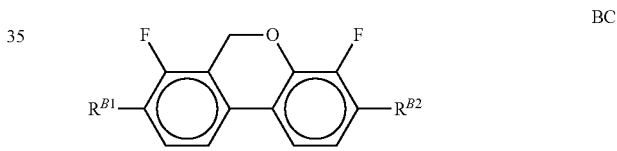

CR

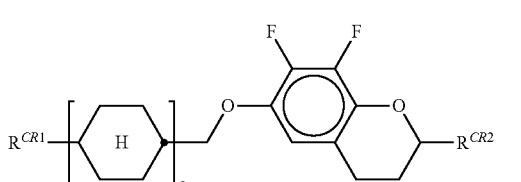

PH-1

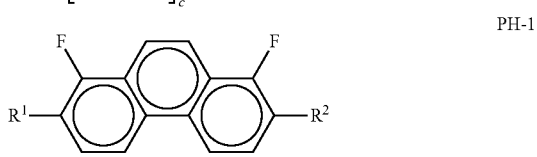

PH-2

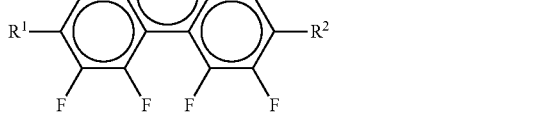

BF

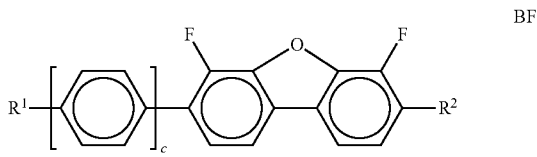

in which $R^{B1}$, $R^{B2}$, $R^{CR1}$, $R^{CR2}$, $R^1$, $R^2$
each, independently of one another, denote H, an alkyl radical having up to 15 C atoms which is unsubstituted, monosubstituted by CN or CF$_3$ or at least monosubstituted by halogen, where, in addition, one or more CH$_2$ groups in these radicals may be replaced by —O—, —S—,

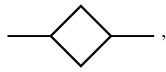

—C≡C—, —CF$_2$O—, —OCF$_2$-, —OC—O— or —O—CO— in such a way that O atoms are not linked directly to one another, c is 0, 1 or 2.

15. The liquid-crystalline medium according to claim 1 further comprising one or more additives selected from the group consisting of stabilisers, antioxidants, UV absorbers, nanoparticles, microparticles, and a combination thereof.

16. The liquid-crystalline medium according to claim 1 further comprising one or more additives selected from the following compounds:

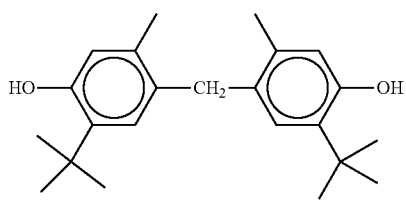 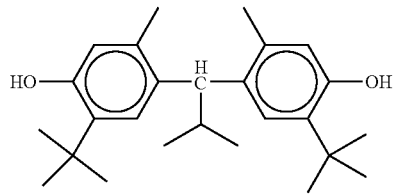

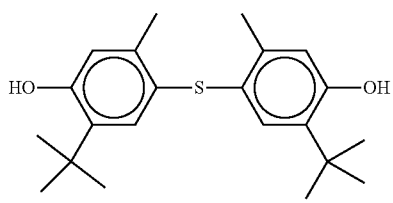 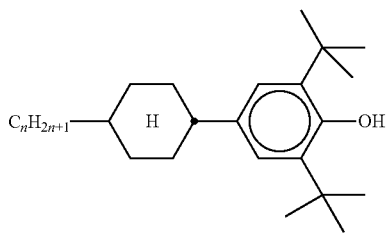

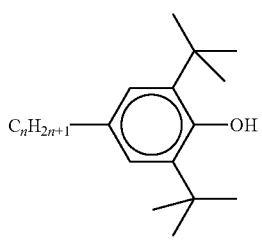 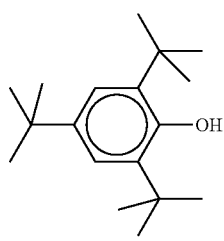 in which n = 1, 2, 3, 4, 5, 6 or 7 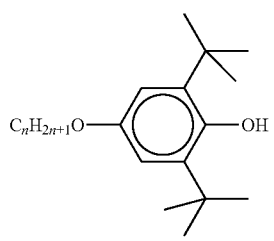

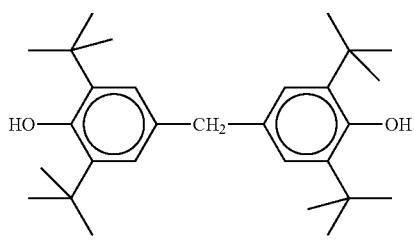 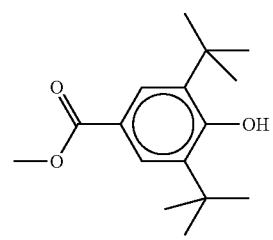 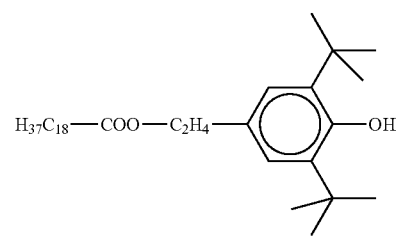

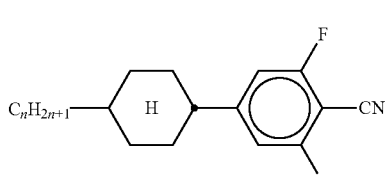 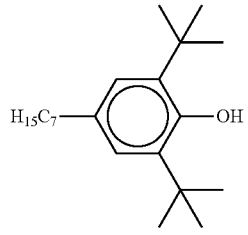 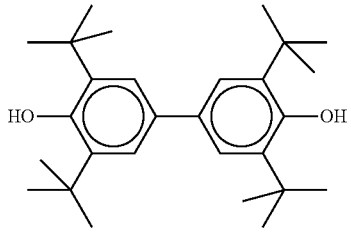

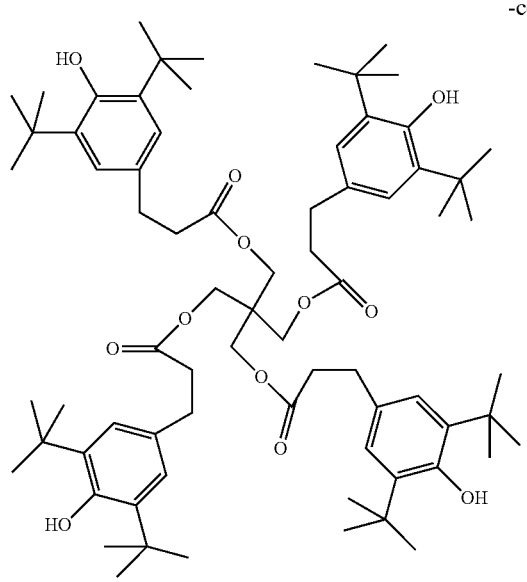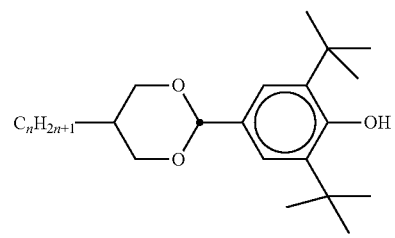
in which n = 1, 2, 3, 4, 5, 6 or 7
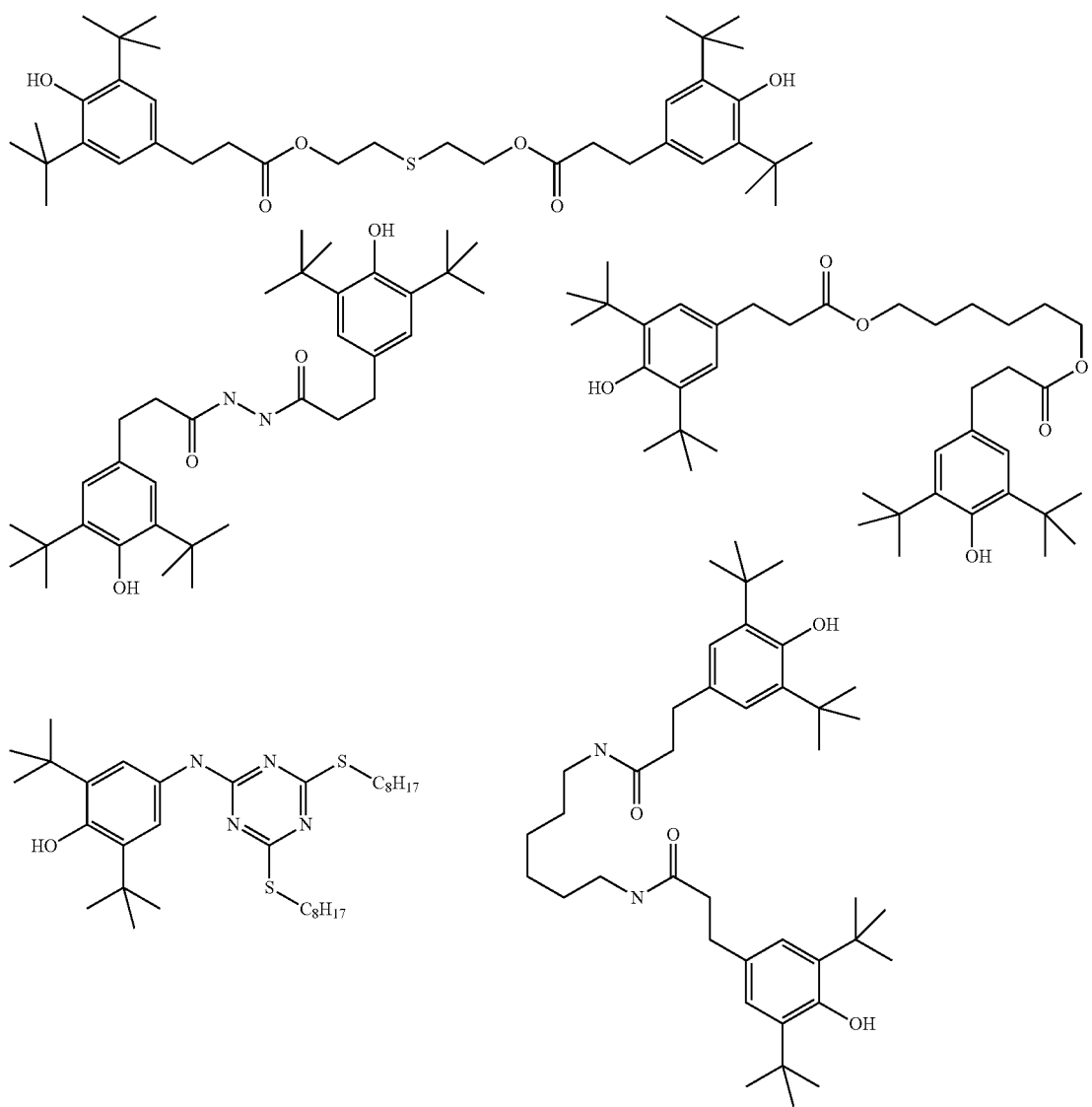

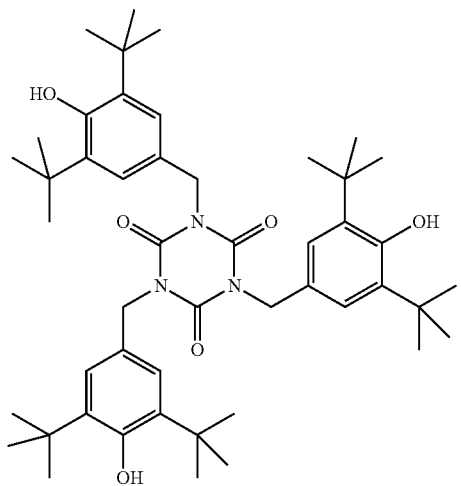
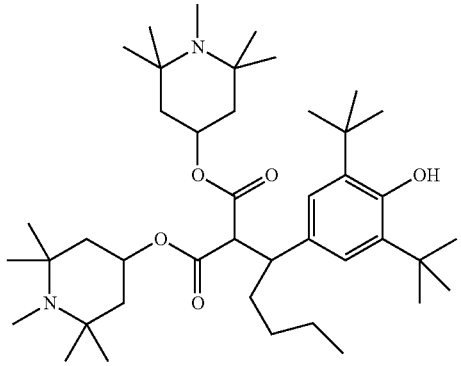
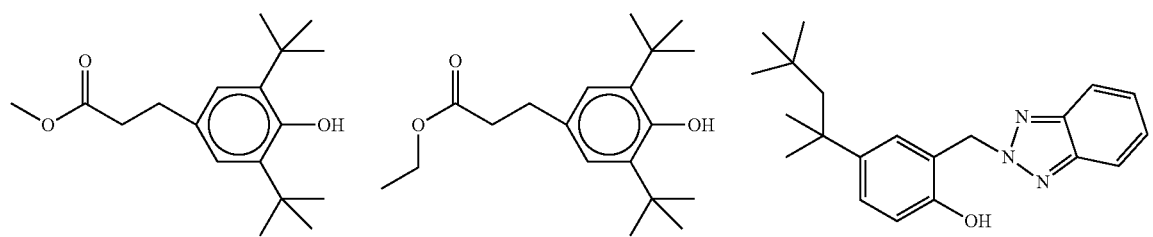
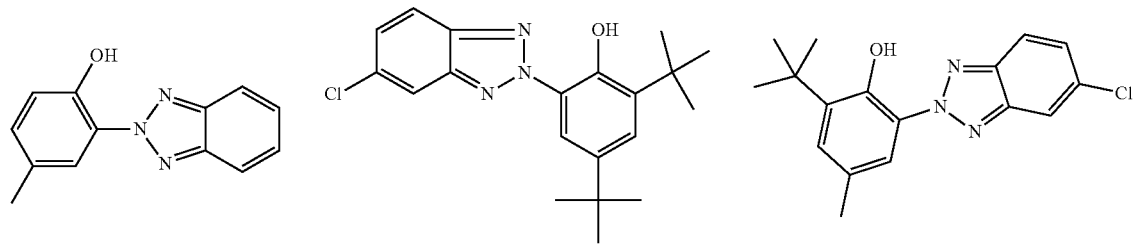
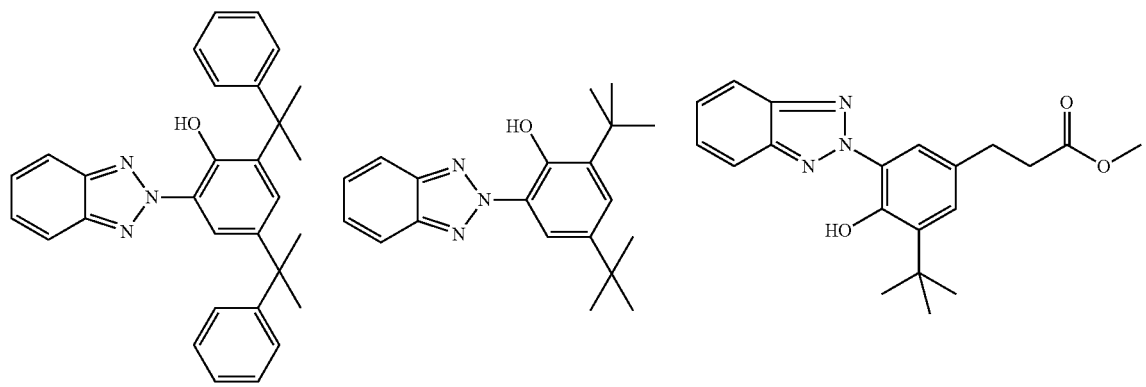

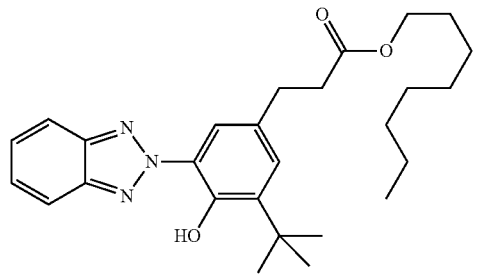
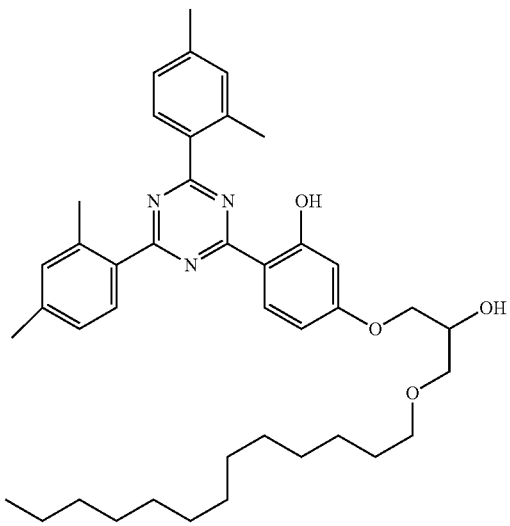
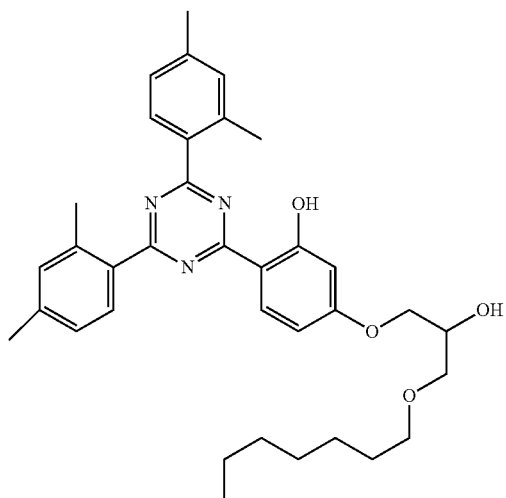
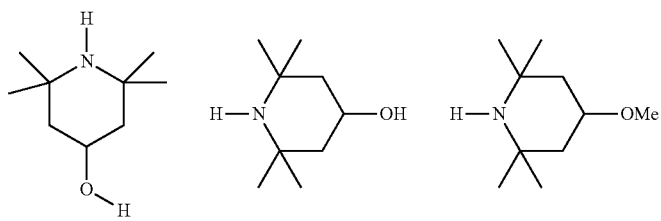
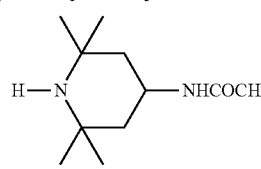
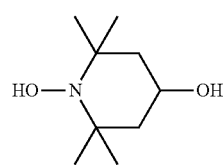
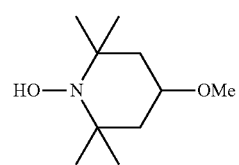
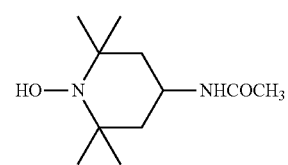
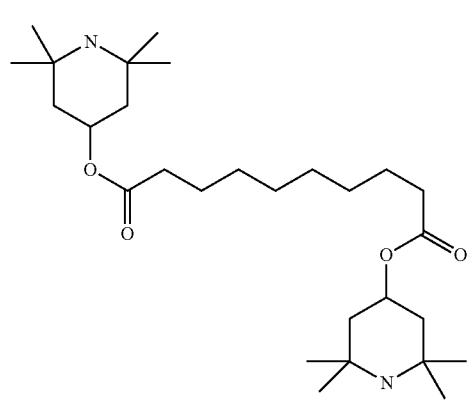
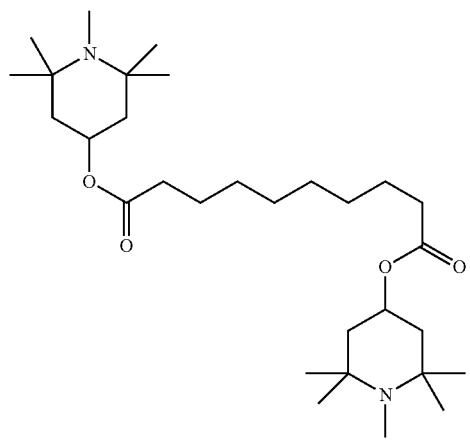

183
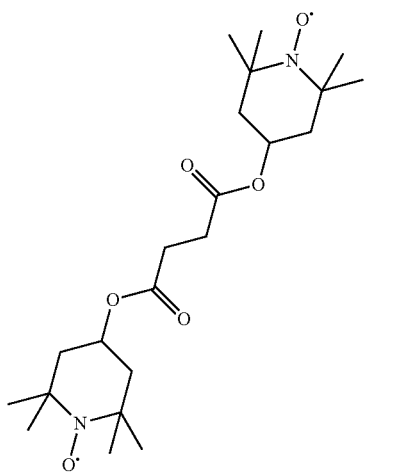
184
-continued
17. The liquid-crystalline medium according to claim 1 further comprising one or more BHT derivatives.
18. A liquid-crystalline medium according to claim 1, wherein the at least two compounds of formula I are each independently selected from formulae I-2 to I-145,
I-2
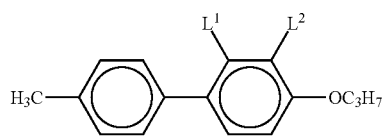
I-3
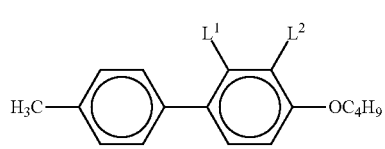
I-4
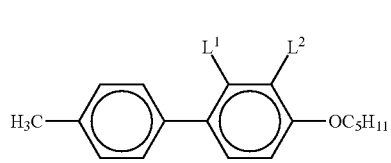
I-5
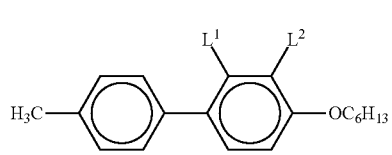
I-6
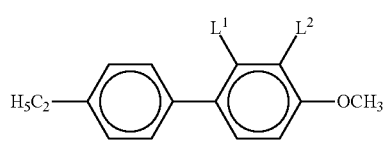
-continued
I-7
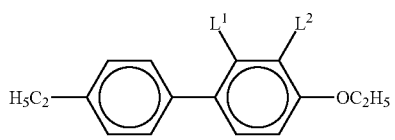
I-8
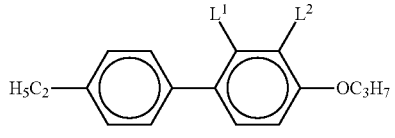
I-9
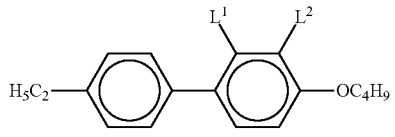
I-10
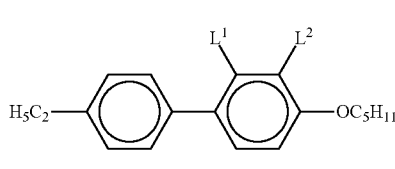
I-11
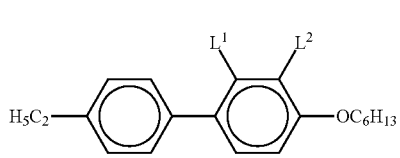
I-12
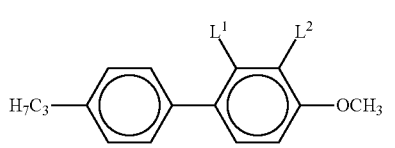

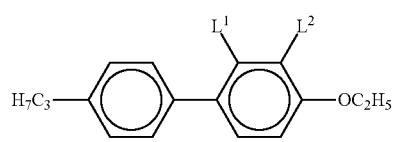
I-13
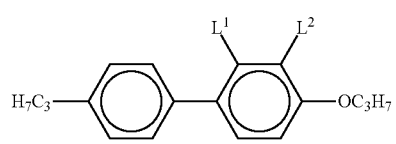
I-14
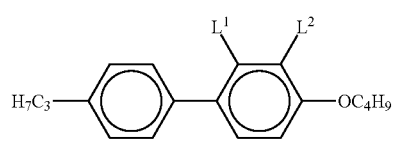
I-15
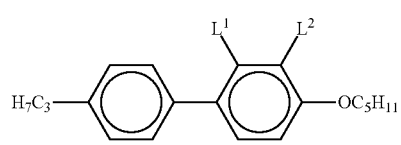
I-16
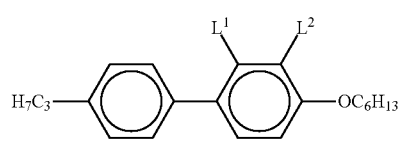
I-17
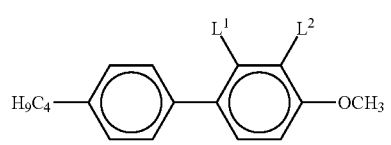
I-18
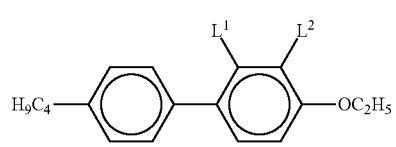
I-19
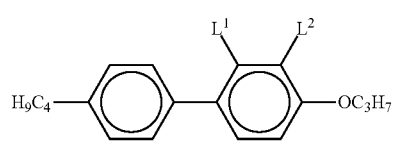
I-20
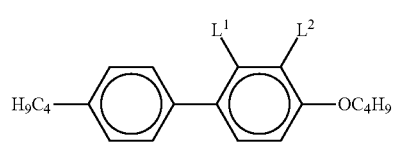
I-21
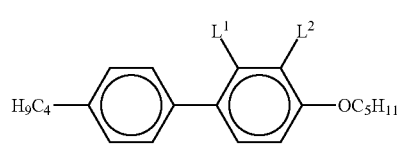
I-22
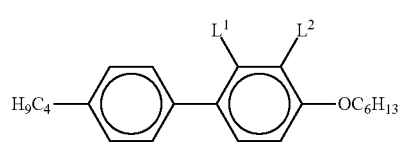
I-23
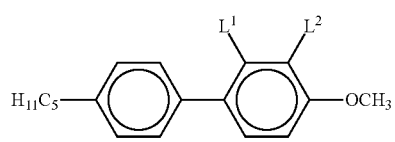
I-24
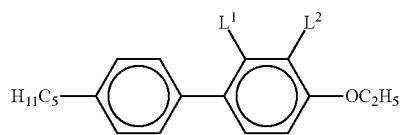
I-25
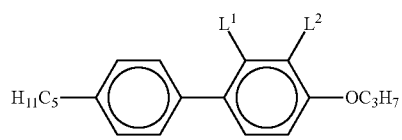
I-26
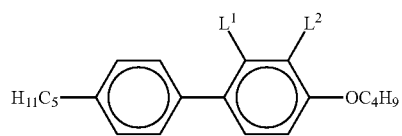
I-27
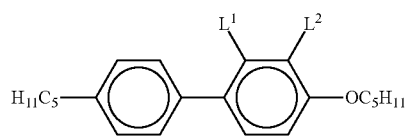
I-28
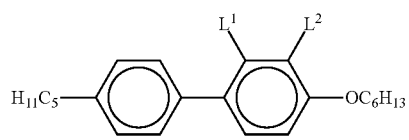
I-29
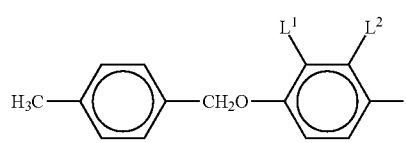
I-30
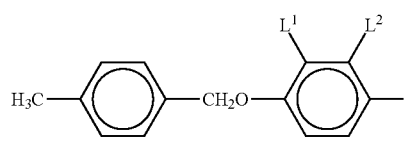
I-31
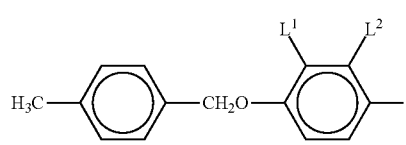
I-32
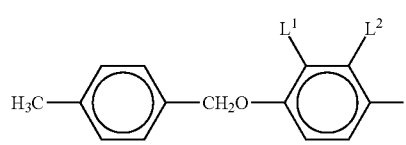
I-33
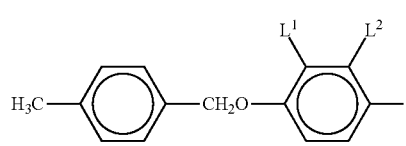
I-34

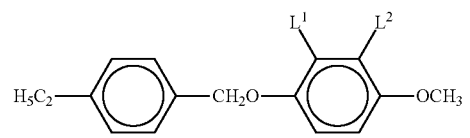
I-35
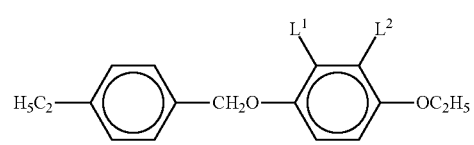
I-36
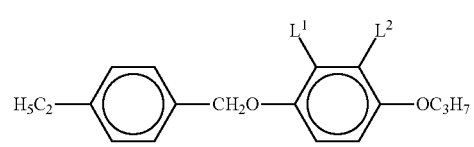
I-37
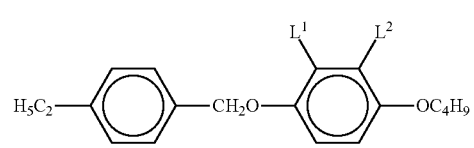
I-38
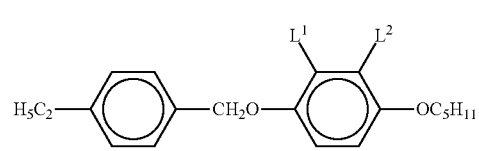
I-39
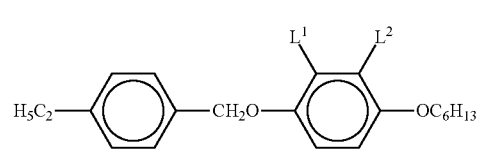
I-40
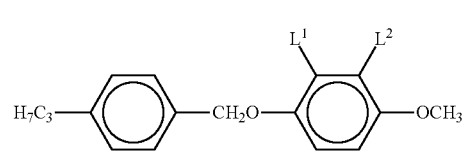
I-41
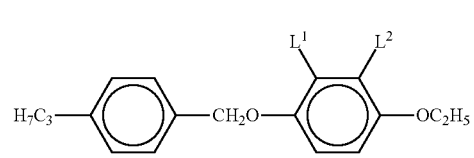
I-42
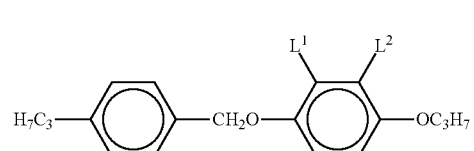
I-43
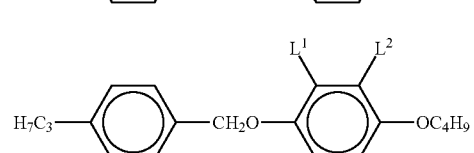
I-44
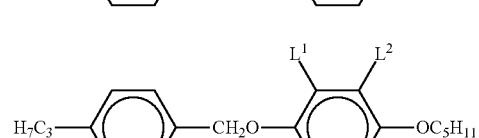
I-45
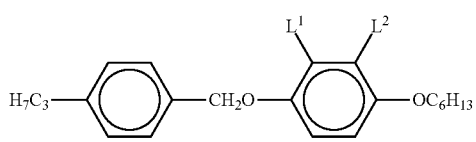
I-46
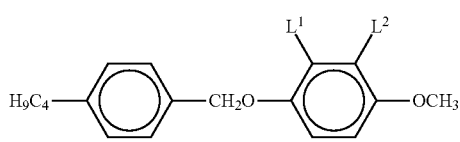
I-47
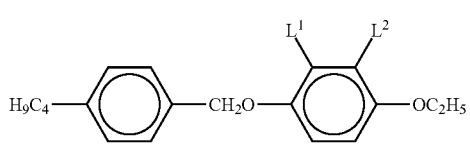
I-48
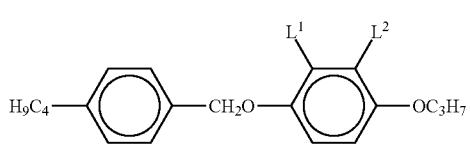
I-49
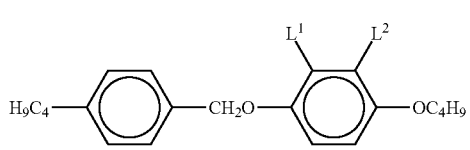
I-50
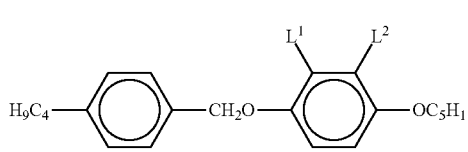
I-51
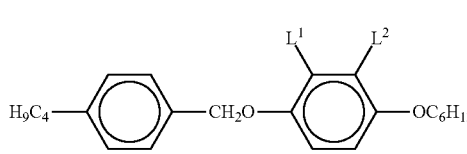
I-52
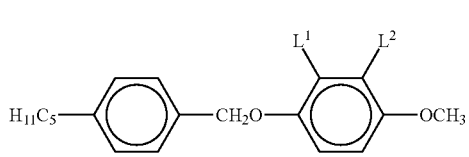
I-53
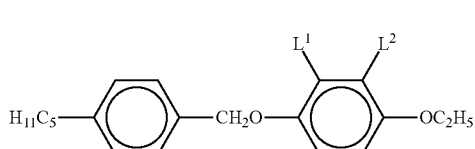
I-54
I-55
I-56

I-57 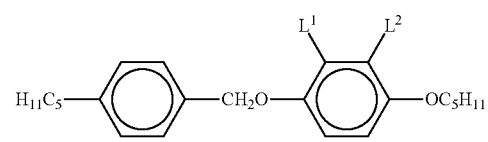
I-58 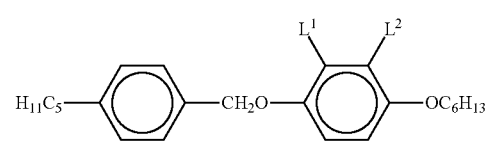
I-59 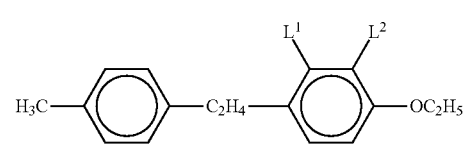
I-60 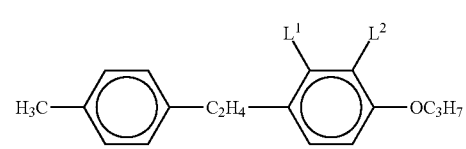
I-61 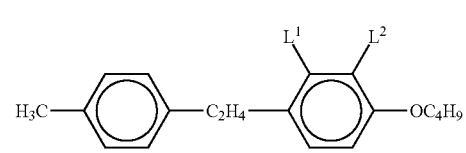
I-62 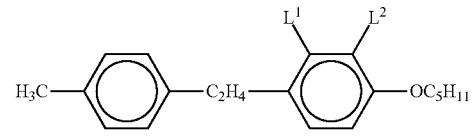
I-63 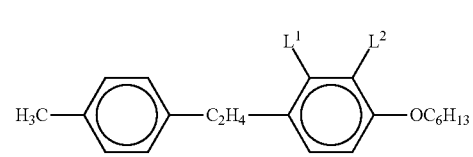
I-64 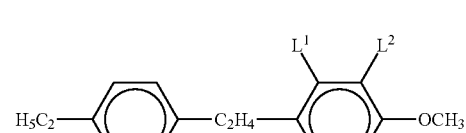
I-65 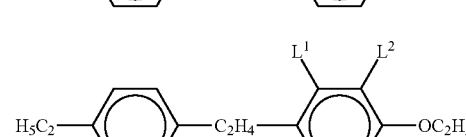
I-66 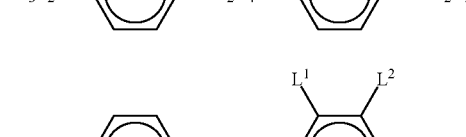
I-67 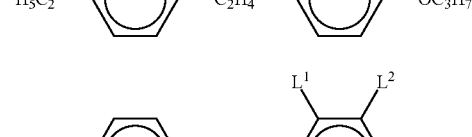
I-68 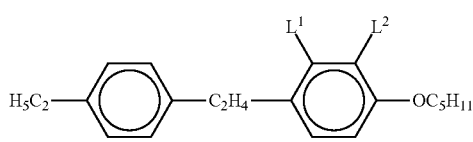
I-69 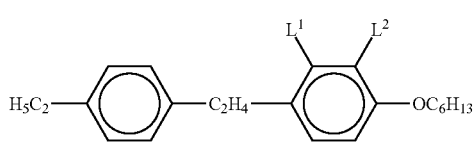
I-70 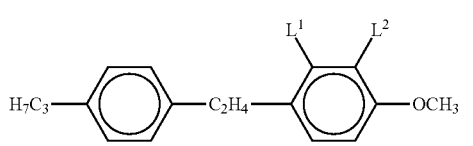
I-71 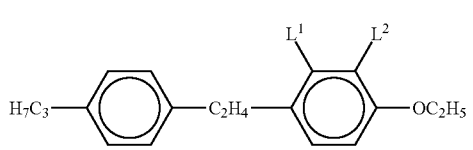
I-72 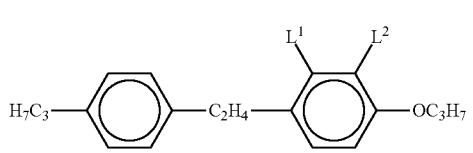
I-73 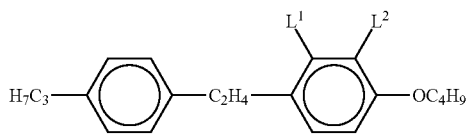
I-74 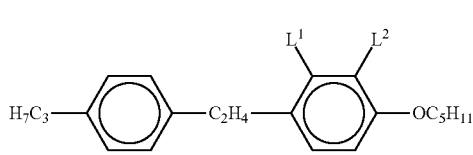
I-75 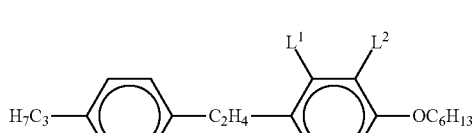
I-76 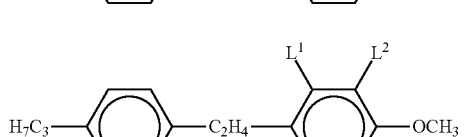
I-77 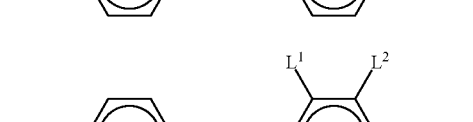
I-78 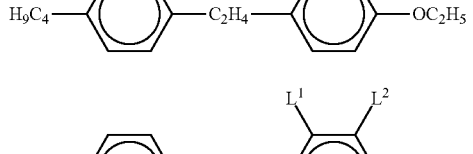

I-79 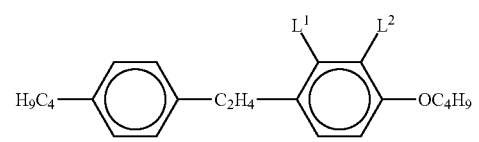
I-80 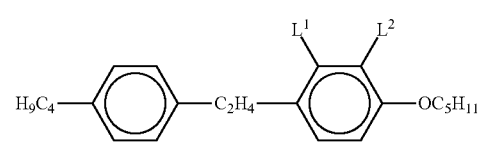
I-81 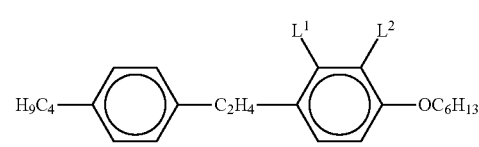
I-82 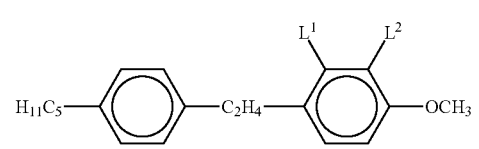
I-83 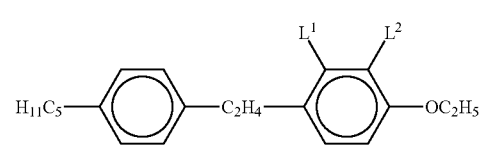
I-84 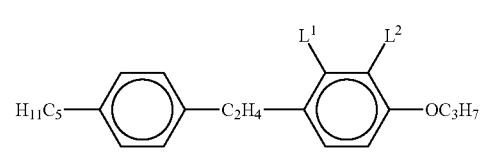
I-85 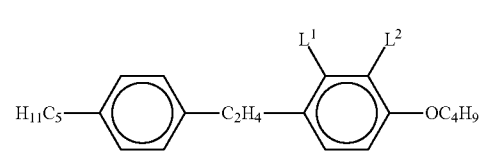
I-86 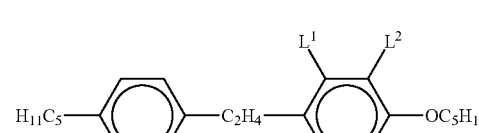
I-87 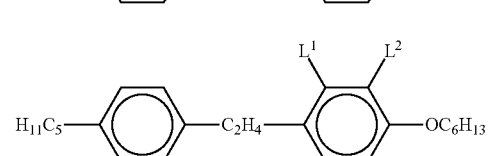
I-88 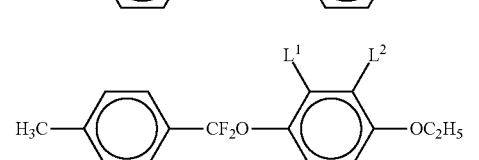
I-89 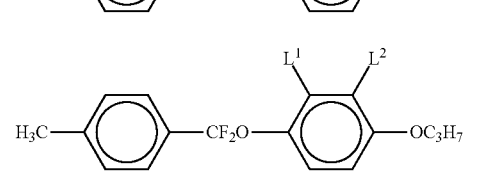
I-90 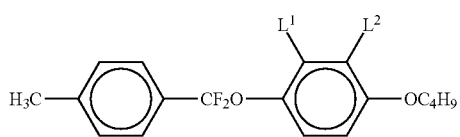
I-91 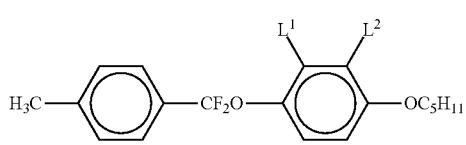
I-92 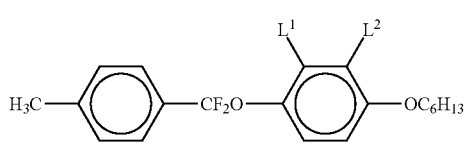
I-93 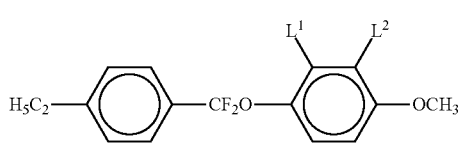
I-94 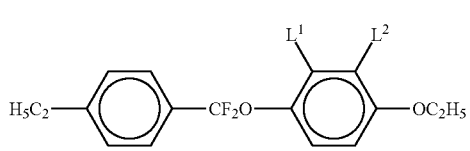
I-95 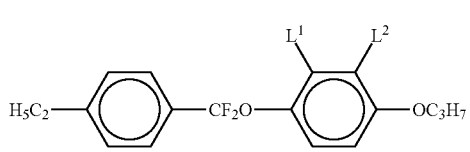
I-96 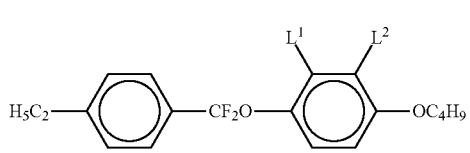
I-97 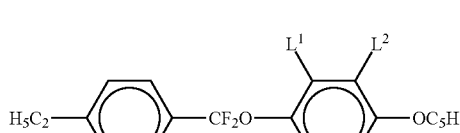
I-98 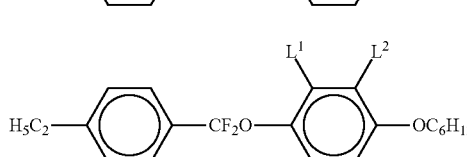
I-99 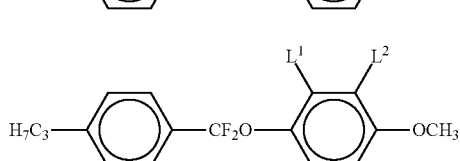
I-100 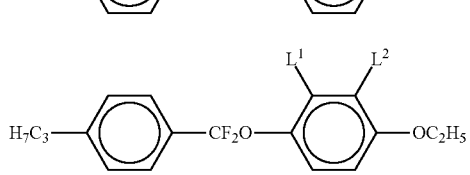

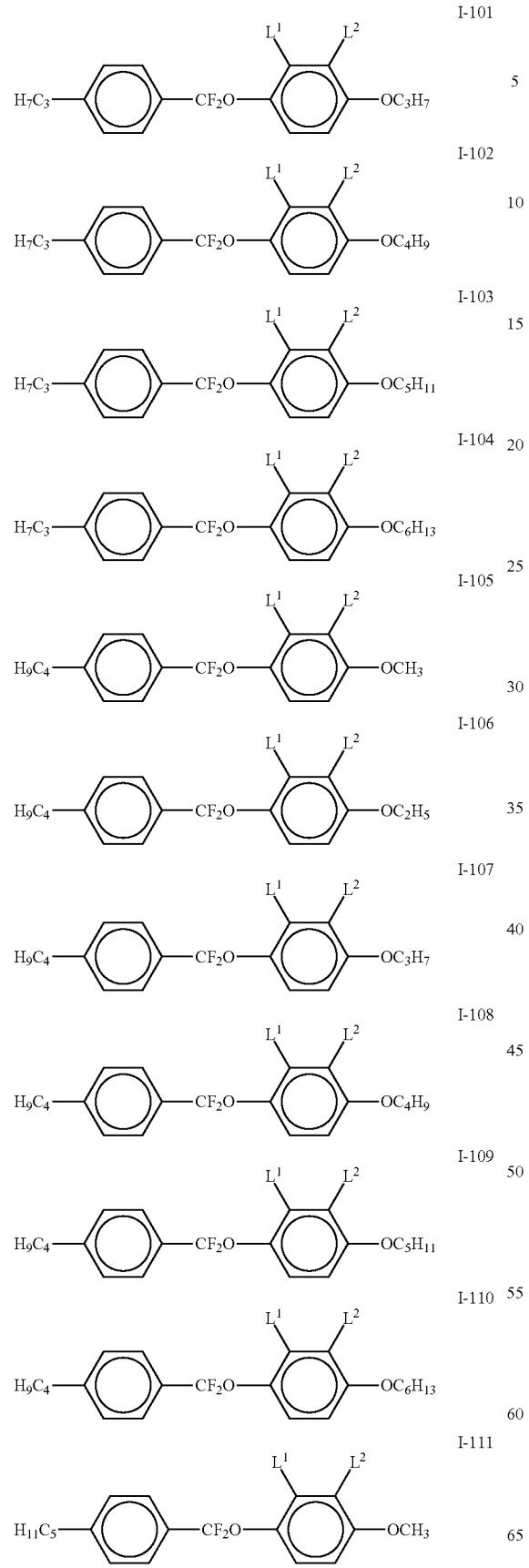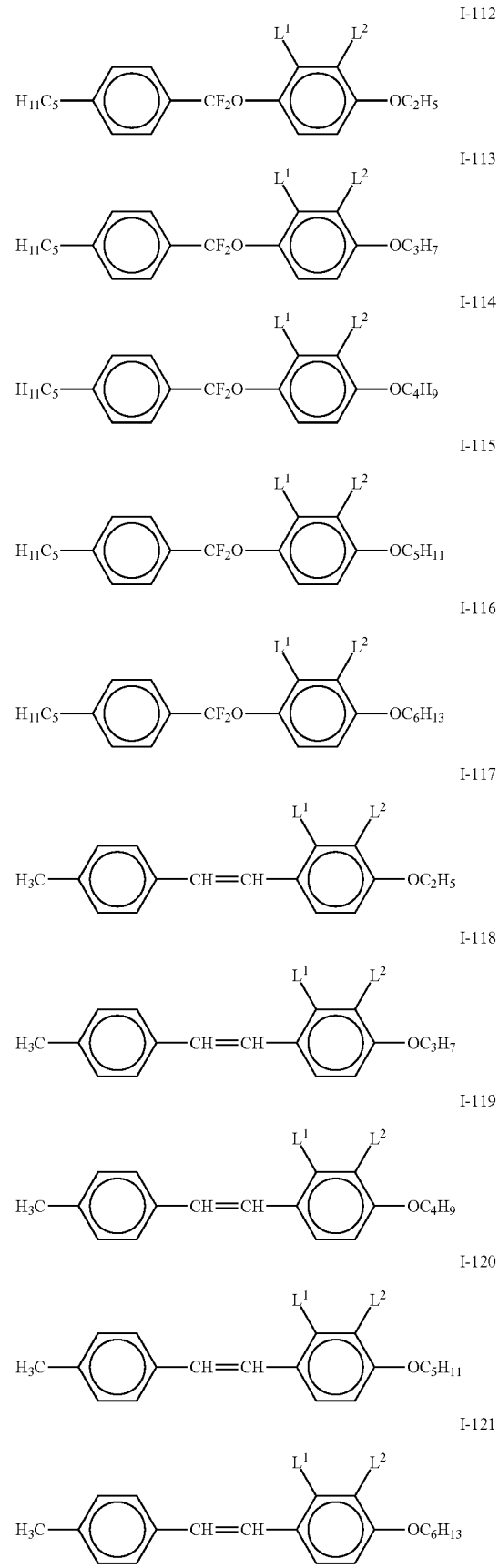

I-122
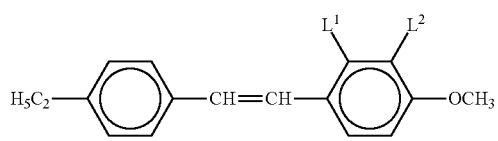
I-123
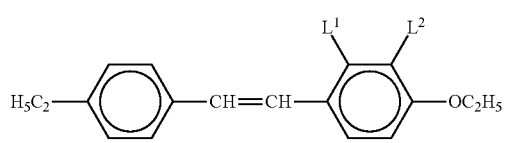
I-124
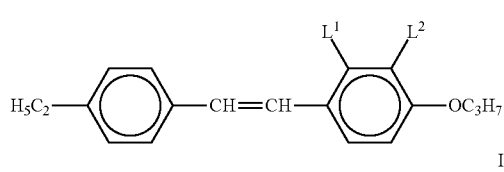
I-125
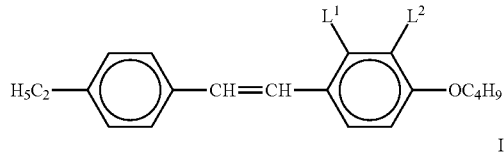
I-126
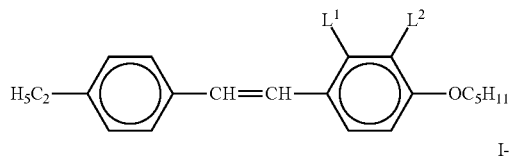
I-127
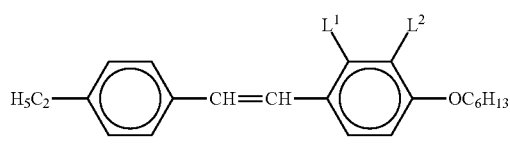
I-128
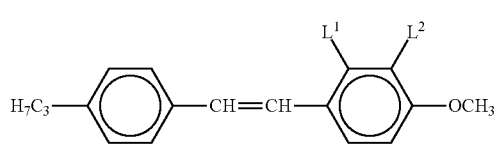
I-129
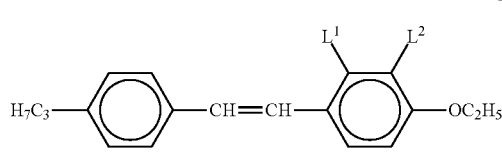
I-130
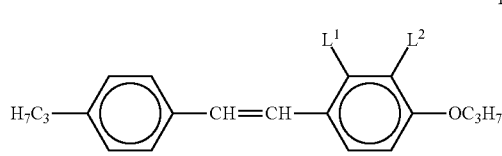
I-131
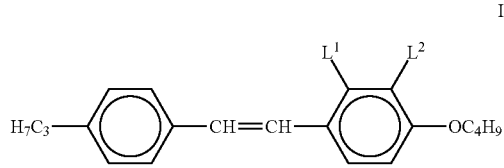
I-132
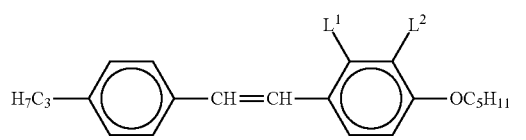
I-133
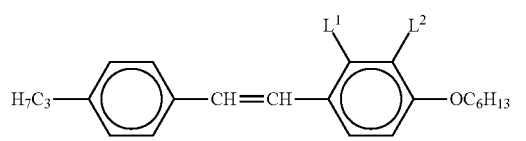
I-134
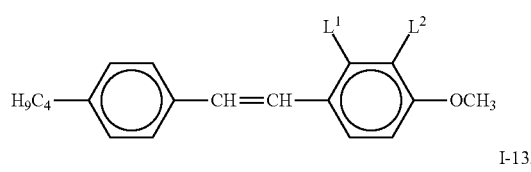
I-135
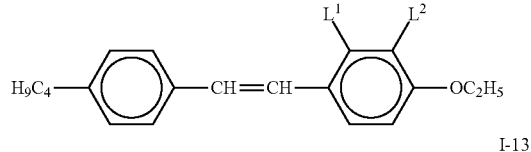
I-136
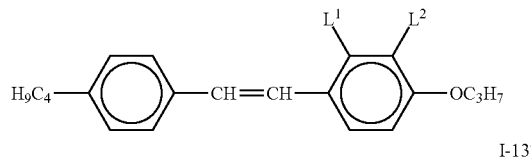
I-137
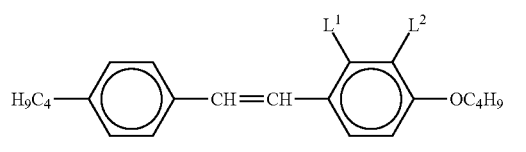
I-138
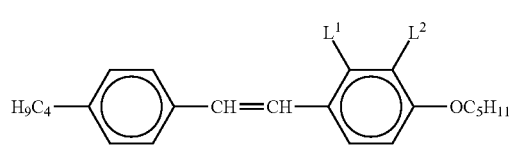
I-139
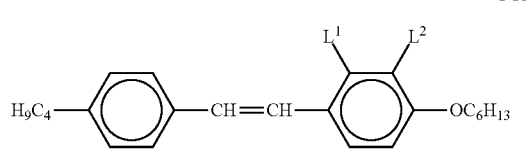
I-140
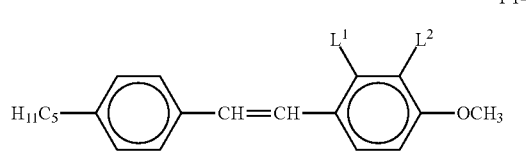
I-141
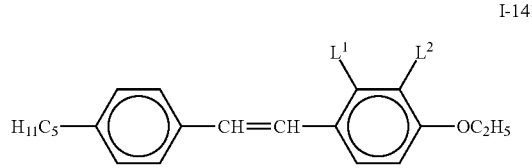

-continued

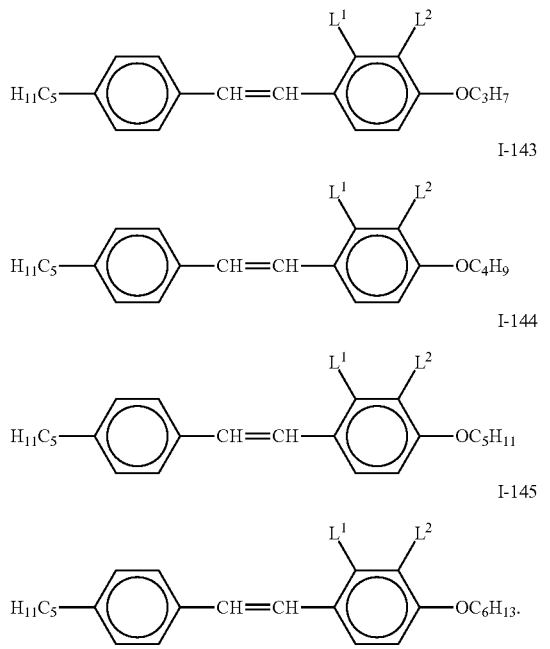

19. The liquid-crystalline medium of claim 1, further comprising at least one compound of the formula O-15,

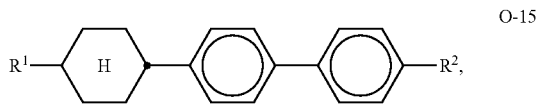

in which $R^1$ and $R^2$ each, independently of one another, denote H, an alkyl radical having up to 15 C atoms which is unsubstituted, monosubstituted by CN or $CF_3$, or at least monosubstituted by halogen, and wherein, in addition, one or more $CH_2$ groups in the alkyl radical may be replaced by —O—, —S—,

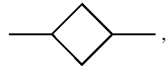

—C≡C—, —$CF_2$O—, —O$CF_2$—, —OC—O—, or —O—CO— in such a way that O atoms are not linked directly to one another.

* * * * *